United States Patent [19]
Reis et al.

[11] Patent Number: 5,640,151
[45] Date of Patent: Jun. 17, 1997

[54] COMMUNICATION SYSTEM FOR COMMUNICATING WITH TAGS

[75] Inventors: Robert Steven Reis; Vikram Verma, both of Palo Alto; Domingo Antonio Mihovilovic, Mountain View; Peter Scott Bertrand, Palo Alto; Richard Kenneth Stevens, Cupertino, all of Calif.

[73] Assignee: Texas Instruments Incorporated, Dallas, Tex.

[21] Appl. No.: 148,552

[22] Filed: Nov. 8, 1993

Related U.S. Application Data

[63] Continuation-in-part of Ser. No. 710,825, Jun. 5, 1991, abandoned, which is a continuation-in-part of Ser. No. 538,546, Jun. 15, 1990, abandoned.

[51] Int. Cl.[6] .................................................. H04Q 1/00
[52] U.S. Cl. ................... 340/825.54; 340/825.49; 340/572; 342/44; 342/361
[58] Field of Search ............... 340/825.54, 825.49, 340/534, 539, 572, 573, 825.06; 342/42, 44, 51, 361

[56] References Cited

U.S. PATENT DOCUMENTS

| | | | |
|---|---|---|---|
| 4,471,345 | 9/1984 | Barrett | 340/572 |
| 4,510,495 | 4/1985 | Sigrimis | 340/825.54 |
| 4,636,950 | 1/1987 | Caswell | 340/825.54 |
| 4,667,193 | 5/1987 | Cotie | 340/825.54 |
| 4,673,932 | 6/1987 | Ekehian | 340/825.54 |
| 4,691,202 | 9/1987 | Denne | 340/825.54 |
| 4,827,395 | 5/1989 | Anders | 340/825.44 |
| 4,899,158 | 2/1990 | Saeki | 342/50 |
| 4,926,187 | 5/1990 | Sugawara | 342/44 |
| 4,952,928 | 8/1990 | Carroll | 340/825.54 |
| 5,194,860 | 3/1993 | Jones | 340/825.54 |
| 5,426,421 | 6/1995 | Gray | 340/825.06 |

OTHER PUBLICATIONS

Websters Ninth New Collegiate Dictionary. 1985 p. 128.

*Primary Examiner*—Brian Zimmerman
*Attorney, Agent, or Firm*—Robert C. Klinger; James C. Kesterson; Richard L. Donaldson

[57] ABSTRACT

A communication system for identifying, locating, tracking and communicating for other purposes with large numbers of tags in a time and energy efficient manner. The tags are associated with items located in a communication region that is interrogated by an interrogator on a one-to-many basis using broadcast commands, on a one-to-one basis using directed commands or on a combination basis using both methods. Identification occurs through organized transmission and reception of signals between the tags and the interrogator. A batch collection protocol uses a combined one-to-many and one-to-one communication system that effectively resolves communication contentions. The batch collection protocol employs a plurality of collection periods which communicate with large or unknown numbers of portable tags.

2 Claims, 5 Drawing Sheets

COMMUNICATION SYSTEM FOR COMMUNICATING WITH TAGS

CROSS-REFERENCE TO RELATED APPLICATIONS

This application is a continuation-in-part of U.S. patent application Ser. No. 07/710,825, filed Jun. 5, 1991, now abandoned, which is a continuation-in-part of U.S. patent application Ser. No. 07/538,546, filed Jun. 15, 1990, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention is a communication method and apparatus for communicating with tags in a communication region and particularly for communicating to locate, track and identify tags in a communication region. The present invention is particularly useful where large numbers of tags are present in the communication region, where the locations or identities of the tags in the communication region are not necessarily known, where transport of the tags to and from the communication region is not necessarily restricted and where contentions among communications to and from tags need to be resolved in a time and energy efficient manner.

Tags can be attached to items such as parts, equipment, furniture, vehicles or to persons, to livestock or to any object having requirements to be tracked, located, or identified. Communications with the tags may be for the purposes of inventory, stock location in warehouses, determination of work-in-progress status, environment history, personnel location or for other purposes necessary for the efficient operation of a process. Examples of such processes are manufacturing, warehousing, inventory management, storage and transfer facilities and personal communication systems.

The communication region in which the communication occurs to identify, locate or track tagged items may be small or large, cellular or single celled or may have other characteristics. For example, in inventory or tracking applications, items may be in widely separated locations in a warehouse or may be grouped closely together in a small storage container. Also, tags may be attached to compound items having components where each component is itself a tagged item. Examples of such compound items are manifests, bills of lading, manufacturing travelers, transport trailers, containers or similar elements.

Communication systems have been developed for locating, tracking or identifying tags. For example, simple written lists or automated machines such as bar code readers or similar devices have been implemented for inventory tasks. The procedure for communicating with each of the tags can be simple if there are a relatively few tags or if the tags are readily accessible. Simple procedures usually have either a reader or other device brought to the tags or have the tags brought to the device. Such procedures require knowledge of the location of each item. If the location of an item is not known, the item must first be located before the procedure can occur. A significant mount of time may be required for those items positioned in relatively inaccessible areas such as a box interior or a remote shelf location.

Simple procedures may be adequate for small numbers of items or for items whose location is known or where the tag is easily accessible, however, for large numbers of items or if repositioning, unpacking or disassembly of items is required (for example in order to gain access to compound items), the simple procedures become complex and time consuming. For large numbers of items, the methods that may work for small numbers of items are inadequate.

One application of an identification system for large numbers of tagged items is in connection with a manufacturing facility. For example, an airplane manufacturing facility will have a large inventory of airplane parts (thousands of items) stored in a warehouse. New parts will be regularly received into the warehouse while other parts will be regularly withdrawn from the warehouse for use in manufacturing the airplanes. From time to time, items within the warehouse will be moved from one location to another. In the identification system, the warehouse is the communication region and each item has an attached tag and the warehouse has one or more interrogators in one or more cells for communicating with all the tags in the warehouse. This is an example of a wide area tracking system.

Another use of an identification system is in connection with a parcel delivery service where many packages are transported from a sender to a receiver through trucks which are at different locations within cities and within other regions of the country or world. Each truck typically has many packages (hundreds of items) regularly received into the truck while other packages are regularly withdrawn from the truck for delivery. From time to time, items within the truck are moved from one location to another. In the identification system, each truck is a communication region and each item has an attached tag and the truck has one or more interrogators in one or more cells for communicating with all the tags in the truck. The entire fleet of trucks forms an expanded communication region where each truck is a separate region and the regions are not necessarily contiguous.

Still another use of an identification system is for work-in-progress tracking. For example, an aircraft engine repair facility requires tracking the engine through the various stages of repair or overhaul, a process that may take a considerable length of time and require frequent moving and temporary storage of the engine. To manage this process requires an identification system that can locate, identify and track items in an unstructured environment.

Another use of an identification system in an unstructured environment is for sensor monitoring. For example, temperature gauges can be attached to items distributed in one or more regions of a cold storage facility where it is desirable to periodically monitor the temperature at each gauge and to note the temperature or whether or not an alarm temperature or other parameter has been exceeded. An effective communication system is required in order to identify and interrogate the numerous items without the necessity of having to locate or access each of the items individually, thus allowing the freedom to relocate items from time to time without regard to the ability to interrogate the items at a future time.

Thus a need exists for an accurate and efficient system that locates, identifies, tracks or otherwise communicates with large numbers of items. The system must operate in a time and energy efficient manner without the need to unpack or disassemble storage containers, without the need to be physically close to the items and without the need for a rigorous manual bookkeeping system to keep track of the items and their status, particularly if the items are moveable within a region.

A number of communication systems exist for identification, location or tracking of items and these systems are based upon many different technologies. Some of the communications may be in a broadcast mode (one to many) where an interrogator broadcasts to many tags, others may be in a one-to-one mode where communication is between one interrogator and one tag. Examples of one-to-one systems are optical bar code readers, optical character readers and magnetic stripe readers, all commonly used in identification systems. The communication range of these systems is typically less than a meter, limiting their application to use where the tags are in close proximity to a reader. Because such systems require close proximity for interrogation, they are of little value when the location of the item is unknown or when it is desired to communicate over a larger communication region such as a warehouse, a truck or other large region.

Radio frequency (RF) identification systems have been used for identification and tracking where an increased range, relative to the short range of proximity detectors, is required. One type of RF system uses magnetically coupled tags affixed to the items to be identified. In such magnetic coupling systems, tags are energized by movement of the tag through a magnetic field generated by an interrogator and the energized tags magnetically couple energy back to the interrogator. These systems find application in inventory control where items pass through portals. For instance, shrink-wrap packages such as computer software or tagged clothing in retail establishments effectively use magnetic coupling systems.

Magnetically-coupled tags are inherently restricted to close-range communications not extending beyond several meters because such tags use small loop antennas that operate at VLF frequencies that have a low coupling efficiency. While larger antennas are theoretically possible, in actual practice small loop antennas are required to avoid excessive tag size. This antenna size limitation precludes the use of such systems in other than small areas with small numbers of tags within the communication region. These systems are also not effective when the location of the tag is not known since, in these systems, the tag must be moved through the interrogation field of the reader thus necessitating prior knowledge of the tag location.

Another type of radio frequency (RF) system uses passive reflecting tags affixed to the items to be identified. When the items having tags are positioned within the range of the radiation radiated from an RF source, the tags are energized by the incident RF radiation at the tags. The tags modify the incident RF radiation and reflect a portion thereof back to a receiver at the RF source thereby producing an identification signal.

The passive RF reflector systems are energy efficient as the tags do not consume power, but instead simply reflect back incident radiation. However, there exist several inherent limitations in passive systems. In passive systems, the signal-to-noise ratio of the reflected identification signal is dependent upon the power level of the incident RF radiation at the tag, the geometry of the reflector and the efficiency of the modification and reflection operations. It is common for the reflected identification signal to be substantially weaker (for example, 100 db weaker) than the incident signal, and therefore, strong incident signals are required for the passive reflectors to work even over limited ranges of small regions.

To increase the power of incident radiation and thereby increase the range of a passive reflector system, passive reflector systems have employed focused radiation rather than omni-directional radiation since the incident power of focused radiation tends to be greater than the incident power of omni-directional radiation. Focused radiation, however, is not practical for a location system because it requires prior knowledge of the location and direction of the tag with respect to the transmitting source. Although reflective systems are used as verification or security systems, reflective systems have not proved practical for identification systems for items of unknown location or in an unstructured environment.

RF systems employing active communication between interrogators and tags are the most practical method to solve the identification task presented by a large number of tags in an unstructured environment. These active systems typically utilize broadcast techniques allowing a number of tags in an area to be located and identified by RF communication. Presently known active systems, however, although commonly used with small numbers of tags per reader, (typically less than ten), do not possess the orderly and efficient methods necessary to resolve the communication conflicts that arise in applications where large numbers of tags, typically hundreds or thousands, are present. Existing systems are not adequate where large numbers of tags are present and where the tags, in battery-powered operation for example, have a finite and small amount of energy available. Specific examples of proposed communication systems useful in limited environments are known.

Examples are communication systems wherein each tag responds to interrogation during a unique time slot, fixed by a tag address code, at a particular response time after interrogation without any provision for collision resolution. Such a system is limited to interrogating a small number of tags at one time or to only a fixed number of tags and is inadequate for large numbers of tags or for a varying population of tags because these systems have no provision for collision resolution.

Another example is a communication system for interrogating transient tags brought into the field of an interrogator where the interrogator sends a synchronization signal to responsive tags and identifies the responding tags with no acknowledgement to a tag to communicate to the tag that a successful transmission was received by the interrogator. In that system, the interrogator continuously broadcasts interrogation requests and listens for and records, when able, tags which respond. The collisions which inevitably result from two or more tags responding simultaneously to the interrogator are attempted to be overcome by having the tags indefinitely repeat their transmissions at randomly chosen times. Such a system tends to create an unacceptable collision problem in the case of many tags or stationary tags and hence is limited to identification of only a few tags and then only if the few tags are transient at the interrogator station.

As another example, a communication system uses two frequencies, one for interrogators to send and the other for tags to respond using various communication sequences. If more than one tag responds, the tag signals collide and the interrogator will detect errors and copy those errors back to the tags. The tags transmit again and frequently again collide repeating the error transmissions. The tags then go silent and respond again after a random time delay. Such a system is deficient in organizing the energy resource. The system is limited to only a few tags since if expanded to a large number of tags, the system presents an unacceptable level of energy consumption due to the disorganized method of resolving collisions. The response acknowledge cycle of each single tag, along with the associated time overhead in error determination, requires constant transmission of signals, consuming an excessive amount of power.

Still another communication system employs multiple frequency responses to interrogation where a transmitter transmits messages to a group of pagers. The transmitter transmits tag addresses in a time-multiplexed group on a single frequency to normally sleeping tags. All tags wake up and listen to the address to determine if their unique address is contained in the group and if so, at what relative position in the sequence. If a tag determines that its address is not in the group of addresses sent, the tag returns to sleep. If the tag determines that its address is in the group, it remains awake to receive a message sent by the central transmitter. Having received its message, the tag sends back to the central transmitter a response signal on a frequency specified by the relative position of the tag address in the group address transmission. Such a system limits the number of tags that can respond at any one time to the number of frequencies available for responses. Only a small number of frequencies, perhaps as few as twenty, are practical due to design tradeoffs between the number of frequencies needed and the frequency precision required of the transmitter and receiver design. The antenna design also becomes more expensive and complex due to the wide frequency bandwidth within which such systems must be responsive.

The communication systems described by way of example, and other proposed systems, are unable to satisfy the need to identify one or more of a plurality of tags within a given area, to resolve collisions in the responses of interrogated tags and to accomplish these tasks in a time and energy efficient manner for a large number of tags.

In view of the above background, there is a need for highly efficient communication systems capable of operation in an orderly and time and energy efficient manner with large numbers of tags to communicate with all tags for purpose of inventory or for other purposes.

For an effective communication system for communicating with items in a communication region to locate, track, or identify the items or to communicate with the items for other reasons, many factors must be considered including the following.

The size of the communication region determined in part by the communication range of the signals from interrogator to tags and from tags to interrogator.

The rate at which tags are introduced into and removed from the communication region.

The number of tags which are within the communication region at any one time where a large number may be hundreds or thousands or more and a small number may be none or a few.

The nature and number of communication channels between the tags and the interrogators.

The bandwidth of the communication channels between the tags and the interrogators.

The reliability of the communication channels.

The efficiency of time with which the interrogation process can be completed and the speed of communications.

The type of communication protocol that is employed.

The cost of the system and particularly the cost of each tag.

Power requirements including battery life and size for portable operation.

Additional desirable features of an identification system are the ability to increase the range of the system over a larger communication region by forming adjacent communication cells in a cellular system where each cell includes an interrogator that communicates with tags over a part of the larger communication region so that a plurality of such interrogators together effectively communicate over the entire communication region. Such a system, having coordinated communications among the cells, defines a wide area identification or asset tracking system.

In summary, efficient communication systems are needed that take inventory of, or for other purposes communicate with, tags within a communication region. Since the number of tags may be hundreds or thousands, the communication protocol is significant and must consider cost, reliability, accuracy, energy efficiency and the other factors identified above. Also, since tags are transportable when attached to transportable items, the tags are typically battery operated and hence the need to conserve power in order to extend battery life is of major consideration.

SUMMARY OF THE INVENTION

The present invention is a communication system that communicates for identifying, locating, tracking or that communicates for other purposes with large numbers of tags in a time and energy efficient manner. The tags are located in a communication region that is interrogated by an interrogator on a one-to-many basis using broadcast commands, on a one-to-one basis using directed commands or on a combination basis using both types of commands. Identification occurs through organized transmission and reception of signals between the tags and the interrogator. The number or the locations of the tags (and associated items) within the communication region are not necessarily known to the interrogator.

The present invention employs, in one embodiment, a batch collection protocol that efficiently and effectively resolves communication contentions. The batch collection protocol uses a plurality of organized, time and energy efficient interrogator initiated collection periods which communicate with large numbers or unknown numbers of portable tags.

In the collection protocol, one-to-many communications occur to direct a plurality of tags to perform a specific function. An example of a one-to-many communication is an interrogator's command that all tags in the region of the interrogator transmit tag IDs to the interrogator. A one-to-one communication occurs to direct only a specific tag to perform a specific function. An example of a one-to-one communication in the collection protocol is an interrogator command to a specific tag to acknowledge receipt of the tag ID. Other specific functions include, for example, the energizing of a sound device (beeper), the reporting of the results of a data collection, a temperature recording or other transfers of data from interrogator to tag or from tag to interrogator. These communications are performed under the direction of the interrogator or the direction of an external system such as a computer.

To perform inventory functions, the interrogator employs batch collection protocol wherein communication signals are processed during a batch session. The batch session includes a plurality of collection periods, each collection period comprising a listen period and an acknowledge period. In the batch session, the quantity of collection periods and the durations of the listen periods are controlled individually, thus providing a means to identify a large number of tags in an orderly and time and energy efficient manner and to effectively resolve communication contentions.

During the listen period of each collection period, each of the unidentified tags is allowed to transmit tag identifying signals to the interrogator only once. During any particular listen period, only a subset of tags is likely to successfully transmit identifying signals to the interrogator because, for large numbers of tags, tag communications often collide. To enhance the probability that tags will successfully communicate, the transmission time for each tag identifying signal is relatively small compared with the full listen period and the times, during the listen period when particular tags initiate sending their identifying signals, are evenly distributed over the listen period.

During the acknowledge period for each collection period, all tags identified during the preceding listen period are individually acknowledged in a batch by the interrogator. Each acknowledge signal directs the addressed tag not to respond to subsequent collection periods during the current batch session and instead to enter a low-power state so as to conserve battery power. The acknowledge period is interference free since tags are permitted to transmit only during the listen period and are required to remain silent during the acknowledge period.

The duration of each succeeding batch collection period is controlled by the interrogator generally to be shorter in time than the previous period by shortening the listen period, taking advantage of the fact that since tags are collected and acknowledged during previous periods, there remain fewer tags after each period and therefore there is not the need for long or constant duration collection periods. In this manner, the system features a controlled orderly time efficient collection process.

During the batch session, the communication bandwidth during a particular one of the collection periods is matched with the number of tags likely to successfully communicate with the interrogator during that particular one of the collection periods so as to tend not to saturate the communication channel during that collection period nor to extend unnecessarily the duration of the collection period thereby conserving battery power. Additionally, during any given collection period, the communications from tags are distributed over the communication bandwidth available during that collection period so as to tend not to saturate the communication channel during that collection period.

With such distribution of tag communications over different collection periods and the control and distribution of tag communications over the available bandwidth within each collection period, the inventory process is efficiently implemented.

In an embodiment of the present invention where the identification signals and the acknowledge signals share the same common communication channel, the interrogator makes no attempt at transmitting acknowledge signals during the listen period, instead continuing to receive as many identification signals as can be detected during the listen period, storing them for batch processing. The process of storing for batch processing ensures that during the listen period when incoming identification signals are present, no collisions in the communication channel are caused by the interrogator attempting to send acknowledgment signals over the same channel used by the tag identification signals.

The present invention also does not permit repeated transmissions of identification signals from the same tag during the same listen period, but rather forces an unacknowledged tag in one listen period to wait to send until the subsequent listen period thereby further avoiding collisions.

Since the transmission time of the tag identification signal is small relative to the listen period, the probability of tag responses colliding with one another is small and gets even less probable as the collection process continues. The probability of collision in each period is determined by the duration of the listen period, the number of tags unacknowledged and the degree of randomness of the transmit delay for each transmission. Accordingly, the present invention is effective in avoiding saturation and resolving contention.

The batch collection protocol thus operates with a sequence of collection periods where some of the tags are identified in different ones of the collection periods, the duration of succeeding periods being progressively shorter, until all tags within the region are identified.

The present invention also incorporates one-to-one communication wherein the interrogator may direct an individual tag to execute a function such as turning on a beeper for a period of time or to prepare a list of data bytes and transmit the data back to the interrogator. This one-to-one communication does not use the batch collection protocol but instead employs an energy efficient protocol to locate and identify and communicate to one or a subset of the plurality of the tags in the region of the interrogator.

The present invention conveniently employs tag apparatus which incorporates omni-directional antennas described in the U.S. patent application 08/068,682, entitled AN EFFICIENT ELECTRICALLY SMALL LOOP ANTENNA WITH A PLANAR BASE ELEMENT. The present invention also employs interrogators having a plurality of antennae thus providing spatial and polarization diversity. These antenna may each be separately engaged for transmission and reception, and in addition, the tag signal strength as received by each antenna separately is monitored and recorded, thus providing an indication of the optimum antenna orientation for communication. This combination of omni-directional tag antennas and interrogator antenna diversity ensures efficient, effective communications. In the preferred embodiment a typical useable range extends beyond one hundred meters.

The foregoing and other objects, features and advantages of the invention will be apparent from the following detailed description in conjunction with the drawings.

DESCRIPTION OF THE PREFERRED EMBODIMENTS

Figure 1:
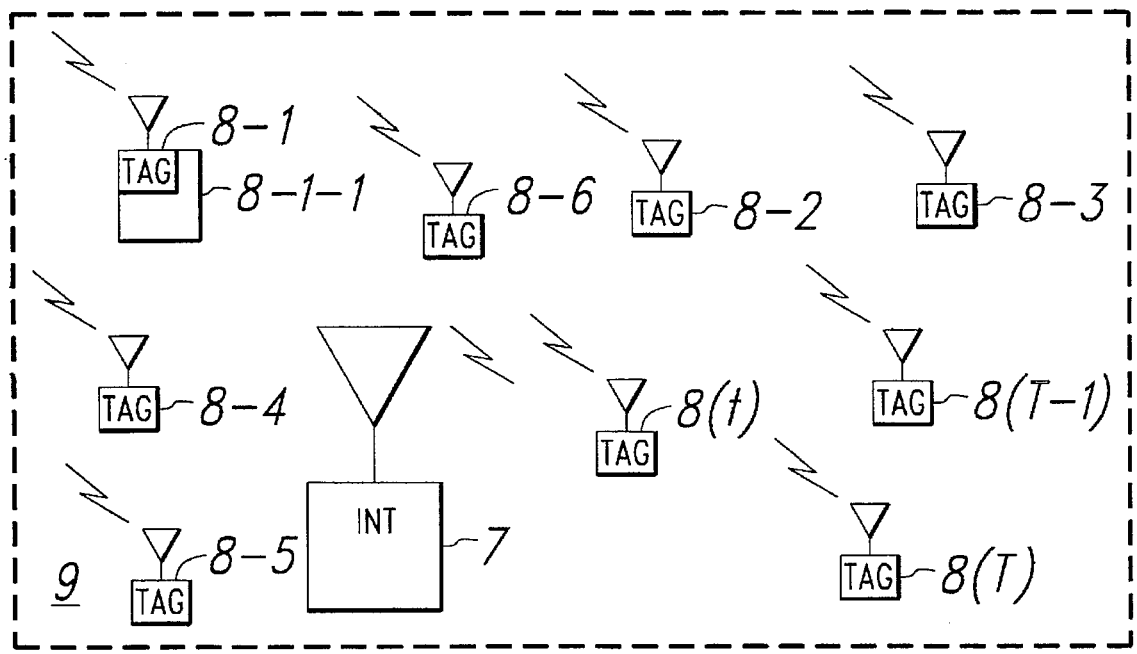
FIG. 1 depicts a communication region formed of one cell in which an interrogator communicates with a plurality of tags.

FIG. 1—Communication System

In FIG. 1, a communication region is shown as a single cell 9 that includes a plurality T of tags 8-1, 8-2, . . . , 8-(t), . . . , 8-(T-1), 8-(T) that communicate with the interrogator 7. The interrogator 7 and the tags 8 form a communication system that operates in the communication region of cell 9. The communication region in typical embodiments is enclosed within a radius of less than one mile from the interrogator 7 and typically contains 50 to 1000 of the tags 8. Each of the tags 8 transmits and receives communications to and from the interrogator 7 and interrogator 7 also transmits and receives communications to and from the tags 8. The cell 9 contains items and each item typically has a tag 8 attached by adhesive, clip or other convenient binder so that locating, tracking, identifying or communicating with a tag is the same as locating, tracking, identifying or communicating with the attached item. For purposes of illustration, the tag 8-1 of FIG. 1 is associated with the item 8-1-1 of FIG. 1. Each of the other tags 8 is similarly associated with items which for clarity are not shown.

Many types of transmitters and receivers (sometimes called "transmitters/receivers" or "transceivers") can be used for the tags 8 and the interrogator 7. Such devices can employ infrared, acoustic, radio frequency, optical or magnetic means and the communication medium may be wire, optical fiber or air. In preferred embodiments, very high frequency (VHF) radio frequency is used in an air communication medium so that the transmitter power, antenna size requirements and device range capability are satisfactory for local communication ranges suitable for warehouses, buildings, vehicles and other similar local regions.

Figure 2:
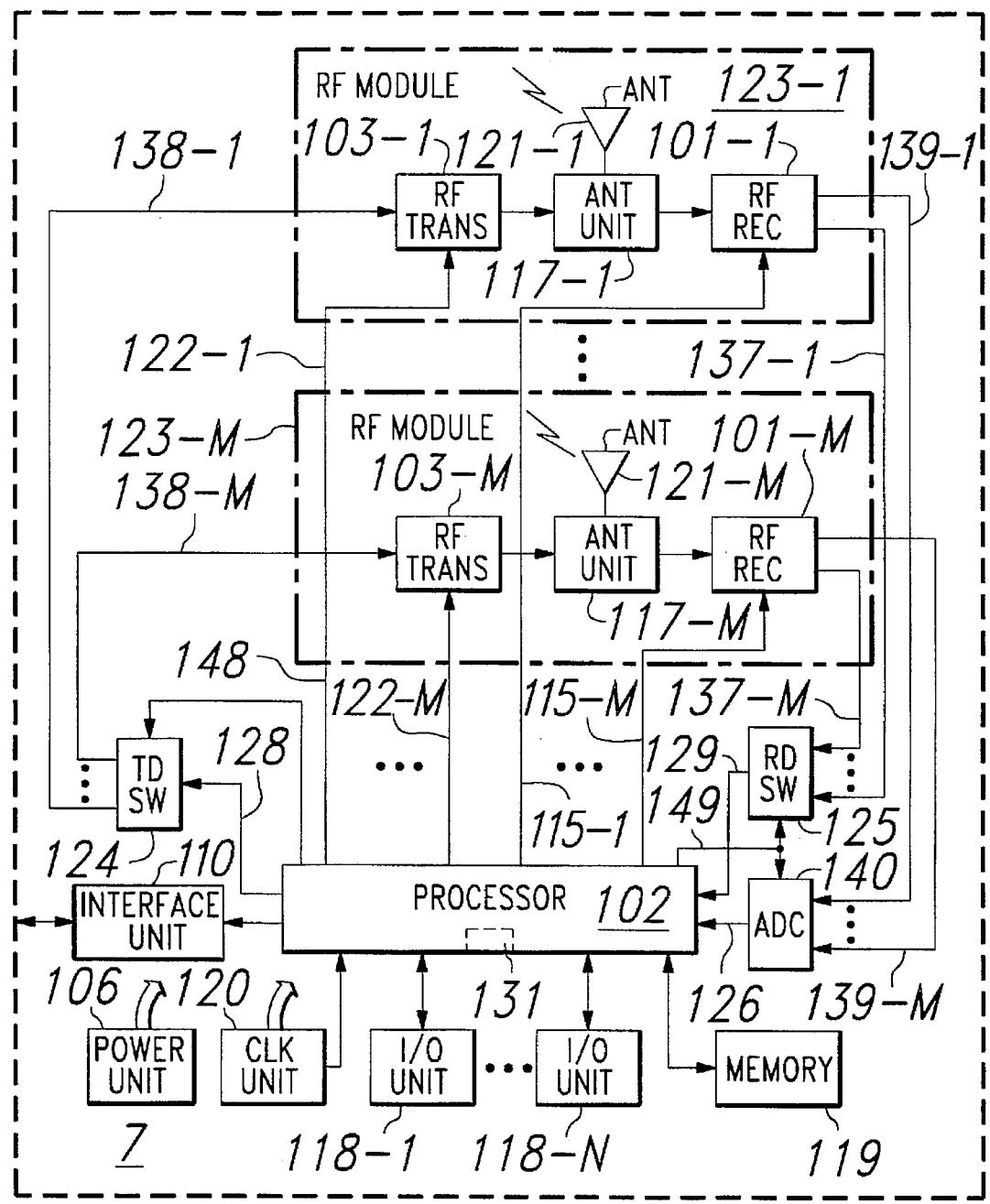
FIG. 2 depicts a block diagram of a typical interrogator.

FIG. 2—Interrogator

In FIG. 2, further details of the interrogator 7 of FIG. 1 are shown. The interrogator 7 includes one or more radio frequency (RF) transmitter/receiver (transceiver) modules 123, particularly, the RF modules 123-1, . . . , 123-M. Typically, the value of M is 2 or 3 so that interrogator 7 typically includes 2 or 3 RF modules 123. The interrogator 7 includes an interrogator processor 102 for processing commands from an interrogator command set. The interrogator RF modules 123 connect to interrogator processor 102 for sending and receiving communications to and from tags 8 of FIG. 1 including tag commands, synchronizing signals and acknowledge signals. The processor 102 together with the synchronizing code stored in memory 131 is a synchronizing means for communications with tags 8.

RF module 123 contains RF transmitter 103, which is a respective one of frequency modulating RF transmitters 103-1, . . . , 103-M, and contains RF receiver 101, which is a respective one of RF receivers 101-1, . . . , 101-M. RF receiver 101 is typically a conventional superheterodyne receiver or other similar receiver.

The power to the RF modules 123-1, . . . , 123-M and other components of the interrogator of FIG. 2 is from the power unit 106. The power states of the RF transmitters 103-1, . . . , 103-M are controlled by control lines 122-1, . . . , 122-M, respectively. The power states of RF receivers 101-1, . . . , 101-M are controlled by control lines 115-1, . . . , 115-M, respectively. The control lines 122-1, . . . , 122-M and 115-1, . . . , 115-M are controlled by processor 102 by means of which the processor 102 has control over the receive and transmit functions of RF modules 123-1, . . . , 123-M, respectively.

RF module 123 contains an antenna unit 117 which is a respective one of the antenna units 117-1, . . . , 117-M. Antenna unit 117 is typically a diode network that is responsive to the power states of RF transmitter 103 and RF receiver 101 and functions automatically to connect RF transmitter 103 to antenna 121 which is a respective one of the antennas 121-1, . . . 121-M for transmission of RF signals to the tags 8 of FIG. 1 or to connect antenna 121 to RF receiver 101 for reception of RF signals from the tags 8.

The RF modules 123-1, . . . , 123-M receive the processor output signals, to be transmitted, on the respective data signal lines 138-1, . . . , 138-M, respectively, from the transmit data switch 124 and provide processor input signals, received from tags 8, to lines 137-1, . . . , 137-M, respectively, which connect as inputs to the receive data switch 125. The RF modules 123-1, . . . , 123-M also provide receive signal strength indications to signal strength indication lines 139-1, . . . , 139-M which connect as inputs to analog-to-digital converter (ADC) 140. The analog-to-digital converter 140, under control of control lines 149 from processor 102, provides a digital representation via input line 126 of the signal strength indications on lines 139-1, . . . , 139-M to processor 102.

The receivers 101, lines 139 and converter 140 are signal strength detector means for detecting the signal strength of the received signals from the tags 8 and providing a signal strength indication to interrogator processor 102.

The transmit data switch 124, under control of processor 102 by control lines 148, switches the data signal 128 from processor 102 to one of data signal lines 138-1, . . . , 138-M. The receive data switch 125, under control of processor 102 by means of control signals on lines 149, switches the data signal lines 137-1, . . . , 137-M from RF receivers 101-1, . . . , 101-M to the data signal line 129 which is input to processor 102.

In the arrangement described, the interrogator processor 102 has independent control of which of the RF modules 123 are to receive power, which of the transmitters 103 in RF modules 123 are to function as transmitters as controlled by lines 122-1, . . . , 122-M and which of the receivers 101 in RF modules 123 are to function as receivers as controlled by lines 115-1, . . . , 115-M.

For example, processor 102 may select RF module 123-1 for the transmission function, in which event, control signals on line 148 from processor 102 configure the transmit data switch 124 to connect the processor data signal line 128 to the data signal line 138-1 for input to RF module 123-1 and control line 122-1 from processor 102 enables RF transmitter 103-1. Similarly, processor 102 may select RF module 123-M for a reception function, in which event control signals on line 149 from processor 102 configure the receive data switch 125 to connect the receiver 101-M data signal line 137-M to the receive data processor input signal line 129 for input to the processor 102 and control line 115-M from processor 102 enables RF receiver 101-M.

In the preferred embodiment, the use of two or more RF modules 123 and associated antennas 121 provides diversity in the transmissions to and from the tags in the FIG. 1 system so as to increase the reliability and robustness of the communication. Although many different types of diversity are possible, the preferred embodiment uses both spatial and polarization diversity.

Each of antennas 121-1, . . . , 121-M is spatially offset from the others and is relatively oriented in a different direction from the others, thus providing both spatial and polarization diversity, respectively. Any one of the tags 8 of FIG. 1 which may have poor reception from one of the antennas 121 of interrogator 7 is apt, because of the spatial and polarization diversity, to have better reception from another one of the antennas 121. Similarly, any one of the antennas 121 of the interrogator 7 having weak reception from one of the tags 8 of FIG. 1 is apt to have stronger reception from other ones of the antennas 121.

The communication protocol may select the optimum one of the RF modules 123 in the interrogator 7 for communication with any particular one of the tags 8. The optimum one is determined by the signal strength through ADC 140 and operation of processor 102. Generally, the optimum RF module for a particular one of tags 8 is the one reporting the highest signal strength.

The processor 102 is any conventional microprocessor having a speed sufficient to process the data and control the functions of interrogator 7. In a preferred embodiment, processor 102 is a Motorola MC68HC05C9, an eight-bit microcontroller having an internal instruction code memory 131. The processor 102 executes interrogator sequencing code stored in the interrogator memory 131 which controls the collection protocol and controls the transmission and reception of information between the interrogator 7 and tags 8 of the system of FIG. 1. The memory 131 also stores tag commands that are to be transmitted to the tags for controlling the operation of the tags.

The interrogator 7 also includes an interface unit 110 connected in a conventional manner to processor 102 functioning to process data communication between processor 102 and computer data processing devices (not shown in FIG. 2) external to interrogator 7. The external devices can be computers such as computer 40 in FIG. 8, directly connected or connected over a network to interface unit 110.

The interrogator 7 also may include I/O units 118-1, . . . , 118-N that connect in a conventional manner to the processor 102. The I/O units 118 are optional and can include display units, keyboards or other conventional I/O devices.

Processor 102 is also connected to memory 119. Memory 119 typically stores configuration and other data associated with I/O units 118, associated with other external devices or associated with interface unit 110 connecting to computer 40 of FIG. 7 (not show in FIG. 2). Memory 119 is typically an EEPROM memory. The processor 102 in one embodiment includes both internal memory 131 and external memory 119 that together constitute the interrogator memory. However, the interrogator memory can be either internal or external or can be both as shown.

The interrogator 7 includes a clock unit 120 which provides the timing signals to the processor 102 and other components of the interrogator 7 and may include a time-of-day clock.

FIG. 3—Tag

Figure 3:
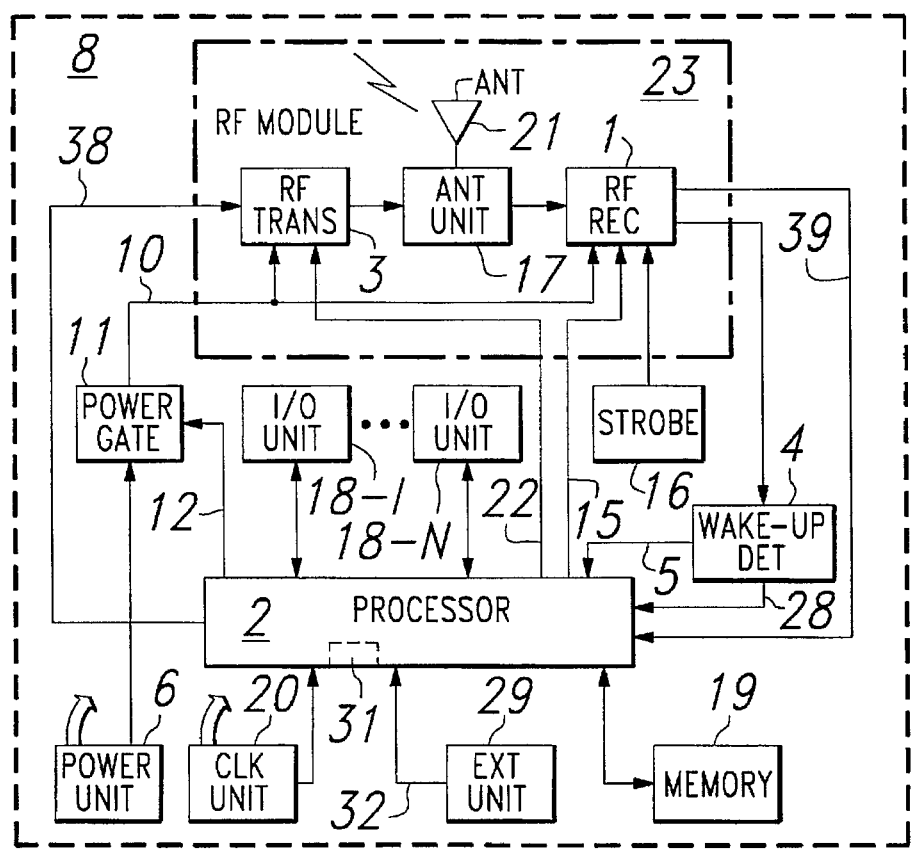
FIG. 3 depicts a block diagram of a typical tag.

In FIG. 3, further details of a typical one of the tags 8 of FIG. 1 are shown. The tag 8 includes a radio frequency (RF) transceiver module 23. RF module 23 contains RF transmitter 3 and RF receiver 1. RF receiver 1 is typically a conventional superheterodyne receiver or other similar receiver.

The RF module 23 receives power lines 10 from the RF controllable power-gate module 11 which is controlled by RF power-gate module control line 12 from processor 2. The power state of the RF transmitter 3 is controlled by control lines 22. The power state of RF receiver 1 is controlled by control lines 15. The control lines 22 and 15 are controlled by processor 2 by means of which the processor 2 has control over the receive and transmit functions of RF module 23. The power unit 6 provides power to the tag transceiver 23 in either the low-power state or the normal-power state as selected by power gate 11.

RF module 23 contains an antenna unit 17 which is a diode network or other circuit responsive to the power states of RF transmitter 3 and RF receiver 1 and functions automatically either to connect RF transmitter 3 to antenna 21 for transmission of RF signals to the interrogator 7 FIG. 1 or to connect antenna 21 to RF receiver 1 for reception of RF signals from the interrogator 7.

The RF module 23 receives the processor output signals to be transmitted on the data signal lines 38 from processor 2 and provides signals received from interrogator 7 to line 37 which connects as a processor input to the processor 2. The RF module 23 also provides received signals on line 39 to a wake-up detector 4. The detector 4 operates to sense the presence of wake-up signals on line 39 that indicate that a communication has been received from the interrogator 7 of FIG. 1.

Antenna 21 is typically an omni-directional antenna for RF communication that provides good sensitivity at multiple signal polarizations. One example of such an antenna that provides excellent sensitivity is disclosed in U.S. patent application 08/068,682, entitled AN EFFICIENT ELECTRICALLY SMALL LOOP ANTENNA WITH A PLANAR BASE ELEMENT.

The preferred operation of the tag 8 is to switch to a low-power mode (sleep mode), through operation of the power gate 11, whenever possible so as to conserve the energy of power unit 6. In the preferred embodiment, power unit 6 is a small battery and hence power conservation is important. Prior to entering the sleep state, processor 2 enables the wake-up detector 4 by means of control line 5, to detect any wake-up signal that arrives from the interrogator 7.

The tag 8 includes strobe 16, a conventional pulse generator providing a power strobe signal which is active for a short period (approximately three milliseconds in one preferred embodiment) and inactive for a long period (approximately three seconds in one preferred embodiment). During the sleep state, strobe 16 periodically powers RF receiver 1 to receive any wake-up signals that may be transmitted from the interrogator 7 of FIG. 1. If a wake-up signal is detected, the tag 8 changes to the normal-power mode and prepares for communication with the interrogator 7. If no wake-up signal is detected, the tag 8 remains in the sleep state.

The processor 2 is any conventional microprocessor having a speed sufficient to process the data and control the functions of tag 8. In a preferred embodiment, processor 2 is a Motorola MC68HC05P1 eight-bit microcontroller having an internal instruction code memory 31. The processor 2 executes tag sequencing code stored in the tag memory 31 which controls the transmission and reception of information from the interrogator 7 and participates in the tag collection and other protocols for the system of FIG. 1. The tag processor 2 is connected to the tag transceiver module 23 for processing the tag sequencing code in response to tag commands received by the tag transceiver to send a tag ID to the interrogator transceiver in response to one of the synchronizing signals and responsively to receive one of the acknowledge signals from the interrogator.

Processor 2 includes a reset input 28 connected from wake-up detector 4 to reset the processor 2, causing processor 2 to leave the low-power mode and enter the normal-power mode. Processor 2 also includes an interrupt input 32 connected from external unit 29 to the processor that causes processor 2, in response to an interrupt signal on interrupt input 32, to exit the low-power mode and enter the normal-power mode.

Processor 2 is connected to memory 19. Memory 19 is typically an EEPROM memory, although other memory devices, preferably forms of non-volatile memory (NOVRAM) so as to conserve energy, may be used.

The processor 2 in one embodiment includes both internal memory 31 and external memory 19 that together constitute the tag memory. However, the tag memory can be either internal or external or can be both as shown. The tag memory stores information that may have been received from interrogator 7 of FIG. 1, from external sources by means of the I/O units 18 or from other units. On command from the interrogator 7, the tag may be caused to transmit data from the tag memory to the interrogator 7.

The tag 8 also may include I/O units 18-1, . . . , 18-N that connect in a conventional manner to the processor 2. The I/O units 18 are optional and can include such things as sound devices (beepers), display units, keyboards, temperature sensors, RS232 devices or other conventional and non-conventional I/O devices. In one embodiment, a beeper is included as an I/O device.

Each tag in the system typically has a unique tag ID that distinguishes all tags from each other. The tag ID is typically stored in the tag memory although it may be specified by or included as one of I/O units 18.

The tag 8 includes a clock unit 20 which provides the timing signals to the processor 2 and other components of the tag 8 and may include a time-of-day clock.

The power unit 6 provides the power to all of the components of the tag 8. Typically, the power unit 6 is a battery so that the tag 8 is transportable without the necessity of connection to an external power source although, in some embodiments, other sources of power may be employed.

Figure 4:
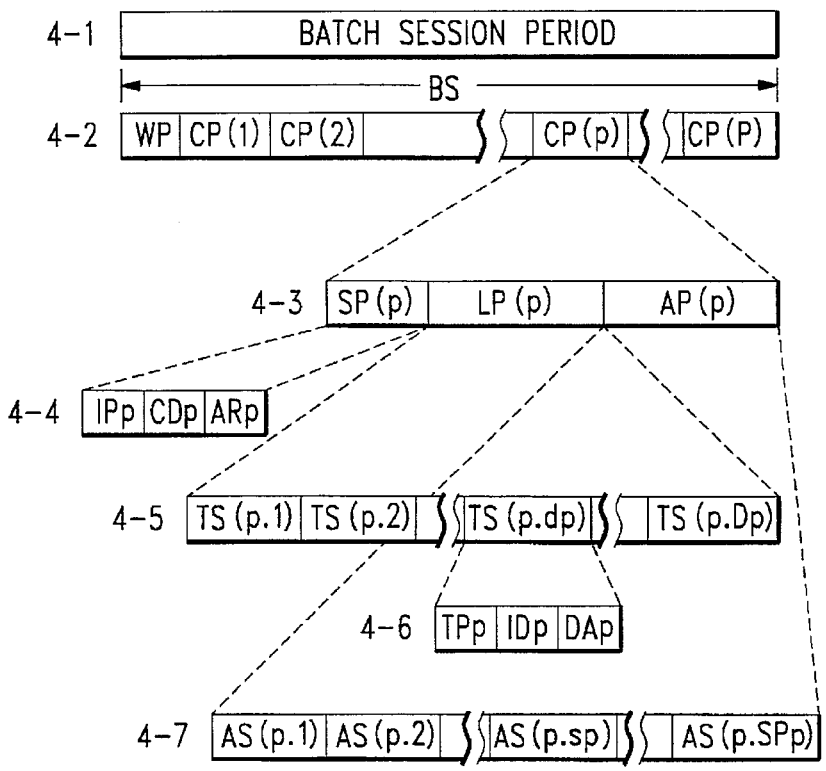
FIG. 4 is a schematic timing diagram of the batch session period for executing the batch collection protocol in the FIG. 1 system.

FIG. 4—Batch Collection Protocol

In FIG. 4, the batch collection protocol is represented. The batch collection protocol is useful, for example, for taking inventory of all tags 8 in the communication region 9 of FIG. 1. The inventory process occurs over a batch session (BS) period 4-1 that includes two way communication between the interrogator 7 and the tags 8.

The batch session BS as indicated in 4-2 of FIG. 4 includes an initial wake-up control period, WP, for waking up the tags and a plurality P of batch collection periods, CP(1), CP(2), . . . , CP(p), . . . , CP(P). In one particular embodiment, the wake-up signal sent by interrogator 7 during the WP period is a 30.5 Khz square wave modulation of the RF carrier sent for a period of 3.492 seconds, this period being longer than the 3 second period of the wake-up signal detect strobe during which the receiver 1 of each of tags 8 is enabled for 3 milliseconds to receive the wake-up signal.

During each batch collection period, a batch of tags that constitute a subset SS of the total set T of tags 8 in the communication region 9 of FIG. 1 successfully communicate with the interrogator 7. Specifically, a first subset of the tags 8 that successfully communicate during collection period CP(1) is designated SS(1). For example, subset SS(1) might include tags 8-4, 8-2, 8-(0 and others of FIG. 1. Some of the tags of FIG. 1 that do not successfully communicate during collection period CP(1), may successfully communicate as one of a second subset SS(2), during collection period CP(2), or may thereafter communicate, as one of a subsequent subset SS(p), that successfully communicates during a subsequent collection period CP(p). The batch collection period CP(P) is the final opportunity for the tags 8 to communicate during a batch session as part of the final subset SS(P). The value of P is selected large enough to ensure that all tags that can communicate will have successfully communicated by the CP(P) collection period. In one embodiment, P has the value of 20. In typical operation, all tags are collected in 5 or less collection periods so that 20 collection periods provides a large safety margin.

In summary, the subsets SS of tags that successfully communicate during collection periods CP are designated SS(1), SS(2), . . . , SS(p), . . . , SS(P) and correspond respectively to collection periods CP(1), CP(2), . . . , CP(p), . . . , CP(P). In a communication system where all tags 8 successfully communicate, the sum of the number of tags in each of the subsets SS(1), SS(2), . . . , SS(p), . . . , SS(P) is equal to the total number T of tags in the communication region.

For the subsets of tags SS(1), SS(2), . . . , SS(p), . . . , SS(P), the corresponding tags that are in the subsets are identified as follows. Subset SS(1) comprises SS1 tags, including tags T(1,1), T(1,2), . . . , T(1,ss1), . . . , T(1,SS1). Subset SS(2) comprises SS2 tags, including tags T(2,1), T(2,2), . . . , T(2,ss2), . . . , T(2,SS2). Subset SS(p) comprises SSp tags, including tags T(p,1), T(p,2), . . . , T(p,ssp), . . . , T(p,SSp). Subset SS(P) comprises SSP tags, including tags T(P,1), T(P,2), . . . , T(P,ssP), . . . , T(P,SSP).

Each collection period CP of batch session 4-2 of FIG. 4 is divided into a synchronization period SP(p), a listen period LP(p) and an acknowledge period AP(p). Thus the collection periods CP(1), CP(2), . . . , CP(p), . . . , CP(P) have synchronization periods SP(1), SP(2), . . . , SP(p), . . . , SP(P), listen periods LP(1), LP(2), . . . , LP(p), . . . , LP(P) and acknowledge periods AP(1), AP(2), . . . , AP(p), . . . , AP(P), respectively. A typical collection period CP(p) having a synchronization period SP(p), a listen period LP(p) and an acknowledge period AP(p) is shown as collection period 4-3 in FIG. 4. In the example described, each listen period LP(p) precedes the acknowledge period AP(p) in the batch collection period CP(p) so that the collection function is separated from the acknowledge function. Each listen period LP(p) is proceeded by a synchronization period SP(p) for synchronizing the tags 8 of FIG. 1 for that collection period.

The synchronization period SP(p) is shown in more detail as 4-4 in FIG. 4. The synchronization period SP(p) includes an interrogator preamble field, IPp, a command field CDp, and an argument field ARp.

The preamble field IPp is sent at the beginning of the synchronization period and consists of, in one example, 12 pulses where 11 of the pulses are of 50 microsecond duration repeated at 125 microsecond intervals. The 12th pulse in the preferred embodiment is 110 microseconds in duration, serving to identify the preamble as being from the interrogator of the preferred embodiment. Other durations of the final or of one or more of the intermediate pulses may be used in alternate embodiments and constitute means to identify the preamble source and therefore the source of the subsequent data.

The command field CDp and argument field ARp of 4-4 in FIG. 4, in one particular embodiment, are comprised of 8-bit bytes having 7 bits of code and one bit of parity. The command field CDp defines the command that is sent from an interrogator 7 to the tags 8. The argument field ARp may be associated with a particular command and will comprise differing numbers of bytes corresponding to the command type and may carry the address (ID code) of a tag or other information.

An example of a command instruction set and the corresponding argument fields for the preferred embodiment appear in the following TABLE 1. In TABLE 1, the commands are of two types, namely, one-to-many commands or "broadcast commands" that are commands broadcast for execution by all awake tags and one-to-one commands or "directed commands" that are commands directed to an addressed tag for execution. The HELLO, ALL_SLEEP, and INTERRUPT_HELLO commands are broadcast commands and all other commands are directed commands. Of course, additional broadcast commands or directed commands can be added to TABLE 1 if desired.

The interrogator processor accesses the interrogator memory to process the interrogator sequencing code to first send a broadcast command and subsequently to send a directed command. With this broadcast command and subsequent directed command sequencing, efficient communication between many tags and an interrogator is achieved.

identified by the argument field (the argument field includes the tag ID code) to resume the sleep state and directs the identified (addressed) tag to remain enabled to receive a subsequent directed command, for example, a BEEP_ON command. The ALL_SLEEP command is an example of a broadcast one-to-many communication that is typically followed by a one-to-one communication such as BEEP_ON command.

Other commands shown in TABLE 1 are commands directed to a specific addressed tag. For example, the SQUAWK command directs a specific tag to transfer the data from a specific portion of the tag memory to the interrogator.

TABLE 1

| Code | Name | Arguments | Description |
| --- | --- | --- | --- |
| 00000000 | HELLO | None | Initiate collection of all awake tags using default listen period. |
| 11000011 | SLEEP | 3 byte ID | Instructs the addressed tag that it has been heard and that it can go to sleep. |
| 11000101 | BEEP_ON | 3 byte ID | Instructs the addressed tag to turn on the audible alarm. Returns: Tag ID plus status code. |
| 11000110 | BEEP_OFF | 3 byte ID | Instructs the addressed tag to turn off the audible alarm. Returns: Tag ID plus status code. |
| 11001001 | PLACE | 3 byte ID + count N + address (M) + N bytes of data + parity byte | Store N bytes in EEPROM of addressed tag starting at addr M. Returns: Tag ID plus status code. |
| 11010010 | SQUAWK | 3 byte ID + counter (N) + address (M) | Retrieve N bytes from addressed tag EEPROM starting at address M. Returns: Tag ID + N bytes of data + parity byte covering the data. |
| 11011011 | ALL_SLEEP | 3 byte ID | Puts all awake tags to sleep except the one with the specified ID. |
| 11001100 | CHECK_IN | 3 byte ID | Instructs the addressed tag to return its ID and status bytes. |
| 10001110 | SET_WINDOW | Byte N | Set listen window in all tags to N times 55 msec. Default N=1. Command initiates a hello cycle. |
| 11010001 | GET_VERSION | 3 byte ID | Instructs addressed tag to return its ID and version byte. |
| 11010100 | WRITE_PORT_B | 3 byte ID + data byte | Writes a byte to Port B of addressed tag. Returns: Tag ID. |
| 11011001 | READ_PORT_A | 3 byte ID | Reads Port A of addressed tag. Returns: Tag ID + Port A. |
| 00000011 | INTERRUPT_HELLO | None | Hello directed to all tags that have the Int A in the status byte set. Returns: Tag ID. |
| 11011010 | GET_ERROR | 3 byte ID | Get error vector from addressed tag. Returns: Tag ID + error byte. |
| 11011101 | CLR_ERROR | 3 byte ID | Clears the error vector on addressed tag. Returns: Tag ID. |

Each tag processor processes the tag sequencing code in response to the broadcast command and the directed command. As part of the sequencing, each tag returns a unique communication to the interrogator including the tag ID.

In FIG. 4 and referring to collection period 4-3 of FIG. 4, the synchronization period SP(p) is followed by a tag command selected from the instruction set of TABLE 1 to command the tags to perform a function. For the inventory function, the HELLO and SET_WINDOW commands are broadcast commands that function to initiate the collection of the ID codes from all tags within range of the interrogator. The HELLO and SET_WINDOW commands instruct all tags to report their tag ID's to the interrogator and to subsequently resume the sleep (low-power) state. These broadcast commands are examples of one-to-many command operations, that is, communication from one interrogator to many tags. The ALL_SLEEP command is a broadcast command that directs all awake tags except the tag In the inventory function, the synchronization period SP(p) of 4-3 in FIG. 4 is followed by the listen period LP(p) of 4-3. A typical one of listen periods LP(p), shown in further detail in 4-5 of FIG. 4, comprises a plurality DiD of diverse communication periods (time periods) TS which, in the embodiment described, are time periods TS(p,1), TS(p, 2), ..., TS(p,dp), ..., TS(p,Dp). The time period TS(p,dp) is typical and is a time period provided for one tag 8 of FIG. 1 to communicate with the interrogator 7 of FIG. 1. If more than one tag attempts to communicate during a time period such as TS(p,dp), a communication collision may occur that will defeat the successful tag-to-interrogator communication for one or more of the colliding tags.

The communication times of the tags 8 are distributed over the Dp time periods of listen period 4-5 of FIG. 4 so as to reduce the number of collisions that occur. However, in general it may be expected that some tags may not successfully communicate during any particular listen period LP(p).

The larger the number Dp of time periods relative to the number T of tags 8 attempting to communicate, the more likely that successful communication occurs during a listen period. The larger the number Dp, however, the longer the time required to take inventory of the tags 8. For battery operated tags, the longer the communication time, the more battery power required. Thus a balance between the number of time periods allocated and the number of tags in the system is required for efficient operation. In actual practice it has been observed that the most efficient operation is attained when the number Dp of time periods is equal to the number T of expected tags.

The algorithms used to determine the distribution of the communication times allocated to tags over the time periods are also important to system operation.

A typical one of the time periods TS(p,dp) is shown in 4-6 of FIG. 4. A communication from a tag during the TS(p,dp) time period includes a tag preamble TPp, a tag identifier IDp, and a data field DAp.

The tag preamble TPp is sent by a tag at the beginning of the time period to which the particular tag has been allocated. In one example, the preamble consists of 12 pulses of which the first 11 are 50 microsecond in duration, repeated at 125 microsecond intervals. The 12th pulse in the preferred embodiment is 70 microseconds in duration, serving to identify the preamble as being from the tag of the preferred embodiment. Other durations of the final or of one or more of the intermediate pulses may be used in alternate embodiments and constitute means to identify the preamble source and therefore the source of the subsequent data.

The tag identifier IDp, in one embodiment, is a 24-bit field comprising 20 ID bits and a 4-bit format field. The format field is used to identify the nature of the tag and/or the nature of data that follows in the data field DAp. The data field may include, for example, status information indicating conditions of the tags such as low battery, audible alarms on or off, interrupt levels or may include information as to the data contained within memory 19 of FIG. 3, the nature of connected I/O devices and other information or data associated with data transfers between the tag 8 and the interrogator 7.

By way of example, referring to FIG. 3, one of the I/O units 18 may be a temperature monitoring device which provides temperatures to the tag 8 to be recorded by the tag for transmission to the interrogator 7 of FIG. 1. In such a case, the nature and format of the data is specified in the format field with any data to be transferred to the interrogator carried in the DAp field. Similarly, if the I/O unit 18 is an RS232 port, such a port and the data format is specified in the format field and the data to be transferred to the interrogator carried in the DAp field. Many different data formats and I/O units are possible in accordance with applications of the present invention.

For each of the plurality SSp tags of subset SS(p) that are successful in communicating as part of the batch collection protocol during the listen period LP(p), an acknowledge signal is sent only once and only during the immediately following acknowledge period, AP(p). Each of the SSp tags of the subset of tags SS(p) is allocated a separate communication channel that, in the embodiment described, is a separate acknowledge time period during the acknowledge period, AP(p). More specifically, during the acknowledge period AP(1), the subset SS(1) has acknowledge signals AS(1,1), AS(1,2), ..., AS(1,ss1), ..., AS(1,SS1) that correspond to the tags of subset SS(1), namely, tags T(1,1), T(1,2), ..., T(1,ss1), ..., T(1,SS1). During the acknowledge period AP(2), the subset SS(2) has acknowledge signals AS(2,1), AS(2,2), ..., AS(2,ss2), ..., AS(2,SS2) that correspond to the tags of subset SS(2), namely, tags T(2,1), T(2,2), ..., T(2,ss2), ..., T(2,SS2). During the acknowledge period AP(P), the subset SS(P) has acknowledge signals AS(P,1), AS(P,2), ..., AS(P,ssP), ..., AS(P,SSP) that correspond to the tags of subset SS(P), namely, tags T(P,1), T(P,2), ..., T(P,ssP), ..., T(P,SSP).

Figure 5:
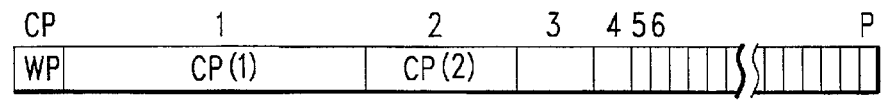
FIG. 5 is a schematic timing diagram showing further detail of the FIG. 4 timing.

FIG. 5—Batch Collection Period Matching

In FIG. 5, further details of the batch session period of FIG. 4 are described. Specifically, the batch session includes the P collection periods CP(1), ..., CP(P). In a preferred embodiment, these collection periods are not all of equal duration and the performance of the collection protocol is enhanced by matching the duration of each of the collection periods to the expected number of tags that are likely to respond during each of the collection periods.

More specifically, in one example of the operation of a batch session, the wake-up command during the wake-up period WP is communicated to all of the tags 8 in the communication region 9 of FIG. 1. All of the tags of region 9 wake up in response to a wakeup signal during the wake-up period, WP, and responsively are programmed to transmit during the listen period LP(1) of FIG. 4-3 on receipt of the synchronization command CD(1) of FIG. 4-4 sent during the synchronization period SP(1) of FIG. 4-3.

The duration of the listen period LP(1) is longer than the duration of subsequent listen periods because it can be expected that the largest number of tags will be attempting to communicate during the collection period CP(1). In one particular embodiment, the duration of listen period LP(1) is made approximately equal to XR times T, where XR is the time required for transmission of a response by a tag, shown as 4-6 of FIG. 4, approximately 6 milliseconds in a preferred embodiment, and T is the total number of tags in the communication region 9 of FIG. 1.

In one example, the T tags 8 have response times distributed, generally randomly, over the listen period LP(1). With such a distribution, it is generally expected that approximately 60% of the tags will successfully communicate without collision with other tags during the CP(1) collection period. These successful tags constitute the subset SS(1).

During CP(1), acknowledge signals are sent to the successfully communicating tags so that the SS(1) subset of tags which successfully communicate during CP(1) do not attempt to communicate during CP(2) and the subsequent collection periods. As indicated in the collection period representation of FIG. 5, the duration of the CP(2) collection period is approximately one-half the duration of CP(1), therefore, the duration of listen period LP(2) is equal to approximately one half of LP(1), the duration of the listen period of CP(1).

During the LP(2) listen period of the collection period CP(2), only approximately 40% of the original T tags attempt to communicate with the interrogator 7 of FIG. 1 since the other approximately 60% were successful during the CP(1) collection period and hence have been removed from further communication. During CP(2), approximately 75% of the remaining tags attempting communication are successful and these tags, designated as the SS(2) subset, are then acknowledged during the AP(2) acknowledge period and are removed as tags that try to communicate with the interrogator in subsequent collection periods. After CP(2), approximately 10% of the T tags remain to communicate.

The CP(3) collection period as indicated in FIG. 5, is once again approximately half as long as CP(2) and the duration of time available for communication in CP(3) is approximately one half of LP(2). During CP(3) about 75% of the remaining tags successfully communicate and are acknowledged, leaving again a still smaller number of the original T tags to be collected.

In a similar manner, one or more of the collection periods CP(4), CP(5) and CP(6) follow, each period contributing a percentage of the remaining tags. Eventually, by the CP(P) collection period, all tags are collected that is, all tags 8 have sent a tag identifier to interrogator 7, have received back an acknowledge signal and have returned to the sleep state. Normal operation of the batch collection process will have collected all tags within a lesser number of collection periods than the limit P. In one preferred embodiment, the limit P is equal to 20, however, it has been observed that typically all tags are collected within 5 or less collection periods.

The example described in connection with FIG. 5 employs one method where a plurality of batch collecting periods CP are each determined to match the collection period bandwidth to the probable number of responding communication tags during each collection period. With such a matching, the whole batch session, including the plurality of collection periods CP(1), . . . , CP(P), is efficient in collecting tag communications whereby an inventory of the tags 8 present in the communication region 9 of FIG. 1 is efficiently made.

The method employed is an algorithm in which the bandwidth (control period duration) is reduced for each succeeding collection period down to a minimum collection period and thereafter the collection periods are of constant duration. Of course, other algorithms for matching the collection period bandwidth to the number of transmitting tags may be employed.

In one alternative example, the interrogator may partition the tags into groups based upon unique tag ID's and permit responses only a group at a time. In another alternative example, the interrogator may partition the tags into groups based upon unique tag ID's and permit responses by each group to be over different frequency channels. Each of these alternatives, however, is more expensive than the embodiment described above.

While the size of the subsequent collection periods after the first may be repeatedly reduced in duration, it has been found that continued reductions in duration after a number of initial reductions are not required in that the final collection periods may be set to a fixed, short duration.

While it is possible to lengthen the time duration of each of the collection periods to possibly collect, for example, 100% of the tags in fewer collection periods, in actual practice it has been found that the most effective manner to collect the tags is to use shorter periods and take advantage of diversity of antennae to collect those tags which do not have optimum reception by one of the antennae. This embodiment is described in connection with FIG. 6.

Figure 6:
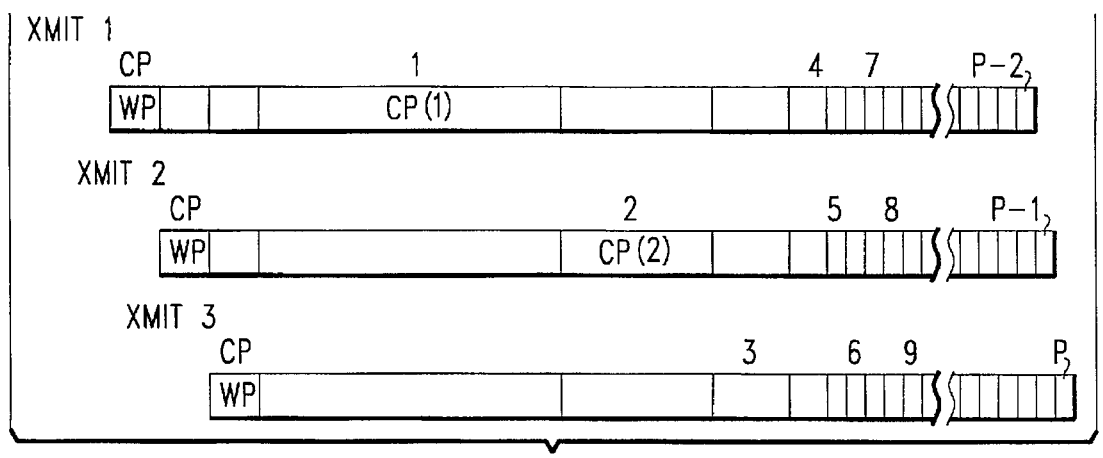
FIG. 6 is a schematic timing diagram showing the FIG. 5 timing in an interrogator having three diverse antennas.

FIG. 6—Batch Collection With Multiple Transmitters

In FIG. 6, further details of a batch session period of the FIG. 5 type are described. The batch session of FIG. 6, like that of FIG. 5 includes the P collection periods CP(1), ..., CP(P). In FIG. 6, like in FIG. 5, these collection periods are not all of equal duration and the performance of the collection protocol is enhanced by matching the duration of each of the collection periods to the expected number of tags that are likely to respond during each of the collection periods.

More specifically, in operation during a batch session of FIG. 6, the FIG. 5 collection periods CP(1), . . . , CP(P), are distributed over three different transmitters designated XMIT1, XMIT2 and XMIT3 that correspond to RF modules 123-1, 123-2 and 123-3 of the FIG. 2 type of interrogator 7. Each of the XMIT1, XMIT2 and XMIT3 transmitters issues a wake-up command during the wake-up period WP and each command is communicated to all of the tags 8 within the communication region 9 of FIG. 1, for example. The FIG. 6 embodiment uses the diversity of plural transmitters to enhance the probability that all tags 8 within the region 9 will have a successful communication with the interrogator 7.

All of the tags in region 9 wake-up in response to one of the wake-up signals from the XMIT1, XMIT2 and XMIT3 transmitters during the wake-up period, WP, and responsively are programmed to transmit during the listen period LP(1) of collection period CP(1).

The duration of the listen period LP(1) is longer than the duration of subsequent listen periods because it can be expected that the largest number of tags will be attempting to communicate during the collection period CP(1). In one particular embodiment, the duration of listen period LP(1) is made approximately equal to XR times T, where XR, is the time required for transmission of a response by a tag, shown as 4-6 of FIG. 4, approximately 6 milliseconds in a preferred embodiment, and T is the total number of tags in the communication region 9 of FIG. 1.

In one example, the T tags 8 have response times distributed, generally randomly, over the listen period LP(1). With such a distribution, it is generally expected that approximately 60% of the tags will successfully communicate without collision with other tags during the CP(1) collection period. These successful tags constitute the subset SS(1). Communication during the CP(1) collection period is performed, for example, with the antenna for XMIT1.

During CP(1), acknowledge signals are sent using the antenna for XMIT1 to the successfully communicating tags so that the SS(1) subset of tags which successfully communicated during CP(1) do not attempt to communicate during CP(2) and the subsequent collection periods.

As indicated in the collection period representation of FIG. 6, the duration of the CP(2) collection period is approximately one-half the duration of CP(1). Therefore, the duration of listen period LP(2) is equal to approximately one half of LP(1), the duration of the listen period of CP(1). The CP(2) collection period is distributed to the second antenna XMIT2.

During the LP(2) listen period of the collection period CP(2), only approximately 40% of the original T tags attempt to communicate with the interrogator 7 of FIG. 1 since the other approximately 60% were successful during the CP(1) collection period and hence have been removed from further communication. During CP(2), approximately 75% of the remaining tags attempting communication are successful and these tags, designated as the SS(2) subset, are then acknowledged during the AP(2) acknowledge period and are removed as tags that try to communicate with the interrogator in subsequent collection periods. After CP(2), approximately 10% of the T tags remain to communicate.

The CP(3) collection period as indicated in FIG. 6, is once again approximately half as long as CP(2) and the duration of time available for communication in CP(3) is approximately one half of LP(2). The CP(3) collection period is distributed to the third antenna XMIT3. During CP(3) about 75% of the remaining tags successfully communicate and are acknowledged, leaving again a still smaller number of the original T tags to be collected.

In a similar manner, one or more of the collection periods CP(4), CP(5) and CP(6) follow, each period contributing a percentage of the remaining tags. The CP(4), CP(5) and CP(6) collection periods are distributed to the antennas XMIT1, XMIT2 and XMIT3, respectively. Eventually, by the CP(P) collection period, all tags are collected that is, all tags 8 have sent a tag identifier to interrogator 7 and have received back an acknowledge signal. Normal operation of the batch collection process will have collected all tags within a lesser number of collection periods than the limit P. In the preferred embodiment, the limit P is equal to 20, however, it has been found that typically all tags are collected within 5 or less collection periods.

While it has been found that the number of collection periods typically required is 5 or less, a greater number of collection periods are provided (20 in one example) in order to increase the probability that no tags are missed. Furthermore, the collection process is dynamic and changes as a function of the number of tags in the collection region, the number of collection periods employed, the duration of each collection period and the algorithm for changing the duration of the collection periods during any particular session. In general, the greater the number of tags for any sixth duration of a collection period, the greater the probability that a collision occurs. The more collisions that occur, the greater the number of collection periods that will generally be required. Alternatively, if the number of tags remains constant, and the collection period duration is expanded, the fewer the number of collisions that are likely to occur and hence the fewer the number of collection periods required to collect all tags.

In addition to the above factors, other factors such as weak signals from tags in the collection region may also affect the probability of successful interrogator tag communications. If a particular tag is communicating very weakly with an interrogator, it may be that the communication is unsuccessful in one collection period but will be successful in a subsequent collection period even though the poor communication is not the result of a collision. Many factors can interfere with communications between tags and interrogators. In the preferred embodiment described, it has been found that six mandatory collection periods of decreasing collection period duration followed by three uniform short collection periods is typically adequate to collect all tags. However, if after such nine collection periods tags are still being collected, then the system continues to try to communicate for an additional 11 collection periods. It has been found that occasionally tags that were missed during the initial 9 collection periods are collected during one or more of the subsequent 11 collection periods. While these parameters have been found to be very successful in collecting tags, it will of course be realized that all of the parameters can be modified to match the bandwidth parameters whereby efficient collection occurs.

While it is possible to lengthen the time duration of each of the collection periods to possibly collect, for example, 100% of the tags in fewer collection periods, in actual practice it has been found that the most effective manner to collect the tags is to use shorter periods as embodied and to use the diversity of antennae to advantage so as to collect those tags which do not have optimum reception to one of the antennae.

Figure 7:
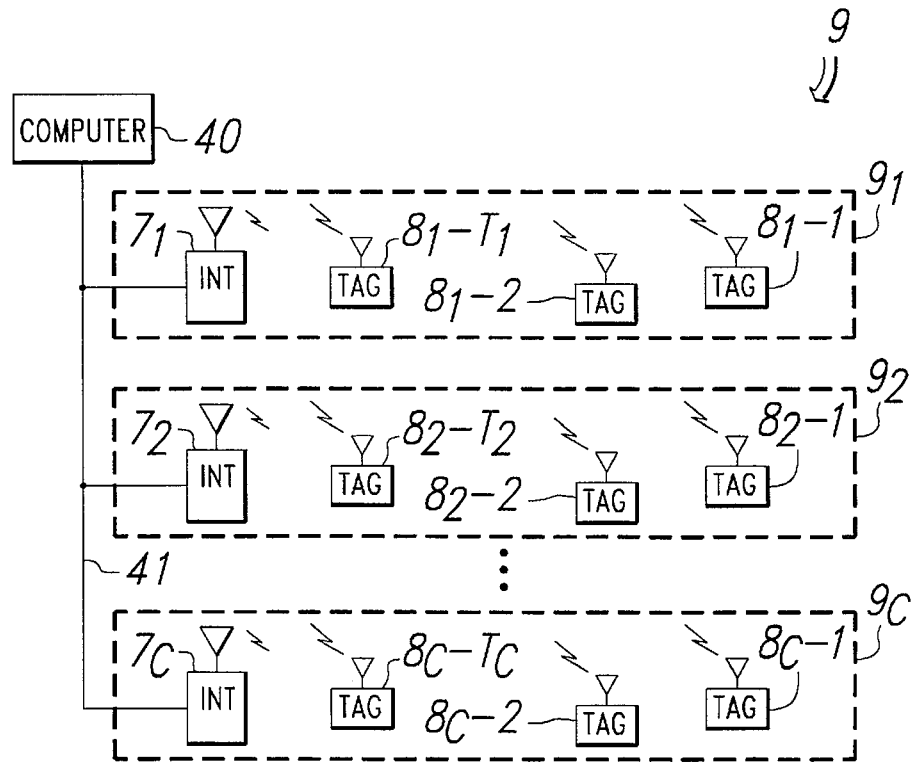
FIG. 7 depicts a communication region formed of a plurality of cells, where each cell has an interrogator that communicates with a plurality of tags.

FIG. 7—Multiple Cells

Referring to FIG. 7, a multi-cell communication system, a cellular communication system, is shown with a plurality of cell regions $9_1, 9_2, \ldots, 9_C$ forming a composite region 9 as distinguished from the single cell system of FIG. 1. In FIG. 7, multiple interrogators 7 including interrogators $7_1, 7_2, \ldots, 7_C$, are positioned and connected in a computer network to create a cellular communication system. A plurality C of cells $9_1, 9_2, \ldots, 9_C$ are present where each cell contains a plurality T of tags 8 and at least one of at least a plurality C of interrogators 7. Specifically, cell $9_1$ includes tags $8_1\text{-}1, \ldots, 8_1\text{-}T_1$, cell $9_2$ includes tags $8_2\text{-}1, \ldots, 8_2\text{-}T_2$, and cell $9_C$ includes tags $8_C\text{-}1, \ldots, 8_C\text{-}T_C$. Interrogators $7_1, \ldots, 7_C$, located respectively in cells $9_1, \ldots, 9_C$, communicate with a computer 40 via a network 41 of conventional design (wired-line, optical-fiber, radio-link, and so on), and also with all of the radio tags located within the communication cell 9 associated with that interrogator 7. The boundary of each of the cells 9 may correspond to the communication range of the interrogators 7 respectively.

An array of these interrogator communication cells $9_1, 9_2, \ldots, 9_c$ form a composite region 9 and are sequenced by the computer 40 to provide cellular communication system for communicating with all of the tags 8 located in the composite region 9. When each of the interrogators $7_1, 7_2, \ldots, 7_c$ has collected all tags in its corresponding region $9_1, 9_2, \ldots, 9_c$, the identification code of each tag, along with the strength of the tag signal, is communicated to the host computer 40, thereby identifying not only all the tags 8, but some information about the location of all tags as well.

While the communication cells $9_1, 9_2, \ldots, 9_C$ of FIG. 7 may be contiguous or overlapping so as to completely cover a building, a ship or other similar contiguous region, they may also be non-contiguous such as one cell per truck where the trucks are in different cities or other non-contiguous locations.

When the cells are in close proximity, the signal strength and the optimum antenna information provided for each tag by the interrogator allows computer 40, utilizing location algorithms, to determine each tag's location.

Each interrogator 7 in FIG. 7, receives signals from the tags 8 at each of the plurality of the separate interrogator antennas 121-1, ..., 121-M as described in connection with FIG. 2. The physical location and orientation of each of tags 8, the diverse antenna orientation, the signal path of the communication between the tag 8 and the interrogator 7 and surfaces of reflection in the local environment will each affect the strength, field pattern and polarization of the tag signals. In a preferred embodiment, the interrogator selects the optimum antenna for further communication by analyzing the tag signal strength at each antenna within the interrogator.

Figure 8:
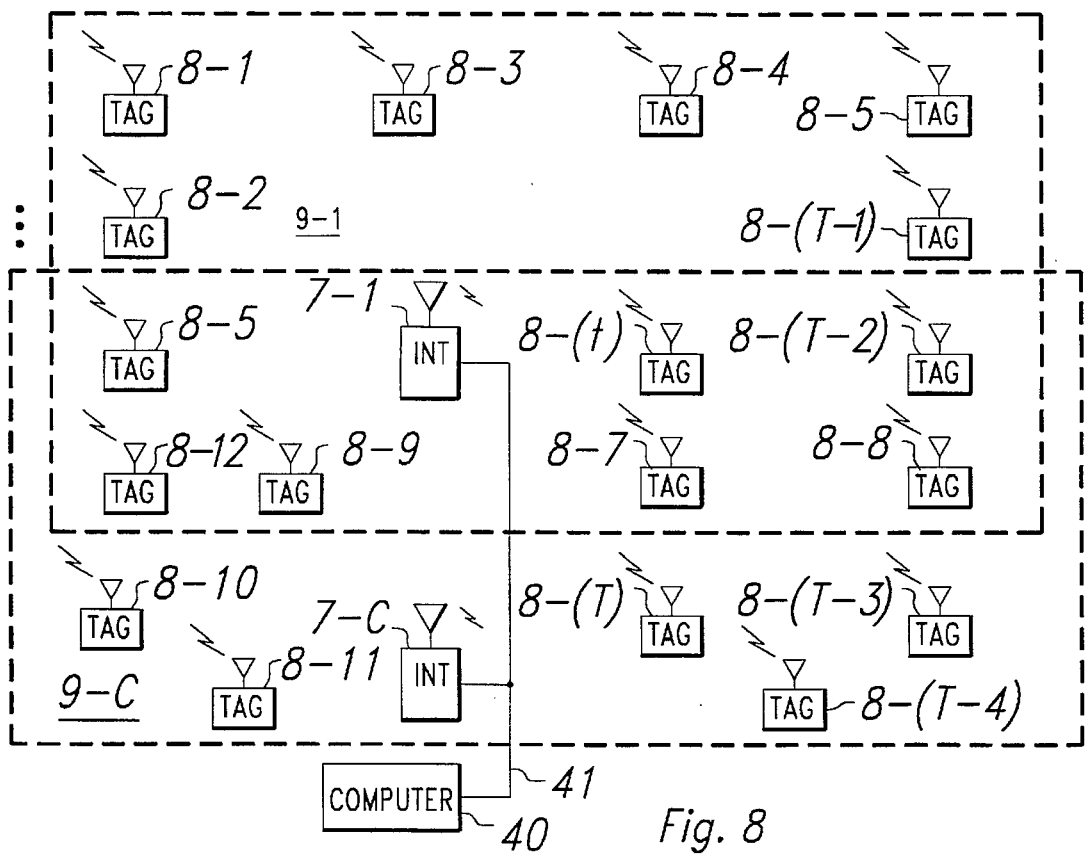
FIG. 8 depicts a communication region formed of two cells in overlapping proximity, where each cell has an interrogator that communicates with a plurality of tags.

FIG. 8—Multiple Contiguous Cells

Referring to FIG. 8, multiple interrogators are positioned and networked to create a cellular identification environment that covers the composite region 9 where region 9 is the union of cells 9-1, ..., 9-C. In FIG. 8, the cellular region 9 includes a plurality C of cells where each cell contains one (of a plurality C) of interrogators 7 and numerous tags 8. Interrogators 7-1, ..., 7-C, located respectively in cells 9-1, ..., 9-C communicate with a computer 40 via a network 41 using conventional connection technology (for example, wired-line, optical fiber, or radio link) and with all of the radio tags located within the communication cell associated with that interrogator.

The limits of the cells 9-1, ..., 9-C correspond with the communication ranges of the interrogators 7-1, ..., 7-C, respectively. An army of the FIG. 8 interrogator communication cells, placed strategically around a facility and appropriately sequenced by the computer 40, provides a communication system for communicating with all of the tags located in the facility. The identification code of each tag, along with the strength of the tag signal and the identity of the antenna receiving the strongest signal, is communicated to the host computer 40, thereby identifying not only the tag, but information about the approximate location of the tag as well.

Each interrogator 7 receives signals from the tags 8 in its respective region at each of the plurality of the separate interrogator antennas 121-1, . . . , 121-M. The physical location and orientation of each of tags 8, the diverse antenna orientation, the signal path of the communication between the tag 8 and the interrogator 7 and surfaces of reflection in the local environment will each affect the strength, field pattern and polarization of the tag signal, thus the data provided by the interrogator allows computer 40 to select the optimum antenna for further communication from each interrogator by analyzing the tag signal strength and antenna identity at each interrogator.

The signal strength and the optimum antenna information provided for each tag by the interrogators allow computer 40, utilizing location algorithms, to determine each tag's location.

Figure 9:
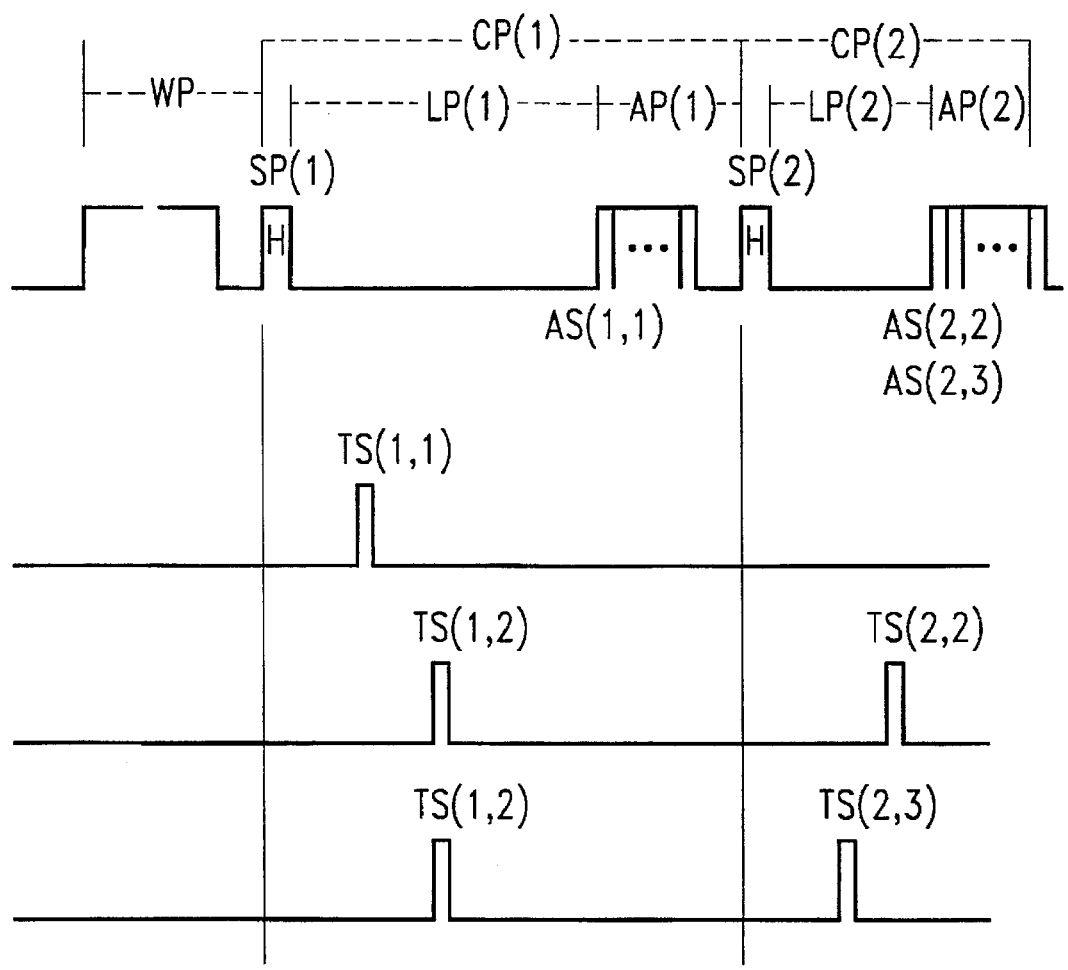
FIG. 9 depicts waveforms representing the batch collection sequence timing, particularly for illustrating the collision resolution technique of the present invention.

FIG. 9—Batch Collection Sequence Timing

The timing and collision resolution of a batch collection process is represented graphically by the waveforms in FIG. 9. The interrogator wakes-up all tags for example tags T(1), T(2) and T(3) (that correspond to tags 8-1, 8-2 and 8-3 of FIG. 1, for example), during the wake-up period, WP, and then begins the collection period CP(1) by sending out a synchronization command H during period SP(1), collects the identity of each tag responding during the listen period LP(1) and acknowledges in acknowledge period AP(1) all tags successfully collected during the listen period LP(1). Tag T(1) sending its tag ID during time period TS(1,1) is representative of the successful tags. Assuming that tags T(2) and T(3) have simultaneously transmitted responses at time TS(1,2) during the listen period LP(1) in such that their transmissions collide and hence are not heard clearly by interrogator, neither tag will receive an acknowledge signal during acknowledge period AP(1). Tags T(2) and T(3) therefore respond again after the subsequent synchronization command H arrives during SP(2).

Listen period LP(1) illustrates the operation of the batch process wherein two tags T(2) and T(3) each respond to the synchronization command during SP(1) in such a manner that a collision results. In the case where thousands of tags are in the region of the interrogator, the response time time-period of two or more tags (with response time time-periods computed based on a tag ID (tag-address) hashing algorithm, for example) might well be the same. Identical or near identical time periods result in a signal overlap or collision that appears as a corrupt signal at the interrogator and the result is that one or both of the colliding signals at TS(1,2) for example, is lost and not received by the interrogator.

The example occurrence shown in FIG. 9, considers the collision case where both signals are lost at time period TS(1,2). Since the interrogator does not acknowledge either of the tags T(2) or T(3) in acknowledge period LP(1), the tags T(2) and T(3) remain in the wait for function loop (see loop 92, 92-1 of LIST 2 hereafter described) waiting for an acknowledge signal. The arrival of the subsequent synchronization command H during SP(2) causes tags T(2) and T(3) to exit the wait loop 92, 92-1 of LIST 2, compute a new random time delay after SP(2) to determine a new response time period at state 94 of LIST 2 and transmit their tag ID identity again during LP(2). This succeeding transmission time during LP(2) occurring after a random time delay for tags T(2) and T(3) thus resolves the time contention of the preceding period LP(1). The tag responses are then sent at the TS(2,2) and TS(2,3) time periods respectively and acknowledged at the time periods AS(2,2) and AS(2,3) in acknowledge period AP(2) without collision.

Two or more different algorithms are used to determine the response time for tags in order to enable efficient use of collection time. In one example, the first algorithm is based on a hashing of tag IDs and the second algorithm is based on random time selection. The hashing algorithm guarantees an even distribution of response times throughout the listen period while the random distribution algorithm does not provide such a guarantee. For the hashing algorithm, more than one tag ID (address) may be hashed to the same time period so that contention will likely result, particularly for large numbers of tags. Therefore, after the first collection period, a random distribution algorithm is employed. The use of a random distribution algorithm for subsequent responses efficiently resolves any contention originally resulting from the ID-based hashing algorithm.

The system also progressively reduces, to a limiting value, the duration of each successive collection period, taking advantage of the fact that fewer tags will remain unacknowledged with each succeeding collection period.

Sequenced Operation of Sessions

LIST 1, LIST 2, LIST 3 and LIST 4 are tables representing the sequenced operation of communication sessions executed by an interrogator 7 and tags 8. The TAG INVENTORY session and the POLL TAGS sessions executed by LIST 1 and LIST 2 are two examples of the sessions and each of these sessions employ the batch collection protocol. The TAG INVENTORY session is initiated by the interrogator to wake-up and identify each tag that is within the communication region.

The POLL TAGS session is initiated by the interrogator to identify each tag that is awake in the communication region where the tag has been awakened through initiation of the tag rather than the interrogator. This process occurs when the interrupt input 32 of FIG. 3 is activated by the external unit 29 of FIG. 3. The TAG INVENTORY session and the POLL TAGS sessions are examples and many other sessions are possible.

LIST 3 is an example of a one-to-many followed by a one-to-one communication where the interrogator and tag function to execute a particular one of the commands of TABLE 1 to energize a beeper in a particular tag, although similar processing may be executed for other commands. LIST 3 is representative of the general processing for many different commands of which the beeping function is but one example.

LIST 4 in conjunction with FIG. 8 is representative of the sequencing of the interrogator and tag processing wherein the computer 40 employs the batch collection process with tag location algorithms for determining the location of a particular one of tags 8 in region 9 using the interrogators 7. The location determination process uses the collection information returned from each of the interrogators 7 in region 9 to determine the location within region 9 of a particular one or more of the tags. The determination is made based on the interrogator identity, the antenna identity and tag signal strength data returned from each of the interrogators.

LIST 1 - INTERROGATOR Sequencing
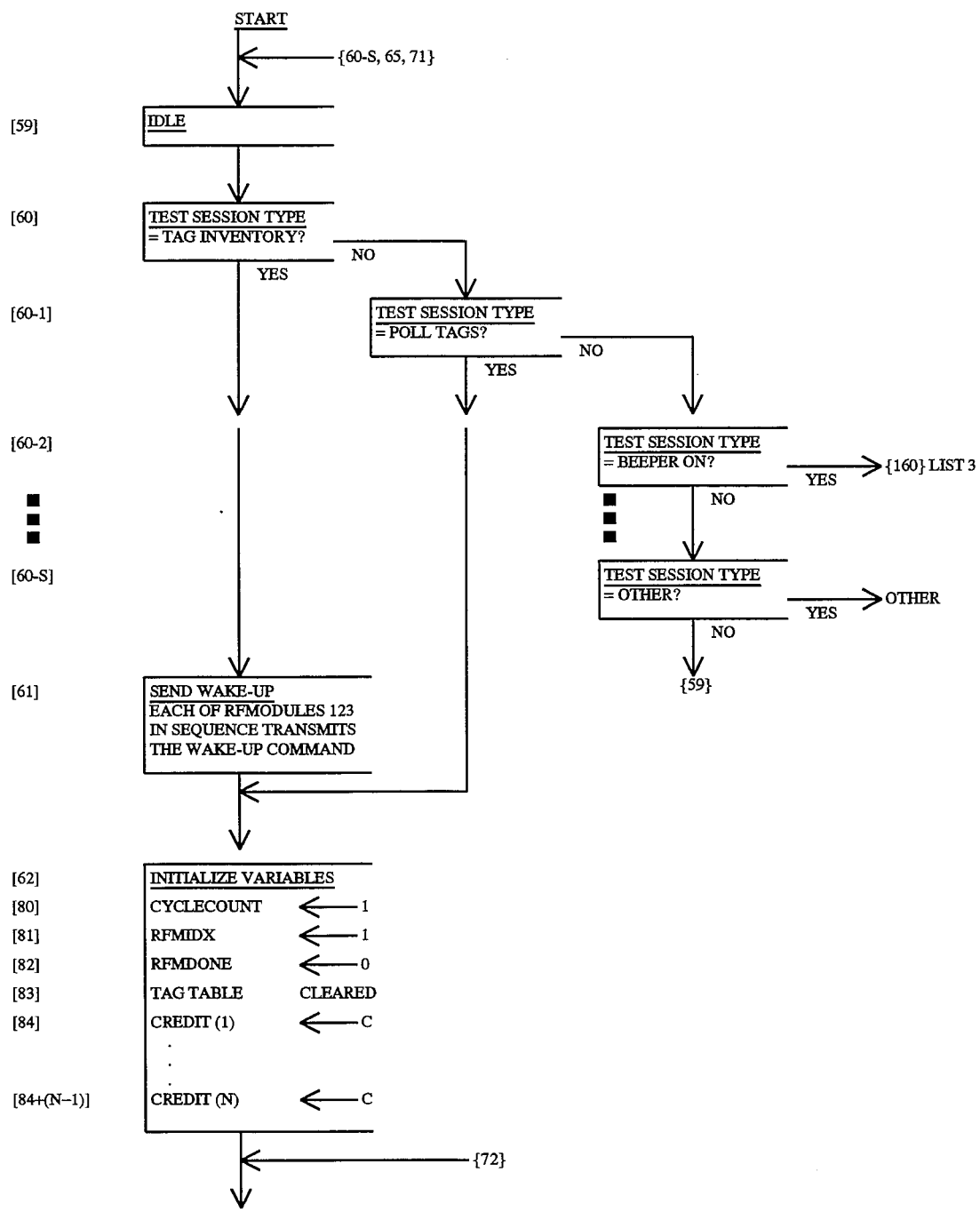

-continued
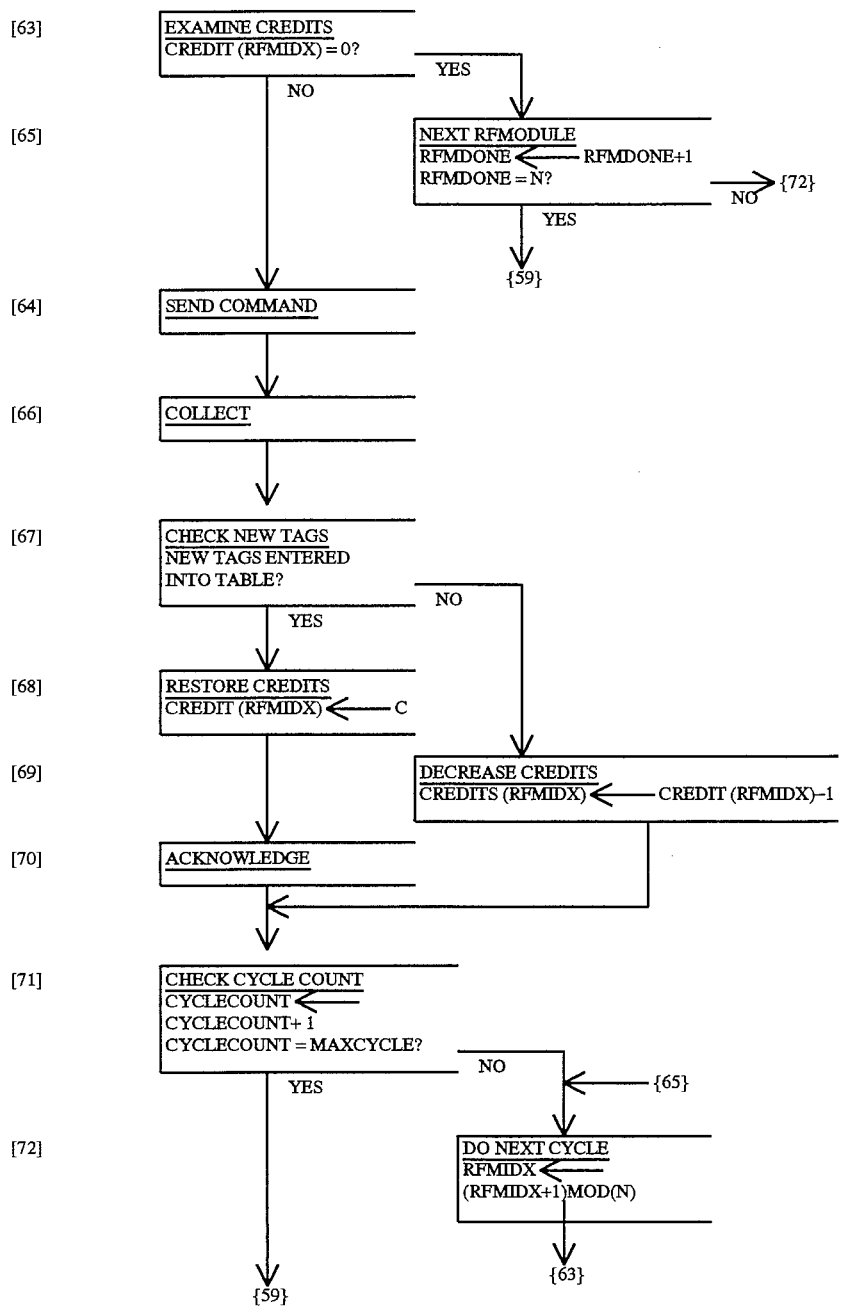
LIST 2 - TAG Sequencing

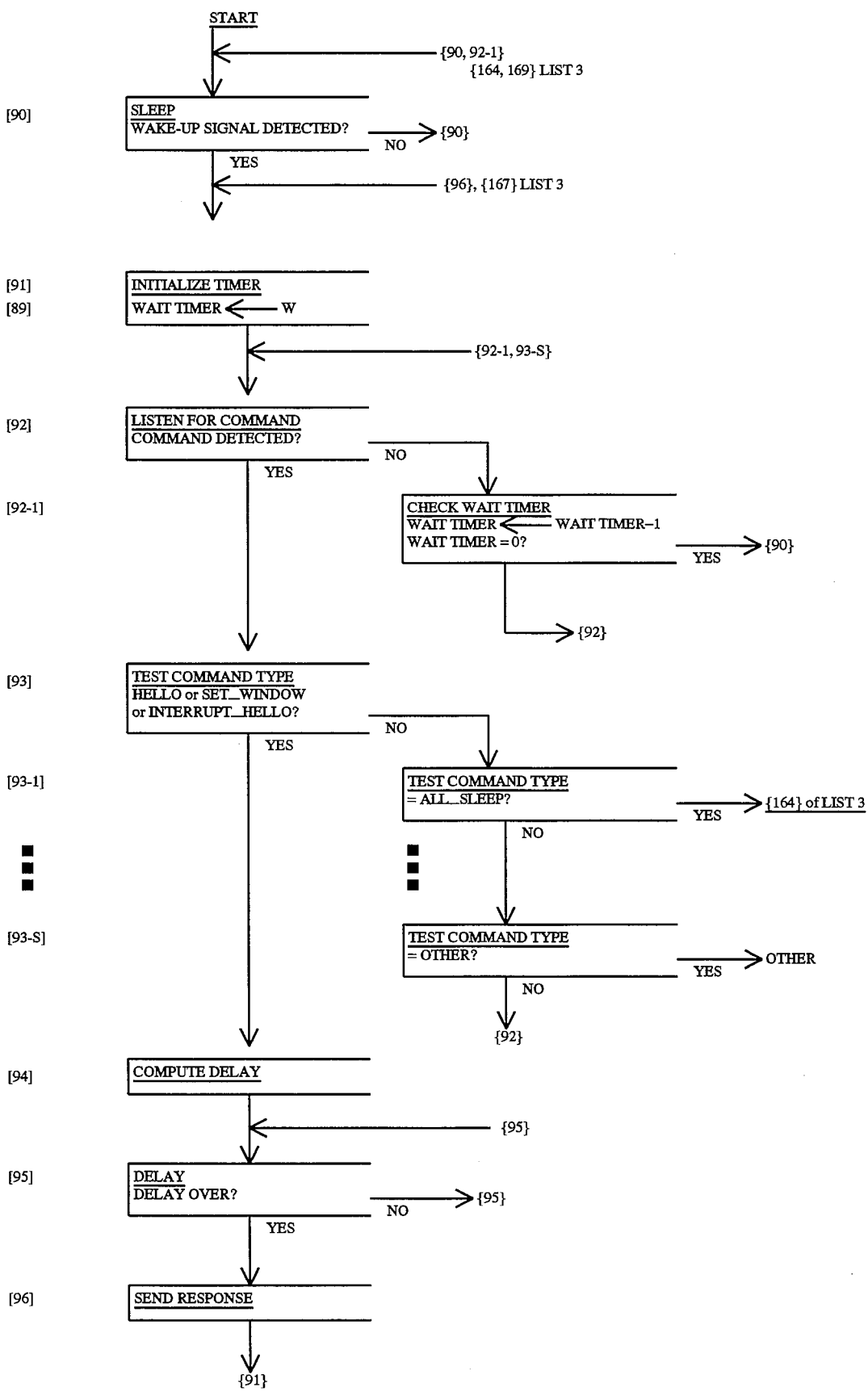

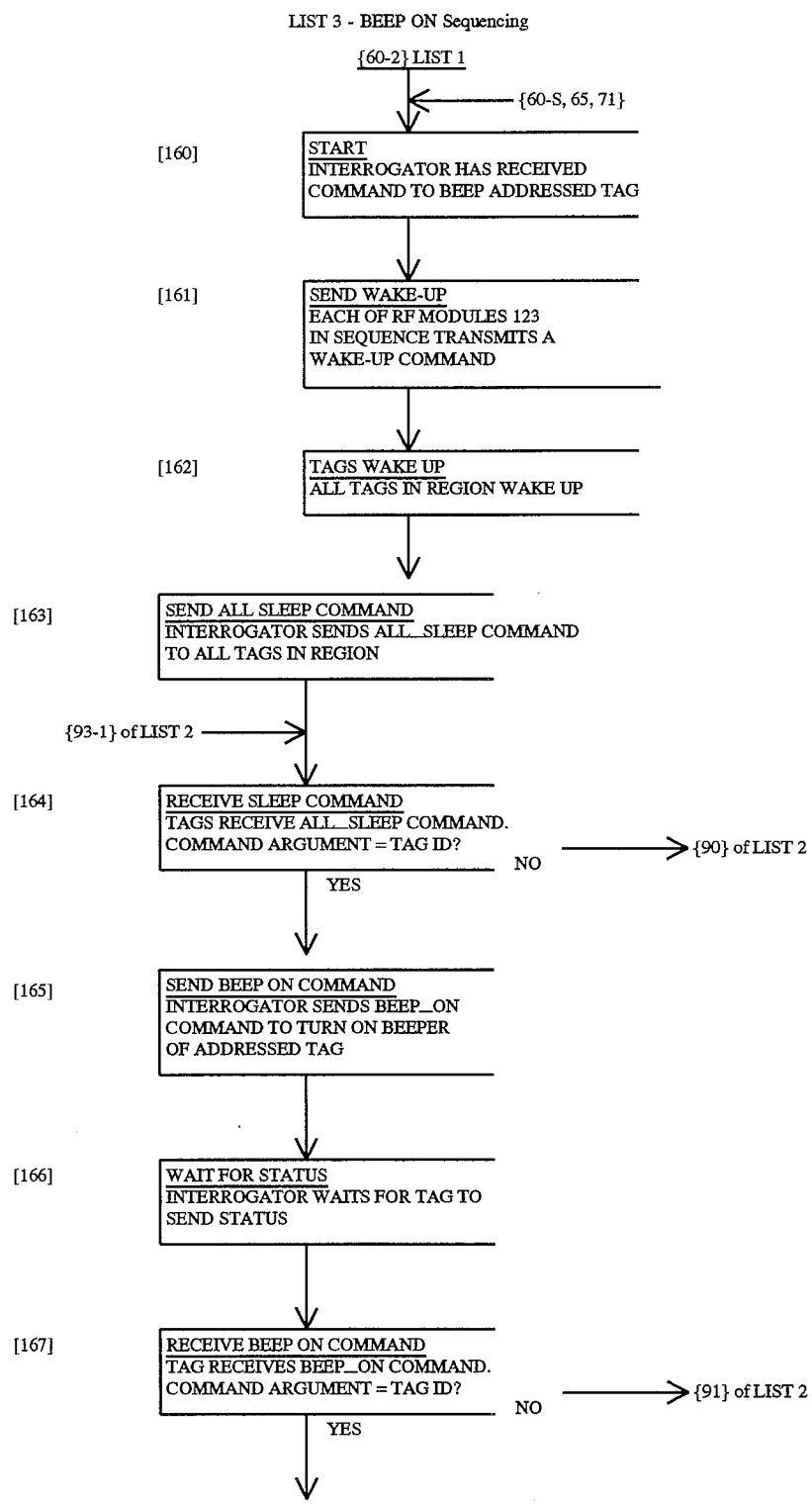

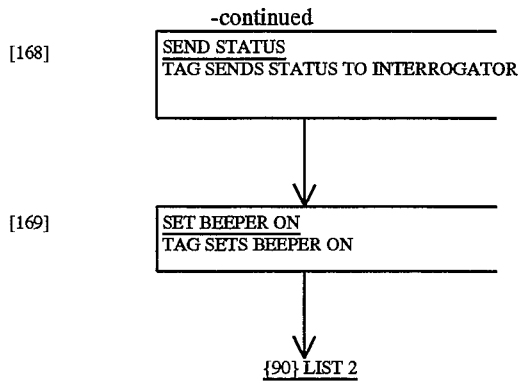

INTERROGATOR STATE 59. Referring to FIG. 2 and LIST 1, the IDLE state 59 represents the idle state of the interrogator 7. From this state, the interrogator commences different operations that are executed as sessions. The IDLE state is implemented in a conventional manner in the processor 102 of FIG. 2. For example, processor 102 executes an idle loop that branches when an operation, such as tag inventory, is to be started. Tag inventory is one of the significant operations of the invention but many other operations are possible. Other operations include servicing I/O units 118, communicating with tags 8 to enable tag functions, for example, sound generation such as energizing a beeper in a particular tag, or communicating with external systems.

In one preferred embodiment, interface unit 110, connected to computer 40 via network 41 of FIG. 7, initiates the operations to be performed by the interrogator 7. The communication system remains in the idle state until a request from the network 41 initiates a session for performing some operation. Upon receiving a request, the processing in the interrogator 7 passes from IDLE state 59 to TEST SESSION TYPE state 60.

INTERROGATOR STATE 60, 60-1, . . . , 60-S. In state 60, interrogator 7 tests to determine the type of session to be executed. State 60 first tests to determine if a TAG INVENTORY operation is to be performed. Assuming a TAG INVENTORY operation is to be performed, a YES result of the test sends the processing to SEND WAKE-UP state 61. Assuming a TAG INVENTORY operation is not to be performed, a NO result of the test sends the processing to the next TEST SESSION TYPE state 60-1.

The TEST SESSION TYPE state 60-1 tests to determine if a POLL TAGS session is to be performed. Assuming a POLL TAGS operation is to be performed, a YES result of the test sends the processing to the INITIALIZE VARIABLES state 62. A NO result of the test sends the processing to the next TEST SESSION TYPE state 60-2.

The TEST SESSION TYPE state 60-2 again is a test for a particular session type. A YES response will send the processing to the particular sequence, a NO response will continue the test for session type. One of the possible sessions is the sequence to activate the beeper in the tag. In the example shown, a BEEPER ON operation is to be performed, hence a YES result of the test sends the processing to LIST 3 state 160. A different required session will return a NO result of the test, sending the processing to the next TEST SESSION TYPE state.

The test session processing continues for any number S of TEST SESSION TYPE tests up to TEST SESSION TYPE state 60-S. While LIST 1 has included serial testing in order to determine the session to be executed, other ways of determining sessions can be employed. For example, condition code branching, vectoring, or table look-up methods can be used.

For purposes of explanation of the batch collection process, assume now that interrogator 7 has received a request for a TAG INVENTORY session from computer 40 via interface unit 110. Processing after leaving the IDLE state 59 advances to TEST SESSION state 60 and then to the SEND WAKE-UP state 61.

Batch Collection Inventory Sessions

Referring to FIGS. 1, 2, and 3 and to LIST 1 and LIST 2, in accordance with the present invention, batch collection and other protocols are one-to-many processes employed during sessions when communication occurs between the interrogator 7 and the tags 8 in an environment where multiple tags may attempt to communicate simultaneously with interrogator 7. The following description applies to the batch collection process as implemented to perform TAG INVENTORY in the preferred embodiment.

INTERROGATOR STATE 61. For TAG INVENTORY using batch collection and for many other sessions, the constant interrogation of all tags within radio range of the interrogator 7 (or other operation requiring high-power consumption by the tags) is not desired. Low-power operation is important for battery-operated tags to extend battery life in the tags. In the present example, it is assumed that all tags normally are in a low-power standby mode (sleep mode) and are awakened and interrogated only as the need arises.

In SEND WAKE-UP state 61, the interrogator transmits a WAKE-UP signal to wake-up sleeping tags. For multiple modules 12-1, . . . , 123-N in the interrogator 7, a WAKE-UP signal is sent from each of the RF modules 123-1, . . . , 123-N in sequence. In the preferred embodiment, the WAKE-UP signal comprises a VHF radio signal modulated at 30.5 Khz, sent for a period of 3.492 seconds. By using a plurality of RF modules 123 and hence the associated plurality of antennas 121, advantage is taken of the antenna diversity previously discussed, providing to all tags within range the opportunity for optimum reception of the WAKE-UP signal from one of the modules 123. After having sent the plurality of WAKE-UP signals as described, the interrogator advances to INITIALIZE VARIABLES state 62.

INTERROGATOR STATE 62. In INITIALIZE VARIABLES state 62 the contents of variable CYCLECOUNT 80 are initialized to 1, the contents of index variable RFMIDX 81 are initialized to 1 and the contents of variable RFM-DONE 82 are initialized to 0. The contents of table TAG TABLE 83 are cleared and the contents of variables CREDIT(l) 84, . . . , CREDIT(N) 84+(N−1) are each initialized to a predetermined value C. In the preferred embodiment, the value C equals 3. In the preferred embodiment, the quantity N is equal to 3 and is the number of RF modules installed in the interrogator 7. The interrogator next advances to EXAMINE CREDITS state 63.

TAG STATE 90. Referring now to FIG. 3 and LIST 2, the tags 8 are quiescent in the low-power sleep mode in SLEEP state 90. The strobe 16 functions to cause receiver 1 to sample the ambient radio energy for the duration of the strobe pulse width every strobe period, in the preferred embodiment the sampling is for three milliseconds every three seconds. If the wake-up signal energy is not present, the tag maintains the sleep mode. If the wake-up signal energy is present, the RF receiver 1 and wake-up detector 4 function to activate the processor 2. The processor 2 awakens the tag from its low-power state and the tag advances to INITIALIZE TIMER state 91.

TAG STATE 91. In INITIALIZE TIMER state 91, the tag initializes variable WAIT TIMER 89 to the value W where W has a value of 30 seconds in the preferred embodiment. The tag continues to LISTEN FOR COMMAND state 92.

TAG STATE 92. In LISTEN FOR COMMAND state 92, the tag checks for the presence of a command from the interrogator. If a command has been received, the tag advances to TEST COMMAND TYPE state 93. If a command is not present, the tag advances to CHECK WAIT TIMER state 92-1.

TAG STATE 92-1. In CHECK WAIT TIMER state 92-1, the variable WAIT TIMER 89 is decreased by one count.

If the variable equals zero, this condition indicates that the tag has not detected a command from the interrogator, most probably because the tag is too distant from the interrogator to detect the command and that therefore there is no reason for the tag to continue listening. The tag branches to SLEEP state 90 resuming the sleep mode.

If the variable is greater than zero, this condition indicates that there still exists time for a command to be received and the tag remains in LISTEN FOR COMMAND state 92.

INTERROGATOR STATE 63. Referring to FIG. 2 and LIST 1, the interrogator in EXAMINE CREDITS state 63 examines the variable CREDIT(RFMIDX) 84+(RFMIDX).

If the variable is greater than zero, this condition means either that this is the first time in the current batch collection process that the particular RF module 123-RFMIDX is to be used for communication with the tags or that at least one of the previous N commands for the RF module 123-RFMIDX was successful in collecting tags. In either of these cases, the interrogator advances to SEND COMMAND state 64.

If the variable is equal to zero, that condition means that for N consecutive command transmissions from RF module 123-RFMIDX, no tags have responded in which case the interrogator advances to NEXT RFMODULE state 65.

INTERROGATOR STATE 64. In SEND COMMAND state 64, the interrogator sends a command. In the inventory batch collection process, the command is one of the HELLO or SET_WINDOW commands of TABLE 1 and defines the LISTEN period duration. The duration of the LISTEN period is determined by accessing an array indexed by the contents of variable CYCLECOUNT 80. From the army, the interrogator obtains a value for the duration of the LISTEN period. The array has been preloaded with values related to the number of tags expected in the range of the interrogator, the preloaded values having been installed either at the time of system installation or by computer 40 via network 41. This code together with the processor is bandwidth code and is means for controlling the bandwidth of the collection periods. The bandwidth code sets the bandwidth of each collection period by setting the duration of each of the respective listen periods.

In the preferred embodiments, the maximum one of the values is 6840 milliseconds, with the remaining values decreasing in a manner such that progressive values are approximately one-half the previous value, reaching a limit value of 285 milliseconds. In the preferred embodiments, the army is arranged such that progressively smaller values are loaded at progressively larger index positions in the army. In other embodiments, other values may be used for the LISTEN period durations where such selection of values is dependent on the number of tags expected to be in the range of the interrogator or is determined by the host system after analysis of tag collection statistics.

The interrogator sends a command to all tags using RF module 123-RFMIDX, prefixed by a preamble. The preamble in the preferred embodiment is a series of 50 microsecond duration pulses, repeated at 125 microsecond intervals. The preferred data format of commands, and all other data exchanges, is a pulse-width modulated code configured with 90 or 50 microsecond pulses and 35 microsecond spaces. Other preamble and data exchange formats can also be used with the present invention.

After sending a command, the interrogator advances to COLLECT state 66.

INTERROGATOR STATE 65. In NEXT RFMODULE state 65, the variable RFMDONE 82 is increased by one count and compared to the limit N. In the preferred embodiment, N is equal to three, the quantity of RF modules installed in the system.

If the variable is equal to the limit, the interrogator has completed the requisite batch collection periods and is to return to IDLE state 59.

If the variable is less than the limit, the interrogator returns to EXAMINE CREDITS state 63.

TAG STATE 93, 93-1, . . . , 93-S. Referring now to FIG. 3 and LIST 2, the tag enters TEST COMMAND TYPE state 93 having detected the receipt of a command. In state 93, the tag tests to determine the type of command that has been received. State 93 first tests to determine if a HELLO or SET_WINDOW command has been received. Assuming a HELLO or SET_WINDOW command has been received, a YES result of the test sends the tag to COMPUTE DELAY state 94. Assuming a HELLO or SET_WINDOW was not received, a NO result of the test sends the processing to the next TEST COMMAND TYPE state 93-1.

The TEST COMMAND TYPE state 93-1 tests to determine if an ALL_SLEEP command has been received. Assuming an ALL_SLEEP command has been received, a YES result of the test sends the processing to RECEIVE SLEEP state 164 of LIST 3. A NO result of the test sends the processing to the next TEST COMMAND TYPE state 93-2.

The test command processing continues for any number S of TEST COMMAND TYPE tests up to TEST COMMAND TYPE state 93-S. While LIST 2 has included serial testing in a certain typical sequence in order to determine the session to be executed, other ways of determining sessions can be employed. For example, different sequences of command testing, condition code branching, vectoring, table look-up or other methods can be used.

For purposes of explaining the batch collection process, it is assumed that tag 8 has received a HELLO or SET_WINDOW broadcast command from the interrogator, in which event, the tag advances to COMPUTE DELAY state 94.

TAG STATE 94. The tag enters COMPUTE DELAY state 94 having detected a HELLO, SET_WINDOW or INTERRUPT_HELLO command. If the command is the SET_WINDOW command, the tag stores the LISTEN time value accompanying the command and then computes a time delay value for the response. If the command is a HELLO or INTERRUPT_HELLO command, the tag computes the time delay value for the response using the default LISTEN time value, in the preferred embodiment the default time value is 285 milliseconds.

On the first SET_WINDOW command received by the tag after the WAKE-UP command, the delay is computed associating the tag address code (tag ID) with the LISTEN duration value. In the preferred embodiment, this association is a hash algorithm manipulation of the tag address (tag ID).

After the first SET_WINDOW command that the tag receives after the WAKE-UP or on receipt of a HELLO or INTERRUPT_HELLO command, the tag chooses a random time delay within the LISTEN time. In the preferred embodiment, the internal clock of the processor 2 of each tag 8 is used as a randomizing element for the tag.

When the delay has been computed as described above, the tag advances to DELAY state 95.

TAG STATE 95. In DELAY state 95, the tag waits its chosen time delay and then advances to SEND RESPONSE state 96.

TAG STATE 96. In SEND RESPONSE state 96, the tag sends its address code (tag ID), prefixed with a preamble, back to the interrogator. The response comprises a preamble, the tag address (ID code) and status code information. The preamble is in the preferred embodiment a series of 50 microsecond duration pulses, repeated at 125 microsecond intervals. The preferred data format of the address, and all other data exchanges, is a pulse-width modulated code configured with 90 or 50 microsecond pulses and 35 microsecond spaces. The tag status code information may include information as to the battery state, beeper state (on or off), interrupt level or other information. Additional data may be sent to the interrogator as data bytes in the format described according to command type as indicated in TABLE 1. The tag then advances to INITIALIZE TIMER state 91 to await further communication from the interrogator.

INTERROGATOR STATE 66. Referring again to FIG. 2 and LIST 1, the interrogator in COLLECT state 66 enables all RF receivers 101 so as to receive tag responses with the maximum diversity possible. When a tag preamble is detected, the interrogator determines the optimum one of the RF modules 123, based on the signal strength from the RF receivers 101 using the ADC converter 140. The interrogator then disables all but the optimum antenna and receives the tag address code, placing the tag code in table TAG TABLE 83 at the position indexed by the tag address. Also placed at the table position is the signal strength indication and other status information. If the data is received in error, the data is discarded. The interrogator enables now all RF modules 123 and again continues in COLLECT state 66, listening for tag response. The interrogator remains in COLLECT state 66 until the LISTEN period expires, at which time the interrogator advances to CHECK NEW TAGS state 67.

INTERROGATOR STATE 67. Referring to FIG. 2 and LIST 1, the interrogator, in CHECK NEW TAGS state 67, examines the table TAG TABLE 83. All tags that respond to the broadcast command sent in SEND COMMAND state 64 will have been entered into table TAG TABLE 83 in COLLECT state 66.

If any additional tags were entered into the table in COLLECT state 66, the interrogator advances to RESTORE CREDITS state 68.

If no additional tags were entered into the table during COLLECT state 66, the interrogator branches to DECREASE CREDITS state 69 wherein the contents of variable CREDIT(RFMIDX) 84+(RFMIDX-1) is decreased one count. The interrogator then advances to CHECK CYCLE COUNT state 71.

INTERROGATOR STATE 68. In RESTORE CREDITS state 68, the contents of variable CREDIT(RFMIDX) 84+(RFMIDX-1) are initialized to the initial value C to indicate that new tags have responded to transmission from RF module 123-RFMIDX and that collections are to continue using this RF module. The interrogator then advances to ACKNOWLEDGE state 70.

INTERROGATOR STATE 69. In DECREASE CREDITS state 69, no additional tags were entered into the table during the COLLECT state 66. The contents of variable CREDIT (RFMIDX) 84+(RFMIDX-1) are decreased by one. The interrogator then advances to CHECK CYCLE COUNT state 71.

INTERROGATOR STATE 70. In ACKNOWLEDGE state 70, since new tags were entered into the table TAG TABLE 83 during the COLLECT state 66, all such new tags are sequentially each sent an ACKNOWLEDGE command, in the inventory function a directed command, specifically the SLEEP command of TABLE 1. The interrogator then advances to CHECK CYCLE COUNT state 71.

INTERROGATOR STATE 71. The interrogator in CHECK CYCLE COUNT state 71 increases variable CYCLE COUNT 80 by one count. The value of variable CYCLE COUNT 80 is then compared with the limit END-CYCLE. In the preferred embodiment, ENDCYCLE is equal to 20.

If the variable is equal to the limit, the interrogator has completed the requisite number of batch collection periods. The interrogator returns to IDLE state 59.

If the variable is less than the limit, the interrogator branches to DO NEXT CYCLE state 72.

INTERROGATOR STATE 72. The interrogator in DO NEXT CYCLE state 72 increases the contents of index variable RFMIDX 81 by one count in a modular manner. The modular limit N is equal to the number of RF modules 123 installed in the system, N=3 in the preferred embodiment. The interrogator then returns to EXAMINE CREDITS state 63 to begin another batch collection period of the current batch collection session and processing repeats as previously described.

POLL TAGS Session

Referring again to FIGS. 1, 2, and 3 and to LIST 1 and LIST 2, in accordance with the present invention, batch collection and other protocols are one-to-many processes, employed during sessions when communication occurs between the interrogator 7 and the tags 8 in an environment where multiple tags may attempt to communicate simultaneously with interrogator 7. The following description applies to the batch collection process sequencing to perform a POLL TAGS session in the preferred embodiment.

For a POLL TAGS session, LIST 1 and LIST 2 represent the sequenced operation wherein the communication system polls the tags to determine if any tags are awake and requesting communication with interrogator 7. In one example, tags are awakened in response to an interrupt input 32 from external unit 29 to processor 2 of FIG. 3.

INTERROGATOR STATE 59. Referring to FIG. 2 and LIST 1, the IDLE state 59 represents the idle state of the interrogator 7. From this state, the interrogator 7 commences different operations. Upon receiving a request for a session to perform an operation, the processing in the interrogator passes to TEST SESSION TYPE state 60.

INTERROGATOR STATE 60, 60-1, ..., 60-S. In state 60, interrogator 7 tests to determine the type of session to be

39 executed. State 60 first tests to determine if a TAG INVENTORY operation is to be performed. Assuming a TAG INVENTORY operation is not to be performed, a NO result of the test sends the processing to the next TEST SESSION TYPE state 60-1.

The TEST SESSION TYPE state 60-1 tests to determine if a POLL TAGS session is to be performed. In this present example, a POLL TAGS operation is to be performed, therefore, a YES result of the test sends the processing to the INITIALIZE VARIABLES state 62.

INTERROGATOR STATE 62. In INITIALIZE VARIABLES state 62, the contents of variable CYCLECOUNT 80 are initialized to 1, the contents of index variable RFMIDX 81 are initialized to 1 and the contents of variable RFMDONE 82 are initialized to 0. The contents of table TAG TABLE 83 are cleared and the contents of variables CREDIT(1) 84, . . . , CREDIT(N) 84+(N−1) are each initialized to a predetermined value C. In the preferred embodiment, the value C equals 3. In the preferred embodiment, the quantity N is equal to 3, the number of RF modules installed in the interrogator. In the same manner as for a TAG INVENTORY session, the interrogator advances to the EXAMINE CREDITS state 63 and then to SEND COMMAND state 64.

TAG STATE 90. Referring now to FIG. 3 and LIST 2, the tags 8 are quiescent in the low-power sleep mode in SLEEP state 90 as previously described. For POLL TAGS and many other sessions, the constant interrogation of all tags within radio range of the interrogator 7 or other operation requiring high-power consumption by the tags is not desired. Low-power operation is important for battery-operated tags. In this present example, it is assumed that all tags normally are in low-power, standby mode (sleep mode), as previously discussed, and are awakened and interrogated only as the need arises as a result of an interrupt to processor 2 of FIG. 3. If the wake-up signal is not present, the tag remains in the sleep mode unless an interrupt signal is present. If the interrupt signal is present, the processor 2 awakens the tag from its sleep state and the tag advances to INITIALIZE TIMER state 91.

TAG STATE 91. In INITIALIZE TIMER state 91, the tag initializes variable WAIT TIMER 89 to the value W, W has a value of 30 seconds in the preferred embodiment. The tag continues to LISTEN FOR COMMAND state 92.

The POLL TAGS process sequencing in the interrogator now sends the INTERRUPT_HELLO command that will cause all tags in the region that are awake to respond in the same manner as for an INVENTORY process. Only those tags awakened by an interrupt as previously described will receive the INTERRUPT_HELLO command. From this time on, the sequencing is the same as previously described in connection with the TAG INVENTORY session, except that the interrogator sends the INTERRUPT_HELLO command instead of SET_WINDOW or HELLO as the interrogator is now using the batch collection protocol to identify all tags that are awake. Since the interrogator did not transmit a wake-up command, the tags are awake under their on initiation by operation of an interrupt signal, for example. The operation described for polling tags is an example of a reverse wake-up operation in which the tag awakens in response to a stimulus. While the stimulus can be via the processor interrupt, the stimulus can also be from an alarm or other signal from one of the attached I/O units 18 of FIG. 2 thereby, in the case of an alarm, embodying a polled remote alarm system. The interrupt stimulus may also be from a switch or other device activated by a person carrying the tag, as for example, for personal identification.

40

Turn On Beeper Session

Referring now to LIST 1, LIST 2 and LIST 3 and FIG. 1, FIG. 2 and FIG. 3, an example of a one-to-many followed by a one-to-one communication sequence is shown. In this example, causing a particular one of the tags in the region to execute a function is accomplished by first waking up all tags in the region by executing the wake up sequence, subsequently directing all tags except the desired tag to resume the sleep state and then commanding the desired tag to execute the function. The batch collection protocol is not employed in this sequence as it is necessary only to wake up the tags and command the directed tag to perform the desired action.

The sequence begins with the interrogator sending the WAKE-UP signal to all tags. The interrogator then sends the ALL_SLEEP command of TABLE 1 with the address (tag ID) code of the desired tag as the command argument. The ALL_SLEEP command is a broadcast command directing all tags except the tag identified by the ID code to immediately resume the sleep state. The interrogator follows the ALL_SLEEP command with the BEEP_ON command, a directed command of TABLE 1, again with the address (tag ID) code of the desired tag as the command argument. The tag, on receipt of the BEEP_ON command, transmits back to the interrogator a response code indicating successful receipt of the command and associated information bytes containing the status of the tag. The tag then activates the beeper for a predefined time, in the preferred embodiment three minutes, after which it automatically resumes the sleep state.

In the following discussion of the flow of this process, the states 160 to 169 are operational blocks describing the processing of the BEEPER ON sequence by an interrogator and a plurality of tags. These blocks each incorporate one or more of the states 91 to 96 of LIST 2 which are executed internally within the block being discussed and are not shown in LIST 3 for clarity.

BEEP ON STATE 160. Referring now to LIST 1 and LIST 3, the interrogator in the example has arrived at START state 160 having being commanded to execute a BEEPER ON sequence to energize the beeper of a particular one of a plurality of tags. The address (ID code) of the particular tag has been transmitted to the interrogator by, for example, the external computer 40 of FIG. 7, and has been stored internally in processor 102. The process continues to SEND WAKE UP state 161.

BEEP ON STATE 161. For directed tag communication and for many other types of sessions, the constant operation of all tags within radio range of the interrogator 7 (or other operation requiring high-power consumption by the tags) is not desired. Low-power operation is important for battery-operated tags to extend battery life in the tags. In the present example, it is assumed that all tags normally are in a low-power standby mode (sleep mode) and are awakened only as the need arises.

In SEND WAKE-UP state 161, the interrogator transmits a WAKE-UP signal to wake up sleeping tags in the same manner as described previously for LIST 1 SEND WAKE UP state 61. After having sent the plurality of WAKE-UP signals as described, the process continues to TAGS WAKE UP state 162.

BEEP ON STATE 162. In TAGS WAKE UP state 162, each tag in the region 9, in the sleep mode of SLEEP state 90 of LIST 2, responds to the WAKE_UP signal in the same manner as described previously in LIST 2 and advances to INITIALIZE TIMER state 91 and then to LISTEN FOR COMMAND state 92. The process continues to SEND ALL SLEEP COMMAND state 163.

BEEP ON STATE 163. In SEND ALL SLEEP COMMAND state 163, to conserve battery energy in the plurality of tags, the interrogator transmits an ALL_SLEEP command of TABLE 1 to the plurality of tags, using the address (held in storage in processor 102) of the particular tag whose beeper is to be energized as the argument to the command. The process continues to RECEIVE SLEEP COMMAND state 164.

BEEP ON STATE 164. In RECEIVE SLEEP COMMAND state 164, the tag receives the ALL_SLEEP command from the interrogator. Each tag compares the address (ID code) argument of the command with its own address (ID code). If the result of the compare is FALSE, that is, the particular tag is not being addressed, the tag returns to the sleep mode of SLEEP state 90 of LIST 2. No further action occurs with this particular tag.

If the result of the compare is TRUE, that is, the particular tag is being addressed, the process continues to SEND BEEP ON COMMAND state 165 where the tag awaits a further command from the interrogator.

BEEP ON STATE 165. In SEND BEEP ON COMMAND state 165, the interrogator transmits the BEEP ON command of TABLE 1, using as an argument the address (held in storage in processor 102) of the particular tag to be energized. The process flow continues to WAIT FOR STATUS state 166.

BEEP ON STATE 166. In WAIT FOR STATUS state 166 the interrogator is waiting for the command response from the addressed tag for a period of time which in the preferred embodiment is approximately 114 milliseconds. During this time period, the tag is expected to return an acknowledgement of the command. When the status response is received from the tag, or at the end of the time period if the response from the tag is not received within the time period, the interrogator will set an appropriate status code, send the code to computer 40 and then return to IDLE state 59 of LIST 1. The process flow continues to RECEIVE BEEP ON COMMAND state 167.

BEEP ON STATE 167. In RECEIVE BEEP ON COMMAND state 167, the tag has received the BEEP_ON command and compares the address argument of the command with its own address.

If the comparison result is FALSE, this indicates that the particular tag responded incorrectly to the ALL_SLEEP command of state 163, that is it either did not hear the command correctly or it incorrectly compared the address argument. In either event, on failure to verify the address, the tag returns to the INITIALIZE TIMER state 91 and then to LISTEN FOR COMMAND state 92 to await further commands. Since the interrogator has no knowledge of the state of this tag, that is this tag has remained awake erroneously, the tag will remain in the loop states 92 and 92-1 until the WAIT TIMER equals zero, at which time the tag returns to the sleep mode at SLEEP state 90. In this manner the process functions in a fail safe manner.

If the comparison result is TRUE, the tag has been addressed and the process flow continues to SEND STATUS state 168.

BEEP ON STATE 168. In SEND STATUS state 168, the tag transmits its address ID code and a status byte back to the interrogator. The status byte is of the same format as the response to the HELLO or SET_WINDOW command, that is a preamble followed by an address, and additionally accompanied by the status byte. This transmission is collision free as all other tags are either in the sleep state, having not found a TRUE comparison when the address of the original command was matched as described in state 164 or, as previously discussed having erroneously found true the address code, are in the LISTEN FOR COMMAND state 92.

On receipt of the address ID and status information, the interrogator sends the information to the computer 40 and returns to the idle state as discussed in state 166. After transmission of the status information, the process flow continues to SET BEEPER ON state 169.

BEEP ON STATE 169. In SET BEEPER ON state 169, the tag activates the beeper for a predetermined time, in the preferred embodiment three minutes, and then deactivates the beeper. The BEEPER ON function then terminates with the tag advancing to SLEEP state 90 of LIST 2.

Tag Location Algorithms

Referring to LIST 4 and FIG. 8, an example of a session is described in which the computer 40 employs the batch collection process, previously described, together with tag location algorithms for determining the location in FIG. 8 of particular ones of tags 8 in region 9 using the interrogators 7. The location determination uses the collection information returned from each of the interrogators 7 in region 9 to determine the location within region 9 of a particular one or more of the tags. The determination is made based on the interrogator identity, the antenna identity and tag signal strength data returned from each of the interrogators. Such a process is readily repeatable for any of the tags 8 in the region 9 using the command set of TABLE 1.

The LOCATE TAG states 300 to 307 of LIST 4 are shown only as function blocks for clarity. The command sequencing may be discerned by examination of TABLE 1 and of LIST 1, LIST 2 and LIST 4 and CODE LISTING 1 APPENDIX and CODE LISTING 2 APPENDIX.

| LIST 4 - LOCATE TAG PROCESS | |
|---|---|
| {300} | Computer 40 desires location of tag 8-7. |
|  |  |
| {301} | Computer 40 sends interrogator 7-1 an inventory command. |
|  |  |
| {302} | After inventory completed, computer 40 requests tag table information from interrogator 7-1. |
|  |  |
| {303} | Computer 40 stores tag information in computer memory as table T-1. |
|  |  |
| {304} | Computer 40 sends interrogator 7-C an inventory command. |
|  |  |

LIST 4 - LOCATE TAG PROCESS

| {305} | After inventory completed, computer 40 requests tag table information from interrogator 7-C. |
|---|---|
| | ↓↓ |
| {306} | Computer 40 stores tage information in computer memory as table T-C. |
| | ↓↓ |
| {307} | Applying location algorithms, computer 40 analyzes data from stored tag tables T-1 and T-C and determines from signal strength and antenna information the location of tag 8-7. |

Code Listing

The actual computer code used in one preferred embodiment, comprising code in C program language and in assembly language for the processors identified above, is included in CODE LISTING 1 APPENDIX (corresponding to LIST 1 above) and CODE LISTING 2 APPENDIX (corresponding to LIST 2 above). The code modules are entitled as follows:

CODE LISTING 1—INTERROGATOR CODE MODULES

ADC.05H
C6805C9.H
CLOCK.05H
COLLECT.05H
COLLECT.H
COMCMDS.H
COMMANDS.05H
COMMUNIC.05H
CONFIG.H
DATABASE.05H
DELAYDEF.H
DELAYS.05H
DFTAGNIL.05H
DPOT.05H
EEPROM.05H
FLAGS.H
HW.05H
HW.H
INT.05C
INT.H
IO.05H
LCD.05H
MACROS.05H
NIUNULL.05H
RAM.05H
RS232.05H
SCANRSSI.05H
SCANRSSI.H
SCI.05H
STDDEF.H
TIMER.05H
UTIL.05H
WATCHDOG.05H
XTAG.05H

CODE LISTING 2—TAG CODE MODULES

COMCMDS.H
COMMUNIC.05H
DELAYDEF.H
DELAYS.05H
EEPROM.05H
LCD.05H
MSGS.05H
STDDEF.H
TAG.05C
TAGCONFG.H

The sequencing represented by LIST 1, LIST 2, LIST 3 and LIST 4 is functional and represents concisely the operation of the preferred embodiment of the present invention. The actual detailed operation appears in CODE LISTING 1 APPENDIX and CODE LISTING 2 APPENDIX. The correspondence between the actual code listings and LIST 1 through LIST 4 is illustrated through the following examples.

1. The interrogator process flow shown in LIST 1 states 63 through 72 is implemented in CODE LISTING 1, module "COLLECT.05H" lines 286 to 325.

2. The interrogator process flow shown in LIST 1 state 70 is implemented in CODE LISTING 1, module "COLLECT.05H" line 212 and lines 145 to 173.

3. The interrogator process flow shown in LIST 1 states 64, 66 through 70 is implemented in CODE LISTING 1, module "COLLECT.05H" lines 181 to 223.

4. The interrogator process flow shown in LIST 1 states 60, 60-1, 60-2, . . . , 60-S is implemented in CODE LISTING 1, module "INT.05C" lines 352 to 507.

5. The tag process flow shown in LIST 2 states 91, . . . , 93-S is implemented in CODE LISTING 2, module "TAG.05C" lines 502 to 524.

6. The tag process flow shown in LIST 2 states 94, 95 and 96 is implemented in CODE LISTING 2, module "TAG.05C" lines 387 to 394, lines 938 to 971 and lines 543 to 561.

7. The BEEP ON process flow shown in LIST 3 state 160 to 169 is implemented in CODE LISTING 1 module "MACROS.05H" lines 17 to 24 and lines 44 to 48, and in module COMMANDS.05H, lines 197 to 224. It will be apparent by one skilled in the art that the multiple steps of these states are implemented as a macro command series and include functions executed in other modules and that this series executes a beeper on command. Other functions are readily implemented using the macro command set included in or contemplated for the invention.

8. The BEEP ON process flow shown in LIST 3 state 167 is implemented in CODE LISTING 2 module "TAG.05C" lines 457 to 468, lines 384 to 419 and lines 572 to 600. It will be apparent by one skilled in the art that the multiple steps of the state 167 of LIST 3 are implemented by the functions included in this sequence of code series and that this series executes a beeper on command and that other functions are readily implemented.

9. The tag location process in LIST 4 states 301 and 304 is implemented in CODE LISTING 1, module "INT.05C" line 353 and module "COLLECT.05H" lines 243 to 325.

10. The tag location process in LIST 4 states 302 and 305 is implemented in CODE LISTING 1, module "INT.05C" line 358 and in module "COLLECT.05H" lines 437 to 442 and lines 352 to 421.

Further And Other Embodiments

Each of the different operations described in CODE LISTING 1 and CODE LISTING 2 may be implemented requiring only the execution of the different commands listed in TABLE 1 from the computer 40. Similarly, new and unique commands may be included by altering the current code using well known programming techniques. For example, as may be seen from the command list of TABLE 1 and CODE LISTING 1 and CODE LISTING 2, the system of the present invention also operates in the following ways:

A. messaging, where the tag appends a message to its address ID response to a broadcast (one-to-many) command, means existing then to quickly ascertain the status of a plurality of tags;

B. messaging, where the tag appends a message to its address ID response to a directed (one-to-one) command, means existing then for a tag to communicate data or other information to the interrogator and subsequently to a host system;

C. reverse messaging, where the interrogator adds a message to a specific tag's acknowledgement signal, means existing then to communicate data or other information from the interrogator or a host system via the interrogator to a tag.

In accordance with the present invention, the collision avoidance method employs randomization based on any of several communication parameters. In the preferred embodiment described in detail above, response delay is used as the parameter, however, the method can employ frequency, phase, amplitude or spatial variation parameters. Also, a linear recursive sequence generator seeded by the tag identification number may be used to generate a pseudo-random delay. In this manner, the diversity of time selection of responding tags expedites communication in the system.

Another mode of enhancement that may be employed in the interrogator apparatus is parameter enhancement. For instance, effective transmission power may be enhanced through the use of repeater apparatus. To implement the repeater, relay units rebroadcast a tag signal from a tag to a more distant interrogator unit that has a particular association with that particular tag. Such a system increases the effective range between tags and their associated interrogators.

Additional applications of the present invention use time measurement methods to determine the range and direction from an interrogator to a tag. The tag embodies a simple time measurement apparatus, such as a time-of-day clock and incorporates in the tag address response an indication of a time difference measurement. Such time measurements from tags allows an interrogator to determine the distance to a responding tag. Such enhancements are implemented by employing radio or acoustic transmissions along one path of the two way link between the tag and the interrogator. In addition, multiple beams may be used to provide direction measurement using conventional triangulation techniques.

Additional applications of the present invention relate to the use of external sensing apparatus incorporated in or associated with tags. A signal from an external sensor is incorporated within the tag address response to the interrogator synchronization command. The tag can also return elapsed time measurements along with the state of thermal, pressure or other outputs from physical sensors. This data affords an interrogator information as to the environment history of the tag or the current state of physical devices, such as the state of a lock or a continuity sensor.

The present invention is also operable wherein a plurality of batch collection periods are executed without the wake-up sequence. Such operation may employ tags which self-awaken with external stimulus. For instance, a thermal sensor may detect an out of range temperature of the tag environment. In such an example, only those tags having experienced an out of range circumstance would respond to a batch collection, all others would remain silent in the absence of a wake-up signal.

Wake-up and non-wake-up batch collection sequences may be combined. In such a system the interrogator rarely executes a batch collection process preceded with the wake-up command. Alternatively, the batch collection processes are performed without the wake-up period. Such a system extends tag battery life while still maintaining surveillance of the tags in the communication region. Only those tags with unusual circumstances to report would respond to a batch collection in the absence of a wake-up command. By way of contrast, all tags respond to a sequence preceded by a wake-up command.

Other embodiments modify the wake-up signal using time, frequency or pulse coding methods to address only a subset of the tags in the communication region of the interrogator. Envisioned also are embodiments using infrared or acoustic energy for the wake-up signal.

Additional embodiments envisioned are directed wake-up using a special wake-up frequency followed by a tag address code which wakes-up only the specifically addressed tag.

While the invention has been particularly shown and described with reference to preferred embodiments thereof it will be understood by those skilled in the art that various changes in form and details may be made therein without departing from the spirit and scope of the invention.

CODE LISTING 1 APPENDIX
COPYRIGHT 1993 SAVI TECHNOLOGY, INC.

module adc.05h 112

```
1    /*          module adc.05h              */
2    /*-------------------------------------------------*/
3    /*          ADC.05h
4    ---------------------------------------------------
5              Savi Technology 6    $Source: p:/int/RCS/adc.05h $ 7    Interface for the ADC0809 analog to digital converter 8    ---------------------------------------------------*/
9    #define adc_WR       portc.2
10   #define adc_IRQ      portd.3

11   #define adc_ALE      portc.1

12   #define adc_bus      data_bus
13   #define adc_bus_dir  data_bus_dir

14   #define select_adc   enable_device(D_ADC)
15   #define deselect_adc disable_device()

16   /* define externals */
17   int inc_tx(unsigned int) ;

18   int wait_adc_ready()
19   {
20     disable_int() ;
21     temph = TimerAltHigh ;
22     templ = TimerAltLow ;
23     enable_int() ;
24     while ( adc_IRQ == 1 )
25       {
26       disable_int() ;
27       if (TimerAltHigh-temph > 0x22) /* timeout to 20 msec */
28         {
29         REGA = TimerAltLow ;   /* read low byte to complete the sequence */
30         enable_int() ;
31         return(FALSE) ;    /* indicate that timeout error has occured */
32         }
33       else
34         {
35         REGA = TimerAltLow ;
36         enable_int() ;
37         }
38       }
39     return(TRUE) ;
```

CODE LISTING 1 APPENDIX
COPYRIGHT 1993 SAVI TECHNOLOGY, INC.

module adc.05h 113

```
40    }

41    /*------------------------------------------------------------
42                        ADC_START
43    ------------------------------------------------------------
44    Start the ADC. The ADC starts when the CS and WR line are simulta
45    neously low. The WR line is low by default. The CS line is pulled
46    down by selecting the device.
47    ------------------------------------------------------------*/
48    #define adc_set_address()  adc_ALE = 0 ;adc_ALE = 1 ;adc_ALE = 0 ;
49    #define adc_start()  adc_WR = 1 ; \
50                 adc_WR = 0 ;  /* start conversion */

51    /*------------------------------------------------------------
52                        ADC_READ
53    ------------------------------------------------------------
54    Read the count of the ADC. The count is read once the adc_irq line
55    is active (low). If the irq line stays high, this routine will loop
56    forever !!
57    ------------------------------------------------------------*/
58    int adc_read()
59    {
60    unsigned int adc_tmp ;
61        adc_bus_dir = 0x00 ;        /* define the bus as input */

62        select_adc ;                /* select the device (CS -> low) */

63        portc.0 = 1 ;
64        portc.0 = 0 ;
65        adc_tmp = adc_bus ;         /* get the value from the ADC */

66        deselect_adc ;

67        /* adc_bus_dir = 0xFF ;         redefine the bus as output */

68        return(adc_tmp ) ;
69    }
```

CODE LISTING 1 APPENDIX
COPYRIGHT 1993 SAVI TECHNOLOGY, INC.

module c6805c9.h 114

```
1   /*              module c6805c9.h                          */
2   /*---------------------------------------------------------
3       File:$Source: p:/int/RCS/c6805c9.h $ 4           General definitions for the C6805C9 microprocessor

5   ---------------------------------------------------------*/

6   /*---------------------------------------------------------
7       Port definitions
8       port? = data registers
9       ddr?  = data direction registers
10          0 = input
11          1 = output
12  ---------------------------------------------------------*/
13  #pragma  portrw porta           @ 0x00 ;
14  #pragma  portrw portb           @ 0x01 ;
15  #pragma  portrw portc           @ 0x02 ;
16  #pragma  portrw portd           @ 0x03 ;
17  #pragma  portrw ddra            @ 0x04 ;
18  #pragma  portrw ddrb            @ 0x05 ;
19  #pragma  portrw ddrc            @ 0x06 ;
20  #pragma  portrw ddrd            @ 0x07 ;

21  /*---------------------------------------------------------
22                  RS-232  DRIVER
23  ---------------------------------------------------------*/
24  #pragma  portrw SCI_BAUD        @ 0x0D ;  /* baud rate register */
25  #pragma  portrw SCI_CONTROL1    @ 0x0E ;  /* control1 */
26  #pragma  portrw SCI_CONTROL2    @ 0x0F ;  /* control2 */
27  #pragma  portrw SCI_STATUS      @ 0x10 ;  /* sci status */
28  #pragma  portrw SCI_DATA        @ 0x11 ;  /* sci data */

29  /*---------------------------------------------------------
30                  Define Timer Registers
31  ---------------------------------------------------------*/
32  #pragma  portrw TimerControl    @ 0x12 ;  /* Timer Control Register */
33  #pragma  portrw TimerStatus     @ 0x13 ;  /* Timer Status Register */
34  #pragma  portrw InputTimerHigh  @ 0x14 ;  /* Input Timer High */
35  #pragma  portrw InputTimerLow   @ 0x15 ;  /* Input Timer Low */
36  #pragma  portrw TimerCmpHigh    @ 0x16 ;  /* Compare High Register */
37  #pragma  portrw TimerCmpLow     @ 0x17 ;  /* Compare Low Register */
38  #pragma  portrw TimerRegHigh    @ 0x18 ;  /* Counter High Register */
39  #pragma  portrw TimerRegLow     @ 0x19 ;  /* Counter Low Register */
40  #pragma  portrw TimerAltHigh    @ 0x1A ;  /* Alternate High Register */
41  #pragma  portrw TimerAltLow     @ 0x1B ;  /* Alternate Low Register */
```

CODE LISTING 1 APPENDIX
COPYRIGHT 1993 SAVI TECHNOLOGY, INC.

module c6805c9.h

```
42   /*----------------------------------------------------
43            Define COP (Watchdog Timer) Registers
44   ----------------------------------------------------*/
45   #pragma portrw COPRST      @ 0x1D ;   /* COP Reset Register */
46   #pragma portrw COPCR       @ 0x1E ;   /* COP Control Register */

47   /*----------------------------------------------------
48            Define User Vectors
49   ----------------------------------------------------*/
50   #pragma vector sci_interrupt    @ 0x3FF6 ;  /* Sci interrupt vector */
51   #pragma vector timer_int        @ 0x3FF8 ;  /* Timer interrupt vector */
52   #pragma vector external_int     @ 0x3FFA ;  /* External interupt vector */
53   #pragma vector soft_interrupt   @ 0x3FFC ;  /* Software interrupt vector */
54   #pragma vector __RESET          @ 0x3FFE ;  /* Reset vector */

55   /*----------------------------------------------------
56            Tell the compiler about these two special instructions
57   ----------------------------------------------------*/
58   #pragma has STOP ;
59   #pragma has MUL ;
```

CODE LISTING 1 APPENDIX
COPYRIGHT 1993 SAVI TECHNOLOGY, INC.

module clock.05h 116

```
1   /*          module clock.05h                    */
2   /*------------------------------------------*/
3   /*          CLOCK.05h
4   ------------------------------------------

5   $Source: p:/int/RCS/clock.05h $

6   ------------------------------------------*/
7   #define clock_WR      WR_line
8   #define clock_DS      E_line
9   #define clock_AS      porta.0

10  #define clock_bus     portb
11  #define clock_bus_dir ddrb

12  #define ck_seconds    0x00
13  #define ck_al_seconds 0x01
14  #define ck_minutes    0x02
15  #define ck_al_minutes 0x03
16  #define ck_hours      0x04
17  #define ck_al_hours   0x05
18  #define ck_day_week   0x06
19  #define ck_day_month  0x07
20  #define ck_month      0x08
21  #define ck_year       0x09

22  #define registerA     0x0A
23  #define registerB     0x0B
24  #define registerC     0x0C 25  #define select_clock   enable_device(D_CLOCK)
26  #define deselect_clock disable_device()

27  unsigned int clock_add ;
28  unsigned int clock_data ;

29  char get_byte();
30  /*------------------------------------------
31                  CLOCK_READ
32  ------------------------------------------*/
33  int clock_read(clock_add)
34  {
35      clock_WR  = 1 ;
36      select_clock ;
37      clock_bus = clock_add ;
38      clock_AS  = 1 ;
39      clock_AS  = 0 ;
```

CODE LISTING 1 APPENDIX  
COPYRIGHT 1993 SAVI TECHNOLOGY, INC.

```
40    clock_DS = 0 ;
41    clock_bus_dir = 0x00 ;    /* define bus as input */

42    clock_data = clock_bus ;

43    clock_DS = 1 ;
44    clock_bus_dir = 0xFF ;    /* define bus as output */

45    deselect_clock ;
46    clock_WR = 0 ;

47    return(clock_data) ;
48    }

49  /*------------------------------------------------------------
50                        CLOCK_WRITE
51  ------------------------------------------------------------*/
52  void clock_write(clock_data,clock_add)
53  {
54    clock_WR  = 1 ;
55    clock_DS  = 1 ;
56    select_clock ;

57    clock_bus = clock_add ;
58    clock_AS = 1 ;
59    clock_AS = 0 ;

60    clock_WR = 0 ;
61    clock_bus = clock_data ;
62    clock_WR = 1 ;

63    deselect_clock ;
64    clock_WR = 0 ;
65  }

66  /*------------------------------------------------------------
67                        CLOCK_INIT
68  ------------------------------------------------------------*/
69  void clock_init()
70  {
71    clock_write(0b00100000,registerA) ;/*01*/

72    clock_write(0b00000110,registerB);
73                      /*b0=DSE  Daylight Savings Enable 0=NO */
74                      /*b1=24/12                1 = 24 hour mode */
```

CODE LISTING 1 APPENDIX  module clock.05h 118
COPYRIGHT 1993 SAVI TECHNOLOGY, INC.

```
75              /*b2=DM   Data Mode  1 = binary mode */
76              /*b3=SQWE Sq Wave Enab  0 = no sq wave out */
77              /*b4=UIE  Updt End Int Enab 0 = NO update ended int */
78              /*b5=AIE  Alarm Int Enab 0 -> alarm IRQ disable */
79              /*b6=PIE  Per. Int Enab  0 -> periodic IRQ disable */
80              /*b7=SET  Inhibit update 0 -> start SET bit in zero */
81     /* note alarm IRQ is POLLED */

82     REGA = clock_read(registerC) ;    /* clear IRQ flags */

83     }

84     /*----------------------------------------------------------
85                     CLOCK_ENABLE
86     ----------------------------------------------------------
87     Enable updates in the clock chip
88     ----------------------------------------------------------*/
89     void clock_enable()
90     {
91       clock_write(0b00000110,registerB) ;
92     }

93     /*----------------------------------------------------------
94                     CLOCK_DISABLE
95     ----------------------------------------------------------
96     Disable updates in the clock chip. Then I can write to it.
97     ----------------------------------------------------------*/
98     void clock_disable()
99     {
100      clock_write(0b10000110,registerB) ;
101    }

102    /*----------------------------------------------------------
103                    BCD2HEX
104    ----------------------------------------------------------
105    Convert a number from bcd format to hexadecimal
106    ----------------------------------------------------------*/
107    int bcd2hex(aa)
108    unsigned int aa ;
109    {
110    unsigned int bb ;
111      bb = aa ;
112      aa = (aa >> 4) * 10 ;
113      bb = aa + (bb & 0x0F) ;
114      return(bb) ;
115    }
```

CODE LISTING 1 APPENDIX   module clock.05h 119
COPYRIGHT 1993 SAVI TECHNOLOGY, INC.

```
116   /*----------------------------------------------------------------
117                     HEX2BCD
118   ----------------------------------------------------------------
119   Convert a number from hexadecimal format to bcd notation
120   ----------------------------------------------------------------*/
121   int hex2bcd(aa)
122   {
123     bb = aa ;
124     aa = aa/10 ;
125     bb = bb % 10 ;
126     return((aa<<4)+bb) ;
127   }

128   /*----------------------------------------------------------------
129                     CLOCK_ALARM
130   ----------------------------------------------------------------
131   Return TRUE if the alarm is set, FALSE otherwise.
132   ----------------------------------------------------------------*/
133   int clock_alarm()
134   {
135     return( (clock_read(registerC) & 0b00100000) != 0) ;
136   }

137   /*----------------------------------------------------------------
138                     SHOW_CLK_VAL
139   ----------------------------------------------------------------
140   Read the clock, convert to bcd and print
141   ----------------------------------------------------------------*/

142   void show_clk_val(registera val)
143   {
144   #if USE_LCD
145     accumula_msg(hex2bcd(clock_read(val))) ;
146   #endif
147   }

148   void show1_clk_val(registera val)
149   {
150   #if USE_LCD
151           show_clk_val(val);
152           putc_msg(':') ;
153   #endif
154   }

155   void show2_clk_val(registera val)
156   {
157   #if USE_LCD
158           show_clk_val(val);
```

CODE LISTING 1 APPENDIX  
COPYRIGHT 1993 SAVI TECHNOLOGY, INC.

module clock.05h 120

```
159         putc_msg(0x20) ;
160   #endif
161   }

162   /*---------------------------------------------------------------
163                       WRITE_TIME
164   ---------------------------------------------------------------
165   Write the time to the LCD
166   ---------------------------------------------------------------*/
167   void write_time()
168   {
169   #if USE_LCD
170       lcd_line(4) ;
171       show1_clk_val(ck_hours);
172       show1_clk_val(ck_minutes);
173       show2_clk_val(ck_seconds);

174       show1_clk_val(ck_al_hours);
175       show1_clk_val(ck_al_minutes);
176       show2_clk_val(ck_al_seconds);

177       show_clk_val(ALARM_ACTIVE);
178   #endif
179   }

180   /*---------------------------------------------------------------
181                       ALARM_INIT
182   ---------------------------------------------------------------
183   Initialize the alarm time in the interrogator. The alarm is set to N
184   minutes, where N is the interrogator ID ( low byte )
185   ---------------------------------------------------------------*/
186   void alarm_init()
187   {
188       /*
189       Initially the alarm was incremented by 1 minute
190       clock_write(clock_read(ck_seconds),ck_al_seconds) ;
191       clock_write(clock_read(ck_minutes)+1,ck_al_minutes) ;
192       clock_write(clock_read(ck_hours),ck_al_hours) ;
193       */

194       /* set the alarm to a function of the interrogator ID */
195       j = i = ee_read(EE_ID_LOW) ;
196       i = i / 60 ;
197       j = j % 60 ;

198       /* set the alarm to N minutes, with N equal to the interrogator ID */
```

CODE LISTING 1 APPENDIX
COPYRIGHT 1993 SAVI TECHNOLOGY, INC.

module clock.05h 121

```
199      clock_disable() ;
200      clock_write(0,ck_al_seconds) ;
201      clock_write(j,ck_al_minutes) ;
202      clock_write(i,ck_al_hours) ;
203      clock_enable() ;
204    }

205    /*----------------------------------------------------------
206                       CLOCK_RAM_INIT
207    ----------------------------------------------------------
208      Initialize the constants stored in the real time clock ram
209    ----------------------------------------------------------*/
210    void clock_ram_init()
211    {
212      clock_write(0x00,CHECKSUM_BYTE) ;
213      clock_write(0b01110000,COM_MODE_BYTE) ; /* use all antennas */

214      clock_write(0x00,START_TIME_HR) ;     /* start collecting at midnight */
215      clock_write(0x00,START_TIME_MIN) ;

216      clock_write(0x08,TIME_INTVL_HR) ;     /* collect every 8 hours */
217      clock_write(0x00,TIME_INTVL_MIN) ;

218      /* for now do not change this because there is no way to know if the
219         unit was reset because of the watchdog timer or because of an
220         actual reset
221      */
222      /* clock_write(TRUE,ALARM_ACTIVE) ;*/

223      clock_write(0x00,MANUF_CODE) ;
224      clock_write(0x00,CONFIG_BYTE) ;
225      clock_write(TRUE,POOL_NIU) ;          /* pool the NIU */
226    }

227    /*----------------------------------------------------------
228                       PROGRAM_COLLECTION
229    ----------------------------------------------------------
230      Read the appropiate parameters from the PC to do collections.
231    ----------------------------------------------------------*/
232    void program_collection()
233    {
234      clock_disable() ;
235      clock_write(get_byte(),START_TIME_HR) ;
236      clock_write(get_byte(),START_TIME_MIN) ;
237      clock_write(get_byte(),TIME_INTVL_HR) ;
238      clock_write(get_byte(),TIME_INTVL_MIN) ;
```

CODE LISTING 1 APPENDIX
COPYRIGHT 1993 SAVI TECHNOLOGY, INC.

module clock.05h 122

```
239    /* set the alarm with the initial value */

240    clock_write(clock_read(START_TIME_HR),ck_al_hours) ;
241    clock_write(clock_read(START_TIME_MIN),ck_al_minutes) ;
242    clock_write(0x00,ck_al_seconds) ;

243    clock_enable() ;
244    }

245    /*--------------------------------------------------------------
246                    SET_NEXT_ALARM
247    ---------------------------------------------------------------
248    Set the alarm to the next value.
249    ------------------------------------------------------------*/
250    void set_next_alarm()
251    {
252      clock_disable() ;
253      j = 0 ;
254      i = clock_read(ck_al_minutes);
255      i += clock_read(TIME_INTVL_MINUTES);
256      if ( i > 59)
257        {
258          i -= 60 ;
259          j++ ;
260        }
261      clock_write(i,ck_al_minutes) ;

262      j += clock_read(ck_al_hours);
263      j += clock_read(TIME_INTVL_HOUR) ;
264      if ( j > 23 )
265        j -=24 ;
266      clock_write(j,ck_al_hours) ;

267      clock_enable() ;
268    #if USE_LCD
269      lcd_clear() ;
270    #endif
271    }
```

CODE LISTING 1 APPENDIX
COPYRIGHT 1993 SAVI TECHNOLOGY, INC.

module collect.05h 123

```
1   /*          module collect.05h         */
2   /*----------------------------------------------
3                  COLLECT.05h
4   This file contains all the routines related to the collection
5   of tags. It also has the routines that report the collection
6   results to the PC.
7   ----------------------------------------------

8   $Source: p:/int/RCS/collect.05h $

9   ----------------------------------------------*/
10  void show_tag_counter() ;

11  /*----------------------------------------------
12                  SET_DEFAULT_WINDOWS
13  ----------------------------------------------
14  Set the colection windows to their default values
15  ----------------------------------------------*/
16  void set_default_windows()
17  {
18    window_1[0] = 120;    /* default values for cycle 0 */
19    window_1[1] = 60;
20    window_1[2] = 30 ;
21    window_2 = 15 ;       /* default value for cycle 1 */
22    window_3 = 5 ;        /* default value for final cycles */
23  }

24  /*----------------------------------------------
25                  SEND_HELLO
26  ----------------------------------------------
27  Send the hello signal. If the window factor is not 4 then send also
28  the window size to be used.
29  ----------------------------------------------*/
30  void send_hello()
31  {
32    Enable_Tx();
33    if ( window_factor != 4 ) /* expanded window */
34    {
35      SEND_1BYTE_CMD(SET_WINDOW_CMD) ;
36      hello_delay() ;              /* TEMPORARILY!! 80 usec  */
37      transmit_byte(window_factor) ;   /* send the window factor */
38    }
39    else /* normal 200 msec window */
40    {
41      SEND_1BYTE_CMD(HELLO_CMD) ;
```

CODE LISTING 1 APPENDIX  module collect.05h  124
COPYRIGHT 1993 SAVI TECHNOLOGY, INC.

```
42      }
43      Disable_Tx() ;

44   }

45   #if USE_NIU
46   void ck_niu_status()
47   {
48     if (command_source == RS485)
49        {
50           /* check if the PC is asking for status via niu */
51           if (command == NULL_COMMAND) {
52              check_niu() ;
53              if ( command == CHECK_STATUS)
54                 {
55                    check_status() ;
56                    command = NULL_COMMAND ;
57                 }
58           }
59        }
60   }
61   #endif 62   /*----------------------------------------------------------------
63                        RECEIVE_TAGIDS
64   -----------------------------------------------------------------
65      This routine receives tag IDs during une time window (200 msec)
66      It receives while the time of the time window has not expired
67   -----------------------------------------------------------------*/
68   #define NO_ERROR      0
69   #define PARITY_ERROR  1
70   #define RF_ERROR      2

71   int receive_tagIDs()
72   {
73     expired = FALSE ;
74     got_one_header = FALSE ;
75     got_one_tag = FALSE ;
76     EXT0 = EXT1 = EXT2 = 0 ;

77     while ( ! expired )   /* while the window time is active */
78        {
79           ID0 = 0X00 ;            /* set to 000000 initially */
80           ID1 = 0X00 ;            /* used to detect at what time the */
81           ID2 = 0X00 ;            /* bad id started*/

82           tag_error_code = NO_ERROR ;   /* assume no error in getting ID */
```

CODE LISTING 1 APPENDIX      module collect.05h 125
COPYRIGHT 1993 SAVI TECHNOLOGY, INC.

```
83        if ( wait_header() != 0 )     /* receive the header */
84          break ;

85        /* receive one tag ID and put it in the array ID */
86        got_one_header = TRUE ;
87        adc_start() ;    /* start the adc conversion */
88        if (rf_receive(3,ID))
89          {
90            if (!check_parity())  /* bad parity */
91              {
92                tag_error_code = PARITY_ERROR ;
93              }
94            else              /* good parity */
95              {
96                portc.0 = 1 ;
97                portc.0 = 0 ;
98                got_one_tag = TRUE ;
99              }
100         } /* end if rf_receive */

101       /* keep also record of the bad ids */
102       else
103         {
104           tag_error_code = RF_ERROR ; /* 2 means Rf error , pulse width error */
105           EXT0 = byte_counter ;     /* record where the error occured */
106           EXT1 = bit_counter ;
107           EXT2 = rf_error_code ;
108  #if DEBUG_SIGNALS
109           db_colli_start() ;
110           db_colli_end() ;
111  #endif
112         }

113       /* if we got a correct id or if we want to store everything */
114       if ((tag_error_code==NO_ERROR) || (store_collisions))
115         {
116           RSSI = adc_read() ;  '   /* get value from A/D */
117           REGA = TX_RX & 0xF0;
118             TX_RX = REGA | current_rx;  /* now add rx into buffer */

119  #if DEBUG_SIGNALS
120           db_ram_start() ;
121  #endif
122  /* TRICKY
123     The next lines are to prevent an overflow in case of too many tags /
124     The DB_add_tag routine will add a tag to the collection table. If that
125     table is full it will return FALSE. In that case we also return false
126     so that the collection will finish sooner. At the higher level it looks
```

CODE LISTING 1 APPENDIX    module collect.05h 126
COPYRIGHT 1993 SAVI TECHNOLOGY, INC.

```
127        that there are no more tags around
128     */
129            if (! DB_add_tag())     /* write the record to external ram */
130               return(FALSE) ;   /* I could not add the new record */

131            tag_counter++ ;       /* increase the number of collected 'tags' */
132     #if DEBUG_SIGNALS
133            db_ram_end() ;
134     #endif
135            }
136        } /* while ! expired */
137        select_one_rx(3) ;         /* disable receiver */

138        return(got_one_tag) ;
139     } /* receive */

140     /*------------------------------------------------------------
141                     ACK_TAGS
142     ----------------------------------------------------------
143     Send acknowledge all the tags that were collected in the last cycle
144     ----------------------------------------------------------*/
145     void ack_tags()
146     {
147     int rtncount ;
148        Enable_Tx();
149        ram_aux = ram_add ;
150        ram_add = ram_old_add ;
151        do
152         {
153     /* short delays are used to produce a 100 usec space between succesive bytes*/
154            DB_get_tagID() ;

155            if (tag_error_code == 0 ) /* if the tag ID was correct */
156             {
157              SEND_1BYTE_CMD(SLEEP_CMD) ;  /* send SLEEP cmd */
158              hello_delay() ;
159              transmit_byte(ID0) ;     /* send the 3 byte ID*/
160              short_delay() ;
161              transmit_byte(ID1) ;
162              short_delay() ;
163              transmit_byte(ID2) ;
164     /*^^^^^*/
165              one_msec() ;
166             }
167        } while ( ram_add != ram_aux) ;

168        ram_old_add = ram_add ;       /* move the pointer to the top of the list of
```

CODE LISTING 1 APPENDIX
COPYRIGHT 1993 SAVI TECHNOLOGY, INC.

module collect.05h 127

```
169                     tag IDs do the next acknowledge cycles
170                     we don't send again the tag IDs that we
171                     just sent */
172     Disable_Tx() ;
173     }

174     /*----------------------------------------------------------------
175                     SET_ANTE_COLLECT
176     ----------------------------------------------------------------
177     Set the apropriate antenna combination and do one collect.
178     If there is not tags there, decrement the credit for that transmitter,
179     else reset the credit to its original value.
180     ----------------------------------------------------------------*/
181     void set_ante_collect()
182     {
183     unsigned long tags_this_cycle ;
184     #if (DFTAG==FALSE)

185             TX_RX = current_tx << 4;  /* put tx in buffer now and RX later */

186     /* Collect one cycle using the current tx. */
187     #if VERBOSE_LCD
188     #if USE_LCD
189             lcd_gotoxy(0,2) ;
190             show("W="); show_int_dec(window_factor);
191             show(" T="); nibble_msg(current_tx+1);
192           tags_this_cycle = tag_counter ;
193     #endif
194     #endif 195             send_hello();
196             load_cmp_regs();
197             window_counter = window_factor;         /* window = 50ms*window_counter */

198             if (receive_tagIDs())     /* return true if at least one tag */
199                     {
200                     kick_the_dog();                 /* reset watchdog timer */
201                     ack_tags() ;            /* acknowledge tags */
202                     ram_old_add = ram_add ;

203                     /* reset to initial credit */
204                     j = tx_credit[current_tx] & 0xF0 ;
205                     tx_credit[current_tx] = j | (j>>4) ;
206                     }
207             else
208                     {
```

CODE LISTING 1 APPENDIX         module collect.05h 128
COPYRIGHT 1993 SAVI TECHNOLOGY, INC.

```
209            if (! got_one_header )
210                    {
211                    if ((tx_credit[current_tx] & 0x0F) != 0x00)
212                            tx_credit[current_tx]-- ;
213                    } ;
214            } ;

215     one_msec() ;         /* add some delay between cycles */

216  #if USE_LCD
217      show_tag_counter() ;   /* show total number of tags */
218      tags_this_cycle = tag_counter - tags_this_cycle ;
219      lcd_gotoxy(6,3) ;
220      show_long_dec(tags_this_cycle) ;
221  #endif
222  #endif
223  }

224  #if USE_LCD
225  /*--------------------------------------------------------
226               SHOW_TAG_COUNTER
227  --------------------------------------------------------
228    Simply print out tag count to lcd
229  --------------------------------------------------------*/
230  const char s_tags[]=" tags";
231  void show_tag_counter()
232  {
233      lcd_gotoxy(11,2) ;
234      show_long_dec(tag_counter) ;
235      show(s_tags) ;
236  }
237  #endif 238  /*--------------------------------------------------------
239               COLLECT_TAGS
240  --------------------------------------------------------
241    Do a sequence of collections.
242  --------------------------------------------------------*/
243  #define MAX_COL_CYC_LIM 20     /* maximum number of collect cycles */
244  unsigned int max_collect_cycles; /* max limit for collection cycles */
245  void collect_tags()
246  {
247  #if (DFTAG == FALSE)
248  #if USE_LCD
249   lcd_clear();
250   show_int_ID() ;
```

CODE LISTING 1 APPENDIX
COPYRIGHT 1993 SAVI TECHNOLOGY, INC.

module collect.05h 129

```
251    #endif
252    i_collecting = TRUE ;      /* indicate in the status that we are collecting
253                                  in bit 3 of the status byte */

254    clock_write(current_tx,TRANSMITTER) ; /* store the current transmitter */

255    /* get and store the starting time of the collection */
256    clock_write(clock_read(ck_hours),HOUR_LAST_COLL) ;
257    clock_write(clock_read(ck_minutes),MIN_LAST_COLL) ;
258    clock_write(clock_read(ck_seconds),SEC_LAST_COLL) ;

259    max_collect_cycles = 0 ;
260    tag_counter = 0 ;

261    if (with_wakeup)
262      Tx_Wakeup() ;

263    ram_set_add(NEW_TAGS_BASE) ;
264    ram_old_add = NEW_TAGS_BASE ;

265    for ( cycle_counter = 0 ; cycle_counter < 2 ; cycle_counter++) {
266            tx_mask = 0b00010000 ;
267            for ( current_tx = 0  ; current_tx < 3 ; current_tx++ ) {
268                    if (cycle_counter==0) window_factor = window_1[current_tx] ;

269                    kick_the_dog();                /* reset watchdog timer */
270                    if ((clock_read(COM_MODE_BYTE) & tx_mask) == tx_mask)
271                            set_ante_collect();  /* select antennas and collect */

272    #if USE_NIU
273                    ck_niu_status();
274    #endif
275                    tx_mask <<= 1 ;
276            }  /* end for current_tx */
277            window_factor = window_2;      /* use 400msec window for cycle 2*/

278    }  /* cycle = 0..1 */

279    cycle_counter=1;
280    window_factor = window_3;       /* now use a 200 msec window */

281    for ( i = 0 ; i < PAIR_CRDT_SIZE ; i++)
282       tx_credit[i] &= 0xF0 ;

283    loop_again:
284      cycle_counter++ ;   /* this variable is the 4th field of the tagID */
```

CODE LISTING 1 APPENDIX
COPYRIGHT 1993 SAVI TECHNOLOGY, INC.

module collect.05h 130

```
285    tx_mask = 0b00010000 ;

286    for ( current_tx = 0 ; current_tx < 3 ; current_tx++ )
287    {
288        if ((clock_read(COM_MODE_BYTE) & tx_mask) != 0)
289        {
290            if (cycle_counter == 2)
291            {
292                i = tx_credit[current_tx] ;
293                tx_credit[current_tx] = i | (i>>4) ;
294            }

295            kick_the_dog() ;
296            /* select antennas and do the collection*/
297            if ((tx_credit[current_tx] & 0x0F) != 0)
298                set_ante_collect() ;

299   #if USE_NIU
300            /* check if the PC is asking for status */
301            ck_niu_status();
302   #endif
303        } /* end if clock_read */

304        tx_mask <<= 1 ;
305    }  /* current TX */

306   #if USE_LCD
307   lcd_clrline(4) ;
308   for ( j = 0 ; j < PAIR_CRDT_SIZE ; j++)
309     accumula_msg(tx_credit[j] & 0x0F) ;
310   #endif 311   kick_the_dog() ;

312   /* if some pair still has credit available, loop again */
313   for ( j = 0 ; j < PAIR_CRDT_SIZE ; j++)
314     if (((tx_credit[j] & 0x0F) != 0) &&
315         (max_collect_cycles++ < MAX_COL_CYC_LIM) )
316            goto loop_again ;

317   #if USE_LCD
318     show1("Hashing") ;
319   #endif

320   DB_update_hash() ;        /* update the hash table */

321   i_collecting = FALSE ;    /* indicate in the status that we are done with
```

CODE LISTING 1 APPENDIX     module collect.05h 131
COPYRIGHT 1993 SAVI TECHNOLOGY, INC.

```
322                    the collection in bit 3 of status byte */

323    current_tx = clock_read(TRANSMITTER) ; /* restore the current transmitter */
324    #endif
325    }

326    #if (DFTAG==FALSE)
327    void report_aborted()
328    {
329      /* set the pointer to the original value */
330      ram_add = ram_aux ;

331    #if USE_LCD
332      show2("Abort report") ;
333      int_tenth_sec(100) ;
334    #endif 335    }
336    #endif 337    void put_record(unsigned int l)
338    {
339      for ( i = 0 ; i < l ; i++)
340        put_byte(ID[i]) ;
341    }

342    /*----------------------------------------------------------
343                        REPORT_LONG
344    ----------------------------------------------------------
345      Report to the PC ALL the collecting information of tags collected.
346      If the short_format flag is false the report consists of 10-byte
347      records.
348      If short_format is true the report consists of 4-byte records (tag
349      ID and RSSI)

350    ----------------------------------------------------------*/
351    const char s_report[]="Report ";
352    void do_report()
353    {
354    #if (DFTAG == FALSE)
355    #if USE_LCD
356      show1(s_report) ;
357      tag_counter = 0 ;
358    #endif
359      if ( ram_add != NEW_TAGS_BASE)
360        {
361          ram_aux = ram_add ;
```

CODE LISTING 1 APPENDIX  module collect.05h 132
COPYRIGHT 1993 SAVI TECHNOLOGY, INC.

```
362         ram_set_add(NEW_TAGS_BASE) ;
363         do {
364             kick_the_dog();   /* reset watchdog timer */

365             DB_get_tag() ;   /* get tag information from database */

366     #if USE_NIU
367             if (command_source == RS485)  /* wait for available TX buffer */
368             {
369               if (short_format)
370                 wait2txnbytes(4, REGULAR_DATA_PACKET) ; /* ID + RSSI */
371               else
372                 wait2txnbytes(TAG_RECORD_LENGTH, REGULAR_DATA_PACKET) ;
373             }
374     #endif 375     #if USE_LCD
376             tag_counter++ ;
377     #endif 378             if (short_format)
379             {
380               put_record(3) ;      /* send tag ID */
381               put_byte(RSSI) ;     /* send RSSI */
382             }
383             else
384             {
385               if (short_format)
386                 put_record(4) ;
387               else
388                 put_record(TAG_RECORD_LENGTH) ;
389             }

390             /* check that the NIU was able to send the packet */
391     #if USE_NIU
392             if (command_source == RS485)
393             {
394               REGA = niu_get_status() ;
395               if (NIU_TXERR)
396               {
397                 report_aborted() ;
398                 goto abort_full_report ;
399               }
400             }
401     #endif 402         } while ( ram_add != ram_aux) ;
403     }
```

CODE LISTING 1 APPENDIX   module collect.05h 133
COPYRIGHT 1993 SAVI TECHNOLOGY, INC.

```
404    #if USE_LCD
405      show_tag_counter();
406    #endif

407    #if USE_NIU
408      if (command_source = = RS485)  /* wait for available TX buffer */
409        wait2txnbytes(TAG_RECORD_LENGTH, EOT_DATA_PACKET) ;
410                          /* to send TAG_RECORD BYTES */
411                          /* turn on flag to send EOT */
412    #endif
413      if (short_format)
414        j = 4 ;              /* 3 bytes for ID plus one for RSSI */
415      else
416        j = TAG_RECORD_LENGTH ;

417      for ( i = 0 ; i < j ; i++)
418        put_byte(0) ;
419    abort_full_report:
420    #endif
421    }

422    /*------------------------------------------------
423                  REPORT_LONG
424    ------------------------------------------------
425      Report to the PC ALL the collecting information of tags collected.
426    ------------------------------------------------*/
427    void full_report()
428    {
429      do_report() ;   /* do full report */
430    }

431    /*------------------------------------------------
432                  SHORT_REPORT
433    ------------------------------------------------
434      Do a short report. Each record contains tag ID and RSSI (4 bytes
435      total). A null record indicates the end of report
436    ------------------------------------------------*/
437    void short_report()
438    {
439      short_format = TRUE ;
440      do_report() ;              /* do short report */
441      short_format = FALSE ;
442    }

443    /*------------------------------------------------
444                  DO_FILTER_REPORT
445    ------------------------------------------------
```

CODE LISTING 1 APPENDIX
COPYRIGHT 1993 SAVI TECHNOLOGY, INC.

module collect.05b 134

```
446    Report tags after filtering.
447    I am reporting back a sequence of 5 byte records. A record contains
448    Tag ID : 3 bytes
449    How many times the tag was collected : 1 byte
450    RSSI for last time that the tag was collected : 1 byte
451    Collection pattern for last 16 collections : 2 bytes 452    This function is called once the filter value has been read from the
453    pc in the routine filter_report bellow
454    -----------------------------------------------------------------*/
455    void do_filter_report(unsigned int j)
456    {
457    #if (DFTAG == FALSE)
458    #if USE_LCD
459      show1(s_report) ;
460      tag_counter = 0 ;
461    #endif
462      ram_aux = ram_add ;
463      ram_set_add(HASH_TAGS_BASE) ;
464      do
465      {
466         kick_the_dog();   /* reset watchdog timer */
467         DB_get_hash_tag() ;
468         if (HASH_TAG[3] > j)
469           {
470    #if USE_LCD
471             tag_counter++ ;
472    #endif
473    #if USE_NIU
474             if (command_source == RS485 )     /* if niu add header */
475                wait2txnbytes(7, REGULAR_DATA_PACKET) ;
476    #endif
477             for ( i = 0 ; i < 7 ; i++)
478                put_byte(HASH_TAG[i]) ;

479             /* check that the NIU was able to send the packet */
480    #if USE_NIU
481             if (command_source == RS485)
482                {
483                  REGA = niu_get_status() ;
484                  if (NIU_TXERR)
485                    {
486                      report_aborted() ;
487                      goto abort_filter_report ;
488                    }
489                }
490    #endif
491          }
```

CODE LISTING 1 APPENDIX
COPYRIGHT 1993 SAVI TECHNOLOGY, INC.

module collect.05h 135

```
492      } while ( ram_add != END_HASH_TAGS) ;

493   #if USE_LCD
494      show_tag_counter();
495   #endif

496   #if USE_NIU
497      if (command_source == RS485 )          /* if niu add header */
498         wait2txnbytes(7,EOT_DATA_PACKET) ;
499   #endif 500      for ( i = 0 ; i < 7 ; i++)    /* end of message */
501         put_byte(0) ;

502      /* restore the original pointer */
503      ram_add = ram_aux ;

504   abort_filter:
505   #endif
506   }

507   void filter_report()
508   {
509   /* get filter value and call function that does the report */
510      do_filter_report(get_byte());
511   }

512   /*------------------------------------------------
513   --------------------------------------------------
514   ------------------------------------------------*/
515   void auxiliar()
516   {
517      for ( i = 1 ; i < number_of_bytes ; i++) /* send the arguments */
518         {
519            transmit_byte(buffer[i]) ;
520            short_delay() ;
521         } ;
522      load_cmp_regs();
523      Disable_Tx() ;
524   }

525   /*------------------------------------------------
526                  CHECK_RECEIVED_ID
527   --------------------------------------------------
528   This routine checks that the received routine is equal to the target
529   ID and also it checks if it has the correct parity and if the
530   service request bit is on.
```

CODE LISTING 1 APPENDIX
COPYRIGHT 1993 SAVI TECHNOLOGY, INC.

module collect.05h 136

```
531   ----------------------------------------------------------*/
532   void check_received_id()
533   {
534     if (check_parity())
535       {
536         target_ID2 &= 0xF0 ;
537         if ((ID0==target_ID0) && (ID1==target_ID1) && ((ID2&0xF0)==target_ID2))
538           {
539             if ((ID2 & 0b00000010) != 0)
540               error_code = TAG_SERVICE ;
541             else
542               error_code = ALL_OK ;
543           } /* if it is the target ID */
544       } /* is is the correct parity */
545     else  /* ID parity error */
546       error_code = IDPARITY_ERROR ;
547   }

548   /*---------------------------------------------------------
549                       COUNT_ONES
550   ---------------------------------------------------------
551     Count how many ones are in the leftmost nbits of data
552   ---------------------------------------------------------*/
553   int count_ones(nbits,data)
554   registerx nbits ;
555   {
556   int counter ;
557     counter = 0 ;
558     do
559       {
560       if ((data & 0x80) == 0x80 )
561         counter++ ;
562       data <<= 1 ;
563       nbits-- ;
564       } while (nbits != 0) ;
565     return(counter) ;
566   }

567   /*---------------------------------------------------------
568                       CHECK_PARITY
569   ---------------------------------------------------------
570     Check that the parity of the received ID is correct
571   ---------------------------------------------------------*/
572   int check_parity()
573   {
574     return((count_ones(8,ID0^ID1^ID2) & 0x01)==0) ;
575   }
```

CODE LISTING 1 APPENDIX
COPYRIGHT 1993 SAVI TECHNOLOGY, INC.

module collect.05h 137

```
576   /*-------------------------------------------------------------
577                  COMPUTE_CHECKSUM
578   -------------------------------------------------------------
579     This function returns the checksum (parity byte) for all the bytes in
580     buffer2 from 0 to "data_length"-1.
581   -------------------------------------------------------------*/
582   unsigned int compute_checksum(data_length)
583   int data_length ;
584   {
585   unsigned int checksum ;
586     checksum = 0 ;
587     for ( j = 0 ; j < data_length ; j++)
588        checksum ^= buffer[j] ;
589     return(checksum) ;
590   }
```

CODE LISTING 1 APPENDIX
COPYRIGHT 1993 SAVI TECHNOLOGY, INC.

module collect.h 138

```
1   /*          module collect.h                                    */
2   /*-------------------------------------------------------------
3                   COLLECT.h 4       Prototypes for the collect.05h module
5   -------------------------------------------------------------

6       $Source: p:/int/RCS/collect.h $

7   -------------------------------------------------------------*/
8   void send_hello() ;
9   void collect_tags() ;
10  void report_aborted() ;
11  void report_full() ;
12  void filter_report() ;
```

CODE LISTING 1 APPENDIX  
COPYRIGHT 1993 SAVI TECHNOLOGY, INC.

module comcmds.h 139

```
1    /*         module comcmds.h        */
2    /*-------------------------------------------------
3    $Source: p:/int/RCS/comcmds.h $
4    -----------------------------------------------------*/
5    /*-----------------------------------*/
6    /*    Interrogator-tag commands    */
7    /*-----------------------------*/
8    #define HELLO_CMD         0b00000000
9    #define INT_HELLO_CMD     0b00000011
10   #define TURBO_HELLO_CMD   0b00000101
11   #define SLEEP_CMD         0b11000011
12   #define BEEPON_CMD        0b11000101
13   #define BEEPOFF_CMD       0b11000110
14   #define PLACE_CMD         0b11001001
15   #define ALL_SLEEP_CMD     0b11011011
16   #define CHECK_IN_CMD      0b11001100
17   #define SET_WINDOW_CMD    0b10001110
18   #define TURBO_SET_WIN_CMD 0b10011111
19   #define GET_VERSION_CMD   0b11010001
20   #define SQUAWK_CMD        0b11010010
21   #define WRITE_PORTB_CMD   0b11010100
22   #define READ_PORTA_CMD    0b11011001
23   #define GET_ERROR_CMD     0b11011010
24   #define CLEAR_ERROR_CMD   0b11011101
25   #define ARM_SEALTAG_CMD   0b11011110  /* SEAL TAG */
26   #define PLACE_RAM_CMD     0b11100001  /* the next 4 commands are used */
27   #define SQUAWK_RAM_CMD    0b11100010  /* for SENSOR TAG */
28   #define READ_RTC_CMD      0b11100100
29   #define READ_ADC_CMD      0b11100111
30   #define LOCK_TAG_CMD      0b11101000  /* used for LockTag */

31   #define PING_HELLO_CMD    0b00000111  /* for dftag */
32   #define DF_REPORT_CMD     0b00001100
33   #define TEST_EEPROM_CMD   0b11111111

34   /*-------------------------------------------*/
35   /*    Interrogator-pc commands    */
36   /*-------------------------------------------*/
37   #define COLLECT_TAGS   0x00   /* collect the tags */
38   #define REPORT_FILTER  0x01   /* send the ids to the PC */
39   #define REPORT_FULL    0x02   /* send all info to pc */
40   #define CHECK_STATUS   0x03   /* get int status */
41   #define SET_COLL_MODE  0X04   /* set collection parameters */
```

CODE LISTING 1 APPENDIX  module comcmds.h 140
COPYRIGHT 1993 SAVI TECHNOLOGY, INC.

```
42   #define SHORT_REPORT 0x05      /* send tag ID and RSSI report */
43   #define SET_TIME      0X06     /* set interrogator time */

44   #define SET_MODE_BYTE 0x07     /* define TX and TX pairs to use */
45   #define SET_TX_CREDIT 0x08     /* define number retries for TX */

46   #define CLEAR_DB      0x09     /* clear the DB (hash table) */

47   #define SEND_WAKEUP   0x0A     /* send the wakeup signal */
48   #define WAKEUP_ON     0x0B     /* turn wakeup signal on */
49   #define WAKEUP_OFF    0x0C     /* turn wakeup signal off */
50   #define CHECK_IN      0x0D     /* check in and report status */
51   #define LOCK_TAG      0x0E     /* lock tag */
52   #define GET_VERSION   0x0F     /* send software version */

53   #define COLLI_ON      0x10     /* save collisions to DB */
54   #define COLLI_OFF     0x11     /* do not save collisions to DB */
55   #define SNIFFON_TAG   0x12     /* sniff on command */
56   #define SNIFFOFF_TAG  0x13     /* sniff off command */
57   #define READ_PORT     0x14     /* read porta */
58   #define WRITE_PORT    0x15     /* set the value of portb */
59   #define SLEEP_ALL     0x16     /* send all tags to sleep */
60   #define SQUAWK        0x17     /* squawk a tag */
61   #define PLACE         0x18     /* write to tag eeprom */
62   #define GET_ERROR     0x19     /* get error code from the tag */
63   #define CLEAR_ERROR   0x1A     /* clear tag error code */
64   #define INT_HELLO     0x1B     /* do hello only for tags in interrupt mode*/
65   #define GET_INT_STATE 0x1C     /* report interrogator state */
66   #define SET_ALARM     0X1D     /* set interrogator alarm */

67   #define SET_NUMBER_WAKEUPS 0x1E /* how many wakeups to use */
68   /*
69   #define FREE          0x1F
70   */
71   #define SET_WAKE_TX   0x20     /* define the TX that sends the wakeup signal */
72   #define TEST_INT_RAM  0x21     /* test external ram */
73   #define TEST_INT_EEPROM 0x22   /* check internal eeprom */
74   #define DUMP_INT_RAM  0x23     /* write xram content to lcd*/

75   /* Interrogator NIU commands */
76   #define NIUGET_STATUS     0x24
77   #define NIUSEND_DATA      0x25
78   #define NIUGET_DATA       0x26
79   #define NIUTEST_MEMORY    0x27
80   #define NIUTEST_485       0x28
81   #define NIUSET_RETX       0x29
82   #define NIUSET_TIMEOUT    0x2A
```

CODE LISTING 1 APPENDIX     module comcmds.h 141
COPYRIGHT 1993 SAVI TECHNOLOGY, INC.

```
83   #define NIUSET_ID        0x2B
84   #define NIUDISABLE       0x2C
85   #define NIUENABLE        0x2D
86   #define SET_DPOT         0x2E
87   #define BROADCAST        0x2F   /* broadcast a known pattern to LEDtag */
88   #define FIND_TAG         0x30
89   #define ARMSEALTAG       0x31
90   #define SETWINDOWS       0x32
91   #define READCRASHCOUNTER    0x33
92   #define RESETCRASHCOUNTER   0x34
93   #define SAMPLE_RSSI      0x35
94   #define MODULATE_FM      0x36

95   #define PLACERAM         0x37   /* commands 0x37 - 0x3A are used */
96   #define SQUAWKRAM        0x38   /* for Sensor Tag */
97   #define READRTC          0x39

98   #define STAMP_FILTER_REPORT 0x3A
99   /* these are the macro commands used to reduce network traffic */
100  #define M_BEEPER_ON      0x3B
101  #define M_PLACE          0x3C
102  #define M_SQUAWK         0x3D
103  #define GET_INT_VERSION  0x3E 104  /* two routines to read and write eeprom */
105  #define EEPROM_READ      0x3F
106  #define EEPROM_WRITE     0x40

107  #define SET_POWER        0x41
108  #define START_BROADCAST  0x42
109  #define STOP_BROADCAST   0x43

110  /* commands for dftag */
111  #define SET_FREQ_SYN     0x44
112  #define PING_TAG         0x45
113  #define DFREPORT         0x46
114  #define ANGLE_TAG        0x47

115  #define ALARM_ON         0x48
116  #define ALARM_OFF        0x49
117  #define READ_TIME        0x4A
118  #define RECEIVER_ON      0x4B
119  #define RECEIVER_OFF     0x4C
120  #define DB_TIMING        0x4D 121  #define CON_WAKE_ON      0x4E 122  /* Launch Station commands */
```

Attorney Docket No. SAVI1001CIP2DEL
del/savi/1001cip2.pa.a1

CODE LISTING 1 APPENDIX
COPYRIGHT 1993 SAVI TECHNOLOGY, INC.

module comcmds.h 142

```
123  #define REPORT_LAUNCH      0x4F
124  #define WRITEFULLCLK       0x50
125  #define READFULLCLK        0x51
126  #define TEST_SET           0x52
127  #define WRITE_INT_RAM      0x53
128  #define READ_INT_RAM       0x54
129  #define INT_GET_ID         0x55
130  #define WRITELAUNCREC      0x56

131  /* commands used for SealTag II */
132  #define TEST_TAG_EEPROM    0x57
133  #define TEST_TAG_RAM       0x58

134  #define LARGEST_COMMAND    0x58

135  #define NULL_COMMAND       0xFF

136  /*------------------------------------------------*/
137  /* Error codes returned by the interrogator to the PC */
138  /* to inform about the most recent command            */
139  /*------------------------------------------------*/
140                             /* successful operation */
141  #define ALL_OK             0
142                             /* error when receiving header */
143  #define HEADER_ERROR       1
144                             /* parity error when receiving tag ID */
145  #define IDPARITY_ERROR     2
146                             /* error when receiving tag ID */
147  #define IDRX_ERROR         3
148                             /* tag needs service */
149  #define TAG_SERVICE        4
150                             /* error when receiving the extra byte
151                                in the commands check_in
152                                          get_version
153                                          get_error */
154  #define BYTE_RX_ERROR      5
155                             /* error when receiving number_of_bytes+1
156                                bytes via RF in squawk command */
157  #define MESSAGERX_ERROR    6
158                             /* error in the parity byte for the
159                                message in squawk command */
160  #define MESSAGEPARITY_ERROR 7
161                             /* buffer overflow error
162                                in pass_thru command */
163  #define BUFFER_FULL        8
164                             /* error when receiving response in
165                                pass_thru command */
166  #define RESPONSE_ERROR     9
```

CODE LISTING 1 APPENDIX
COPYRIGHT 1993 SAVI TECHNOLOGY, INC.

module comcmds.h 143

```
167                         /* error trying to write to an input
168                         line in set_bit_cmd or reset_bit_cmd */
169     #define INPUTLINE_ERROR    10
170                         /* errorr trying to reprogram the int. ID */
171     #define INT_SET_ID_ERROR   11

172     /*---------------------------------------------*/
173     /*---------------------------------------------*/
174                         /* pulse width error in rf_receive */
175     #define T_RFPULSE_ERR      0x81
176                         /* parity error in rf_receive */
177     #define T_RFPARITY_ERR     0x82
178                         /* pulse width error in rf_receive
179                         when reading the tag ID */
180     #define T_RFIDPULSE_ERR    0x83
181                         /* parity error in rf_receive
182                         when reading the tag ID */
183     #define T_RFIDPARITY_ERR   0x84
184                         /* The tag has no beeper. This error
185                         is generated for beeper_on and
186                         beeper_off commands */
187     #define T_NOBEEPER_ERR     0x85
188                         /* parity error in the byte specifying
189                         the window size */
190     #define T_WINDOWPARITY_ERR 0x86
191                         /* pulse width error in rf_receive
192                         when reading the M,N in squawk */
193     #define T_RFMNPULSE_ERR    0x87
194                         /* parity error in rf_receive
195                         when reading M,N in squawk */
196     #define T_RFMNPARITY_ERR   0x88
197                         /* overflow in squawk. We are asking
198                         for more bytes than the size of
199                         the buffer */
200     #define T_SQUAWK_OVF_ERR   0x89
201                         /* pulse width error in rf_receive
202                         when reading window_size */
203     #define T_RFWPULSE_ERR     0x8A
204                         /* parity error in rf_receive
205                         when reading window_size */
206     #define T_RFWPARITY_ERR    0x8B
207                         /* pulse width error in rf_receive
208                         when reading the M,N in place */
209     #define T_RFMNPPULSE_ERR   0x8C
210                         /* parity error in rf_receive
211                         when reading M,N in place */
212     #define T_RFMNPPARITY_ERR  0x8D
```

CODE LISTING 1 APPENDIX
COPYRIGHT 1993 SAVI TECHNOLOGY, INC.

module comcmds.h 144

```
213                 /* pulse width error in rf_receive
214                    when reading the string in place */
215     #define T_RFSTPPULSE_ERR   0x8E
216                 /* parity error in rf_receive
217                    when reading the string in place */
218     #define T_RFSTPPARITY_ERR  0x8F 219                 /* Incorrect CRC in place command */
220     #define T_PLACECRC_ERR     0x90
221                 /* Error when writing data to eeprom
222                    in place */
223     #define T_PLACEWRITE_ERR   0x91
224                 /* Error when comparing data written
225                    with the original message in place */
226     #define T_PLACECONFIRM_ERR 0x92
227                 /* Error when writing the new checksum
228                    error to eeprom in place */
229     #define T_PLACECHECK_ERR   0x93
230                 /* Error when confirming the writting
231                    of new checksum to the eeprom in place*/
232     #define T_CPLACECHECK_ERR  0x94
233                 /* overflow in place. We want to write
234                    more bytes than the size of
235                    the buffer */
236     #define T_PLACE_OVF_ERR    0x95
237                 /* overflow in place. The string overflows
238                    the maximum eeprom address */
239     #define T_PLACE_OVF2_ERR   0x96
240                 /* error when receiving the byte to be
241                    written to portb */
242     #define T_WRITEPORTB_ERR   0x97
```

CODE LISTING 1 APPENDIX
COPYRIGHT 1993 SAVI TECHNOLOGY, INC.

module commands.05h 145

```
1   /*              module commands.05h    */
2   /*------------------------------------------------*/
3   /*              COMMANDS.05h
4       This file contains most of the general interrogator commands.
5   
6       $Source: p:/int/RCS/commands.05h $
7   ------------------------------------------------*/

8   /*------------------------------------------------
9               SEND_TARGET_ID
10  
11      Send the target ID via RF.
12  ------------------------------------------------*/
13  #define send_target_id() hello_delay() ;            \
14                      transmit_byte(target_ID0) ; \
15                      short_delay() ;             \
16                      REGX = 1 ; delay() ;        \
17                      transmit_byte(target_ID1) ; \
18                      short_delay() ;             \
19                      REGX = 1 ; delay() ;        \
20                      transmit_byte(target_ID2) ; \
21                      short_delay() ;

22  /*------------------------------------------------
23              GET_TARGET_ID
24  
25      Receives the 3 byte ID from the PC via rs232.
26  ------------------------------------------------*/
27  void get_target_id()
28  {
29      target_ID0 = get_byte() ;
30      target_ID1 = get_byte() ;
31      target_ID2 = get_byte() ;
32  }

33  /*------------------------------------------------
34              GET_TAG_ACK
35  
36      Receives the tag acknowledge and writes the error code to the LCD.
37      It also sends the error code to the PC.
38      This routine waits for the tag ID for 100*time [msec].
39      It calls check_received_ID to check if the ID is consistant.
40  ------------------------------------------------*/
41  void get_tag_ack(time)
42  registera time ;
```

CODE LISTING 1 APPENDIX     module commands.05h 146
COPYRIGHT 1993 SAVI TECHNOLOGY, INC.

```
43   {
44   #if (DFTAG == FALSE)
45      window_counter = time*2 ;        /* how many times 100 msec we are going to
46                                          wait for response. time = 2 -> 200msec*/
47      Disable_Tx() ;

48      load_cmp_regs();
49      expired = FALSE ;
50      error_code = ALL_OK ;
51      if (wait_header() == 0 )         /* the header was received correctly */
52         {
53         if (rf_receive(3,ID))         /* receive back the tag ID as an
54                                          acknowledge that the communication
55                                          was successful */
56            check_received_id() ;
57         else
58            error_code = IDRX_ERROR ;  /* error receiving the tag ID */
59   #if DEBUG_SIGNALS
60         db_colli_start() ;
61         one_msec() ;
62         db_colli_end() ;
63   #endif
64         } /* correct header */
65      else   /* the header was incorrect */
66         {
67   #if DEBUG_SIGNALS
68         db_coll_start() ;
69         one_msec() ;
70         db_coll_end() ;
71   #endif
72         error_code = HEADER_ERROR ;
73         }

74      select_one_rx(3) ;

75   #if USE_LCD
76      code_msg() ;
77   #endif
78   #endif
79   }

80   #if USE_LCD
81   const char wk_on[]="W ON";
82   const char wk_off[]="W OFF";
83   const char tx_wk_on[]="Wk=";
84   #endif
85   /*---------------------------------------------------------------
86                     WAKEUP_ON
```

CODE LISTING 1 APPENDIX    module commands.05h  147
COPYRIGHT 1993 SAVI TECHNOLOGY, INC.

```
87   -----------------------------------------------------------------
88      Enable the wakeup signal
89   -----------------------------------------------------------*/
90   void wakeup_on()
91   {
92     with_wakeup = TRUE ; /* enable wakeup signal */
93     put1byte(ALL_OK) ;
94   #if USE_LCD
95     show2(wk_on) ;
96   #endif
97   }

98   /*-----------------------------------------------------------------
99                   WAKEUP_OFF
100  -----------------------------------------------------------------
101     Disable the wakeup signal
102  -----------------------------------------------------------*/
103  void wakeup_off()
104  {
105    with_wakeup = FALSE ;
106    put1byte(ALL_OK) ;
107  #if USE_LCD
108    show2(wk_off) ;
109  #endif
110  }

111  /*-----------------------------------------------------------------
112                   INC_TX
113  -----------------------------------------------------------------
114     Increment current TX to next one.
115     It does a mod 3 increment, this is 0,1,2,0,1,2,0,1,2... etc
116     It also check the mode byte for active/inactive transmitters.
117  -----------------------------------------------------------*/
118  int inc_tx(unsigned int tx)
119  {
120  unsigned int counter ;
121  unsigned int tx_mask ;

122  /*
123     If the mode byte was set to zero because of an error condition,
124     meaning no transmitter enabled. The routine will not increment
125     at all
126  */
127  if (clock_read(COM_MODE_BYTE) == 0) return(tx) ;

128  increment:
129    tx++ ;
130    if (tx > 2) tx = 0 ;
```

Attorney Docket No. SAVI1001CIP2DEL
del/savi/1001cip2.pa.a]

CODE LISTING 1 APPENDIX    module commands.05h  148
COPYRIGHT 1993 SAVI TECHNOLOGY, INC.

```
131    tx_mask = 0b00010000 ;
132    for ( counter = 0 ; counter < tx ; counter++)
133      tx_mask <<= 1 ;
134    if ((tx_mask & clock_read(COM_MODE_BYTE)) == 0 )
135      goto increment ;
136    return(tx) ;
137  }

138  /*------------------------------------------------
139                    TX_WAKEUP
140  ------------------------------------------------
141    Set the proper tx and receiver and call the actual routine that sends
142    the square wave.
143  ------------------------------------------------*/
144  void Tx_1_Wakeup()
145  {
146  #if USE_LCD
147     show3(tx_wk_on) ;
148     nibble_msg(wakeup_tx+1) ;      /* indicate wakeup TX */
149  #endif 150    current_tx = wakeup_tx ;

151    /* set the dpot to wakeup level */
152    move_dpot(current_tx,ee_read(WAKEUP_POWER)) ;

153    Enable_Tx();
154    send_wakeup();
155    Disable_Tx() ;

156    /* reset the dpot to commands level */
157    move_dpot(current_tx,ee_read(COMMANDS_POWER)) ;

158    wakeup_tx = inc_tx(wakeup_tx) ;
159  }

160  /*------------------------------------------------
161                    TX_WAKEUP
162  ------------------------------------------------
163    Set the proper tx and receiver and call the actual routine that sends
164    the square wave.
165  ------------------------------------------------*/
166  void Tx_Wakeup()
167  {
168  unsigned int w_counter ;
169    for (w_counter = 0 ; w_counter < how_many_wakeups ; w_counter++)
170      Tx_1_Wakeup() ;
171  }
```

CODE LISTING 1 APPENDIX       module commands.05h  149
COPYRIGHT 1993 SAVI TECHNOLOGY, INC.

```
172   /*----------------------------------------------------------
173                       COLLISIONS_ON
174   ----------------------------------------------------------
175     Enable the recording of bad IDs and collisions
176   ----------------------------------------------------------*/
177   void colli_on()
178   {
179     store_collisions = TRUE ;
180     put1byte(ALL_OK) ;
181   }

182   /*----------------------------------------------------------
183                       COLLISIONS_OFF
184   ----------------------------------------------------------
185     Disable the recording of collisions and bad IDs
186   ----------------------------------------------------------*/
187   void colli_off()
188   {
189     store_collisions = FALSE ;
190     put1byte(ALL_OK) ;
191   }

192   /*----------------------------------------------------------
193                       BEEP_TAG
194   ----------------------------------------------------------
195     Send the BEEPER_CMD or BEEPER_CMD to an specific tag
196   ----------------------------------------------------------*/
197   void beep_tag(action_type)
198   unsigned int action_type ;
199   {
200     switch (action_type)
201     {
202       case ON : SEND_1BYTE_CMD(BEEPON_CMD) ;  /* send BEEPON_TAG cmd */
203               break ;

204       case OFF : SEND_1BYTE_CMD(BEEPOFF_CMD) ;  /* send BEEPON_TAG cmd */
205               break ;
206     } /* end switch */

207     send_target_id() ;

208     get_tag_ack(1) ;      /* get the tag ID as an acknowledge to the cmd
209                              timeout after 100 msec */

210     /* if operation failed, then increment rotating receiver */
211     if ( error_code != ALL_OK)
```

CODE LISTING 1 APPENDIX      module commands.05h 150
COPYRIGHT 1993 SAVI TECHNOLOGY, INC.

```
212    current_tx = inc_tx(current_tx) ;

213    put1byte(error_code) ; /* send result of operation to PC */
214    }

215    /*----------------------------------------------------------
216                        BEEPER_ON
217    ----------------------------------------------------------
218    Send the beeper ON command
219    ----------------------------------------------------------*/
220    void beeper_on()
221    {
222      get_target_id() ;
223      beep_tag(ON) ;
224    }

225    /*----------------------------------------------------------
226                        BEEPER_OFF
227    ----------------------------------------------------------
228    Send the beeperr OFF command
229    ----------------------------------------------------------*/
230    void beeper_off()
231    {
232      get_target_id() ;
233      beep_tag(OFF) ;
234    }

235    /*----------------------------------------------------------
236                        WRITE_PORTB_TAG
237    ----------------------------------------------------------
238    This routine implements the WRITE_PORTB_CMD command.
239    ----------------------------------------------------------*/
240    void write_portb_cmd()
241    {
242    unsigned int portvalue ;
243    get_target_id() ;
244    portvalue = get_byte() ; /* read the value to be written to port B*/

245    SEND_1BYTE_CMD(WRITE_PORTB_CMD) ;
246    send_target_id()

247    transmit_byte(portvalue) ;   /* send the value to be written */

248    get_tag_ack(1) ;       /* get the tag ID as an acknowledge to the cmd */
249    put1byte(error_code) ; /* send result of operation to PC */
250    }
```

CODE LISTING 1 APPENDIX  module commands.05h 151
COPYRIGHT 1993 SAVI TECHNOLOGY, INC.

```
251   /*------------------------------------------------
252                 CLEAR_ERROR_TAG
253   ------------------------------------------------
254     Send the CLEAR_ERROR command to reset the error code in the tag to 0
255   ------------------------------------------------*/
256   void clear_error_tag()
257   {
258     get_target_id() ;

259     SEND_1BYTE_CMD(CLEAR_ERROR_CMD) ;  /* send CLEAR_ERROR cmd */
260     send_target_id() ;

261     get_tag_ack(1) ;        /* get the tag ID as an acknowledge to the cmd */
262     put1byte(error_code) ; /* send result of operation to PC */
263   }

264   /*------------------------------------------------
265                 INTERRUPT_HELLO
266   ------------------------------------------------
267     Send the special hello to all the tags in interrupt mode
268   ------------------------------------------------*/
269   void interrupt_hello()
270   {
271     SEND_1BYTE_CMD(INT_HELLO_CMD) ;
272   }

273   /*------------------------------------------------
274                 SLEEP_ALL_TAG
275   ------------------------------------------------
276     Send the ALL_SLEEP command to send to sleep all the tags except
277     the one specified by the transmitter ID.
278   ------------------------------------------------*/
279   void sleep_all_tag()
280   {
281     get_target_id() ;
282     SEND_1BYTE_CMD(ALL_SLEEP_CMD) ;  /* send ALL_SLEEP cmd */
283     send_target_id() ;

284     Disable_Tx() ;
285   }

286   /*------------------------------------------------
287                 DO_GET_CMD
288   ------------------------------------------------
289     This routine implements a general command in which a command byte
290     is sent to the Tag and then the tag ID is received back followed
291     by an extra byte . The interpretation of the last byte depends on
```

CODE LISTING 1 APPENDIX  module commands.05h 152
COPYRIGHT 1993 SAVI TECHNOLOGY, INC.

```
292    the particular command.
293    ------------------------------------------------------------*/
294    void do_get_cmd(command_code)
295    {
296    unsigned int retries;

297    retries = 0 ;

298    /* when the check_in_tag command is called from find tag we do not need
299       to get the targetID because we already got it to be able to send
300       the wakeup and the sleep all but command. In all otehr cases we get
301       the target ID here
302    */
303    if (current_command != FIND_TAG)
304       get_target_id();

305    dg_send:
306    SEND_1BYTE_CMD(command_code);   /* send the command code */

307    send_target_id() ;

308    Disable_Tx() ;
309    window_counter = 4 ;

310    load_cmp_regs();
311    expired = FALSE ;
312    error_code = ALL_OK ;

313    if (wait_header() == 0 ) {  /* the header was received correctly */

314       if (rf_receive(3,ID)) {
315          if (rf_receive(1,buffer))
316             check_received_id() ;   /* I also have to check status parity */
317          else
318             error_code = BYTE_RX_ERROR ;
319       }
320       else
321          error_code = IDRX_ERROR ;
322    }
323    else
324       error_code = HEADER_ERROR ;

325    select_one_rx(3) ; /* turn off receivers */

326    if (error_code != ALL_OK)
327       {
328          current_tx = inc_tx(current_tx);
```

CODE LISTING 1 APPENDIX     module commands.05h 153
COPYRIGHT 1993 SAVI TECHNOLOGY, INC.

```
329         if (++retries < 3) goto dg_send;
330       }

331  #if USE_LCD
332    code_msg() ;
333  #endif

334  #if USE_NIU
335     if (command_source == RS485) /* wait for available TX buffer */
336     {
337         i = 2; /* normally send error status and one byte result */
338         if (command_code == CHECK_IN_CMD) i = 6; /* send RSSI bytes also */
339         if (error_code != 0) i = 1; /* send only error code */

340         wait2txnbytes(i, EOT_DATA_PACKET) ; /* wait for i bytes */
341     }
342  #endif 343     put_byte(error_code) ; /* send result of operation to PC */
344     if (error_code==0) {
345       put_byte(buffer[0]) ; /* send the byte received to the PC */
346       if (command_code == CHECK_IN_CMD)
347       {
348           put_byte(max_rssi) ; /* send max rssi*/
349           put_byte(rssi0) ; /* send RSSI Receiver 1*/
350           put_byte(rssi1) ; /* send RSSI Receiver 2*/
351           put_byte(rssi2) ; /* send RSSI Receiver 3*/
352       }
353     }
354  }

355  /*------------------------------------------------------------
356                   CHECK_IN_TAG
357  ------------------------------------------------------------
358  Send the CHECK_IN_CMD to ask the tag to report its ID and its
359  status byte
360  ------------------------------------------------------------*/
361  void check_in_tag()
362  {
363    do_get_cmd(CHECK_IN_CMD) ;
364  }

365  /*------------------------------------------------------------
366                   GET_VERSION_TAG
367  ------------------------------------------------------------
368  Send the GET_VERSION_CMD to ask the tag to report its ID and its
369  software version.
```

CODE LISTING 1 APPENDIX       module commands.05h 154
COPYRIGHT 1993 SAVI TECHNOLOGY, INC.

```
370  -----------------------------------------------------------------*/
371  void get_version_tag()
372  {
373    do_get_cmd(GET_VERSION_CMD) ;
374  }

375  /*----------------------------------------------------------------
376                      GET_ERROR_TAG
377  -----------------------------------------------------------------
378    Send the GET_ERROR_CMD to ask the tag to report its ID and its
379    error_code from the previous command.
380  -----------------------------------------------------------------*/
381  void get_error_tag()
382  {
383    do_get_cmd(GET_ERROR_CMD) ;
384  }

385  /*----------------------------------------------------------------
386                      READ_PORTA_TAG
387  -----------------------------------------------------------------
388    Send the READ_PORTA_CMD to read the content of porta.
389  -----------------------------------------------------------------*/
390  void read_porta_tag()
391  {
392    do_get_cmd(READ_PORTA_CMD) ;
393  }

394  /************************ IMPORTANT NOTE *****************************
395   This is an ugly fix to the problem that happens when the interrogator
396   squawks 1 or 2 bytes. Apparently the receiver is not ready because the
397   tag responds too fast. The fix is that when the PC request for a squawk
398   of 1 or 2 bytes, the interrogator actually squawks 3 bytes but it reports
399   only part of these data to the PC.
400   The actual number of bytes requested is stored in "actual_number".
401  **********************************************************************/
402  unsigned int actual_number ;

403  /*----------------------------------------------------------------
404                      RECEIVE_BUFFER
405  -----------------------------------------------------------------
406    Receive data ("number_of_bytes" bytes) from tag and save in array
407    buffer.
408  -----------------------------------------------------------------*/
409  void receive_buffer()
410  {
411  #if (DFTAG==FALSE)
412    window_counter = 2 ;     /* timeout after 2 * 50 msecs */
```

CODE LISTING 1 APPENDIX   module commands.05h 155
COPYRIGHT 1993 SAVI TECHNOLOGY, INC.

```
413    load_cmp_regs();
414    expired = FALSE ;
415    error_code = ALL_OK ;
416    if (wait_header() == 0 )    /* the header was received correctly */
417     {
418      if (rf_receive(3,ID))
419       {
420        if (rf_receive(number_of_bytes+1,buffer)) /* read "number_of_bytes" bytes
421                                    of data plus the extra parity
422                                    byte */
423         {
424          check_receive_ID() ;
425          if (error_code==ALL_OK)  /* if ID is OK check message parity byte */
426           if ( buffer[number_of_bytes] != compute_checksum(number_of_bytes))
427             error_code = MESSAGEPARITY_PARITY ;
428         } /* the message was received correctly */
429        else              /* error receiving number_of_bytes+1 bytes */
430         error_code = MESSAGERX_ERROR ;
431       } /* ID received correctly */
432      else
433       error_code = IDRX_ERROR ;
434     }
435    else  /* error receiving the header */
436     {
437      error_code = HEADER_ERROR ;
438     }

439    select_one_rx(3) ;

440    if (error_code != ALL_OK)
441      current_tx = inc_tx(current_tx) ;

442    /* To report to the PC, I use the argument received from the PC */
443    if ((command_code == SQUAWK_CMD) || (command_code == READ_ADC_CMD))
444        number_of_bytes = actual_number ;

445    #if USE_NIU
446    if (command_source == RS485)   /* wait for available TX buffer */
447     {
448      if (error_code == ALL_OK)
449        wait2txnbytes(1+number_of_bytes, EOT_DATA_PACKET); /* err code + msg */
450      else
451        wait2txnbytes(1, EOT_DATA_PACKET) ;   /* send only error code */
452     }
453    #endif 454    put_byte(error_code) ;
```

CODE LISTING 1 APPENDIX    module commands.05h 156
COPYRIGHT 1993 SAVI TECHNOLOGY, INC.

```
455        if (error_code == ALL_OK)
456          for ( i = 0 ; i < number_of_bytes ; i++) /* send the data to */
457            put_byte(buffer[i]) ;         /* the computer */

458    #if USE_LCD
459      code_msg();
460      lcd_line(3) ;
461      if (error_code == ALL_OK)
462        for ( i = 0 ; i < number_of_bytes ; i++)
463          accumula_msg(buffer[i]) ;
464    #endif
465    #endif
466    }

467    /*----------------------------------------------------------
468                      SQUAWK_TAG
469    ------------------------------------------------------------
470      Send the squawk command to read data from the tag eeprom.
471      This routine is called once the id has been obtained. This is to
472      use the routine also from the macro_squawk command.
473    ------------------------------------------------------------*/
474    void do_squawk_tag()
475    {
476    #if (DFTAG==FALSE)

477    #if (XTAG == FALSE)
478      actual_number = get_byte() ;  /* read number of bytes */

479      if (command_code == SQUAWK_CMD)
480      {
481        starting_at = get_byte() ;  /* read starting address */
482      }
483    #else
484      switch (command_code)
485      {
486        case SQUAWK_CMD :    /* read number of bytes */
487                    actual_number = get_byte() ;
488                    /* read starting address */
489                    starting_at = get_byte() ;
490                    break ;

491    #if XTAG
492        case SQUAWK_RAM_CMD : /* read number of bytes */
493                    actual_number = get_byte() ;
494                    /* get 2 byte address for Tag RAM */
495                    address.bytepart[0] = get_byte() ;
496                    address.bytepart[1] = get_byte() ;
497                    break ;
```

CODE LISTING 1 APPENDIX        module commands.05h 157
COPYRIGHT 1993 SAVI TECHNOLOGY, INC.

```
498    #endif

499    #if XTAG
500      case READ_RTC_CMD :   actual_number = 6 ;
501                  break ;

502      case READ_ADC_CMD :   actual_number = 3 ;
503    #endif
504    }
505    #endif 506    /* If the squawk is only 2 or 3 bytes, then squawk 3 bytes and report back
507       only part of the data */
508    if (actual_number<3)
509      number_of_bytes = 3 ;
510    else
511      number_of_bytes = actual_number ;

512    SEND_1BYTE_CMD(command_code) ;       /* send command code */

513    send_target_id() ;

514    #if (XTAG == FALSE)
515    transmit_byte(number_of_bytes) ;  /* send number of bytes to read */
516    #else
517    if (command_code != READ_RTC_CMD)
518      transmit_byte(number_of_bytes) ;
519    #endif 520    #if (XTAG == FALSE)
521    if (command_code == SQUAWK_CMD)
522    {
523      short_delay() ;
524      transmit_byte(starting_at) ; /* send starting address */
525    }
526    #else
527    switch (command_code)
528    {
529      case SQUAWK_CMD :   short_delay() ;
530                  transmit_byte(starting_at) ; /* send starting address */
531                  break ;

532    #if XTAG
533      case SQUAWK_RAM_CMD : short_delay() ;
534                  transmit_byte(address.bytepart[0]) ;
535                  short_delay() ;
536                  transmit_byte(address.bytepart[1]) ;
537                  break ;
```

CODE LISTING 1 APPENDIX   module commands.05h 158
COPYRIGHT 1993 SAVI TECHNOLOGY, INC.

```
538    #endif

539    #if XTAG
540       case READ_RTC_CMD :   break ;
541       case READ_ADC_CMD :   break ;
542    #endif
543    }
544    #endif 545    Disable_Tx() ;

546    receive_buffer() ;
547    #endif
548    }

549    /* this routine get the tag id and calls the above function */
550    void squawk_tag()
551    {
552    get_target_id() ;
553    command_code = SQUAWK_CMD ;
554    do_squawk_tag() ;
555    }
556    /*------------------------------------------------------------
557    -------------------------------------------------------------
558    ----------------------------------------------------------*/

559    /*------------------------------------------------------------
560                      PLACE_TAG
561    -------------------------------------------------------------
562       Write data into a tag eeprom or Sensor Tag RAM, depending on the
563       command code.
564       This function is called from place_tag once the tag ID has been
565       obtained. This is done to reuse this code for the macro place command
566    ----------------------------------------------------------*/
567    void do_place_tag()
568    {
569    #if (DFTAG == FALSE)

570    #if (XTAG == FALSE)
571    number_of_bytes = get_byte() ;   /* read number of bytes */

572    if (command_code == PLACE_CMD)
573       starting_at    = get_byte() ;   /* read starting address */
574    #else
575    switch (command_code)
576    {
577       case PLACE_CMD      : number_of_bytes = get_byte() ;
```

CODE LISTING 1 APPENDIX        module commands.05h 159
COPYRIGHT 1993 SAVI TECHNOLOGY, INC.

```
578                  starting_at = get_byte() ;
579                  break ;
580   #if XTAG
581     case PLACE_RAM_CMD : number_of_bytes = get_byte() ;
582                  address.bytepart[0] = get_byte() ;
583                  address.bytepart[1] = get_byte() ;
584                  break ;
585   #endif
586   #if XTAG
587     case ARM_TAG_CMD   : number_of_bytes = 6 ;
588                  break ;
589   #endif
590     }
591   #endif /* XTAG */

592   for ( i = 0 ; i < number_of_bytes ; i++)
593     buffer[i] = get_byte() ;

594   /* append the parity byte */
595   buffer[number_of_bytes] = compute_checksum(number_of_bytes) ;

596   /* set the dpot to data level */
597   move_dpot(current_tx,ee_read(DATA_POWER)) ;

598   SEND_1BYTE_CMD(command_code) ;

599   send_target_id() ;

600   if (command_code != ARM_SEALTAG_CMD)
601     transmit_byte(number_of_bytes) ;

602   #if (XTAG == FALSE)
603   if (command_code == PLACE_CMD)
604     {
605       short_delay() ;
606       transmit_byte(starting_at) ;  /* send starting address */
607     }
608   #else
609   switch (command_code)
610     {
611     case PLACE_CMD     : short_delay() ;
612                  transmit_byte(starting_at) ;  /* send starting address */
613                  break ;
614   #if XTAG
615     case PLACE_RAM_CMD : short_delay() ;
616                  transmit_byte(address.bytepart[0]) ;
617                  short_delay() ;
```

CODE LISTING 1 APPENDIX  module commands.05h 160
COPYRIGHT 1993 SAVI TECHNOLOGY, INC.

```
618               transmit_byte(address.bytepart[1]) ;
619               break ;
620  #endif
621  #if XTAG
622    case ARM_TAG_CMD   : break ;
623  #endif
624  }
625  #endif /* XTAG */

626  /* send the actual message plus the parity byte */
627  for ( i = 0 ; i <= number_of_bytes ; i++)
628  {
629    short_delay() ;
630    transmit_byte(buffer[i]) ;
631  }

632  switch (command_code)
633  {
634    case PLACE_CMD : get_tag_ack(2) ;   /* receive the acknowledge from the tag */
635                                       /* wait header for approx. 200 msecs
636                                          It takes max 10 msec per byte to
637                                          write to the EEPROM */
638              break ;
639  #if XTAG
640    case ARM_TAG_CMD : get_tag_ack(2) ;
641              break ;
642  #endif
643  #if XTAG
644    case default : get_tag_ack(1) ;   /* wait 100 msec because writing to RAM
645                                         is much faster than writing to eeprom */
646              break ;
647  #endif
648  }

649  /* set the dpot to commands level */
650  move_dpot(current_tx,ee_read(COMMANDS_POWER)) ;

651  if (error_code != ALL_OK)     /* rotate antennas in case of failure */
652    current_tx = inc_tx(current_tx) ;

653  put1byte(error_code) ; /* send result of the command to the PC */
654  #endif
655  }

656  /* this function calls the above code once the tag ID has been obtained*/
657  void place_tag()
658  {
659    command_code = PLACE_CMD ;
```

CODE LISTING 1 APPENDIX  module commands.05h 161
COPYRIGHT 1993 SAVI TECHNOLOGY, INC.

```
660    get_target_id() ;
661    do_place_tag() ;
662  }
663  /*----------------------------------------
664  -----------------------------------------
665  ------------------------------------- */

666  /*----------------------------------------
667                SET_DEF_TX
668  -----------------------------------------
669    Define tha TX to be used in direct communication with the tag
670  ------------------------------------- */
671  /* obsolete function
672  void set_def_tx()
673  {
674    default_tx = get_byte()-1 ;
675    put1byte(ALL_OK) ;
676  }
677  */
678  /*----------------------------------------
679                SET_DEF_RX
680  -----------------------------------------
681    Define the RX to be used in direct communication with the tag
682  ------------------------------------- */
683  /* This routine is obsolete now because the interrogator uses all the
684     receivers
685  void set_def_rx()
686  {
687    default_rx = get_byte() ;
688  #if USE_LCD
689    show3("Df rx=") ;
690    accumula_msg(default_rx) ;
691  #endif
692    default_rx-- ;
693    put1byte(ALL_OK) ;
694  }
695  */

696  /*----------------------------------------
697                SET_WAKE_TX
698  -----------------------------------------
699    Define the XT used to send the wakeup signal
700  ------------------------------------- */
701  void set_wake_tx()
702  {
703    current_tx = wakeup_tx = get_byte()-1 ;
704    put1byte(ALL_OK) ;
```

CODE LISTING 1 APPENDIX     module commands.05h 162
COPYRIGHT 1993 SAVI TECHNOLOGY, INC.

```
705     }

706     /*-------------------------------------------------
707                     SET_DPOT
708     -------------------------------------------------
709     Sets the digital potentiometers in the interrogator (to control range).
710     It reads from station (or tag"OS") two arguments :
711     - dpot number. Possible values are 1 2 or 3.
712     - dpot_value. final value for the dpot.
713     -----------------------------------------------*/
714     void set_dpot()
715     {
716       which = get_byte()-1 ;          /* get dpot number */
717       where = get_byte() ;            /* get dpot value */
718       move_dpot(which,where) ;        /* for this function dpots are 0,1,2 */
719       put1byte(ALL_OK) ;
720     }

721     /*----------------------------------------------------*/
722     /*                  INT_SET_ID                        */
723     /*----------------------------------------------------*/
724     /* Set the INT ID and send it to the NIU              */
725     /* The interrogator ID is stored into the real time clock chip and */
726     /* also in EEPROM.                                    */
727     /*----------------------------------------------------*/
728     const s_id[]="ID=";
729     void int_set_id()
730     {
731     #if (DFTAG==FALSE)
732       i = get_byte();       /* read the ID from PC */
733       j = get_byte();
734       buffer[0] = get_byte() ;   /* get i xor j */
735       buffer[1] = get_byte() ;   /* get complement of (i xor j) */
736       if ((i^j) == buffer[0])
737       {
738         if (~buffer[0] == buffer[1])
739         {
740           /* use a protected write to eeprom */
741           i = ee_prot_write(i, EE_ID_HIGH) ;   /* store ID into EEPROM */
742           j = ee_prot_write(j, EE_ID_LOW) ;

743     #if USE_NIU
744           if (load_niu_id() & i & j )
745             put1byte(ALL_OK) ;
746           else
747             put1byte(INT_SET_ID_ERROR);        /* update the niu ID */
```

CODE LISTING 1 APPENDIX   module commands.05h  163
COPYRIGHT 1993 SAVI TECHNOLOGY, INC.

```
748    #else
749        if ( i & j )
750           put1byte(ALL_OK) ;
751        else
752           put1byte(INT_SET_ID_ERROR) ;      /* update the niu ID */
753    #endif
754      }
755     }
756     else
757       put1byte(INT_SET_ID_ERROR) ;       /* error in the arguments */
758    #if USE_LCD
759      show_int_ID() ;
760    #endif
761    #endif
762    }

763    /*--------------------------------------------------------------
764                    SET TIME
765    ---------------------------------------------------------------
766      Set the real time clock in the interrogator.
767    ---------------------------------------------------------------*/
768    void set_time()
769    {
770    #if (DFTAG= = FALSE)
771      clock_disable() ;
772      clock_write(get_byte(),ck_hours) ;
773      clock_write(get_byte(),ck_minutes) ;
774      clock_write(get_byte(),ck_seconds) ;
775      clock_enable() ;
776      put1byte(ALL_OK) ;
777    #endif
778    }

779    /*--------------------------------------------------------------
780                    READ TIME
781    ---------------------------------------------------------------
782      Read the Interrogator real time clock and report it to the PC
783    ---------------------------------------------------------------*/
784    void read_time()
785    {
786    #if USE_NIU
787      if (command_source = = RS485)   /* wait for available TX buffer */
788         wait2txnbytes(3, EOT_DATA_PACKET); /* err code + msg */
789    #endif 790      put_byte(clock_read(ck_hours)) ;
791      put_byte(clock_read(ck_minutes)) ;
792      put_byte(clock_read(ck_seconds)) ;
```

CODE LISTING 1 APPENDIX  module commands.05h 164
COPYRIGHT 1993 SAVI TECHNOLOGY, INC.

```
793    }

794    /*----------------------------------------------------------
795                    SET ALARM
796    ----------------------------------------------------------
797    Sets the alarm in the real time clock in the interrogator.
798    ----------------------------------------------------------*/
799    void set_alarm()
800    {
801    #if (DFTAG == FALSE)
802      clock_disable() ;
803      clock_write(get_byte(),ck_al_hours) ;
804      clock_write(get_byte(),ck_al_minutes) ;
805      clock_write(get_byte(),ck_al_seconds) ;
806      clock_enable() ;
807      put1byte(ALL_OK) ;
808    #endif
809    }

810    /*----------------------------------------------------------
811                    SET WINDOWS
812    ----------------------------------------------------------
813    Define windows to use during collection
814    ----------------------------------------------------------*/
815    void set_windows()
816    {
817    #if (DFTAG==FALSE)
818      window_1[0] = get_byte() ;
819      window_1[1] = get_byte() ;
820      window_1[2] = get_byte() ;
821      window_2 = get_byte() ;
822      window_3 = get_byte() ;
823      put1byte(ALL_OK) ;
824    #endif
825    }

826    /*----------------------------------------------------------
827                    RESET TIMEOUT COUNTER
828    ----------------------------------------------------------*/
829    void reset_timeout_counter()
830    {
831      clock_write(0,TIMEOUT_COUNTER) ;
832      put1byte(ALL_OK) ;
833    }

834    /*----------------------------------------------------------
835                    READ TIMEOUT COUNTER
836    ----------------------------------------------------------*/
```

CODE LISTING 1 APPENDIX       module commands.05h  165
COPYRIGHT 1993 SAVI TECHNOLOGY, INC.

```
837   void read_timeout_counter()
838   {
839     put1byte(clock_read(TIMEOUT_COUNTER)) ;
840   }

841   /*---------------------------------------------------
842                      SAMPLE RSSI
843   ---------------------------------------------------
844     This routine samples the RSSI on each of the three antenna and then
845     returns the three values in 1 packet
846   ---------------------------------------------------*/
847   void sample_rssi()
848   {
849   #if USE_NIU
850     if (command_source == RS485)  /* wait for available TX buffer */
851       wait2txnbytes(3, EOT_DATA_PACKET) ;  /* send the 3 rssi values */
852   #endif
853     measure_rssi() ;
854     for (j = 0 ; j < 3 ; j++)
855       put_byte(rssi_array[j]) ;
856   }

857   /*---------------------------------------------------
858                     GET_INT_VERSION
859   ---------------------------------------------------
860     Return 4 numbers identifying the interrogator version in 1 packet.

861   ---------------------------------------------------*/
862   void get_int_version()
863   {
864   #if USE_NIU
865     if (command_source == RS485)
866       {
867         wait2txnbytes(4, EOT_DATA_PACKET) ;  /* send the header to the NIU */
868       }
869   #endif
870   #asm
871     ldx #12
872     lda here,x
873     jsr put_byte
874     ldx #14
875     lda here,x
876     jsr put_byte
877     ldx #15
878     lda here,x
879     jsr put_byte
```

CODE LISTING 1 APPENDIX  module commands.05h 166
COPYRIGHT 1993 SAVI TECHNOLOGY, INC.

```
880     ldx #16
881     lda here,x
882     jsr put_byte
883     #endasm
884     }

885     /*----------------------------------------------------
886                     READ_EEPROM
887     ----------------------------------------------------
888     Read data from interrogator eeprom.
889     ----------------------------------------------------*/
890     void read_eeprom()
891     {
892     number_of_bytes = get_byte() ;   /* read number of bytes */
893     j = get_byte() ;                 /* read starting address */

894     #if USE_NIU
895     if (command_source == RS485)
896        {
897           wait2txnbytes(number_of_bytes, EOT_DATA_PACKET) ; /* send the header to the NIU */
898        }
899     #endif
900     for ( i = 0 ; i < number_of_bytes ; i++,j++)
901        put_byte(ee_read(j)) ;
902     }

903     /*----------------------------------------------------
904                     WRITE_EEPROM
905     ----------------------------------------------------
906     Write data to the interrogator eeprom.
907     ----------------------------------------------------*/
908     void write_eeprom()
909     {
910     number_of_bytes = get_byte() ;   /* read number of bytes */
911     j = get_byte() ;                 /* read starting address */

912     for ( i = 0 ; i < number_of_bytes ; i++,j++)
913        if (!ee_write(get_byte(),j))
914           {
915              put1byte(FALSE) ;   /* return indicating error in writing */
916              goto write_error ;
917           }
918     put1byte(TRUE) ;   /* send an ack message */
919     write_error:
920     }

921     /*----------------------------------------------------
922                     SET_POWER
```

CODE LISTING 1 APPENDIX  module commands.05h 167
COPYRIGHT 1993 SAVI TECHNOLOGY, INC.

```
923   ----------------------------------------------------------------
924   Set the power levels (dpot values) for commands, wakeups and data
925   ----------------------------------------------------------------*/
926   void set_power()
927   {
928    i  = ee_write(get_byte(),COMMANDS_POWER) ;
929    i &= ee_write(get_byte(),WAKEUP_POWER) ;
930    i &= ee_write(get_byte(),DATA_POWER) ;
931    if ( i )
932      {
933       dpot_init() ;    /* set all dpots to default data value */
934       put1byte(TRUE) ;  /* send an OK ack message */
935      }
936    else
937      put1byte(FALSE) ;  /* send an error ack message */
938   }

939   /*----------------------------------------------------------------
940                   START_BROADCAST
941   ----------------------------------------------------------------
942    Start broadcasting with the default transmitter
943   ----------------------------------------------------------------*/
944   void start_broadcast()
945   {
946    Enable_Tx() ;
947    put1byte(ALL_OK) ;
948   }

949   /*----------------------------------------------------------------
950                   STOP_BROADCAST
951   ----------------------------------------------------------------
952    Stop broadcasting
953   ----------------------------------------------------------------*/
954   void stop_broadcast()
955   {
956    Disable_Tx() ;
957    put1byte(ALL_OK) ;
958   }

959   /*----------------------------------------------------------------
960                   TEST_INT_RAM
961   ----------------------------------------------------------------
962    Write and read to check the external 64K memory
963   ----------------------------------------------------------------*/
964   const char err_msg = "Error" ;
965   const char ok_msg  = "OK" ;
```

CODE LISTING 1 APPENDIX  module commands.05h 168
COPYRIGHT 1993 SAVI TECHNOLOGY, INC.

```
966   void test_int_ram()
967   {
968     /* write the whole RAM */
969     ram_set_add(0x0000) ;
970     do
971       {
972   #if USE_LCD
973         if (ram_addL == 0)
974           {
975             lcd_line(3) ;
976             accumula_msg(ram_addH) ;
977             accumula_msg(ram_addL) ;
978           }
979   #endif
980         ram_write(ram_addL) ;
981       } while (ram_addH < 0xFF) ;

982     /* read back and compare */
983     ram_set_add(0x0000) ;
984     do {
985   #if USE_LCD
986         if (ram_addL == 0)
987           {
988             lcd_line(3) ;
989             accumula_msg(ram_addH) ;
990             accumula_msg(ram_addL) ;
991           }
992   #endif
993         i = ram_addL ;
994         j = ram_read() ;
995         if ( j != i )
996           {

997   #if USE_LCD
998             lcd_clear() ;
999             putc_msg(0x20) ;
1000            accumula_msg(i) ;
1001            putc_msg(0x20) ;
1002            accumula_msg(j) ;
1003            show(err_msg) ;
1004            int_tenth_second(250) ;
1005  #endif 1006            put1byte(0xff) ;   /* error in test */

1007            goto ram_done ;
1008          }
1009      } while (ram_addH < 0xFF) ;
```

CODE LISTING 1 APPENDIX      module commands.05h 169
COPYRIGHT 1993 SAVI TECHNOLOGY, INC.

```
1010        put1byte(0) ;    /* test OK */
1011    #if USE_LCD
1012        lcd_line(2) ;
1013        show(ok_msg) ;
1014    #endif 1015    ram_done:
1016    }

1017    /*--------------------------------------------------------
1018                    TEST_INT_EEPROM
1019    ---------------------------------------------------------
1020    Write and Read the eeprom as a test procedure.
1021    ---------------------------------------------------------*/
1022    void test_int_eeprom()
1023    {
1024       unsigned int test_c ;

1025       for ( test_c = 0 ; test_c < EEPROM_MAX ; test_c++)
1026       {
1027          if ((test_c != EE_ID_HIGH) &&(test_c!= EE_ID_LOW))
1028          if ( !ee_write(test_c,test_c) )  /* if it returns false-> timeout error */
1029          {
1030             /* NOTE LCD STUFF HERE */
1031    #if USE_LCD
1032             show(err_msg) ;
1033             accumula_msg(0) ;
1034    #endif
1035             put1byte(0xff) ;   /* test failed */
1036             goto conti ;
1037          }
1038       } /* end for */
1039       for ( test_c = 0 ; test_c < EEPROM_MAX ; test_c++)
1040       {
1041          if ((test_c != EE_ID_HIGH) &&(test_c!= EE_ID_LOW))
1042          if (test_c != ee_read(test_c))
1043          {
1044    #if USE_LCD
1045             show(err_msg) ;
1046             accumula_msg(1) ;
1047             accumula_msg(test_c); accumula_msg(ee_read(test_c)) ;
1048    #endif
1049             put1byte(0xff) ;   /* test failed */
1050             goto conti ;
1051          }
1052       } /* end for */
1053    #if USE_LCD
```

CODE LISTING 1 APPENDIX   module commands.05h 170
COPYRIGHT 1993 SAVI TECHNOLOGY, INC.

```
1054      show(ok_msg) ;
1055    #endif
1056      put1byte(0) ;    /* test OK */
1057    conti:
1058    }

1059    /*----------------------------------------------------
1060                    SET_MODE_BYTE
1061    ----------------------------------------------------
1062      Receive the Mode byte from the PC
1063    ----------------------------------------------------*/
1064    void set_mode_byte()
1065    {
1066      clock_write(get_byte(),COM_MODE_BYTE) ;
1067    }

1068    /*----------------------------------------------------
1069                    SET_TX_CREDIT
1070    ----------------------------------------------------
1071      Receive the Initial credit for each TX
1072    ----------------------------------------------------*/
1073    void set_tx_credit()
1074    {
1075      for ( i = 0 ; i < 3 ; i++)
1076        tx_credit[i] = (get_byte()<<4) ;
1077    }

1078    /*----------------------------------------------------
1079                    CHECK_STATUS
1080    ----------------------------------------------------
1081      Return the Interrogator Status.
1082      Status :
1083        b7 = Interrupt A
1084        b6 = Interrupt B
1085        b3 = Currently Collecting
1086        b2 = Memory Checksum (RAM)
1087        b1 = Memory Checksum (EEPROM)
1088        b0 = Programmed Collection Active 1089    ----------------------------------------------------*/
1090    void check_status()
1091    {
1092    #if (DFTAG==FALSE)
1093      if (clock_read(ALARM_ACTIVE))  /* scheduled collect are active */
1094        i_programmed = TRUE ;
1095      else
1096        i_programmed = FALSE ;
1097      put1byte(int_status.num) ;        /* send the status to PC */
```

CODE LISTING 1 APPENDIX  module commands.05h 171
COPYRIGHT 1993 SAVI TECHNOLOGY, INC.

```
1098    #endif
1099    }

1100    /*-------------------------------------------------
1101                    ALARM_ON
1102    -------------------------------------------------
1103      Enable scheduled collections
1104    -----------------------------------------------*/
1105    void alarm_on()
1106    {
1107      clock_write(TRUE,ALARM_ACTIVE) ;
1108      put1byte(ALL_OK) ;          /* ack to the PC */
1109    }

1110    /*-------------------------------------------------
1111                    ALARM_OFF
1112    -------------------------------------------------
1113      Disable scheduled collections
1114    -----------------------------------------------*/
1115    void alarm_off()
1116    {
1117      clock_write(FALSE,ALARM_ACTIVE) ;
1118      put1byte(ALL_OK) ;          /* ack to the PC */
1119    }

1120    /*-------------------------------------------------
1121                    RECEIVERS_ON
1122    -------------------------------------------------
1123      Turn on the receivers
1124    -----------------------------------------------*/
1125    void receiv_on()
1126    {
1127      select_rx_all(0) ;
1128      put1byte(ALL_OK) ;          /* ack to the PC */
1129    }

1130    /*-------------------------------------------------
1131                    RECEIVERS_OFF
1132    -------------------------------------------------
1133      Turn off the receivers
1134    -----------------------------------------------*/
1135    void receiv_off()
1136    {
1137      select_one_rx(3) ;
1138      put1byte(ALL_OK) ;          /* ack to the PC */
1139    }
```

CODE LISTING 1 APPENDIX      module commands.05h  172
COPYRIGHT 1993 SAVI TECHNOLOGY, INC.

```
1140    /*-----------------------------------------------------------
1141                    NIU_ENABLE
1142    ------------------------------------------------------------
1143      Enable the pooling of the NIU
1144    ----------------------------------------------------------*/
1145    void niu_enable()
1146    {
1147      clock_write(TRUE,POOL_NIU) ;
1148      put1byte(ALL_OK) ;
1149    }

1150    /*-----------------------------------------------------------
1151                    NIU_DISABLE
1152    ------------------------------------------------------------
1153      Disable the pooling of the NIU
1154    ----------------------------------------------------------*/
1155    void niu_disable()
1156    {
1157      clock_write(FALSE,POOL_NIU) ;
1158      put1byte(ALL_OK) ;
1159    }

1160    /*-----------------------------------------------------------
1161                    CONT_WAKEUP
1162    ------------------------------------------------------------
1163      This functions sends continously the wakeup signal until a byte is
1164      received via the rs22 line.
1165    ----------------------------------------------------------*/
1166    void cont_wakeup()
1167    {
1168      current_tx = wakeup_tx ;

1169      /* set the dpot to wakeup level */
1170      move_dpot(current_tx,ee_read(WAKEUP_POWER)) ;

1171      Enable_Tx();
1172      while (!rs_inbyte_ready())
1173        {
1174          send_wakeup();
1175          kick_the_dog() ;
1176        }
1177      REGA = rs_get_inbyte() ;   /* read the byte to clear the register */
1178      Disable_Tx() ;

1179      /* reset the dpot to normal commands level */
1180      move_dpot(current_tx,ee_read(COMMANDS_POWER)) ;
1181    }
```

CODE LISTING 1 APPENDIX     module commands.05h 173
COPYRIGHT 1993 SAVI TECHNOLOGY, INC.

```
1182    /*----------------------------------------------------------
1183                    SET_NUMBER_OF_WAKEUPS
1184    ----------------------------------------------------------
1185    Select how many wakeups will be sent
1186      Argument 1 : only 1 wakeup
1187               2 : send 2 wakeups
1188               3 : send 3 wakeups
1189               n : send n wakeups
1190    ----------------------------------------------------------*/
1191    void set_number_of_wakeups()
1192    {
1193      how_many_wakeups = get_byte() ;
1194      put1byte(ALL_OK) ;
1195    }

1196    /*----------------------------------------------------------
1197                    GET_STATE
1198    ----------------------------------------------------------
1199    Return the interrogator state
1200    ----------------------------------------------------------*/
1201    void get_int_state()
1202    {
1203    #if USE_NIU
1204      if (command_source == RS485)   /* wait for available TX buffer */
1205        wait2txnbytes(10,REGULAR_DATA_PACKET);
1206    #endif
1207      /* send windows */
1208      put_byte(window_1[0]) ;
1209      put_byte(window_1[1]) ;
1210      put_byte(window_1[2]) ;
1211      put_byte(window_2) ;
1212      put_byte(window_3) ;
1213      /* send number of wakeups */
1214      put_byte(how_many_wakeups) ;
1215      /* mode byte */
1216      put_byte(clock_read(COM_MODE_BYTE)) ;
1217      /* credits */
1218      put_byte(tx_credit[0]) ;
1219      put_byte(tx_credit[1]) ;
1220      put_byte(tx_credit[2]) ;

1221      if (command_source == RS485)
1222      {
1223        REGA = niu_get_status() ;
1224        if (NIU_TXERR)
1225          goto abort_state_report ;
1226      }
```

CODE LISTING 1 APPENDIX        module commands.05h 174
COPYRIGHT 1993 SAVI TECHNOLOGY, INC.

```
1227   #if USE_NIU
1228     if (command_source == RS485)  /* wait for available TX buffer */
1229       wait2txnbytes(10, REGULAR_DATA_PACKET);
1230   #endif
1231   /* current TX */
1232     put_byte(current_tx) ;
1233   /* wakeup transmitter */
1234     put_byte(wakeup_tx) ;
1235   /* wakeup on/off */
1236     if (with_wakeup)
1237       put_byte(1) ;
1238     else
1239       put_byte(0) ;
1240   /* collisions on/off */
1241     if (store_collisions)
1242       put_byte(1) ;
1243     else
1244       put_byte(0) ;
1245   /* alarm time */
1246     put_byte(clock_read(ck_al_hours)) ;
1247     put_byte(clock_read(ck_al_minutes)) ;
1248     put_byte(clock_read(ck_al_seconds)) ;
1249   /* alarm on/off */
1250     put_byte(clock_read(ALARM_ACTIVE)) ;

1251     put_byte(clock_read(START_TIME_HR));
1252     put_byte(clock_read(START_TIME_MIN));

1253     if (command_source == RS485)
1254     {
1255       REGA = niu_get_status() ;
1256       if (NIU_TXERR)
1257         goto abort_state_report ;
1258     }

1259   #if USE_NIU
1260     if (command_source == RS485)  /* wait for available TX buffer */
1261       wait2txnbytes(10, EOT_DATA_PACKET);
1262   #endif
1263     put_byte(clock_read(TIME_INTVL_HR)) ;
1264     put_byte(clock_read(TIME_INTVL_MIN)) ;
1265     for (i = 0 ; i < 8 ; i++)
1266       put_byte(0) ;
1267     if (command_source == RS485)
1268     {
1269       REGA = niu_get_status() ;
1270       if (NIU_TXERR)
1271         goto abort_state_report ;
```

CODE LISTING 1 APPENDIX     module commands.05h 175
COPYRIGHT 1993 SAVI TECHNOLOGY, INC.

```
1272       }
1273    #if USE_NIU
1274       if (command_source == RS485)   /* wait for available TX buffer */
1275          wait2txnbytes(10, EOT_DATA_PACKET);
1276    #endif
1277       /* send a null record at the end */
1278       for (i = 0 ; i < 10 ; i++)
1279          put_byte(0) ;
1280       if (command_source == RS485)
1281       {
1282          REGA = niu_get_status() ;
1283          if (NIU_TXERR)
1284             goto abort_state_report ;
1285       }
1286    abort_state_report:
1287    }
```

CODE LISTING 1 APPENDIX   module communic.05h 176
COPYRIGHT 1993 SAVI TECHNOLOGY, INC.

```
1   /*         module communic.05h    */
2   /*
3   * $Source: p:/int/RCS/communic.05h $
4   * Communications interface for tag and interrogator
5   *
6   *
7   void init_thresholds();
8   void preamble() ;
9   int wait_header();
10  void send_wakeup() ;
11  void send_one() ;
12  void send_zero() ;
13  void transmit_byte(int a;) ;
14  int rf_receive(int how_many, int ptr);
15  */

16  void scan_rx_4_rssi();
17  void wait_pos();
18  void wait_neg();

19  #define select_neg  TimerControl.1 = 0 ; /* select negative edge */
20  #define select_pos  TimerControl.1 = 1 ; /* select positive edge */

21  unsigned int rf_error_code;

22  #if TAG 23  unsigned int min_thresh[6];
24  unsigned int max_thresh[6];

25  #define ONE_MIN       min_thresh[0]
26  #define ZERO_MIN      min_thresh[1]
27  #define PRE_ID_MIN    min_thresh[2]
28  #define PRE_HIGH_MIN  min_thresh[3]
29  #define PRE_LOW_MIN   min_thresh[4]
30  #define LOW_MIN       min_thresh[5]

31  #define ONE_MAX       max_thresh[0]
32  #define ZERO_MAX      max_thresh[1]
33  #define PRE_ID_MAX    max_thresh[2]
34  #define PRE_HIGH_MAX  max_thresh[3]
35  #define PRE_LOW_MAX   max_thresh[4]
36  #define LOW_MAX       max_thresh[5]

37  #endif
```

CODE LISTING 1 APPENDIX    module communic.05h 177
COPYRIGHT 1993 SAVI TECHNOLOGY, INC.

```
38   #pragma option P
39   #if INTERROGATOR
40   #define PRE_HIGH_MIN  PRE_HIGH - MARGIN + DELTA_RF
41   #define PRE_HIGH_MAX  PRE_HIGH + MARGIN + DELTA_RF 42   #define PRE_LOW_MIN   PRE_LOW  - MARGIN - DELTA_RF
43   #define PRE_LOW_MAX   PRE_LOW  + MARGIN - DELTA_RF 44   #define PRE_ID_MIN    PRE_ID - MARGIN + DELTA_RF
45   #define PRE_ID_MAX    PRE_ID + MARGIN + DELTA_RF 46   #define ZERO_MIN      IDEAL_ZERO - MARGIN + DELTA_RF
47   #define ZERO_MAX      IDEAL_ZERO + MARGIN + DELTA_RF 48   #define ONE_MIN       IDEAL_ONE - MARGIN + DELTA_RF
49   #define ONE_MAX       IDEAL_ONE + MARGIN + DELTA_RF 50   #define LOW_MIN       IDEAL_LOW - MARGIN - DELTA_RF
51   #define LOW_MAX       IDEAL_LOW + MARGIN - DELTA_RF 52   /*-------------------------------------------------
53                  SEND_WAKEUP
54   --------------------------------------------------
55     Send wakeup signal ( 30 KHz SIGNAL ) for 3.492 seconds
56   -------------------------------------------------*/
57   #define 30KHZ  TRUE
58   void send_wakeup()
59   {
60     for ( i = 0 ; i < 4 ; i++)         /* changed from 3 PSB */
61       for ( REGX = 0 ; REGX < 208 ; REGX++ )  /* changed from 0xFF */
62       {
63   #if 30KHZ
64         REGA = 127 ;
65   #else
66         REGA = 209 ;
67   #endif
68         do
69          {
70           outhigh ;
71           NOP(); NOP(); NOP(); NOP(); NOP();   /* 10 cycles */
72           NOP() ;
73   #if 30KHZ
74           NOP();NOP();NOP() ;
75           NOP();NOP();NOP() ;
76   #endif
77   #asm
78           CPX   $00  ; I need to generate 3 cycles
79   #endasm
```

CODE LISTING 1 APPENDIX       module communic.05h  178
COPYRIGHT 1993 SAVI TECHNOLOGY, INC.

```
80          outlow ;
81          NOP() ;    /* one extra to balance signal, the while takes 9 cycles */
82          NOP() ; NOP() ;
83  #if 30KHZ
84          NOP();NOP();NOP() ;
85          NOP();NOP();NOP() ; NOP();
86  #endif
87          } while ( REGA -- != 0 ) ;
88      }
89  } /* end send_wakeup */

90  #endif

91  #pragma option P
92  /*-------------------------------------------------------------
93                      PREAMBLE
94  -------------------------------------------------------------
95   Send the first part of the preamble signal formed by nine pulses
96  -------------------------------------------------------------*/
97  #define PRE_PULSE_COUNT 11
98  void preamble()
99  {
100     for ( REGA = 0 ; REGA < PRE_PULSE_COUNT ; REGA++) {
101         outhigh; pre_h_delay();
102         outlow; REGX = PRE_L; delay();
103 #if INTERROGATOR
104         NOP() ;NOP() ;   /* pre distord pulse in the interrogator making the
105                             low part of the preamble equal to 76 microseconds
106                          */
107 #endif
108     }
109     outhigh ;

110 #if TAG
111     REGX = TAG_COUNT;
112 #else
113     REGX = INT_COUNT;
114 #endif 115     delay();
116     outlow ;
117     REGX = PRE_END_PAD;       /* pad to 100us delay */
118     delay();
119 }

120 #pragma option P
121 /*-------------------------------------------------------------
```

CODE LISTING 1 APPENDIX  module communic.05h 179
COPYRIGHT 1993 SAVI TECHNOLOGY, INC.

```
122                    SEND_ONE
123   ----------------------------------------------------------------
124   Send a bit in one. This is a high pulse of one_delay duration amd
125   a low pulse of short_delay duration
126   ----------------------------------------------------------------*/
127   void send_one()
128   {
129     outhigh; one_delay() ;
130     outlow; low_level_delay() ;
131   }

132   /*--------------------------------------------------------------
133                    SEND_ZERO
134   ----------------------------------------------------------------
135   Send a bit in zero. This is a high pulse of zero_delay
136   duration and a low pulse of short_delay duration
137   ----------------------------------------------------------------*/
138   void send_zero()
139   {
140     outhigh; zero_delay() ;
141     outlow; low_level_delay() ;
142   }

143   #pragma option P
144   /*--------------------------------------------------------------
145                    TRANSMIT_BYTE
146   ----------------------------------------------------------------
147   Transmit a whole byte of value tx_byte by succesive calls to send_one
148   and send_zero routines.
149   ----------------------------------------------------------------*/
150   void transmit_byte(tx_value)
151   registera tx_value ;
152   {
153   int tempx ;
154   unsigned int parity_counter ;

155            parity_counter = 0 ;
156          REGX = 8;
157   #asm
158   EACH_BIT
159   #endasm
160            tempx = REGX ;
161   #asm
162          LSRA
163          BCC    IS_ZERO
164   #endasm
165            send_one() ;
166            parity_counter++ ;
```

CODE LISTING 1 APPENDIX        module communic.05h  180
COPYRIGHT 1993 SAVI TECHNOLOGY, INC.

```
167                 REGX = tempx;
168                 REGX--;
169     #asm
170                 BNE    EACH_BIT
171             BRA    FINAL_BITS 172     IS_ZERO
173     #endasm
174                 send_zero();
175                 REGX = tempx;
176                 REGX--;
177     #asm
178                 NOP
179                 NOP
180             BNE    EACH_BIT
181                 NOP                    ; compensate bra final_bits
182     FINAL_BITS                         ; add parity ans stop bits 183                 NOP                    ; add some delays to keep constant
184                 NOP                    ; the time for the low level */
185     #endasm 186                 if (parity_counter & 0x01 != 0)
187                     send_one() ;
188                 else
189                     send_zero() ;
190     #asm
191                 ldx #$01               ;add delay before the stop bit
192     #endasm
193                 delay() ;
194                 send_zero() ; /* stop bit */
195     }

196     #pragma option P
197     #if TAG
198     /*-------------------------------------------------------------
199                     INIT_THRESHOLDS
200     -------------------------------------------------------------
201     Determine if pulse mesurment thresholds are to have hard coded MARGIN
202     and DISTORTION or get them from EEPROM. Then initialize thresholds
203     -------------------------------------------------------------*/
204     #define EE_MARGIN  9
205     #define EE_DISTORT 10

206     void init_thresholds()
207     {
208     #define margin     i
209     #define pulse_dist j
```

CODE LISTING 1 APPENDIX
COPYRIGHT 1993 SAVI TECHNOLOGY, INC.

module communic.05h 181

```
210     if ( USE_EE_THRESH ) {
211         margin = ee_read(EE_MARGIN);
212         pulse_dist = ee_read(EE_DISTORT);
213     }
214     else {
215         margin = MARGIN;
216         pulse_dist = DELTA_RF;
217     }

218     /* the first 4 entrys in the ideal_times are for pulses */
219     /* here we must add the pulse distortion */
220     for( REGX = 0; REGX < 6; REGX++) {
221         max_thresh[REGX] = ideal_times[REGX] + margin + pulse_dist;
222         min_thresh[REGX] = ideal_times[REGX] - margin + pulse_dist;

223         /* the last 2 entrys in the ideal_times are for low levels */
224         /* here we must subtract the pulse distortion */
225         if (REGX==3) pulse_dist = (-pulse_dist);
226     }

227 } /* end init_thresholds */
228 #endif

229 #pragma option P
230 /*----------------------------------------------------------
231                     RF_RECEIVE
232 ------------------------------------------------------------
233 This routine receive how_many bytes from the interrogator and puts
234 them into a zero page buffer pointed to by ptr. If there is an error
235 during the reception of the data this routine returns FALSE. Otherwise
236 it returns TRUE.
237 ----------------------------------------------------------*/
238 int rf_receive(how_many, ptr)
239 int how_many, ptr;
240 {
241 #define bit_counter     i
242 #define rf_data         temph
243 #define parity_received templ 244 unsigned int byte_counter ;
245 unsigned int parity_counter ;
246 int *bp;                /* pointer into the buffer */

247     disable_int() ;     /* avoid interrupts whilre reading data */
248     bp = ptr;
249     REGA = TimerStatus ;
250     REGA = InputTimerLow ;
251     select_pos ;
```

CODE LISTING 1 APPENDIX  module communic.05h 182
COPYRIGHT 1993 SAVI TECHNOLOGY, INC.

```
252   /*
253    *  do the for loop in assembler because the compiler uses only short jumps
254    *     for ( byte_counter = 0 ; byte_counter < how_many ; byte_counter++)
255    */
256   #asm
257         clr   byte_counter         ; byte_counter = 0
258   start_byte_loop
259         lda   byte_counter
260         cmp   how_many
261         bcs   do_more              ; if (byte_counter < how_many) do_more
262         jmp   end_byte_loop        ; else jump ot end of the loop
263   do_more
264   #endasm
265   /*  {                                           */
266         parity_counter = 0 ;
267         rf_error_code = T_RFPULSE_ERR ;      /* assume pulse error until done */
268         wait_pos() ;
269         for ( bit_counter = 8 ; bit_counter > 0 ; bit_counter--)
270           {
271           rf_data >>= 1 ;
272           wait_neg() ;
273           if ((length <= ZERO_MAX) && (length >= ZERO_MIN))
274              rf_data &= 0b01111111 ;
275           else
276              if ((length <= ONE_MAX) && (length >= ONE_MIN))
277              {
278              rf_data |= 0b10000000 ;
279              parity_counter++ ;
280              }
281              else goto bad ; /* a wrong pulse was received.*/
282   /* assembler code is commented out. Now it is done in C above
283   #asm
284         lda   length
285         cmp   #ZERO_MAX
286         bhi   else_part
287         cmp   #ZERO_MIN
288         bcs   else_part
289         bclr  7,temph               ; the pulse is a zero
290         bra   keep_checking
291   else_part:
292   ;     lda length
293         cmp   #ONE_MAX
294         bhi   err_false
295         cmp   #ONE_MIN
296         bcs   err_false
297         bset  7,temph               ; the pulse is a one
298         inc   parity_counter
299         bra   keep_checking
```

CODE LISTING 1 APPENDIX
COPYRIGHT 1993 SAVI TECHNOLOGY, INC.

module communic.05h  183

```
300   err_false:
301       clra
302       rts
303   keep_checking:
304   #endasm
305   */
306       wait_pos() ;
307       if ((length < LOW_MIN) || (length > LOW_MAX))
308           goto bad ;      /* low level too short */
309       } /* end for bit_counter */

310       wait_neg() ;
311       /* check the parity bit */
312       /* ORIGINAL CODE in C */
313       if ((length <= ZERO_MAX) && (length >= ZERO_MIN))
314           parity_received = 0 ;
315       else
316           if ((length <= ONE_MAX) && (length >= ONE_MIN))
317               parity_received = 1 ;
318           else
319               goto bad ;
320   /* Assembler code is commented out . Done in C above
321   #asm
322       lda length
323       cmp #ZERO_MAX
324       bhs check_one
325       cmp #ZERO_MIN
326       bls check_one
327       clr templ
328       bra parity_ok
329   check_one:
330       cmp #ONE_MAX
331       bhs parity_error
332       cmp #ONE_MIN
333       bls parity_error
334       lda #$01
335       sta templ
336       bra parity_ok
337   parity_error:
338       clra
339       rts
340   parity_ok:
341   #endasm
342   */
343       wait_pos() ;
344       if ((length < LOW_MIN) || (length > LOW_MAX))
345           goto bad ;      /* bad low level */
```

CODE LISTING 1 APPENDIX    module communic.05h 184
COPYRIGHT 1993 SAVI TECHNOLOGY, INC.

```
346         wait_neg() ;
347         if ((length < ZERO_MIN) && ( length > ZERO_MAX))
348            goto bad ;

349         if ( (parity_counter & 0x01) == parity_received)
350             *bp++ = rf_data ;
351         else
352            {
353            rf_error_code = T_RFPARITY_ERR ;
354            goto bad ;
355            }

356      #asm
357            inc byte_counter
358            jmp start_byte_loop
359      end_byte_loop
360      #endasm 361         rf_error_code = ALL_OK ;
362         enable_int() ;
363         return(TRUE) ;            /* return TRUE indicating that
364                                     the reception was correct */
365      bad:
366         enable_int() ;
367         return(FALSE) ;
368      }

369      #pragma option P
370      /*---------------------------------------------------------
371                        WAIT_NEG
372      ----------------------------------------------------------
373      This routine waits until a negative edge is found in the TCAP line.
374      It returns the time that the signal was high in timer counts.
375      1 timer count = 2 microseconds.
376      ----------------------------------------------------------*/
377      void wait_neg()
378      {
379         while ( TimerStatus.7 == 0 )
380            ;
381         length = InputTimerLow - start ;
382         start = InputTimerLow ;
383         select_pos;
384      }

385      /*---------------------------------------------------------
386                        WAIT_POS
387      ----------------------------------------------------------
388      This routine waits until a negative edge is found in the TCAP line.
```

<u>CODE LISTING 1 APPENDIX</u>  module communic.05h 185
COPYRIGHT 1993 SAVI TECHNOLOGY, INC.

```
389    It returns the time that the signal was low in timer counts.
390    1 timer count = 2 microseconds.
391    ---------------------------------------------------------*/
392    void wait_pos()
393    {
394       while ( TimerStatus.7 == 0 )
395          ;
396       length = InputTimerLow - start ;
397       start = InputTimerLow ;
398       select_neg ;
399    }

400    #if USE_LCD
401    const char wh_timeout[]="Timeout";
402    #endif

403    /*---------------------------------------------------------
404                        WAIT_HEADER
405    ---------------------------------------------------------
406    Receive the header (preamble) signal and then returns.
407    This routine can also go to sleep because of timeout.
408    ---------------------------------------------------------*/
409    int wait_header()
410    {
411    unsigned int pulse_counter;
412    unsigned int start_timer_high ;

413    TimerControl.6 = 1 ;     /* enable timer interrupts */
414    enable_int() ;
415    while (TRUE) {

416    complete_check = TRUE ;  /* do the RSSI scanning and then the header pulses */

417    try_again:
418       if (complete_check)
419       {
420          /* scan the RSSI until the timeout expires or until
421             the RSSI goes above the threshold */
422          scan_rx_4_rssi();
423          disable_int() ;
424          start_timer_high = TimerAltHigh ;
425          REGA = TimerAltLow ;
426          enable_int() ;
427          complete_check = FALSE ;
428       }
429       else
430       {
431          disable_int() ;
```

CODE LISTING 1 APPENDIX  module communic.05h 186
COPYRIGHT 1993 SAVI TECHNOLOGY, INC.

```
432         /* timeout is $500 timer counts = 1280 * 2 us = 2.56 ms */
433         /* If we are more than 2.56 milliseconds waiting for the header
434            after the RSSI went over the threshold, then go back to
435            sampling the RSSI
436         */
437         if (TimerAltHigh-start_timer_high > 5 )
438           complete_check = TRUE ;
439         REGA = TimerAltLow ;
440         enable_int() ;
441       }

442     pulse_counter = 0 ;
443     while ( pulse_counter != 6 )
444         {
445         REGA = TimerStatus ;
446         REGA = InputTimerLow ;
447         select_pos ;

448     /* wait for positive while checking time*/
449         while (TimerStatus.7 == 0) {

450 #if INTERROGATOR
451         if ( expired ) {
452           TimerControl.6 = 0 ;    /* disable timer interrupts */
453           disable_int() ;         /* mask IRQ */
454           return(1);
455 #endif
456 #if TAG
457         if ( timeout == 0 ) {
458 #endif
459 #if USE_LCD
460           show1(wh_timeout) ;
461 #endif
462 #if TAG
463           Stop_Micro() ;
464 #endif
465         }
466       } /* end while TimerStatus.7 == 0 */

467     start = InputTimerLow ;
468     select_neg ;
469     for ( pulse_counter = 0 ; pulse_counter < 6 ; pulse_counter++ )
470         {
471         wait_neg() ;
472         if (( length < PRE_HIGH_MIN ) || ( length > PRE_HIGH_MAX ))
473           goto try_again ;

474         wait_pos() ;
```

CODE LISTING 1 APPENDIX       module communic.05h 187
COPYRIGHT 1993 SAVI TECHNOLOGY, INC.

```
475         if (( length < PRE_LOW_MIN ) || ( length > PRE_LOW_MAX ))
476            goto try_again ;

477         } /* end for pulse_counter=1:6 */
478      } /* while pulse_counter <> 6*/

479      for ( pulse_counter = 0 ; pulse_counter < 6 ; pulse_counter++ )
480         {
481         wait_neg() ;
482         if ((length >= PRE_ID_MIN) && (length <= PRE_ID_MAX))
483            goto got_header ; /* sorry for the goto but in this case it
484                       does not look that bad, and this part is
485                       time critical to do something fancy */

486         if (( length < PRE_HIGH_MIN ) || ( length > PRE_HIGH_MAX ))
487            goto try_again ;

488         wait_pos() ;
489         if (( length < PRE_LOW_MIN ) || ( length > PRE_LOW_MAX ))
490            goto try_again ;

491         } /* for pulse_counter = 1:6 */

492   } /* while TRUE */

493   got_header:
494   portc.0 = 1 ;
495   portc.0 = 0 ;
496   #if INTERROGATOR
497       TimerControl.6 = 0 ;    /* disable timer interrupts */
498       disable_int() ;          /* mask IRQ */
499       return(0);
500   #endif
501   } /* end wait_header() */

502   /*-------------------------------------------------------------
503              SEND_SINGLE_CMD
504   -------------------------------------------------------------
505     Send the command "cmd" to all the tags
506   -------------------------------------------------------------*/
507   #define SEND_1BYTE_CMD(cmd)    Enable_Tx(); preamble();  \
508                      transmit_byte(cmd)
```

CODE LISTING 1 APPENDIX  module config.h 188
COPYRIGHT 1993 SAVI TECHNOLOGY, INC.

```
1   /*       module config.h                            */
2   /*
3    * $Source: p:/int/RCS/config.h $
4    */

5   /*--------------------------------------------------
6              Define all the hardware I/O lines
7      ---------------------------------------------*/
8   #define DDRA 0b11111111
9              /*-----------------------------------*/
10             /* PA0 OUT   address/control bus line 0    */
11             /* PA1 OUT   address/control bus line 1    */
12             /* PA2 OUT   address/control bus line 2    */
13             /* PA3 OUT   address/control bus line 3    */
14             /* PA4 OUT   address/control bus line 4    */
15             /* PA5 OUT   address/control bus line 5    */
16             /* PA6 OUT   address/control bus line 6    */
17             /* PA7 OUT   address/control bus line 7    */
18             /*-----------------------------------*/

19  #define DDRB 0b11111111
20             /*-----------------------------------*/
21             /* PB0 OUT   data bus line 0           */
22             /* PB1 OUT   data bus line 1           */
23             /* PB2 OUT   data bus line 2           */
24             /* PB3 OUT   data bus line 3           */
25             /* PB4 OUT   data bus line 4           */
26             /* PB5 OUT   data bus line 5           */
27             /* PB6 OUT   data bus line 6           */
28             /* PB7 OUT   data bus line 7           */
29             /*-----------------------------------*/

30  #define DDRC 0b11111111
31             /*-----------------------------------*/
32             /* PC0 OUT   trigger for debug             */
33             /* PC1 OUT   E enable (bus control signal)   */
34             /* PC2 OUT   WR write (bus control signal)   */
35             /* PC3 OUT   RF data out                  */
36             /* PC4 OUT   clock register low            */
37             /* PC5 OUT   bank register low             */
38             /* PC6 OUT   clock register high           */
39             /* PC7 OUT   bank register high            */
40             /*-----------------------------------*/
41  #if C6805C8
42  #define DDRD 0b00000000
43  #else
44  #define DDRD 0b00011010
```

CODE LISTING 1 APPENDIX  
COPYRIGHT 1993 SAVI TECHNOLOGY, INC.

module config.h 189

```
45   #endif
46                  /*---------------------------------------*/
47                  /* PD0 IN   SCI receiver              */
48                  /* PD1 OUT  SCI transmitter           */
49                  /* PD2 IN   MISO                      */
50                  /* PD3 OUT  MOSI                      */
51                  /* PD4 OUT  SCLK line                 */
52                  /* PD5 IN   SS\ line                  */
53                  /* PD6 IN   undefined                 */
54                  /* PD7 IN   NIU ready line            */
55                  /*---------------------------------------*/

56   /*---------------------------------------------------
57     Define the three different latches . The CLOCK_LATCH is used to
58     actually clock the data into the latch that is positive edge
59     triggered (74574)
60   ---------------------------------------------------*/
61   #define ADDR_HIGH_LATCH 0
62   #define CONTROL1_LATCH  1
63   #define CONTROL2_LATCH  2
64   #define CLOCK_LATCH     3

65   #define BANK0      0
66   #define BANK1      1
67   #define BANK2      2
68   #define BANK3      3

69   #define RAM_BANK  0
70   #define IO_BANK   2
71   #define NULL_BANK 3

72   /*---------------------------------------------------
73     Define all the devices connected to the bus. This number is used to
74     activate the respective chip selects. The "D" letter stands for
75     device.
76   ---------------------------------------------------*/
77   #define D_CLOCK      0 <<4
78   #define D_LCD        1 <<4
79   #define D_ADC        2 <<4
80   #define D_OLDKEYPAD  3 <<4
81   #define D_ROM        4 <<4
82   #define D_EEPROM     5 <<4
83   #define D_DPOT1      6 <<4
84   #define D_DPOT2      7 <<4
85   #define D_DPOT3      8 <<4
86   #define D_KEYPAD     9 <<4
87   #define D_DEBUG     10 <<4
```

CODE LISTING 1 APPENDIX  module config.h 190
COPYRIGHT 1993 SAVI TECHNOLOGY, INC.

```
88   #define D_CS11      11<<4
89   #define D_CS12      12<<4
90   #define D_CS13      13<<4
91   #define D_CS14      14<<4
92   #define D_CS15      15<<4
93   #define D_NULL      15<<4

94   /*-----------------------------------------------------------
95           Define macros to access control lines
96   -----------------------------------------------------------*/
97   #define out 3
98   #define TX_LINE  portc.out
99   #define outhigh  TX_LINE = 1 ;
100  #define outlow   TX_LINE = 0 ;
101  #define WR_line  portc.2
102  #define E_line   portc.1
103  #define data_bus_dir ddrb
104  #define data_bus    portb 105  #if C6805C8
106  #define MAX_ADDRESS 0x1EFF
107  #define START_RAM  0x30
108  #define END_RAM    0xD0
109  #else
110  #define MAX_ADDRESS 0x3EFF
111  #define START_RAM  0x20
112  #define END_RAM    0xBF
113  #endif 114  #define FULLY_EXPANDED  TRUE
115         /****** FULLY EXPANDED MEMORY MAP *******/
116         /*     Using 2 extra ram areas         */
117         /*        RAM = START_RAM -> END_RAM   */
118         /*        RAM = 0x100 -> 0x15F/17F     */
119         /*        ROM = 0x160/180 -> 0x1EFF    */
120         /*******************************************/
121  #if FULLY_EXPANDED
122  #define OPTION_REGISTER 0xC0
123  #if C6805C8
124  #define START_CODE 0x160
125  #else
126  #define START_CODE 0x180
127  #endif
128  #define ROM_SIZE MAX_ADDRESS-START_CODE
129  #pragma memory ROMPROG [ROM_SIZE] @ START_CODE ;  /* 0x160/180 -> 0x1EFF */
130  #pragma memory RAMPAGE0 [END_RAM-START_RAM]       @ START_RAM ;
131  #pragma memory RAMPROG [START_CODE-0x100]         @ 0x100 ; /* 0x100 -> 0x15F/17F */
132  #if C6805C8
```

CODE LISTING 1 APPENDIX
COPYRIGHT 1993 SAVI TECHNOLOGY, INC.

module config.h 191

```
133    #pragma mor      @ 0x1FDF = 0xC0 ;
134    #else
135    #pragma mor      @ 0x3FDF = 0xC0 ;
136    #endif
137    #else
138         /********* EXPANDED MEMORY MAP *************/
139         /*     This mode is normally used     */
140         /*     Using 1 extra ram area         */
141         /*        RAM = START_RAM -> END_RAM  */
142         /*        ROM = 0x100 -> 0x1EFF       */
143         /*********************************************/
144    #define OPTION_REGISTER 0x80
145    #define START_CODE 0x100
146    #define ROM_SIZE MAX_ADDRESS-START_CODE
147    #pragma memory ROMPROG [ROM_SIZE] @ START_CODE ;  /* 0x100 -> 0x1EFF */
148    #pragma memory RAMPAGE0 [END_RAM-START_RAM]  @ START_RAM ;
149    #if C6805C8
150    #pragma mor      @ 0x1FDF = 0x80 ;
151    #else
152    #pragma mor      @ 0x3FDF = 0x80 ;
153    #endif
154    #endif
```

CODE LISTING 1 APPENDIX  module database.05h 192
COPYRIGHT 1993 SAVI TECHNOLOGY, INC.

```
1   /*          module database.05h              */
2   /*-----------------------------------------------------------
3                   DATABASE.05H
4              for the Interrogator V3.0

5   $Source: p:/int/RCS/database.05h $

6      The database consists of three tables.

7   1) New Tags table. It start at NEW_TAGS_BASE. Every collected tag
8      is added to this table, even if it was collected with error
9      (pulse width or parity). Each record is TAG_RECORD_LENGTH bytes.

10  2) Hash table. This table goes from HASH_TAGS_BASE to END_HASH_TAGS.
11     Each record is HASH_TAGS_LENGTH. The first three bytes are tag ID
12     and the fourth byte is a counter of how many times the tag was
13     heard. The fifth byte is the RSSI for the last collection.

14  3) Timing table. This table contains the collection time for the last
15     16 collections. It is 3 bytes width.
16  -----------------------------------------------------------*/

17  void DB_clear_hash() ;
18  void DB_update_hash() ;
19  void DB_pattern_update() ;
20  void DB_update_timing() ;

21  #define TAG_RECORD_LENGTH 10
22  #define TAG_ID_LENGTH    3

23  /* maximum number of tags for a single collection */
24  #define MAX_TAGS         3000

25  #define NEW_TAGS_BASE    0x8100
26  #define NEW_TAGS_END     NEW_TAGS_BASE + TAG_RECORD_LENGH * MAX_TAGS 27  /* hash table can hols up to 4096 tag entries */
28  #define HASH_TAGS_LENGTH 8
29  #define HASH_TAGS_BASE   0x0000
30  #define END_HASH_TAGS    0x8000

31  /* location for the timing table */
32  #define TIMING_TABLE     0x8000+10
33  #define TIMING_END       TIMING_TABLE+48

34  /*-----------------------------------------*/
35  /* Buffer for holding tag ID and counter */
```

CODE LISTING 1 APPENDIX  
COPYRIGHT 1993 SAVI TECHNOLOGY, INC.

module database.05h 193

```
36   /* to read and write to hash table    */
37   /* first 3 bytes = tag ID             */
38   /* fourth byte = collection counter   */
39   /*----------------------------------*/
40   unsigned int HASH_TAG [HASH_TAGS_LENGTH];
41   /* define some aliases to access the fields more easily */
42   unsigned int HASH_counter @HASH_TAG[3] ;
43   unsigned int HASH_rssi    @HASH_TAG[4] ;
44   long         HASH_pattern @HASH_TAG[5] ;
45   unsigned long hash_entries ;

46   /*----------------------------------
47                 DB_CLEAR_HASH
48   ----------------------------------
49     Clear the whole hash table AND the timing table
50   ----------------------------------*/
51   void DB_clear_hash()
52   {
53     ram_aux = ram_add ;
54     ram_set_add(HASH_TAGS_BASE) ;
55     do {                    /* clear the whole hash table */
56         ram_write(0x00) ;
57     } while (ram_add != TIMING_END) ;
58     ram_add = ram_aux ;
59     i_databasefull = FALSE ;       /* clear the flag that indicates that
60                                       the databse is full */
61     hash_entries = 0 ;             /* clear total number of entries */
62   }

63   /*----------------------------------
64                 DB_INIT
65   ----------------------------------
66     Clear the hash table and set the base address for incoming tags
67   ----------------------------------*/
68   void DB_init()
69   {
70     DB_clear_hash() ; /* clear the hash and timing table */
71     ram_set_add(NEW_TAGS_BASE) ;
72   }

73   /*----------------------------------
74                 DB_ADD_TAG
75   ----------------------------------
76     Add a tag to the new tags table
77   ----------------------------------*/
78   unsigned int DB_add_tag()
79   {
80     if (ram_add < NEW_TAGS_END )
```

CODE LISTING 1 APPENDIX  module database.05h  194
COPYRIGHT 1993 SAVI TECHNOLOGY, INC.

```
81      {
82         ram_writeblock(TAG_RECORD_LENGTH,ID) ;
83         return(TRUE) ;
84      }
85      else
86         return(FALSE) ;
87  }

88  /*--------------------------------------------------------------
89                   DB_GET_TAG
90  ---------------------------------------------------------------
91      Get a tag from the new tags table (whole record for the tag)
92  ---------------------------------------------------------------*/
93  #define DB_get_tag() ram_readblock(TAG_RECORD_LENGTH,ID)

94  /*--------------------------------------------------------------
95                   DB_GET_TAGID
96  ---------------------------------------------------------------
97      Get a tag from the new tags table (only the tag ID)
98  ---------------------------------------------------------------*/
99  #define DB_get_tagID() ram_readblock(TAG_ID_LENGTH,ID);\
100                 ram_add += (TAG_RECORD_LENGTH-TAG_ID_LENGTH) ;

101 /*--------------------------------------------------------------
102                  DB_GET_HASH_TAG
103 ---------------------------------------------------------------
104     Get a tag record from the hash table
105 ---------------------------------------------------------------*/
106 #define DB_get_hash_tag() ram_readblock(HASH_TAGS_LENGTH,HASH_TAG)

107 /*--------------------------------------------------------------
108                  DB_GET_HASH_TAG
109 ---------------------------------------------------------------
110     Put a tag record into the hash table
111 ---------------------------------------------------------------*/
112 #define DB_put_hash_tag() ram_writeblock(HASH_TAGS_LENGTH,HASH_TAG)

113 /*--------------------------------------------------------------
114                  DO_UPDATE
115 ---------------------------------------------------------------
116     Auxiliar routine for UPDATE_HASH to actually do the update.
117 ---------------------------------------------------------------*/
118 void do_update()
119 {
120 unsigned int roll_over ;
121         roll_over = FALSE ;
122         ram_old_add = ram_add ; /* store temporarily the current address */
```

CODE LISTING 1 APPENDIX  module database.05h  195
COPYRIGHT 1993 SAVI TECHNOLOGY, INC.

```
123         /* get hash address */
124         ram_addH = ID[1] & 0x7F ;
125         ram_addL = ID[0] & 0xF8 ;

126    try_next :
127         DB_get_hash_tag() ;    /* load the ID,counter in HASH_TAG */

128         if (
129             (HASH_TAG[0]==ID0) &&
130             (HASH_TAG[1]==ID1) &&
131             (((HASH_TAG[2]^ID2) & 0xF0) == 0)
132         )
133         {
134             ram_add -= HASH_TAGS_LENGTH ;   /* move @ 1 record before */
135             HASH_counter++ ;    /* rewrite the tag with the new counter */
136             if (HASH_counter == 0x00)    /* overflow in the counter */
137                 HASH_counter = 0xFF ;
138             HASH_rssi = RSSI ;        /* update power level */
139             HASH_pattern |= 1 ;    /* set the least significant bit */
140             DB_put_hash_tag() ;
141         }
142         else
143             if (HASH_counter == 0)    /* got an empty entry */
144             {
145                 HASH_TAG[0] = ID0 ;    /* copy the data to HASH_TAG buffer*/
146                 HASH_TAG[1] = ID1 ;
147                 HASH_TAG[2] = ID2 ;
148                 HASH_counter = 1 ;     /* first time the tag is collected */
149                 HASH_rssi = RSSI ;     /* store power level */
150                 ram_add -= HASH_TAGS_LENGTH ;   /* move @ 1 record before */
151                 HASH_pattern |= 1 ;    /* set the least significant bit */
152                 DB_put_hash_tag() ;
153                 hash_entries ++ ;
154             }
155             else
156             {
157                 if (ram_add == END_HASH_TAGS)  /* I am at the end of the table*/
158                 {
159                     ram_set_add(HASH_TAGS_BASE) ;
160                     if (roll_over)         /* I already rolled over once */
161                         i_databasefull = TRUE ;    /* set a bit in the interrogator status */
162                     else
163                     {
164                         roll_over = TRUE ;    /* I am rolling over for the 1st time*/
165                         goto try_next ;        /* goto rehash */
166                     }
167                 }
168                 else
```

CODE LISTING 1 APPENDIX   module database.05h 196
COPYRIGHT 1993 SAVI TECHNOLOGY, INC.

```
169              goto try_next ;      /* try next cell */
170          }
171       ram_add = ram_old_add ;
172    }

173   /*-----------------------------------------------------------------
174                   DB_UPDATE_HASH
175   ------------------------------------------------------------------
176    Update the information in the hash table with the last collection
177    information
178   -----------------------------------------------------------------*/
179   void DB_update_hash()
180   {
181      ram_aux = ram_add ;     /* store the current address, so in (***)
182                                 we can know that tags were collected */

183      DB_pattern_update() ;   /* shift to the left the collection pattern */
184      DB_update_timing() ;    /* update the list with the collectiontimes */
185      ram_add = ram_aux ;

186      if ( ram_add != NEW_TAGS_BASE)  /* new tags have been collected */
187      {
188         ram_aux = ram_add ;
189         ram_set_add(NEW_TAGS_BASE) ;
190         do {
191            kick_the_dog() ;
192            DB_get_tag() ;
193            if ( (tag_error_code == 0) && (RSSI >= rssi_accept_thresh)) /* if tag was received
194   correctly and recieved power high enough */
195               do_update() ;        /* add it to hash table */
196         } while ( ram_add != ram_aux) ;
197      }
198   }

199   /*-----------------------------------------------------------------
200                   DB_PATTERN_UPDATE
201   ------------------------------------------------------------------
202    This routine goes through the complete hash table and it shifts to
203    the left the collection pattern (16 bits) for all the no null entries.
204   -----------------------------------------------------------------*/
205   void DB_pattern_update()
206   {
207      ram_set_add(HASH_TAGS_BASE) ; /* point to the first entry */
208      do
209      {
210         ram_add += 3 ;         /* point to the collection counter */
211         if (ram_read()==0)     /* if entry null, then go to */
212            ram_add += 4 ;      /* the next record */
```

CODE LISTING 1 APPENDIX     module database.05h  197
COPYRIGHT 1993 SAVI TECHNOLOGY, INC.

```
213     else
214       {
215         ram_add++ ;              /* skip the RSSI field */
216         HASH_TAG[5] = ram_read() ;  /* read the 16 bit pattern */
217         HASH_TAG[6] = ram_read() ;
218         HASH_pattern <<= 1 ;     /* shift the pattern */
219         ram_add -= 2 ;           /* point back and rewrite */
220         ram_write(HASH_TAG[5]) ; /* the 2 byte pattern */
221         ram_write(HASH_TAG[6]) ;
222         ram_add += 1 ;           /* add one to go to the next record */
223       }
224     } while ( ram_add != END_HASH_TAGS) ;
225   }

226   /*-----------------------------------------------------------
227                       DB_UPDATE_TIMING
228   -------------------------------------------------------------
229     This routine adds the new collection time to the list. It moves
230     down first the rest of the list to make insertion space.
231   -----------------------------------------------------------*/
232   void DB_update_timing()
233   {
234     unsigned int stamp_count ;
235     ram_set_add(TIMING_END-6) ; /* first byte of 15th entry */
236     for ( stamp_count = 0 ; stamp_count < 15 ; stamp_count++)
237       {
238         ram_readblock(3,buffer) ;
239         ram_writeblobk(3,buffer) ;
240         ram_add -= 9 ;
241       }
242     ram_set_add(TIMING_TABLE) ;
243     ram_write(clock_read(HOUR_LAST_COLL)) ;
244     ram_write(clock_read(MIN_LAST_COLL)) ;
245     ram_write(clock_read(SEC_LAST_COLL)) ;
246   }

247   void DB_report_timing()
248   {
249     unsigned int stamp_count ;
250     ram_set_add(TIMING_TABLE) ; /* first byte */
251     for ( stamp_count = 0 ; stamp_count < 16 ; stamp_count++)
252       {
253   #if USE_NIU
254         if (command_source == RS485) /* wait for available TX buffer */
255           {
256             if (stamp_count == 15)
257               wait2txnbytes(3,EOT_DATA_PACKET) ;
```

CODE LISTING 1 APPENDIX
COPYRIGHT 1993 SAVI TECHNOLOGY, INC.

module database.05h 198

```
258         else
259           wait2txnbytes(3,REGULAR_DATA_PACKET) ;
260         }
261     #endif
262         ram_readblock(3,buffer) ;
263         put_byte(buffer[0]) ;
264         put_byte(buffer[1]) ;
265         put_byte(buffer[2]) ;
266     #if USE_NIU
267         if (command_source == RS485)
268         {
269           REGA = niu_get_status() ;
270           if (NIU_TXERR)
271              goto abort_rep ;
272         }
273     #endif
274       }
275     abort_rep:
276     }
```

CODE LISTING 1 APPENDIX
COPYRIGHT 1993 SAVI TECHNOLOGY, INC.

module delaydef.h 199

```
1   /*       module delaydef.h           */
2   #pragma option P
3   /*
4    * $Source: p:/int/RCS/delaydef.h $
5    * Defineine the timing given by the specification
6    */

7   /*****************************************************/
8   /* distort preamble by 6 micro seconds            */
9   /*****************************************************/
10  #define PRE_DISTORT 2

11  /*****************************************************/
12  /* counter values used to to generate the delays   */
13  /* They are the same in TAG and INT, with the exception */
14  /* TAG COUNT is used only in TAG and              */
15  /* HELLO COUNT is used only in INT                */
16  /*                                                 */
17  /* each unit here below is 3us                    */
18  /*****************************************************/
19        /* preamble high pulse 50us */
20  #define PRE_H           11 - PRE_DISTORT
21        /* preamble low space 75us */
22  #define PRE_L           20 + PRE_DISTORT
23        /* id pulse from tag to int 70us */
24  #define TAG_COUNT    20
25        /* id pulse from int to tag 110us */
26  #define INT_COUNT    33
27        /* padding to 100ms after id pulse of preamble */
28  #define PRE_END_PAD 22
29  #define SHORT_DELAY       14
30  #define ONE_DELAY    24+1   /* changed to just +3us PSB 4-23 */
31  #define ZERO_DELAY   11
32  #define LOW_LEVEL_DELAY 1

33  /*****************************************************/
34  /* define maximum allowable error. Currently we are */
35  /* using plus minus 4 timer counts (8 microseconds). */
36  /* Changed to 5 timer count (10 microseconds)      */
37  /*****************************************************/
38  #define MARGIN 5  /* 3-31-92 */

39  /*****************************************************/
40  /* define current RF link distortion in number of timer */
41  /* counts                                         */
42  /*                                                 */
```

CODE LISTING 1 APPENDIX
COPYRIGHT 1993 SAVI TECHNOLOGY, INC.

module delaydef.h 200

```
43   /* In version 2.0 we had :                              */
44   /* Tag -> Int  Pulses lengthened, spaces shortened      */
45   /* Int -> Tag  Pulses shortened, length shortened       */
46   /* The parameters were 2 and -2                         */
47   /*                                                      */
48   /* In version 3.0 with the FM tags we have              */
49   /* both pulses shortened. The parameters are -2 and -2  */
50   /*******************************************************/
51   /* restored -2 PSB 4-22 */
52   #define TAG2INT_DISTORTION -2
53   #define INT2TAG_DISTORTION -2

54   #if TAG
55   #define DELTA_RF INT2TAG_DISTORTION
56   #else
57   #define DELTA_RF TAG2INT_DISTORTION
58   #endif 59   /*******************************************************/
60   /*      define constants for header detection      */
61   /*******************************************************/
62   #define PRE_HIGH 25
63   #define PRE_LOW 38
64   #if TAG
65   #define PRE_ID 55
66   #else
67   #define PRE_ID 35
68   #endif 69   /*******************************************************/
70   /*      define constants for data (0,1) detection      */
71   /*******************************************************/
72   #define IDEAL_ZERO 25
73   #define IDEAL_ONE 45
74   /* changed from 18 to 17 because tag generates 34us low PSB 4-22*/
75   #define IDEAL_LOW 17
```

CODE LISTING 1 APPENDIX
COPYRIGHT 1993 SAVI TECHNOLOGY, INC.

module delays.05h 201

```
1   /*           module delays.05h                    */
2   /****************************************************/
3   /*               DELAYS UNIT                        */
4   /*
5   $Source: p:/int/RCS/delays.05h $ 6   This unit contains routines used to produce delays of different
7   duration. All the routines in this unit modify only the X
8   register, and are called without parameters.

9   defined macros
10  --------------
11  pre_h_delay() ;      Delay for high part of preamble
12  pre_l_delay() ;      Delay for low part of preamble
13  short_delay() ;
14  zero_delay() ;       Delay for high part of zero
15  one_delay()  ;       Delay for high part of one
16  hello_delay();       left over from early times for interrogator 17  defined functions
18  -----------------
19  delay();          lowest level time delay loop
20  one_nop_delay();     calls delay
21  two_nop_delay();     calls delay
22  low_level_delay();   precise timing for filling space
23  one_msec() ;         one millisecond
24  five_msec() ;        five milliseconds
25  int_tenth_second(a); # of tenth of second

26  */

27  #pragma option P
28  /*----------------------------------------------------*/
29  /*                 DELAY                             */
30  /*----------------------------------------------------*/
31  /* This routine produces a delay of 6 + X * 6 cycles  */
32  /*----------------------------------------------------*/
33  void delay()
34  {
35  #asm
36  delay_loop    DECX              ; 3 cycles
37                BNE    delay_loop ; 3 cycles
38  #endasm
39  }                    /* 6 cycles (RTS)   */
```

CODE LISTING 1 APPENDIX
COPYRIGHT 1993 SAVI TECHNOLOGY, INC.

module delays.05h 202

```
40   /*------------------------------------------------*/
41   /*  ONE_NOP_DELAY and TWO_NOP_DELAY              */
42   /*------------------------------------------------*/
43   /*  These routines produce a exact timing loops  */
44   /*------------------------------------------------*/
45   #asm
46   two_nop_delay    NOP
47   one_nop_delay    NOP
48            BSR delay   ;X*6+12 cycles
49            RTS
50   #endasm 51   /*------------------------------------------------*/
52   /*     PRE_H_DELAY   (high part of the preamble signal)   */
53   /*------------------------------------------------*/
54   #define pre_h_delay() REGX=PRE_H;one_nop_delay();

55   /*------------------------------------------------*/
56   /*     PRE_L_DELAY   (low part of the preamble signal)    */
57   /*------------------------------------------------*/
58   #define pre_l_delay() REGX=PRE_L;two_nop_delay();

59   /*------------------------------------------------*/
60   /*     SHORT_DELAY                               */
61   /*------------------------------------------------*/
62   #define short_delay() REGX=SHORT_DELAY;one_nop_delay();

63   /*------------------------------------------------*/
64   /*     ONE_DELAY    delay for hi part of '1' bit  */
65   /*------------------------------------------------*/
66   #define one_delay() REGX=ONE_DELAY;two_nop_delay();

67   /*------------------------------------------------*/
68   /*     ZERO_DELAY   delay for hi part of '0' bit  */
69   /*------------------------------------------------*/
70   #define zero_delay() REGX=ZERO_DELAY;two_nop_delay();

71   /*------------------------------------------------*/
72   /*     LOW_LEVEL_DELAY  precise delay, no loop    */
73   /*------------------------------------------------*/
74   void low_level_delay(void)
75   {
76   registerx shortcount ;
77     shortcount = LOW_LEVEL_DELAY ;  /* this value is not used in a loop! */
78     NOP() ;              /* 2 cycles */
79   #asm
80       BSR MYRTS
81   MYRTS RTS
```

CODE LISTING 1 APPENDIX
COPYRIGHT 1993 SAVI TECHNOLOGY, INC.

module delays.05h 203

```
82   #endasm
83   }                    /* 6 cycles */

84   /*----------------------------------------*/
85   /*      ONE_MSEC    delay of 1 millisec          */
86   /*----------------------------------------*/
87   /* delay = 9 * one_counter+8 cycles+ 6 cycles for initial jsr    */
88   /* one_counter = 221*9=1989 1989+14=2003 cycles = 1.0015  msec  */
89   /*----------------------------------------*/
90   void one_msec()
91   {
92     REGX = 221 ;
93     do { REGX--; } while ( REGX != 0 ) ;
94   }

95   /*----------------------------------------*/
96   /*              FIVE_MSEC                        */
97   /*----------------------------------------*/
98   /* delay of 5.0135 msec   5*2003 cycles+12=10,027cycles = 5.0135ms*/
99   /*----------------------------------------*/
100  void five_msec()
101  { one_msec(); one_msec(); one_msec(); one_msec(); one_msec(); }

102  /*----------------------------------------*/
103  /*      INT_TENTH_SECOND    delay of number_ten*10 msecs    */
104  /*----------------------------------------*/
105  void int_tenth_second(number_ten)
106  unsigned int number_ten ;
107  {
108  unsigned int one_counter ;
109    for (one_counter = 0 ; one_counter < number_ten ; one_counter++ )
110      { five_msec(); five_msec(); }
111  }

112  #if INTERROGATOR
113  /*----------------------------------------*/
114  /*      HELLO_DELAY    left over from early times    */
115  /*----------------------------------------*/
116  #define hello_delay() REGX=21;two_nop_delay();
117  #endif
```

CODE LISTING 1 APPENDIX
COPYRIGHT 1993 SAVI TECHNOLOGY, INC.

module dftagnil.05h 204

```
1    /*          module dftagnil.05h          */
2    /*
3     * $Source: p:/int/RCS/dftagnil.05h $
4     */
5    void ping_tag()
6    {
7    }

8    void set_freq_syn()
9    {
10   }

11   void angle_tag()
12   {
13   }
```

CODE LISTING 1 APPENDIX
COPYRIGHT 1993 SAVI TECHNOLOGY, INC.

module dpot.05h 205

```
1   /*          module dpot.05h                         */
2   /*---------------------------------------------------*/
3   /*              DPOT.05H
4   ---------------------------------------------------

5   $Source: p:/int/RCS/dpot.05h $

6   ---------------------------------------------------*/

7   #define dpot_inc  portc.1
8   #define dpot_ud   portc.2

9   unsigned int direction ;
10  unsigned int which ;
11  unsigned int where ;

12  #define MOVE_UP   0
13  #define MOVE_DOWN 1

14  /* ------------------------------------------------
15              DPOT_MOVE
16  ---------------------------------------------------
17  Move dpot in one step in the indicated direction.
18  direction = 0 -> move up
19  direction = 1 -> move down
20  ---------------------------------------------------*/
21  void dpot_move(direction,dpot_number)
22  registera dpot_number ;
23  {
24    enable_device(dpot_number) ;
25    dpot_ud = direction ;  /* select the direction to move */

26    dpot_inc = 0 ;  /* clock with the negative edge */

27    dpot_inc = 1 ;  /* return signals to normal state */
28    dpot_ud  = 0 ;
29    disable_device() ;
30  }

31  /*-------------------------------------------------
32              MOVE_DPOT
33  ---------------------------------------------------
34  This routine sets the specified dpot to value where
35  DPOT are numbered 0 1 2
```

CODE LISTING 1 APPENDIX
COPYRIGHT 1993 SAVI TECHNOLOGY, INC.

module dpot.05h 206

```
36   /*----------------------------------------------------------*/
37   void move_dpot(which,where)
38   {
39     which = (which+6)<<4 ;
40     for (i = 0 ; i < 100 ; i++)          /* reset the dpot */
41       dpot_move(MOVE_DOWN, which) ;
42     for (i = 0 ; i < where ; i++)
43       dpot_move(MOVE_UP, which) ;
44   }

45   /*----------------------------------------------------------
46                       DPOT_INIT
47   -------------------------------------------------------------
48     Reset all the DPOTS to the default value
49   ----------------------------------------------------------*/
50   void dpot_init()
51   {
52     for (j = 0 ; j < 3 ; j++)
53       move_dpot(j,ee_read(COMMANDS_POWER)) ;
54   }
```

CODE LISTING 1 APPENDIX
COPYRIGHT 1993 SAVI TECHNOLOGY, INC.

module eeprom.05h 207

```
1   /*          module eeprom.05h           */
2   /*------------------------------------------------------------
3                   EEPROM UNIT
4   ------------------------------------------------------------*
5   $Source: p:/int/RCS/eeprom.05h $ 6           - if EEPROM_TYPE line is low we have a 1 Kbit eeprom.
7             if it is high we have a 2 Kbit.
8             EEPROM_TYPE is defined in tagconfg.h
9           - Adapted to work in the Interrogator V3.0 hardware 10      This unit implements the primitives to access the 1Kbit serial
11      eeprom (XL93C46 ). In the case of write,erase and erase_all a
12      code is returned to indicate if the operation was sucessfull.
13      A code TRUE is returned if everything is OK.
14      A code FALSE is returned is timeout occured while waiting for
15      the ready signal
16   *------------------------------------------------------------*/
17   /*------------------------------------------------------------
18            Define lines to access EEPROM
19   ------------------------------------------------------------*/
20   /* define 1Kbit eeprom */
21   #define EEPROM_TYPE 0
22   #define ee_put portb.7
23   #define ee_get portb.6
24   #define ee_sk  portc.1

25   /* interface for the eeprom driver */

26   void ee_init() ;
27   void ee_enable() ;
28   void ee_disable() ;
29   int  ee_write(int a;int b;) ;
30   int  ee_read(int a;) ;
31   int  ee_erase(int a;) ;
32   int  ee_erase_all() ;

33   /*------------------------------------------------------------*/

34   #define WRITE_CMD      0b10100000
35   #define READ_CMD       0b11000000
36   #define ERASE_CMD      0b11100000
37   #define ERA_ALL_CMD    0b10000000
38   #define ERA_ALL_CMD2   0b10000000
```

CODE LISTING 1 APPENDIX
COPYRIGHT 1993 SAVI TECHNOLOGY, INC.

module eeprom.05h 208

```
39   #define ENABLE_DISABLE  0b10000000
40   #define ENABLE_CMD      0b11000000
41   #define DISABLE_CMD     0b00000000

42   #define select_eeprom   enable_device(D_EEPROM)
43   #define deselect_eeprom disable_device()

44   /* four global variables are used by this unit */

45   union both ee_dato ;
46   unsigned int ee_data ;
47   unsigned int ee_address ;
48   unsigned int ee_code ;    /* code used to return error if we fail waiting
49                                for the ready signal */

50   /* it also uses temph and templ which are defined in the main */
51   /*
52   unsigned int temph ;
53   unsigned int templ ;
54   */

55   /*---------------------------------------------------------------
56                       EE_INIT
57   ---------------------------------------------------------------
58   Initialize the eeprom driver by enabling the eeprom
59   ---------------------------------------------------------------*/
60   void ee_init()
61   {
62     ee_enable() ;   /* enable the eprom to be programmed */
63   }

64   /*---------------------------------------------------------------
65                       EE_CLOCK
66   ---------------------------------------------------------------
67   Generate the clock signal to the eeprom
68
69   ---------------------------------------------------------------*/
70   void ee_clock()
71   {
72     ee_sk = 0 ;
73     NOP(); NOP(); NOP(); NOP();
74     ee_sk = 1 ;
75   }

76   /*---------------------------------------------------------------
77                       WAIT_CHIP_READY
78   ---------------------------------------------------------------
```

CODE LISTING 1 APPENDIX  
COPYRIGHT 1993 SAVI TECHNOLOGY, INC.

module eeprom.05h 209

```
79    Wait for the eeprom chip to be ready. The chip is ready when the
80    line ee_get is high.
81    Is the line does not go high in 20 msec then the code FALSE is
82    returned indicating that the operation failed. The spec says that
83    the maximum waiting time is 10 msec. In practice it is about 7 msec.
84    -----------------------------------------------------------------*/
85    int wait_chip_ready()
86    {
87      deselect_eeprom ;    /* deselect to enter in self clocking mode */
88      select_eeprom ;
89      disable_int() ;
90      temph = TimerAltHigh ;
91      templ = TimerAltLow ;
92      enable_int() ;
93      while ( ee_get == 0 )
94        {
95          disable_int() ;
96          if (TimerAltHigh-temph > 0x22) /* timeout to 20 msec */
97            {
98              temph = TimerAltLow ;    /* read low byte to complete the sequence */
99              enable_int() ;
100             return(FALSE) ;    /* indicate that timeout error has occured */
101           }
102         else
103           {
104             REGA = TimerAltLow ;
105             enable_int() ;
106           }
107       }
108     return(TRUE) ;
109   }

110   /*----------------------------------------------------------------
111                   SEND_BITS
112   ----------------------------------------------------------------
113   Send the ee_bits leftmost bits of ee_data through the serial line
114   ----------------------------------------------------------------*/
115   void send_bits(ee_bits,ee_dato)
116   registerx ee_bits ;
117   {
118     do {
119       if (ee_dato.bool.7 == 1) ee_put = 1 ;
120       else ee_put = 0 ;

121       ee_clock() ;
122       ee_dato.num <<= 1 ;
123       ee_bits-- ;
```

CODE LISTING 1 APPENDIX
COPYRIGHT 1993 SAVI TECHNOLOGY, INC.

module eeprom.05h 210

```
124      } while ( ee_bits > 0 ) ;
125    }

126    /*---------------------------------------------------
127                    SEND_COMMAND
128    ---------------------------------------------------
129      Send a three bit command to the eeprom
130    ---------------------------------------------------*/
131    void send_command(ee_command)
132    registera ee_command ;
133    { send_bits(3,ee_command); }

134    /*---------------------------------------------------
135                    SEND_DATA
136    ---------------------------------------------------
137      Send the eight bits of data through the serial line
138    ---------------------------------------------------*/
139    void send_data(data)
140    registera data ;
141    { send_bits(8,data); }

142    /*---------------------------------------------------
143                    SEND_ADDRESS
144    ---------------------------------------------------
145      This routine send the address to the eeprom. If the EEPROM_TYPE
146      line is low then we have to send the address for the 1Kbit
147      eeprom (7 bits), otherwise we send the full 8 bits of the address.
148    ---------------------------------------------------*/
149    void send_address(address)
150    registera address ;
151    {
152      if (EEPROM_TYPE == 0)         /* 1 Kbit memory */
153        send_bits(7,address<<1) ;   /* address in only 7 bits */
154      else
155        send_bits(8,address) ;      /* address in 8 bits long */
156    }

157    /*---------------------------------------------------
158                    GET_DATA
159    ---------------------------------------------------
160      Read one byte of data and put it in ee_data
161    ---------------------------------------------------*/
162    void get_data()
163    {
164    registerx gbit ;
165      for ( gbit = 8 ; gbit > 0 ; gbit--)
166        {
167          ee_data <<= 1;
```

Attorney Docket No. SAVI1001CIP2DEL
del/savi/1001cip2.pa.al

CODE LISTING 1 APPENDIX
COPYRIGHT 1993 SAVI TECHNOLOGY, INC.

module eeprom.05h 211

```
168    ee_clock() ;
169    if (ee_get == 0) ee_data &= 0b11111110 ;
170    else ee_data |= 0b00000001 ;
171    }
172  }

173  /*----------------------------------------
174              EE_ENABLE
175  ------------------------------------------
176    Enable the eeprom to be programmed.
177  ----------------------------------------*/
178  void ee_enable()
179  {
180    select_eeprom ;
181    send_command(ENABLE_DISABLE) ;
182    send_data(ENABLE_CMD) ;
183    deselect_eeprom ;
184  }

185  /*----------------------------------------
186              EE_WRITE
187  ------------------------------------------
188    Write the data ee_data into the location ee_address. If the write
189    fails it returns FALSE, otherwise it returns TRUE.
190  ----------------------------------------*/
191  int ee_write(ee_data,ee_address)
192  {
193    if ((ee_address == EE_ID_HIGH) || (ee_address == EE_ID_LOW))
194      return(FALSE) ;
195  skip_protection:
196    select_eeprom ;
197    send_command(WRITE_CMD) ;
198    send_address(ee_address) ;
199    send_data(ee_data) ;
200    ee_code = wait_chip_ready() ;
201    deselect_eeprom ;
202    return(ee_code) ;
203  }

204  int ee_prot_write(ee_data,ee_address)
205  {
206  goto skip_protection ;
207  }

208  /*----------------------------------------
209              EE_READ
210  ------------------------------------------
```

CODE LISTING 1 APPENDIX    module eeprom.05h 212
COPYRIGHT 1993 SAVI TECHNOLOGY, INC.

```
211     Read a byte from the location ee_address
212     ----------------------------------------------------------------*/
213     int ee_read(ee_address)
214     {
215       select_eeprom ;
216       send_command(READ_CMD) ;
217       send_address(ee_address) ;
218       get_data() ;
219       deselect_eeprom ;
220       return(ee_data) ;
221     }

222     /****************** COMMENT ALL NON USED ROUTINES ******************/
223     /*

224     /*----------------------------------------------------------------
225                         EE_DISABLE
226     ----------------------------------------------------------------
227     Disable the eeprom to be programmed.
228     ----------------------------------------------------------------*/
229     void ee_disable()
230     {
231       select_eeprom ;
232       send_command(ENABLE_DISABLE) ;
233       send_data(DISABLE_CMD) ;
234       deselect_eeprom ;
235     }

236     /*----------------------------------------------------------------
237                         EE_ERASE
238     ----------------------------------------------------------------
239     Erase the location ee_address. Return TRUE is sucessfull FALSE
240     otherwise.
241     ----------------------------------------------------------------*/
242     int ee_erase(ee_address)
243     {
244       select_eeprom ;
245       send_command(ERASE_CMD) ;
246       send_address(ee_address) ;
247       ee_code = wait_chip_ready() ;
248       deselect_eeprom ;
249       return(ee_code) ;
250     }

251     /*----------------------------------------------------------------
252                         EE_ERASE_ALL
253     ----------------------------------------------------------------
```

Attorney Docket No. SAVI1001CIP2DEL
del/savi/1001cip2.pa.a1

CODE LISTING 1 APPENDIX  module eeprom.05h 213
COPYRIGHT 1993 SAVI TECHNOLOGY, INC.

```
254      Erase the whole eeprom. If fails it return FALSE. Otherwise it
255      returns TRUE.
256    -------------------------------------------------------------*/
257    int ee_erase_all()
258    {
259      select_eeprom ;
260      send_command(ERA_ALL_CMD) ;
261      send_data(ERA_ALL_CMD2) ;
262      ee_code = wait_chip_ready() ;
263      deselect_eeprom ;
264      return(ee_code) ;
265    }

266    /*-------------------------------------------------------------
267      Routine to test the eeprom. Disabled temporarily
268    -------------------------------------------------------------*/
269    void test_eeprom()
270    {
271    registerx ee_count ;
272      enable() ;    /* enable eeprom for programming */
273      for ( ee_count = 0 ; ee_count < 10 ; ee_count++)
274      {
275        ee_address = ee_count ;
276        ee_write(ee_count) ;
277      }

278      for ( ee_count = 0 ; ee_count < 10 ; ee_count++)
279      {
280        ee_address = ee_count ;
281        ee_buffer[ee_count] = ee_read() ;
282      }
283    }
284    */
```

CODE LISTING 1 APPENDIX
COPYRIGHT 1993 SAVI TECHNOLOGY, INC.

module flags.h 214

```
1   /*           module flags.h                    */
2   /*-----------------------------------------------
3                   FLAGS.H
4              for the Interrogator V3.0

5   $Source: p:/int/RCS/flags.h $

6   This file defines all the switches that are needed to compile the code
7   for different configurations
8   -----------------------------------------------*/

9   /*-----------------------------------------------
10  Set the next line to FALSE to compile for 6805C9 or TRUE to
11  compile for 6805C8
12  -----------------------------------------------*/
13  #define C6805C8       FALSE 14  /*-----------------------------------------------
15  The next two flags should not be changed. They are needed to be
16  compatible with the low level communication routines. The same code
17  is also used in the tag
18  -----------------------------------------------*/
19  #define TAG           FALSE
20  #define INTERROGATOR  TRUE 21  /*-----------------------------------------------
22  Set to TRUE to talk with the UIB via RS232
23  -----------------------------------------------*/
24  #define RF_LINK       FALSE 25  /*-----------------------------------------------
26  Set to TRUE to enable the code that writes to the LCD display
27  -----------------------------------------------*/
28  #define USE_LCD       TRUE 29  /*-----------------------------------------------
30  Display verbose information to the LCD during a collection
31  -----------------------------------------------*/
32  #define VERBOSE_LCD   TRUE 33  /*-----------------------------------------------
34  Set to TRUE to enable communication with the PC via RS485
35  -----------------------------------------------*/
36  #define USE_NIU       TRUE

37  /*-----------------------------------------------
```

CODE LISTING 1 APPENDIX
COPYRIGHT 1993 SAVI TECHNOLOGY, INC.

module flags.h 215

```
38      Set to TRUE to enable extended Tag functions
39      ------------------------------------------------*/
40      #define XTAG        TRUE 41      /* -----------------------------------------------
42      Set to TRUE to poll the NIU only 4 times a second. Set to FALSE to
43      poll continuously
44      ------------------------------------------------*/
45      #define POLL_SLOW   TRUE 46      /* -----------------------------------------------
47      Set the next define to TRUE to enable RS 232 handshaking
48      for the sniffer
49      ------------------------------------------------*/
50      #define USE_HANDSHAKING  FALSE 51      /*------------------------------------------------
52      Set the next line to TRUE to activate the debug lines in the output
53      debug latch. They are defined in the hw.05c file
54      ------------------------------------------------*/
55      #define DEBUG_SIGNALS  FALSE 56      /*------------------------------------------------
57      Set the next two lines to TRUE to use the DF interrogator
58      ------------------------------------------------*/
59      #define DFTAG       FALSE
60      #define USE_KBD     FALSE
```

CODE LISTING 1 APPENDIX  
COPYRIGHT 1993 SAVI TECHNOLOGY, INC.

module hw.05h 216

```
 1   /*          module hw.05h              */
 2   /*----------------------------------------------*/
 3   /*                HW.05h
 4   ----------------------------------------------

5   $Source: p:/int/RCS/hw.05h $

6   ----------------------------------------------*/
 7   /* variables to maintain the state of the 2 control latches */
 8   unsigned int control1 ;
 9   unsigned int control2 ;

10   /*----------------------------------------------
11                 BANK_SELECTION
12         Banks are selected with bits 5 and 7 of port C.
13   BANKS :
14       0 Access the 64K RAM space.
15       1 Unused.
16       2 Access all the IO devices and the UVPROM.
17       3 Null bank.
18   ----------------------------------------------*/
19   /*--------------*/
20   /* Select BANK 0 */
21   /*--------------*/
22   #define select_ram_bank portc &= 0b01011111

23   /*--------------*/
24   /* Select BANK 1 */
25   /*--------------*/
26   void select_bank1_bank()
27   {
28     REGA = portc ;
29     REGA |= 0b00100000 ;
30     REGA &= 0b01111111 ;
31     portc = REGA ;
32   }

33   /*--------------*/
34   /* Select BANK 2 */
35   /*--------------*/
36   void select_io_bank()
37   {
38     REGA = portc ;
39     REGA &= 0b11011111 ;
40     REGA |= 0b10000000 ;
41     portc = REGA ;
42   }
```

CODE LISTING 1 APPENDIX  module hw.05h 217
COPYRIGHT 1993 SAVI TECHNOLOGY, INC.

```
43  /*--------------*/
44  /* Select BANK 3 */
45  /*--------------*/
46  #define select_null_bank portc |= 0b10100000

47  /*----------------------------------------------------
48              SET_HIGH_ADDRESS
49  ----------------------------------------------------
50     Set the high address to addressH_value
51  ----------------------------------------------------*/
52  void set_high_address(addressH_value)
53  registera addressH_value ;
54  {
55     porta = addressH_value ;
56     portc &= 0b10101111 ;
57     portc |= 0b01010000 ;
58  }

59  /*----------------------------------------------------
60              SET_LATCH1
61  ----------------------------------------------------
62     Set the value in latch number 1
63  ----------------------------------------------------*/
64  void set_latch1(value) ;
65  registera value ;
66  {
67     porta = control1 ;
68     REGA = portc ;
69     REGA |= 0b00010000 ;
70     REGA &= 0b10111111 ;
71     portc = REGA ;
72     portc |= 0b01010000 ;
73  }

74  /*----------------------------------------------------
75              SET_LATCH2
76  ----------------------------------------------------
77     Set the control2_value into the control latch 2
78  ----------------------------------------------------*/
79  void set_latch2(control2_value)
80  registera control2_value ;
81  {
82     porta = control2_value ;
83     REGA = portc ;
84     REGA &= 0b11101111 ;
85     REGA |= 0b01000000 ;
86     portc = REGA ;
87     portc |= 0b01010000 ;
```

CODE LISTING 1 APPENDIX  module hw.05h 218
COPYRIGHT 1993 SAVI TECHNOLOGY, INC.

```
 88   }

89   /*-----------------------------------------------------
 90                   ENABLE_DEVICE
 91   -----------------------------------------------------
 92     Activate (low) the device associated with device_number
 93   -----------------------------------------------------*/
 94   void enable_device(device_number)
 95   int device_number ;
 96   {
 97     switch (device_number)
 98       {
 99       case D_EEPROM : data_bus_dir.6 = 0 ;
100                                   /* pin 6 defined as input
101                                      because it is connected
102                                      to output line from
103                                      eeprom */
104                 break ;

105       case D_KEYPAD : data_bus_dir = 0b01111111 ;
106                 break ;
107       }
108     set_high_address(device_number) ;
109     select_io_bank() ;
110   }

111   /*-----------------------------------------------------
112                   DISABLE_DEVICE
113   -----------------------------------------------------
114     Desactivate the active device
115   -----------------------------------------------------*/
116   void disable_device()
117   {
118     set_high_address(D_NULL) ;
119     data_bus_dir = 0xFF ; /* all lines are output */
120     select_null_bank ;
121   }

122   /*-----------------------------------------------------
123                   SELECT_TX
124   -----------------------------------------------------
125     Select the transmitter number "number"
126   -----------------------------------------------------*/
127   void select_tx(number)
128   unsigned int number ;
129   {
```

CODE LISTING 1 APPENDIX
COPYRIGHT 1993 SAVI TECHNOLOGY, INC.

module hw.05h 219

```
130     control1 = (control1 & 0b11111100 ) | number ;
131     set_latch1(control1) ;
132   }

133  /*----------------------------------------------------------
134                    SELECT_ONE_RX
135  ----------------------------------------------------------
136   Select the receiver number "number"
137   The infrared line is high, therefore only the specified receiver
138   will be selected
139  ----------------------------------------------------------*/
140  void select_one_rx(number)
141  {
142    number <<= 2 ;
143    number |= 0b00010000 ;     /* set the INFRARED line high */
144    control1 = (control1 & 0b11100011 ) | number ;
145    set_latch1(control1) ;
146  }

147  /*----------------------------------------------------------
148                    SELECT_RX_ALL
149  ----------------------------------------------------------
150   Select the receiver number "number"
151   The infrared line is active low, therefore all receivers are turned
152   ON
153  ----------------------------------------------------------*/
154  void select_rx_all(number)
155  {
156    number <<= 2 ;
157    number &= 0b11101111 ;     /* set the infrared line low */
158    control1 = (control1 & 0b11100011 ) | number ;
159    set_latch1(control1) ;
160  }

161  /*----------------------------------------------------------
162                    ENABLE_TX
163  ----------------------------------------------------------
164   Enable the current transmitter
165  ----------------------------------------------------------*/
166  void Enable_Tx()
167  {
168    select_tx(current_tx) ;
169    one_msec() ;
170  }

171  /*----------------------------------------------------------
172                    DISABLE_TX
173  ----------------------------------------------------------
```

CODE LISTING 1 APPENDIX
COPYRIGHT 1993 SAVI TECHNOLOGY, INC.

module hw.05h 220

```
174    Disable all transmitters by selecting the transmitter number 3
175    -----------------------------------------------------------*/
176    #define Disable_Tx() select_tx(3) ;

177    /*----------------------------------------------------------
178                   READ_DEBUG_LATCH
179    -----------------------------------------------------------
180    Read and return the value set in the input debug latch
181    -----------------------------------------------------------*/
182    int read_debug_latch()
183    {
184    unsigned int debug_word ;
185       data_bus_dir = 0b00000000 ;          /* bus is input */
186    /* clock the latch */
187       control1 = (control1 & 0b10111111) ;  /* control1.6 = 0 */
188       set_latch1(control1) ;
189       control1 = (control1 | 0b01000000) ;  /* control1.6 = 1 */
190       set_latch1(control1) ;
191    /* set (low) OE */
192       control1 = (control1 & 0b11011111) ;  /* control1.5 = 0 */
193       set_latch1(control1) ;
194       debug_word = data_bus ;
195       control1 = (control1 | 0b00100000) ;  /* control1.5 = 1 */
196       set_latch1(control1) ;

197       data_bus_dir = 0b11111111 ;           /* redefine bus as output */
198       return(debug_word) ;
199    }

200    /*----------------------------------------------------------
201                   HW_INIT
202    -----------------------------------------------------------
203    Initialize the HW by setting the control latches to the correct
204    value
205    -----------------------------------------------------------*/
206    void hw_init()
207    {
208       control1 = 0b01111111 ;
209                           /* b0 = 1 XMT_CTRL0 */
210                           /* b1 = 1 XMT_CTRL1 */
211                           /* b2 = 1 RX_CTRL0 */
212                           /* b3 = 1 RX_CTRL1 */
213                           /* b4 = 1 INFRARED (turn on receivers) */
214                           /* b5 = 1 DEBUG enable (ACTIVE LOW) */
215                           /* b6 = 1 DEBUG_CLOCK */
216                           /* b7 = 0 NIU_SS (slave select) */
217    #if (DFTAG==FALSE)
218       control2 = 0b00000001 ;
```

CODE LISTING 1 APPENDIX
COPYRIGHT 1993 SAVI TECHNOLOGY, INC.

module hw.05h 221

```
219                         /* b0 = 1 RESET_NIU */
220                         /* b1 = 0 ALARM     */
221                         /* b2 = handshaking line for rs232
222                              b3-b7  debug signal see bellow */
223  #else
224    control2 = 0x00 ;
225                         /* b0 = enable speaker A */
226                         /* b1 = enable speaker B */
227                         /* b2 = unused */
228                         /* b3 = unused */
229                         /* b4 = unused */
230                         /* b5 = unused */
231                         /* b6 = unused */
232                         /* b7 = Enable line for the frequency synth. */
233  #endif
234    set_latch1(control1) ;
235    set_latch2(control2) ;
236  }

237  /*-----------------------------------------------------------------
238       DEFINITIONS FOR THE DEBUG LATCH
239       BIT      SIGNAL
240       0        reset niu
241       1        unused
242       2        line to tell the PC that I am ready to receive a byte
243       3        signaling the collection window
244       4        signaling a collision
245       5        talking to the niu
246       6        unused
247       7        unused
248  -----------------------------------------------------------------*/
249  void db_beep_on()
250  {
251    control2 = control2 | 0b00000010 ;
252    set_latch2(control2) ;
253  }

254  void db_beep_off()
255  {
256    control2 = control2 & 0b11111101 ;
257    set_latch2(control2) ;
258  }

259  #if USE_HANDSHAKING
260  void db_I_am_ready()
261  {
262    control2 = control2 | 0b00000100 ;
```

CODE LISTING 1 APPENDIX
COPYRIGHT 1993 SAVI TECHNOLOGY, INC.

module hw.05h 222

```
263     set_latch2(control2) ;
264   }
265   void db_I_am_not_ready()
266   {
267     control2 = control2 & 0b11111011 ;
268     set_latch2(control2) ;
269   }
270   #endif 271   #if DEBUG_SIGNALS
272   void db_coll_start()
273   {
274     control2 = control2 | 0b00001000 ;
275     set_latch2(control2) ;
276   }

277   void db_coll_end()
278   {
279     control2 = control2 & 0b11110111 ;
280     set_latch2(control2) ;
281   }

282   void db_colli_start()
283   {
284     control2 = control2 | 0b00010000 ;
285     set_latch2(control2) ;
286   }

287   void db_colli_end()
288   {
289     control2 = control2 & 0b11101111 ;
290     set_latch2(control2) ;
291   }

292   void db_niu_start()
293   {
294     control2 = control2 | 0b00100000 ;
295     set_latch2(control2) ;
296   }

297   void db_niu_end()
298   {
299     control2 = control2 & 0b11011111 ;
300     set_latch2(control2) ;
301   }
302   #endif
```

CODE LISTING 1 APPENDIX
COPYRIGHT 1993 SAVI TECHNOLOGY, INC.

module hw.h 223

```
1   /*          module hw.h                                      */
2   /*------------------------------------------------------------*/
3   /*          HW.H
4   ------------------------------------------------------------
5           Function prototypes for the hw.05h module 6       $Source: p:/int/RCS/hw.h $ 7   ------------------------------------------------------------*/
8   void set_high_address(int);
9   void set_latch1(int);
10  void set_latch2(int);
11  void enable_device(int);
12  void disable_device();
13  void select_tx(int);
14  void select_rx(int);
15  void Enable_Tx() ;
16  int read_debug_latch();

17  void hw_init();

18  #if USE_HANDSHAKING
19  void db_I_am_ready();
20  void db_I_am_not_ready();
21  #endif 22  #if DEBUG_SIGNALS
23  void db_coll_start();
24  void db_coll_end();
25  void db_colli_start();
26  void db_colli_end();
27  void db_niu_start();
28  void db_niu_end();
29  #endif 30  void db_alive_toggle();
31  void db_alive_on();
32  void db_alive_off();
```

CODE LISTING 1 APPENDIX  
COPYRIGHT 1993 SAVI TECHNOLOGY, INC.

module int.05c 224

```
1   /*              module int.05c                    */
2   /*------------------------------------------------
3       File:$Source: p:/int/RCS/int.05c $

4   *-------------------------------------------------*/

5   #pragma option s2;
6   #include "stddef.h"

7   #include "flags.h"

8   #include "config.h"

9   #if C6805C8
10  #include "c6805c8.h"
11  #else
12  #include "c6805c9.h"
13  #endif 14  #include "int.h"
15  #include "comcmds.h"
16  #include "delaydef.h"
17  #include "scanrssi.h"
18  #include "hw.h"
19  #include "collect.h"

20  void mymain() ;
21  void main()
22  {
23    SEI() ; /* disable interrupts */
24    mymain() ;
25  }

26  #if USE_LCD
27  void show_int_ID() ;
28  #endif
29  unsigned int compute_checksum(int) ;
30  int        check_parity() ;
31  void       check_received_id() ;
32  unsigned int get_niu_cmd() ;
33  unsigned int niu_init() ;
34  void       decode_cmd() ;
35  void       collect_tags() ;
36  void       load_cmp_regs() ;
37  void       put1byte(int a) ;
38  void       wait2txnbytes(int packet, int EOT) ;
39  void       check_status() ;
```

CODE LISTING 1 APPENDIX
COPYRIGHT 1993 SAVI TECHNOLOGY, INC.

module int.05c 225

```
40    void       test_ram() ;
41    void       init_constants() ;
42    void       null_function() ;
43    void       dpot_init() ;
44    void       set_rssi_parameters() ;
45    void       put_byte(int) ;
46    void sci_init() ;
47    uint sci_get() ;
48    uint sci_empty() ;
49    void set_default_windows() ;
50    void set_quick_windows() ;

51    #include "rs232.05h"
52    #include "delays.05h"
53    #include "hw.05h"
54    #include "watchdog.05h"

55    #if USE_LCD
56    #include "lcd.05h"
57    #endif

58    #include "ram.05h"
59    #include "eeprom.05h"

60    #include "clock.05h"

61    #include "dpot.05h"
62    #include "communic.05h"
63    #include "adc.05h"
64    #include "timer.05h"

65    #if USE_NIU
66    #if (RF_LINK==FALSE)
67    #include "niu.05h"
68    #else
69    #include "uib.05h"
70    #endif
71    #else
72    #include "niunull.05h"
73    #endif 74    #include "database.05h"
75    #include "util.05h"
76    #if USE_KBD
77    #include "kbd.05h"
78    #endif
79    #include "io.05h"
```

CODE LISTING 1 APPENDIX  module int.05c 226
COPYRIGHT 1993 SAVI TECHNOLOGY, INC.

```
80   #include "commands.05h"
81   #include "macros.05h"

82   #include "collect.05h"

83   #include "sci.05h"

84   #if DFTAG
85   #include "freqsyn.05h"
86   #include "dftag.05h"
87   #else
88   #include "dftagnil.05h"
89   #endif 90   /* include the sensor tag commands if needed */
91   #if XTAG
92   #include "xtag.05h"
93   #else
94   #include "xtagnil.05h"
95   #endif 96   #include "scanrssi.05h"

97   /*------------------------------------------------*/
98   /*                INIT_PORTS                      */
99   /*------------------------------------------------*/
100  /* See definition of IO lines in CONFIG.H         */
101  /*------------------------------------------------*/
102  void init_ports()
103  {
104    porta = portb = portc = 0x00 ;
105    ddra = DDRA ;
106    ddrb = DDRB ;
107    ddrc = DDRC ;
108    ddrd = DDRD ;
109  }

110  /*------------------------------------------------*/
111  /*                INI_CONSTANTS                   */
112  /*------------------------------------------------*/
113  /* Initialize some variables                      */
114  /*------------------------------------------------*/
115  void init_constants()
116  {
117    with_wakeup   = TRUE ;    /* start without wakeup signal */
118    store_collisions = FALSE ;   /* do not store bad ids and collisions */
```

CODE LISTING 1 APPENDIX
COPYRIGHT 1993 SAVI TECHNOLOGY, INC.

module int.05c 227

```
119     window_factor = 4 ;        /* initially the window size is
120                                   equal to 4 * 50 msec      */
121     expired = FALSE ;

122     int_status.num = 0 ;
123     short_format = FALSE ;     /* default to full report */
124     how_many_wakeups = 3 ;     /* send the wakeup in the 3 antennas */

125     current_tx = wakeup_tx = DEFAULT_TX ;

126     for ( i = 0 ; i < 10 ; i++)
127     {
128       ID[i] = 0x00 ;
129       if (i<PAIR_CRDT_SIZE)
130         tx_credit[i] = DEFAULT_CREDIT << 4 ;  /* initial credit is 1 after 2nd cycle */
131     }                          /* 4/2/92 change default credit to 3   */

132     set_default_windows() ;

133     rssi0=rssi1=rssi2=1 ;
134     i_databasefull = FALSE ;

135   }

136   const char   title[] ="   Interrogator";
137   #if (USE_HANDSHAKING==FALSE)
138   #asm
139   here:
140   #endasm
141   const char title_rev[] =" $Revision:      $";
142   #else
143   #asm
144   here:
145   #endasm
146   const char title_rev[] =" $Revision:      $T";
147   #endif 148   const char copyright[] ="Copyright@1989,1993";
149   const char savi_tech[] =" Savi Technology";

150   const char s_wait_cmd[] = "Wait Cmd";

151   /*------------------------------------------------------------
152                           MAIN
153   ------------------------------------------------------------
154     Main loop of the program. It loops forever receiving commands from
155     the personal computer and calling routines according to the commands
156   ------------------------------------------------------------*/
```

CODE LISTING 1 APPENDIX  module int.05c 228
COPYRIGHT 1993 SAVI TECHNOLOGY, INC.

```
157   void mymain(void)
158   {
159      REGA = OPTION_REGISTER ;        /* this value is defined in config.h */
160                                      /* depending on the memory map */
161   #if C6805C8
162   #asm
163      sta $1fdf
164   #endasm
165   #else
166   #asm
167      sta $3fdf
168   #endasm
169   #endif 170      kick_the_dog();                 /* reset watchdog timer */

171      int_tenth_sec(50) ;             /* wait half a second for the LCD voltage
172                                         to get stable */

173      init_constants() ;              /* Initialize general constants */

174      rs_init() ;                     /* Initialize Serial Interface */

175      sci_init() ;

176      init_ports() ;                  /* Initialize IO ports */

177      hw_init() ;  /* set the default values to latch control1 and control2 */
178      for ( i = 0 ; i < 3 ; i++)
179      {
180        db_beep_on() ;
181        int_tenth_sec(20) ;
182        db_beep_off() ;
183        int_tenth_sec(20) ;
184      }

185      dpot_init() ;                   /* Initialize DPOTs to default value
186                                         that is stored in eeprom */

187      init_timer() ;                  /* Initialize the timer */

188   #if USE_LCD
189      lcd_init() ;                    /* Initialize the LCD display */
190   #if DFTAG
191      show1("--- Savi Locator --- ") ;
192      show2(title_rev);
```

Attorney Docket No. SAVI1001CIP2DEL
del/savi/1001cip2.pa.a1

CODE LISTING 1 APPENDIX  
COPYRIGHT 1993 SAVI TECHNOLOGY, INC.

module int.05c 229

```
193     show3(copyright);
194     show4(savi_tech);
195  #else
196     lcd_clear() ;
197     show1(title);
198     show2(title_rev);
199     show3("   by D.M.A.   ") ;
200     show4(savi_tech);
201     int_tenth_sec(50) ;
202     show3(copyright);
203  #endif
204  #endif 205     ee_init() ;              /* initialize eeprom */

206  #if USE_NIU
207     REGA = niu_init() ;      /* initialize the NIU */
208  #endif 209     DB_init() ;              /* clear external memory */
210     clock_init() ;
211     clock_ram_init() ;       /* write default values to the ram in
212                                 the clock chip */
213  /*
214     alarm_init() ;           /* set the alarm int ID in minutes */
215  */

216  #if USE_LCD
217     lcd_clear() ;
218  #endif 219     db_beep_on() ;
220     int_tenth_sec(20) ;
221     db_beep_off() ;
222     int_tenth_sec(20) ;

223  start_loop:
224     disable_int ;
225     niu_timerh = TimerAltHigh ;   /* Set timer for NIU status checking */
226     niu_timerl = TimerAltLow ;
227     enable_int ;

228     niu_counter = 0 ;

229  #if DFTAG
230     df_init() ;  /* read frequency from eeprom and initialize */

231  #if USE_KBD
```

CODE LISTING 1 APPENDIX  module int.05c 230
COPYRIGHT 1993 SAVI TECHNOLOGY, INC.

```
232    kbd_init() ;
233    kbd_on() ;
234    dftag_main() ;
235   #else
236    df_test() ;
237   #endif 238   #endif 239   #if USE_LCD
240    show_int_ID() ;
241   #endif 242   #if (USE_KBD = = FALSE)
243    while (TRUE)              /* loop forever */
244    {
245      command = NULL_COMMAND ;   /* non-existant command */
246      command_source = RS485 ;   /* default to niu */

247   #if DFTAG
248   #if USE_KBD
249    show2("Press a key to start") ;
250    if (keypressed())
251   #endif
252      df_test() ;
253   #endif 254   #if USE_HANDSHAKING
255        db_I_am_ready() ;
256   #endif
257   #if RF_LINK
258        check_rs232 = FALSE ;
259   #else
260        check_rs232 = TRUE ;
261   #endif
262        if (check_rs232 && rs_inbyte_ready()) /* check status for incoming byte via rs232 */
263           {
264              command = rs_get_inbyte() ;
265              command_source = RS232 ;
266           }
267        else
268           {
269           NOP() ;  /* this instruction is to avoid a compiler bug with
270                   the define line bellow */

271   #if USE_NIU
272          if (clock_read(POOL_NIU))
```

CODE LISTING 1 APPENDIX
COPYRIGHT 1993 SAVI TECHNOLOGY, INC.

module int.05c 231

```
273            {
274    #if DEBUG_SIGNALS
275            db_niu_start() ;
276    #endif
277    #if POLL_SLOW
278            /* This timer block limits NIU status reading to 4 times a second */
279            if (TimerAltHigh - niu_timerh > 49) /* timeout to 25 msec */
280              {
281                niu_counter++ ;
282                niu_timerl = TimerAltLow ;  /* read low byte to finish sequence */

283                niu_timerh = TimerAltHigh ;
284                niu_timerl = TimerAltLow ;
285              }
286            else
287                niu_timerl = TimerAltLow ;  /* read low byte to finish sequence */

288            if (niu_counter >= 10)
289              {
290                check_niu() ;          /* check for command via niu */
291                niu_counter = 0 ;
292              }
293    #else
294            check_niu() ;
295    #endif 296    #if DEBUG_SIGNALS
297            db_niu_end() ;
298    #endif
299            } /* if clock_read(POOL_NIU) */
300          else
301            {
302    #if USE_LCD
303            lcd_gotoxy(16,3) ;
304            show("--") ;
305    #endif
306            NOP() ;
307            }
308    #endif
309          }

310    #if USE_LCD
311                        /* write the current transmitters */
312        lcd_gotoxy(10,1) ;
313        nibble_msg(wakeup_tx+1) ;
314        nibble_msg(current_tx+1) ;
```

CODE LISTING 1 APPENDIX
COPYRIGHT 1993 SAVI TECHNOLOGY, INC.

module int.05c 232

```
315         write_time() ;           /* write time to the LCD */
316                                  /* write the current transmitters */

317     #endif 318         kick_the_dog() ;         /* reset the watchdog timer */

319         if (clock_alarm())       /* check for alarm active */
320         {
321             if (clock_read(ALARM_ACTIVE))   /* scheduled collections active */
322             {
323                 set_next_alarm() ;
324                 set_rssi_parameters() ;
325                 collect_tags() ;
326             }
327         }

328         while (command != NULL_COMMAND)
329         {
330             set_rssi_parameters() ;
331             decode_cmd() ;   /* during collection it is possible that
332                                 we get a new command via NIU.
333                                 If that command is < > from get_int_status,
334                                 the command code will be stored in command.
335                                 If that command is get_int_status it will be
336                                 immediatelly executed and the command byte
337                                 will be reset to NULL_COMMAND
338                              */
339         }
340         /* If any of the rssi is zero then there is a problem with an RF
341            comm boards. Set a flag in the interrogator status */
342         if ((rssi0==0)||(rssi1==0)||(rssi2==0))
343             int_status.bool.4 = 1 ;
344     } /* while (TRUE) */
345 #endif  /* while not kbd */
346 }

347 /*-------------------------------------------------------------
348                     DECODE_CMD
349     ---------------------------------------------------------
350     Call the command corresponding to the command byte
351     ---------------------------------------------------------*/
352 #asm
353 table   fdb collect_tags       ; 0x00
354         fdb filter_report      ; 0x01
355         fdb full_report        ; 0x02
356         fdb check_status       ; 0x03
```

CODE LISTING 1 APPENDIX
COPYRIGHT 1993 SAVI TECHNOLOGY, INC.

module int.05c 233

```
357        fdb program_collection    ; 0x04
358        fdb short_report          ; 0x05
359        fdb set_time              ; 0x06
360        fdb set_mode_byte         ; 0x07
361        fdb set_tx_credit         ; 0x08
362        fdb DB_clear_hash         ; 0x09
363        fdb Tx_Wakeup             ; 0x0A
364        fdb wakeup_on             ; 0x0B
365        fdb wakeup_off            ; 0x0C
366        fdb check_in_tag          ; 0x0D
367        fdb lock_tag              ; 0x0E
368        fdb get_version_tag       ; 0x0F
369        fdb colli_on              ; 0x10
370        fdb colli_off             ; 0x11
371        fdb beeper_on             ; 0x12
372        fdb beeper_off            ; 0x13
373        fdb read_porta_tag        ; 0x14
374        fdb write_portb_tag       ; 0x15
375        fdb sleep_all_tag         ; 0x16
376        fdb squawk_tag            ; 0x17
377        fdb place_tag             ; 0x18
378        fdb get_error_tag         ; 0x19
379        fdb clear_error_tag       ; 0x1A
380        fdb interrupt_hello       ; 0x1B
381        fdb get_int_state         ; 0x1C
382        fdb set_alarm             ; 0x1D
383        fdb set_number_of_wakeups ; 0x1E
384        fdb null_function         ; 0x1F
385        fdb set_wake_tx           ; 0x20
386        fdb test_int_ram          ; 0x21
387        fdb test_int_eeprom       ; 0x22
388        fdb null_function         ; 0x23
389        fdb report_niu_status     ; 0x24
390        fdb null_function         ; 0x25
391        fdb null_function         ; 0x26
392        fdb niu_test_memory       ; 0x27
393        fdb null_function         ; 0x28
394        fdb niu_set_retx          ; 0x29
395        fdb niu_set_timeout       ; 0x2A
396        fdb int_set_id            ; 0x2B
397        fdb niu_disable           ; 0x2C
398        fdb niu_enable            ; 0x2D
399        fdb set_dpot              ; 0x2E
400        fdb null_function         ; 0x2F
401        fdb find_tag              ; 0x30
402        fdb arm_sealtag           ; 0x31
403        fdb set_windows           ; 0x32
404        fdb read_timeout_counter  ; 0x33
```

Attorney Docket No. SAVI1001CIP2DEL
del/savi/1001cip2.pa.a1

CODE LISTING 1 APPENDIX
COPYRIGHT 1993 SAVI TECHNOLOGY, INC.

module int.05c 234

```
405         fdb reset_timeout_counter    ; 0x34
406         fdb sample_rssi              ; 0x35
407         fdb null_function            ; 0x36
408         fdb place_ram                ; 0x37
409         fdb squawk_ram               ; 0x38
410         fdb read_tag_rtc             ; 0x39
411         fdb read_tag_adc             ; 0x3A
412         fdb M_beeper_on              ; 0x3B
413         fdb M_place                  ; 0x3C
414         fdb M_squawk                 ; 0x3D
415         fdb get_int_version          ; 0x3E
416         fdb read_eeprom              ; 0x3F
417         fdb write_eeprom             ; 0x40
418         fdb set_power                ; 0x41
419         fdb start_broadcast          ; 0x42
420         fdb stop_broadcast           ; 0x43
421         fdb set_freq_syn             ; 0x44
422         fdb ping_tag                 ; 0x45
423         fdb null_function            ; 0x46
424         fdb angle_tag                ; 0x47
425         fdb alarm_on                 ; 0x48
426         fdb alarm_off                ; 0x49
427         fdb read_time                ; 0x4A
428         fdb receiv_on                ; 0x4B
429         fdb receiv_off               ; 0x4C
430         fdb DB_report_timing         ; 0x4D
431         fdb cont_wakeup              ; 0x4E
432         fdb null_launch              ; 0x4F
433         fdb null_launch              ; 0x50

434         ; The following entries are reserved for
435         ; Launch Station commands
436         fdb null_launch              ; 0x51
437         fdb null_launch              ; 0x52
438         fdb null_launch              ; 0x53
439         fdb null_launch              ; 0x54
440         fdb null_launch              ; 0x55
441         fdb null_launch              ; 0x56

442         ; The following entries are reserved for
443         ; SealTag II command
444         fdb null_sealtag2            ; 0x57
445         fdb null_sealtag2            ; 0x58
446    #endasm 447    const char s_232[]=" 232";
448    const char s_485[]=" 485";
449    const char s_cmd[]="CMD ";
```

CODE LISTING 1 APPENDIX
COPYRIGHT 1993 SAVI TECHNOLOGY, INC.

module int.05c 235

```
450   /*
451   const int arguments[] = {0,1,0,0,4,0,3,1,3,0,0,0,0,3,0,3,
452                            0,0,3,3,3,3,5,6,3,3,0,0,3,1,0,
453                            1,0,0,0,0,4,0,0,0,1,2,2,0,0,2,0,
454                            3,9,5,0,0,0,0,-1,6,3,0,3,-1,5,0,2,
455                            -1,2,0,0,-2,-2,-2,-2,0,0,0,0,0} ;
456   */

457   void decode_cmd()
458   {
459   #if USE_LCD
460     show1(s_cmd) ;
461     accumula_msg(command) ;
462     if (command_source == RS232) show(s_232) ;
463     else show(s_485) ;
464     lcd_clrline(2) ;
465   #endif 466   /*
467   /* verify that the commands has the right number of arguments */
468     if (command_source == RS485)
469       {
470         if (arguments[command] != packet_length-1)
471           {
472           /* flush the buffer */
473           for ( i = 0 ; i < packet_length-1 ; i++)
474             REGA = niu_get_byte() ;
475           command = LARGEST_COMMAND ; /* set it to this to show the error */
476           }
477       }
478   */

479     current_command = command ;
480     if ((current_command=command) <= LARGEST_COMMAND)
481       {
482   #asm
483         lsla             ; multiply index by 2
484         tax
485         lda table,x      ; load high byte of the address
486         sta jmp_add_high
487         lda table+1,x    ; load low byte of the address
488         sta jmp_add_low
489         lda #NULL_COMMAND
490         sta command      ; set the command code to ff
491         lda #$CC         ; set the op code for the jmp
492         sta jmp_code
493         jsr jmp_code     ; call the appropriate command as a subroutine
494         rts
```

CODE LISTING 1 APPENDIX
COPYRIGHT 1993 SAVI TECHNOLOGY, INC.

module int.05c 236

```
495   #endasm
496     }
497   else
498     {
499       NOP() ;
500   #if USE_LCD
501       show2("BAD") ;
502       accumula_msg(command) ;
503   /*  STOP() ;*/
504   #endif
505       command = NULL_COMMAND ;
506     } /* switch */
507   }

508   /*-------------------------------------------------
509                    INT_LINE_LOW
510   ---------------------------------------------------
511   Return TRUE if the interrupt line is low, FALSE otherwise
512   ---------------------------------------------------*/
513   int int_line_low()
514   {
515   #asm
516           BIL     ISLOW
517           CLRA                    ; set A to False
518           RTS
519   ISLOW   LDA     #$01            ; set A to True
520   #endasm
521   }

522   /*-------------------------------------------------
523                    EXTERNAL_INT
524   ---------------------------------------------------
525   Interrupt service routine. It is activated when an external interrupt
526   is received. This happens when the user pushes the button to star
527   the collection process. After it debounces the key it calls collect_tags
528   to start the collection process.

529   NOTE: Even though the clock is connected to IRQ it is not interrupting
530         it is being polled for ALARM condition. Because we could be in the
531         middle of a communication or collection during a scheduled
532         collect and we would not want to interrupt something in progress.
533   ---------------------------------------------------*/
534   void external_int()
535   {
536     if (int_line_low())
```

CODE LISTING 1 APPENDIX
COPYRIGHT 1993 SAVI TECHNOLOGY, INC.

module int.05c 237

```
537            {
538                    five_msec() ;              /* int button pushed */
539                    while (int_line_low());    /* wait until line goes high */
540                set_rssi_parameters() ;
541            collect_tags();
542         }
543     }

544     #if USE_LCD
545     void show_int_ID()
546     {
547      /* write the interrogator ID */
548         lcd_gotoxy(13,1) ;
549         show(s_id);   /* print "ID=", s_id defined in commands.05h */
550         accumula_msg(ee_read(EE_ID_HIGH)) ;
551         accumula_msg(ee_read(EE_ID_LOW)) ;
552     }
553     #endif 554     void null_function(){} ;
555     void null_launch(){} ;
556     void null_sealtag2() {} ;
557     char last_var ;
```

CODE LISTING 1 APPENDIX  
COPYRIGHT 1993 SAVI TECHNOLOGY, INC.

module int.h 238

```
1   /*          module int.h                    */
2   /*
3    * $Source: p:/int/RCS/int.h $
4    */

5   #define enable_int  CLI
6   #define disable_int SEI

7   /*----------------------------------*/
8   /* Place to store the incoming tag ID  */
9   /* and associated information          */
10  /*----------------------------------*/
11  unsigned int ID      [10]    ;
12  unsigned int ID0            @ ID ;   /* 3 bytes for the ID code */
13  unsigned int ID1            @ ID+1 ;
14  unsigned int ID2            @ ID+2 ;
15  unsigned int cycle_counter  @ ID+3 ;  /* when was the tag heard */
16  unsigned int TX_RX          @ ID+4 ;  /* what channel was used */
17  unsigned int RSSI           @ ID+5 ;  /* received "power" */
18  unsigned int tag_error_code @ ID+6 ;  /* debug information */
19  unsigned int EXT0           @ ID+7 ;  /*       "          */
20  unsigned int EXT1           @ ID+8 ;  /*       "          */
21  unsigned int EXT2           @ ID+9 ;  /*       "          */
22  /*----------------------------------*/

23  /*----------------------------------*/
24  /* Place to store the ID of the tag with */
25  /* which we want to talk              */
26  /*----------------------------------*/
27  unsigned int target_ID0   ;
28  unsigned int target_ID1   ;
29  unsigned int target_ID2   ;
30  /*----------------------------------*/

31  /* Buffer to receive/send data from/to the tag */
32  #define BUFFER_SIZE 16
33  unsigned int buffer [BUFFER_SIZE] ;

34  /*----------------------------------*/
35  /* In this place I put the instruction  */
36  /* jmp xxxx, where xx is the location of */
37  /* a routine. That location is written  */
38  /* here by the decode_command routine   */
39  /* that gets the address from a table   */
40  /* see decode_command routine in int.05c */
41  /*----------------------------------*/
```

CODE LISTING 1 APPENDIX
COPYRIGHT 1993 SAVI TECHNOLOGY, INC.

module int.h 239

```
42    unsigned int jmp_code     ;
43    unsigned int jmp_add_high ;
44    unsigned int jmp_add_low  ;

45    /*------------------------------------*/
46    /*       define boolean flags       */
47    /*------------------------------------*/
48    bits flags ;
49    #define database_full   flags.0
50    #define with_wakeup     flags.1
51    #define store_collisions flags.2
52    #define got_one_tag     flags.3
53    #define got_one_header  flags.4
54    #define complete_check  flags.5
55    #define short_format    flags.6
56    #define check_rs232     flags.7
57    /*------------------------------------*/

58    /*------------------------------------*/
59    /* Variables used to measure the length */
60    /* of the incoming signal           */
61    /*------------------------------------*/
62    unsigned int start ;
63    unsigned int length ;

64    /*------------------------------------*/

65    unsigned int rf_data ;
66    unsigned int window_counter ;
67    unsigned int window_factor ; /* multiplying factor for the
68                                    50 msec window size */
69    unsigned int error_code ;

70    /* variables used for place and squawk */
71    unsigned int number_of_bytes ;
72    unsigned int starting_at ;

73    #if XTAG
74    union twobyte address ; /* used to store 2 byte address for Tag RAM */
75    #endif 76    /* variable used to store a tag command. Used when different commands
77       call a same 'macro' routine */
78    unsigned int command_code ;

79    unsigned int i ;
80    unsigned int j ;
```

CODE LISTING 1 APPENDIX  
COPYRIGHT 1993 SAVI TECHNOLOGY, INC.

module int.h 240

```
81   unsigned int temph;
82   unsigned int templ;

83   unsigned int timer_counter ;

84   unsigned int niu_timerl ;    /* counters used to check niu 4X a second */
85   unsigned int niu_timerh ;
86   unsigned int niu_counter ;

87   unsigned int packet_length ;

88   /* define default antenna for direct commands */
89   #define DEFAULT_TX    0

90   /* variables containing the current transmitter and receiver */
91   unsigned int current_tx ;
92   unsigned int current_rx ;
93   unsigned int wakeup_tx ;     /* tx used for wakeup */
94   unsigned int how_many_wakeups ;   /* how many wakeups will be sent every time*/

95   #define DEFAULT_CREDIT 3

96   #if (DFTAG)
97   unsigned int tx_credit[1] ;    /* keep name to avoid errors */
98   #else
99   #define PAIR_CRDT_SIZE 3
100  unsigned int tx_credit[PAIR_CRDT_SIZE];    /* array to keep credit for all channels */
101  #endif 102  unsigned int tx_mask ;         /* mask to select tx. It is used together
103                                     with the mode byte */

104  unsigned int initial_credit ;   /* credit for each tx rx pair */

105  long ram_old_add ;
106  long ram_aux ;

107  union both int_status ;        /* interrogator status */
108  #define i_programmed    int_status.bool.0
109  #define i_collecting    int_status.bool.3
110  #define i_databasefull  int_status.bool.7

111  unsigned int expired ;         /* used to indicate that the listening */
112                                 /* window has expired when receiving   */
113                                 /* the header                          */

114  unsigned int command ;         /* variable to keep the last command */
```

CODE LISTING 1 APPENDIX
COPYRIGHT 1993 SAVI TECHNOLOGY, INC.

module int.h 241

```
115                         /* received via RS232 or RS485     */
116   unsigned int current_command ;   /* variable to keep the command in  */
117                         /* execution currently           */
118   unsigned int command_source ;    /* use to identify the source of the */
119                         /* command                   */
120   #define RS232 0
121   #define RS485 1

122   unsigned long tag_counter ;

123   unsigned int window_1[3] ;
124   unsigned int window_2 ;
125   unsigned int window_3 ;

126   unsigned int data ;

127   unsigned int use_niu ;  /* boolean to decide if we want to pool the NIU */

128   /*--------- Variables for rssi detection see scanrssi.05h -------- */
129   unsigned int rssi_detect_thresh;    /* detect level above noise */
130   unsigned int rssi_accept_thresh;    /* exclude low power from db */
131   unsigned int max_rssi;              /* maximum detected rssi level */
132   unsigned int rssi0, rssi1, rssi2;
133   unsigned int rssi_array[3] @ rssi0 ;

134   /*-------------------------------------------------------*/
135   /* Define maximum size of the eeprom                */
136   /* 0x7F -> 1Kbit, 0xFF -> 2Kbit                     */
137   /*-------------------------------------------------------*/
138   #define EEPROM_MAX 0x7F 139   /*-------------------------------------------------------*/
140   /* Define addresses for variables stored in the real time */
141   /* clock chip                              */
142   /* Locations 0x00 to 0x0D are used by the real time clock */
143   /* The rest is used as general purpose RAM space       */
144   /*-------------------------------------------------------*/
145   #define START_ADD     0x0E 146   #define CHECKSUM_BYTE  START_ADD + 0
147   #define COM_MODE_BYTE  START_ADD + 1
148   #define START_TIME_HR  START_ADD + 2
149   #define START_TIME_MIN START_ADD + 3
150   #define TIME_INTVL_HR  START_ADD + 4
151   #define TIME_INTVL_MIN START_ADD + 5
```

CODE LISTING 1 APPENDIX
COPYRIGHT 1993 SAVI TECHNOLOGY, INC.

module int.h 242

```
152   /* indicate is the scheduled collects are active or not */
153   #define ALARM_ACTIVE   START_ADD + 6
154   #define AVAILABLE0     START_ADD + 7
155   #define AVAILABLE1     START_ADD + 8

156   #define MANUF_CODE     START_ADD + 9
157   #define CONFIG_BYTE    START_ADD + 10

158   #define TIMEOUT_COUNTER START_ADD + 11
159   #define TRANSMITTER    START_ADD + 12

160   /* variables to store the time when the last collection was started */
161   #define HOUR_LAST_COLL START_ADD + 13
162   #define MIN_LAST_COLL  START_ADD + 14
163   #define SEC_LAST_COLL  START_ADD + 15

164   /* variable to decide if we want to pool the NIU in the main loop */
165   #define POOL_NIU       START_ADD + 16

166   /* signature for normal power down sequence. When power fails */
167   #define SIGN_HIGH      START_ADD + 17
168   #define SIGN_LOW       START_ADD + 18

169   /*-----------------------------------------------------------*/
170   /* Define addresses for variables stored into the EEPROM */
171   /*-----------------------------------------------------------*/

172   /* location for the interrogator ID */
173   #define EE_ID_HIGH     0x10
174   #define EE_ID_LOW      0x11

175   /* levels of power (DPOT values) for wakeup, general commands and data */
176   #define COMMANDS_POWER 0x12
177   #define WAKEUP_POWER   0x13
178   #define DATA_POWER     0x14

179   /* rssi_select and rssi_accept are set to the rssi_background
180      plus these variables */
181   #define RSSI_DETECT_DELTA   0x15
182   #define RSSI_ACCEPT_DELTA   0x16

183   #if DFTAG
184   /* value for the frequency synthesizer for DFTAG */
185   #define FREQ_SYNTH     0x14
186   #endif
```

CODE LISTING 1 APPENDIX  
COPYRIGHT 1993 SAVI TECHNOLOGY, INC.

module io.05h 243

```
1   /*              module io.05h                              */
2   /*------------------------------------------------------------
3                   IO
4                   for the Interrogator V3.0
5   $Source: p:/int/RCS/io.05h $ 6   These are general IO routines that select RS483 or RS232
7   depending on the value of command_source (port from which
8   the command was received)
9   ------------------------------------------------------------*/

10  /*-----------------------------------------------------------
11                  GET_BYTE
12  ------------------------------------------------------------
13  This routine receives a byte from RS232 or RS485 (NIU) depending on
14  the value of command_source.
15  ------------------------------------------------------------*/
16  int get_byte()
17  {
18  #if USE_NIU
19    if (command_source == RS232)
20      return(rs_get_byte()) ;
21    else
22      return(niu_get_byte()) ;
23  #else
24    return(rs_get_byte()) ;
25  #endif
26  }

27  /*-----------------------------------------------------------
28                  PUT_BYTE
29  ------------------------------------------------------------
30  This routine sends a byte to the RS232 or RS485 (NIU) depending on
31  the value of command_source.
32  ------------------------------------------------------------*/
33  void put_byte(data_out)
34  registerx data_out ;
35  {
36  #if USE_NIU
37    if (command_source == RS232)
38      rs_put_byte(data_out) ;
39    else
40      niu_put_byte(data_out) ;
41  #else
42    rs_put_byte(data_out) ;
43  #endif
```

Attorney Docket No. SAVI1001CIP2DEL  
del/savi/1001cip2.pa.a1

CODE LISTING 1 APPENDIX
COPYRIGHT 1993 SAVI TECHNOLOGY, INC.

module io.05h 244

```
44    }

45    /*--------------------------------------------------------------
46                      PUT1BYTE
47    ---------------------------------------------------------------
48    This routine sends a packet of information that consists of only
49    1 byte. The data goes to rs232 or rs485 according to the value of
50    command_source.
51    ---------------------------------------------------------------*/
52    void put1byte(packet2)
53    unsigned int packet2 ;
54    {
55    #if USE_NIU 56      if (command_source == RS485)
57        {
58        wait2txnbytes(1, EOT_DATA_PACKET) ; /* send the header to the NIU */
59        niu_put_byte(packet2) ;    /* send the data byte */
60        }
61      else
62        rs_put_byte(packet2) ;
63    #else
64      rs_put_byte(packet2) ;
65    #endif
66    }
```

CODE LISTING 1 APPENDIX  
COPYRIGHT 1993 SAVI TECHNOLOGY, INC.

module lcd.05h 245

```
1   /*          module lcd.05h              */
2   /*------------------------------------------------------------
3                    LCD DRIVER
4                for the Interrogator V3.0

5   $Source: p:/int/RCS/lcd.05h $

6   ------------------------------------------------------------*/

7   /* interface for lcd driver */
8   /*
9   void lcd_init() ;
10  void lcd_shift() ;
11  void lcd_clear() ;
12  void lcd_move(int a;) ;
13  void lcd_write(int a;) ;
14  void lcd_line(int a;) ;
15  int  lcd_column() ; /* this is actually a define */
16  int  lcd_row() ;    /*          "               */
17  */

18  /* internal function */
19  void lcd_clear() ; /* define it so lcd_init knows it */
20  void lcd_wait_ready() ;
21  void lcd_present() ;

22  #define select_lcd   enable_device(D_LCD)
23  #define deselect_lcd disable_device()

24  #define cmd_mode     porta.0 = 0
25  #define data_mode    porta.0 = 1
26  /* the two next definitions assume that the lcd is enabled */
27  /* The "E" bellow refers to the line going to the LCD. That is
28     why the polarity looks inverted */
29  #define E_high       portc.1 = 0
30  #define E_low        portc.1 = 1
31  #define read_mode    portc.2 = 1
32  #define write_mode   portc.2 = 0
33  #define busy_bit     portb.7

34  /*------------------------------------------------------------
35                    LCD_COLUMN
36  ------------------------------------------------------------
37    Return the column where the cursor is located.
38  ------------------------------------------------------------*/
39  #define lcd_column() c_column
```

CODE LISTING 1 APPENDIX  
COPYRIGHT 1993 SAVI TECHNOLOGY, INC.

module lcd.05h 246

```
40    /*-----------------------------------------------------------
41                    LCD_ROW
42    -----------------------------------------------------------
43    Return the row where the cursor is located.
44    -----------------------------------------------------------*/
45    #define lcd_row()    c_line 46    /*-----------------------------------------------------------
47    This variable is local to lcd unit. Before I used the register A
48    but now it is being used to control the low level hardware.
49    NOTE THAT THERE ARE 3 ALIASES FOR THIS VARIABLE TO SAVE MEMORY
50    LOCATIONS.
51    -----------------------------------------------------------*/
52    unsigned int lcd_variable ;
53    #define l_character   lcd_variable
54    #define l_line        lcd_variable
55    #define l_location    lcd_variable 56    /* these two variables keep track of the cursor location */
57    unsigned int c_line ;
58    unsigned int c_column ;

59    /* variable to tell if the lcd was detected in the unit */
60    unsigned int lcd_exists ;

61    /* auxiliary function that sends the commands to the LCD */
62    void send_lcd_cmd(int lcd_var)
63    {
64      E_high ;
65      portb = lcd_var ;
66      E_low ;
67      lcd_wait_ready() ;
68    }

69    /*-----------------------------------------------------------
70                    LCD_INIT
71    -----------------------------------------------------------
72    Initialize the LCD display by following the directions in the manual
73    AND, lcd and lcd products.Display Products Catalog 1988. (red cover)
74    -----------------------------------------------------------*/
75    void lcd_init()
76    {
77      lcd_exists = FALSE ;        /* set it to false initially to
78                                     avoid checking the busy bit
79                                     in send_lcd_cmd */
```

CODE LISTING 1 APPENDIX  
COPYRIGHT 1993 SAVI TECHNOLOGY, INC.

module lcd.05h 247

```
80    int_tenth_sec(2) ;              /* wait 20 msec */
81    select_lcd ;
82    cmd_mode ;
83    send_lcd_cmd(0x38) ;             /* function set */
84    int_tenth_sec(1) ;               /* wait 10 msecs */
85    send_lcd_cmd(0x38) ;             /* function set */
86    int_tenth_sec(1) ;               /* wait 10 msecs */
87    send_lcd_cmd(0x38) ;             /* function set */
88    one_msec() ;
89    send_lcd_cmd(0x38) ;             /* function set */
90    one_msec() ;

91    send_lcd_cmd(0x0C) ;             /* turn display on */
92    one_msec() ;
93    send_lcd_cmd(0x01) ;             /* clear display */
94    int_tenth_sec(1) ;               /* 10 msec */
95    send_lcd_cmd(0x06) ;             /* set entry mode */
96    int_tenth_sec(1) ;               /* wait 10 msec */
97    deselect_lcd ;

98    lcd_present() ;      /* check if the lcd is present and
99                            set the lcd_exists flag accordingly */
100   }

101   /*------------------------------------------------------
102                  LCD_WAIT_READY
103   ------------------------------------------------------
104   Wait until the lcd is ready to send another command or data
105   If the LCD is not ready in 20 msec I simply return
106   ------------------------------------------------------*/
107   void lcd_wait_ready()
108   {
109     if (lcd_exists)
110     {
111       data_bus_dir = 0x00 ;    /* define data bus as input */
112       read_mode ;              /* move up the wr\ line . Set read mode */

113       disable_int() ;
114       temph = TimerAltHigh ;
115       templ = TimerAltLow ;
116       enable_int() ;
117       do
118       {
119         E_low ;
120         E_high ;
121         disable_int() ;
122         if (TimerAltHigh-temph > 0x22) /* timeout to 20 msec */
123         {
```

CODE LISTING 1 APPENDIX  module lcd.05h 248
COPYRIGHT 1993 SAVI TECHNOLOGY, INC.

```
124            temph = TimerAltLow ;    /* read low byte to complete the sequence */
125            enable_int() ;
126            goto lcd_done ;
127         }
128         else
129         {
130            REGA = TimerAltLow ;
131            enable_int() ;
132         }
133       }
134       while(busy_bit == 1) ;
135  lcd_done:
136       E_low ;
137       write_mode ;              /* return to write mode */
138       data_bus_dir = 0xFF ;
139  }
140  }

141  /*------------------------------------------------------------
142                    LCD_CLEAR
143  ------------------------------------------------------------
144     Clear the LCD display
145  ------------------------------------------------------------*/
146  void lcd_clear()
147  {
148       select_lcd ;
149       send_lcd_cmd(0x01) ;   /* clear display */
150       int_tenth_sec(1) ;
151       deselect_lcd ;
152       c_line = c_column = 1 ;
153  }

154  /*------------------------------------------------------------
155                    LCD_MOVE
156  ------------------------------------------------------------
157     Move the cursor to the location indicated in the argument
158  ------------------------------------------------------------*/
159  void lcd_move(l_location)
160  {
161       select_lcd ;
162       E_high ;
163       portb = 0b10000000 | l_location ;
164       E_low ;
165       lcd_wait_ready() ;
166       deselect_lcd ;
167  }
```

CODE LISTING 1 APPENDIX
COPYRIGHT 1993 SAVI TECHNOLOGY, INC.

module lcd.05h 249

```
168    /*------------------------------------------------------------
169                       LCD_WRITE
170    ------------------------------------------------------------
171       Write one character to the current lcd location.
172    ------------------------------------------------------------*/
173    void lcd_write(l_character)
174    {
175        select_lcd ;
176        data_mode ;     /* enter in data write mode */
177        E_high ;
178        portb = l_character ;
179        E_low ;
180        cmd_mode ;      /* exit data mode */
181        lcd_wait_ready() ;
182        deselect_lcd ;
183        c_column++ ;    /* increment location of the cursor */
184    }

185    /*------------------------------------------------------------
186                       lcd_gotoXY
187    ------------------------------------------------------------
188       Move the cursor to the indicated location
189    ------------------------------------------------------------*/
190    const lcdoffset[] = {0x00,0x40,0x14,0x54} ;
191    void lcd_gotoxy(c_column, c_line)
192    {
193        lcd_move(lcdoffset[c_line-1]+c_column);
194    }

195    /*------------------------------------------------------------
196                       LCD_LINE
197    ------------------------------------------------------------
198       Move the cursor to the beginning of l_line
199    ------------------------------------------------------------*/
200    void lcd_line(c_line)
201    {
202        lcd_gotoxy(0,c_line);
203    }

204    /*------------------------------------------------------------
205                       LCD_CLRLINE
206    ------------------------------------------------------------
207       Erase the line and leave the cursor at the beginning of the line
208    ------------------------------------------------------------*/
209    void lcd_clrline(c_line)
210    {
```

CODE LISTING 1 APPENDIX  module lcd.05h 250
COPYRIGHT 1993 SAVI TECHNOLOGY, INC.

```
211       lcd_line(c_line) ;
212       for ( templ = 0 ; templ < 20 ; templ++)
213          lcd_write(' ') ;
214       lcd_line(c_line) ;
215    }

216   /*================================================
217   ====================
218   This stuff here came from the old MSGS.05h file, mainly show() and accumula_msg()
219   ==================================================
220   ====================*/

221   unsigned int acc1, acc2;  /* temporary accumulators */

222   /* SHOW_LINE must be immediately before show! */
223   /* it restores A and X and falls into show    */
224   #asm
225   show_line:              ;lable to jump to for showN()
226          jsr lcd_line
227          lda acc1    ;restore pointer to data
228          ldx acc2

229   #endasm
230   /*-----------------------------------------------
231                    SHOW
232   ------------------------------------------------
233   This routine prints a character string to the LCD
234   ------------------------------------------------*/
235   void show(char *m)
236   {
237       while ((REGA = *m++) != 0)
238          lcd_write(REGA) ;
239   }

240   /*-----------------------------------------------
241                    SHOWn()
242   ------------------------------------------------
243   These routines show the data on the given line
244   They are written this way to save ram space for temporary
245   pointer variables.
246   ------------------------------------------------*/

247   void show1(char *m);
248   void show2(char *m);
249   void show3(char *m);
250   void show4(char *m);
```

CODE LISTING 1 APPENDIX  
COPYRIGHT 1993 SAVI TECHNOLOGY, INC.

module lcd.05h 251

```
251  #asm
252  show1:
253          sta acc1
254          stx acc2
255          lda #1
256          bra show_line
257  show2:
258          sta acc1
259          stx acc2
260          lda #2
261          bra show_line
262  show3:
263          sta acc1
264          stx acc2
265          lda #3
266          bra show_line
267  show4:
268          sta acc1
269          stx acc2
270          lda #4
271          bra show_line
272  #endasm 273  /*----------------------------------------------------------------
274  ;          write the ASCII character ch to the LCD
275  ----------------------------------------------------------------*/
276  #define putc_msg(ch)   lcd_write(ch)

277  /*----------------------------------------------------------------
278  ;          write 1 digit number to the lcd
279  ----------------------------------------------------------------*/
280  void nibble_msg(registera acc_temp)
281  {
282    if ( acc_temp > 9)
283       acc_temp += 7 ;
284    lcd_write(0x30 + acc_temp) ;
285  }

286  /*----------------------------------------------------------------
287  ;          write a byte as hex (2 digits) to the LCD
288  ----------------------------------------------------------------*/
289  void accumula_msg(acc)
290  registera acc;
291  {
292    acc1 = acc;
293    nibble_msg(acc1 >> 4) ;
```

CODE LISTING 1 APPENDIX
COPYRIGHT 1993 SAVI TECHNOLOGY, INC.

module lcd.05h 252

```
294     nibble_msg(acc1 & 0x0F) ;
295   }

296   /*-----------------------------------------------------------------*/
297   const char msg_code[]="C=";
298   void code_msg()
299     {
300       lcd_line(2) ;
301       show(msg_code) ;
302       accumula_msg(error_code) ;
303     }

304   /*-----------------------------------------------------------------*/
305   const char msg_tx[]="TX=";
306   void show_tx() {
307    show2(msg_tx) ;
308   }

309   /*----------------------------------------------------------
310                       LCD_PRESENT
311   -----------------------------------------------------------
312      Check for the existence of an LCD by writing a character to the screen
313      and waiting for the busy flag to return to zero.  If an LCD exists,
314      the variable lcd_exists will be set to TRUE. When this routine is
315      called lcd_exists MUST be FALSE.
316   -----------------------------------------------------------*/
317   void lcd_present()
318   {
319      select_lcd ;

320      send_lcd_cmd(0x01) ;  /* send cmd to clear lcd */

321      data_bus_dir = 0x00 ;

322   /* check that the busy bit is high */
323      read_mode ;
324      E_low ;
325      E_high ;
326      if (busy_bit == 0)
327         goto check_done ;      /* lcd_exists will continue being FALSE */

328   /* wait 10 milliseconds */
329      int_tenth_sec(1) ;

330   /* the busy bit should be low now */
331      if (busy_bit == 0)
```

CODE LISTING 1 APPENDIX
COPYRIGHT 1993 SAVI TECHNOLOGY, INC.

module lcd.05h 253

```
332      lcd_exists = TRUE ;

333    check_done:
334      write_mode ;           /* return to write mode */
335      data_bus_dir = 0xFF ;
336      deselect_lcd ;
337    }
```

CODE LISTING 1 APPENDIX
COPYRIGHT 1993 SAVI TECHNOLOGY, INC.

module macros.05h 254

```
1   /*            module macros.05h              */
2   /*-----------------------------------------------------------*/
3   /*              MACROS.05h
4       This file contains maacro commands. These are formed by succesive
5       calls to some of the original commands which are in int.05c and in
6       commands.05h
7   -----------------------------------------------------------

8   $Source: p:/int/RCS/macros.05h $

9   -----------------------------------------------------------*/

10  /*-----------------------------------------------------------*/
11  /*              AWAKE_ONE_TAG                  */
12  /*-----------------------------------------------------------*/
13  /* This function gets the tag id, sends the wakeup signal, and puts */
14  /* all the other tags to sleep. It is equivalent to a direct wakeup */
15  /* command.                                    */
16  /*-----------------------------------------------------------*/
17  void awake_one_tag()
18  {
19    get_target_id() ;

20    Tx_Wakeup() ;
21    /* put all other tags to sleep */
22    SEND_1BYTE_CMD(ALL_SLEEP_CMD) ;
23    send_target_id() ;
24  }

25  /*-----------------------------------------------------------*/
26  /*              FIND_TAG                       */
27  /*-----------------------------------------------------------*/
28  /* This is a find tag implemented as a macro check-in command   */
29  /*-----------------------------------------------------------*/
30  void find_tag()
31  {
32    awake_one_tag() ;

33    check_in_tag() ;

34    /* Put this tag to sleep */
35    SEND_1BYTE_CMD(SLEEP_CMD) ;
36    send_target_id() ;

37    Disable_Tx() ;
38  }
```

CODE LISTING 1 APPENDIX  module macros.05h 255
COPYRIGHT 1993 SAVI TECHNOLOGY, INC.

```
39   /*-------------------------------------------------*/
40   /*              M(ACRO)_BEEPER_ON              */
41   /*-------------------------------------------------*/
42   /* Send Wakeup, put all other tags to sleep and beep the tag   */
43   /*-------------------------------------------------*/
44   void M_beeper_on()
45   {
46     awake_one_tag() ;
47     beep_tag(ON) ;
48   }

49   /*-------------------------------------------------*/
50   /*              M(ACRO)_PLACE                  */
51   /*-------------------------------------------------*/
52   /* Send Wakeup, put all other tags to sleep and do the place   */
53   /*-------------------------------------------------*/
54   void M_place()
55   {
56     awake_one_tag() ;
57     command_code = PLACE_CMD ;
58     do_place_tag() ;
59   }

60   /*-------------------------------------------------*/
61   /*              M(ACRO)_SQUAWK                 */
62   /*-------------------------------------------------*/
63   /* Send Wakeup, put all other tags to sleep and do the squawk   */
64   /*-------------------------------------------------*/
65   void M_squawk()
66   {
67     awake_one_tag() ;
68     command_code = SQUAWK_CMD ;
69     do_squawk_tag() ;
70   }
```

CODE LISTING 1 APPENDIX
COPYRIGHT 1993 SAVI TECHNOLOGY, INC.

module niu.05h 256

```
1   /*           module niu.05h                              */

2   /*-----------------------------------------------------*/
3   /*              NIU.05H
4   ------------------------------------------------------

5   $Source: p:/int/RCS/niu.05h $

6   Unit to interact with the NIU using the SPI interface
7   For hardware configuration, see schematic for Interrogator V3.0

8   "Tricks" :
9           the ss line in the slave is kept normally high to allow
10          the slave to write to its own shift register. When the
11          actual shift of data takes place the master sets the ss line
12          high (after it checks that the ready line was set high by
13          the niu).
14  -----------------------------------------------------*/
15  #define NIU_GET_STATUS       0x00
16  #define NIU_SEND_DATA        0x01
17  #define NIU_GET_DATA         0x02
18  #define NIU_TEST_MEMORY      0x03
19  #define NIU_TEST_485         0x04
20  #define NIU_SET_RETX         0x05
21  #define NIU_SET_TIMEOUT      0x06
22  #define NIU_SET_ID           0x07
23  #define NIU_DISABLE_485      0x08
24  #define NIU_ENABLE_485       0x09
25  #define NIU_EOT              0x0A 26  #define NIU_RXRD   niu_status.bool.7
27  #define NIU_TXRD   niu_status.bool.6
28  #define NIU_TXERR  niu_status.bool.5
29  #define NIU_RXERR  niu_status.bool.4
30  #define NIU_MERR   niu_status.bool.3
31  #define NIU_IERR   niu_status.bool.2

32  #define MASTER 0b01011111
33  #define SLAVE  0b01001111
34                  /* b7 = 0 SPI interrupt disable */
35                  /* b6 = 1 SPI system enable */
36                  /* b5 = 0 portd normal CMOS outputs */
37                  /* b4 = 1 master , 0 slave*/
38                  /* b3 = 1 CPOL clock polarity,clock normally high */
39                  /* b2 = 1 CPHA = clock phase */
40                  /* b1b0 = 00 1  MHz clock */
```

CODE LISTING 1 APPENDIX  module niu.05h 257
COPYRIGHT 1993 SAVI TECHNOLOGY, INC.

```
41                    /* b1b0 = 01 500  kHz clock */
42                    /* b1b0 = 10 125  kHz clock */
43                    /* b1b0 = 11 62.5 KHz clock */

44   #pragma  portrw SPI_CONTROL  @ 0x0A ;
45   #pragma  portrw SPI_STATUS   @ 0x0B ;
46   #pragma  portrw SPI_DATA     @ 0x0C ;

47   #define  NIU_READY portd.7

48   /* indicate that we want to send an EOT DATA packet */
49   #define EOT_DATA_PACKET      1
50   /* indicate that we want to send a REGULAR DATA packet */
51   #define REGULAR_DATA_PACKET  0

52   struct both niu_status ;
53   int niu_get_status() ;
54   unsigned int unit_ID ;
55   /*----------------------------------------------------
56                   SS_SLAVE_LOW
57   ----------------------------------------------------
58   Set the SS line in the slave to low. SS line is bit 7 in latch1
59   ----------------------------------------------------*/
60   void ss_slave_low()
61   {
62     control1 &= 0b01111111 ;
63     set_latch1(control1) ;
64   }

65   /*----------------------------------------------------
66                   SS_SLAVE_HIGH
67   ----------------------------------------------------
68   Set the SS line in the slave to high. SS line is bit 7 in latch1
69   ----------------------------------------------------*/
70   void ss_slave_high()
71   {
72     control1 |= 0b10000000 ;
73     set_latch1(control1) ;
74   }

75   /*----------------------------------------------------
76                   CHECK_TIMER
77   ----------------------------------------------------*/
78   void check_timer()
79   {
80     disable_int() ;
```

CODE LISTING 1 APPENDIX
COPYRIGHT 1993 SAVI TECHNOLOGY, INC.

module niu.05h 258

```
81      if (TimerAltHigh-niu_timerh > 195) /* timeout to 100 msec */
82      {
83          timer_counter++ ;

84          niu_timerl = TimerAltLow ;      /* read low byte to complete the sequence */

85          niu_timerh = TimerAltHigh ;     /* setup counter again */
86          niu_timerl = TimerAltLow ;
87      }
88      else
89          niu_timerl = TimerAltLow ;      /* read low byte to complete the sequence */
90      enable_int() ;

91      if (timer_counter > 70)     /* set timeout to 7 seconds */
92      {
93  #if USE_LCD
94          lcd_clear() ;
95          show("TIMEOUT!") ;
96  #endif
97          /* increment the crash counter */
98          clock_write(clock_read(TIMEOUT_COUNTER)+1,TIMEOUT_COUNTER);
99          REGA = niu_init() ;
100 /*
101         STOP() ;
102 */
103         /* ---------------------------------------------------------
104                         IMPORTANT !!!!
105             If a report is aborted in the middle the pointers must be restored
106             to the default values. That is done in the report_aborted routine.
107             Only after that we can safely jump back to the beginning of the
108             program
109         ---------------------------------------------------------*/
110         if ((current_command == REPORT_FULL) || (current_command == REPORT_FILTER) ||
111 (current_command == SHORT_REPORT))
112             report_aborted() ;

113 #asm
114     jmp start_loop
115 #endasm
116     }
117 }

118 /*---------------------------------------------------------
119                 WAIT_READY_LOW
120 ---------------------------------------------------------*/
121 void wait_ready_low()
122 {
123     disable_int() ;
```

CODE LISTING 1 APPENDIX
COPYRIGHT 1993 SAVI TECHNOLOGY, INC.

module niu.05h 259

```
124     niu_timerh = TimerAltHigh ;
125     niu_timerl = TimerAltLow ;
126     enable_int() ;
127     timer_counter = 0 ;

128     while ( NIU_READY )
129        check_timer() ;
130    }

131    /*----------------------------------------------
132                    WAIT_READY_HIGH
133    ----------------------------------------------*/
134    void wait_ready_high()
135    {
136      disable_int() ;
137      niu_timerh = TimerAltHigh ;
138      niu_timerl = TimerAltLow ;
139      enable_int() ;
140      timer_counter = 0 ;

141      while ( !NIU_READY )
142          check_timer() ;
143    }

144    /*--------------------------------------------*/
145    /*              NIU_PUT_BYTE                  */
146    /*--------------------------------------------*/
147    /* This routine sends one byte to the NIU when the niu is ready to */
148    /* accept data.                                */
149    /* The Interrogator acts as master with a 62.5 KHz clock         */
150    /*--------------------------------------------*/
151    void niu_put_byte(value)
152    unsigned int value;
153    {
154      if (! NIU_READY)
155         wait_ready_high() ;

156      SPI_DATA = value ;

157      while (SPI_STATUS.7 == 0)   /* wait for the transfer to finish */
158         ;
159      REGA = SPI_DATA ;        /* read the data register to clear
160                                  the status bit */
161    }

162    /*--------------------------------------------*/
163    /*              NIU_GET_BYTE                  */
164    /*--------------------------------------------*/
```

CODE LISTING 1 APPENDIX
COPYRIGHT 1993 SAVI TECHNOLOGY, INC.

module niu.05h 260

```
165   /* This routine receives one byte from the NIU.           */
166   /* The routine sends a $AA byte in order to get the content in the */
167   /* NIU side of the shift register                          */
168   /*----------------------------------------------------------*/
169   int niu_get_byte()
170   {
171     if (!NIU_READY)
172       wait_ready_high() ;

173     SPI_DATA = 0xAA ;       /* send a $aa byte just to get something back
174                                from the slave (niu) */

175     while (SPI_STATUS.7 == 0)   /* wait for transfer complete */
176       ;

177     return(SPI_DATA) ;      /* return the received byte */
178   }

179   const char niu_init_err[]="NIU ERR";
180   /*----------------------------------------------------------*/
181   /*                   LOAD_NIU_ID                           */
182   /*----------------------------------------------------------*/
183   /* Send the NIU ID to the NIU board                        */
184   /*----------------------------------------------------------*/
185   int load_niu_id()
186   {
187     /* Load the interrogator ID into the NIU */
188     /* The ID is kept in the interrogator real time clock */
189     if (NIU_READY)
190       {
191         niu_put_byte(NIU_SET_ID);           /* send the set niu ID command */
192         niu_put_byte(ee_read(EE_ID_LOW));   /* send the high byte ID */
193         niu_put_byte(ee_read(EE_ID_HIGH));  /* send the low byte ID */
194         return(TRUE) ;
195       }
196     else
197       {
198   #if USE_LCD
199         lcd_clear() ;
200         show(niu_init_err) ;
201         int_tenth_sec(100) ;
202   #endif
203         return(FALSE) ;
204       }
205   }

206   /*----------------------------------------------------------*/
```

Attorney Docket No. SAVI1001CIP2DEL
del/savi/1001cip2.pa.a1

11/8/93-11:11

CODE LISTING 1 APPENDIX
COPYRIGHT 1993 SAVI TECHNOLOGY, INC.

```
207  /*              NIU_INIT                         */
208  /*------------------------------------------------*/
209  /* This routine initializes the NIU interface.    */
210  /* Configured as master with a 62.5 KHz clock     */
211  /* It returns false if initialization failed     */
212  /* Modify :                                       */
213  /*------------------------------------------------*/
214  unsigned int niu_init()
215  {
216    /* Define the SPI interface */
217    ss_slave_low() ;       /* by default ss is low */
218    SPI_CONTROL = MASTER ; /* set the interrogator as master */

219    /* Reset the NIU */
220    set_latch2(0x00) ;     /* reset low */
221    int_tenth_second(1);   /* wait 10 msec */
222    set_latch2(0x01) ;     /* reset high */
223    int_tenth_sec(100) ;   /* wait 2 seconds */

224    return(load_niu_id()) ;
225  }

226  /*------------------------------------------------*/
227  /*              REPORT_NIU_STATUS                 */
228  /*------------------------------------------------*/
229  /* Report the niu status byte                     */
230  /*------------------------------------------------*/
231  int report_niu_status()
232  {
233    put1byte(niu_get_status()) ;
234  }

235  /*------------------------------------------------*/
236  /*              NIU_GET_STATUS                    */
237  /*------------------------------------------------*/
238  /* Ask the NIU for the status word.               */
239  /*------------------------------------------------*/
240  int niu_get_status()
241  {
242    niu_put_byte(NIU_GET_STATUS) ;    /* send the command to NIU */
243    niu_status.num = niu_get_byte() ; /* get the status back */
244    return(niu_status.num) ;
245  }

246  /*------------------------------------------------*/
247  /*              NIU_TEST_MEMORY                   */
248  /*------------------------------------------------*/
249  /* Ask the NIU to test RAM.                       */
```

CODE LISTING 1 APPENDIX
COPYRIGHT 1993 SAVI TECHNOLOGY, INC.

module niu.05h 262

```
250   /*----------------------------------------------------------*/
251   void niu_test_memory()
252   {
253     niu_put_byte(NIU_TEST_MEMORY) ;
254   }

255   /*----------------------------------------------------------*/
256   /*              NIU_TEST_485                          */
257   /*----------------------------------------------------------*/
258   /* Ask the NIU to test 485 driver                     */
259   /*----------------------------------------------------------*/
260   /* Disabled because it is not implemented in the NIU
261   void niu_test_485()
262   {
263     niu_put_byte(NIU_TEST_485) ;
264   }
265   */

266   /*----------------------------------------------------------*/
267   /*              NIU_SET_RETX                          */
268   /*----------------------------------------------------------*/
269   /* Ask the NIU to set the numebr of retransmissions           */
270   /*----------------------------------------------------------*/
271   void niu_set_retx()
272   {
273     /* get the argument before start using the NIU routines */
274     i = get_byte() ;
275     niu_put_byte(NIU_SET_RETX) ;
276     niu_put_byte(i) ;
277     put1byte(ALL_OK) ;
278   }

279   /*----------------------------------------------------------*/
280   /*              NIU_SET_TIMEOUT                       */
281   /*----------------------------------------------------------*/
282   /* Set the NIU timeout                                */
283   /*----------------------------------------------------------*/
284   void niu_set_timeout()
285   {
286     /* get the argument before start using the NIU routines */
287     i = get_byte() ;
288     niu_put_byte(NIU_SET_TIMEOUT) ;
289     niu_put_byte(i) ;
290     put1byte(ALL_OK) ;
291   }

292   /*----------------------------------------------------------*/
293   /*              NIU_DISABLE_485                       */
```

CODE LISTING 1 APPENDIX
COPYRIGHT 1993 SAVI TECHNOLOGY, INC.

module niu.05h 263

```
294   /*-----------------------------------------------------*/
295   /*  Disable 485 driver                                 */
296   /*-----------------------------------------------------*/
297   /* Disabled because it is not implemented in the NIU
298   void niu_disable_485()
299   {
300     niu_put_byte(NIU_DISABLE_485);
301   }
302   */

303   /*-----------------------------------------------------*/
304   /*                  NIU_ENABLE_485                     */
305   /*-----------------------------------------------------*/
306   /*  Enable 485 driver                                  */
307   /*-----------------------------------------------------*/
308   /* Disabled because it is not implemented in the NIU
309   void niu_enable_485()
310   {
311     niu_put_byte(NIU_ENABLE_485);
312   }
313   */
314   const char niu_st[]="st=";
315   const char niu_get_cmd[]="cmd:";
316   const char niu_down[]="DOWN";
317   /*-----------------------------------------------------*/
318   /*                    CHECK_NIU                        */
319   /*-----------------------------------------------------*/
320   /* Check for incoming commands via NIU by testing the bit number 7 */
321   /* of the niu status byte.                             */
322   /*-----------------------------------------------------*/
323   void check_niu()
324   {
325   #if USE_LCD
326     lcd_gotoxy(13,3) ;
327     show(niu_st);
328   #endif
329     if (NIU_READY)
330       {
331         REGA = niu_get_status() ;    /* status is written to niu_status */
332   #if USE_LCD
333   /*    lcd_gotoxy(12,3) ;*/
334         accumula_msg(niu_status.num) ;
335         lcd_write(0x20) ;
336   #endif
337         if (NIU_RXRD)        /* input data available */
338           {
339   #if USE_LCD
340             show1(niu_get_cmd) ;
```

CODE LISTING 1 APPENDIX
COPYRIGHT 1993 SAVI TECHNOLOGY, INC.

module niu.05h 264

```
341   #endif
342           command = get_niu_cmd() ;
343   #if USE_LCD
344           accumula_msg(command) ;
345   #endif
346         }
347       }
348     else
349     {
350       NOP() ;
351   #if USE_LCD
352       lcd_gotoxy(16,3) ;
353       show(niu_down) ;
354   #endif
355     }
356   }

357   /*----------------------------------------------------------*/
358   /*                    GET_NIU_CMD                           */
359   /*----------------------------------------------------------*/
360   /* Check for incoming commands from the PC. If the incoming */
361   /* message via niu does not come from the PC, just flush it and */
362   /* return an invalid code. If the command comes from the PC, return */
363   /* the first byte that contains the command code            */
364   /* Note that after this function returns the rest of the command */
365   /* (arguments) are still in the niu buffer.                 */
366   /*----------------------------------------------------------*/
367   int get_niu_cmd()
368   {
369     niu_put_byte(NIU_GET_DATA) ;

370     unit_ID = niu_get_byte() ;    /* get first byte of the source ID */
371     j = niu_get_byte() ;          /* get second byte of the source ID */

372     packet_length = niu_get_byte() ; /* number of bytes in the packet */
373     i = niu_get_byte() ;          /* get the command byte */

374     if ((unit_ID != 0) || (j != 0) || (i > LARGEST_COMMAND)) /* it is not coming from the PC
375                                                                 or it is invalid */
376     {
377       /* flush the rest of the message */
378       for ( i = 0 ; i < packet_length-1 ; i++ )
379         REGA = niu_get_byte() ;
380       return(NULL_COMMAND) ;       /* return null command code */
381     }
382     else
383       return(i) ;                  /* return first byte (command code) */
384   }
```

CODE LISTING 1 APPENDIX
COPYRIGHT 1993 SAVI TECHNOLOGY, INC.

module niu.05h 265

```
385   /*---------------------------------------------------------*/
386   /*                  WAIT2TXNBYTES                          */
387   /*---------------------------------------------------------*/
388   /* This routine sends the appropriate header to the NIU. The   */
389   /* header contains the actual command byte, the destinmation ID */
390   /* (2bytes), and the size of the packet. The routine calling this */
391   /* one is in charge of sending to the NIU all the data bytes.    */
392   /* The second argument defines if the packet is a regular data   */
393   /* packet or an EOT data packet                            */
394   /*---------------------------------------------------------*/
395   void wait2txnbytes(packet, EOT)
396   unsigned int packet, EOT ;
397   {
398     do
399       {
400         REGA = niu_get_status() ;
401       } while (!NIU_TXRD) ;

402     if (EOT)              /* if EOT is true send EOT command */
403        niu_put_byte(NIU_EOT);
404     else
405        niu_put_byte(NIU_SEND_DATA);

406     niu_put_byte(0) ;     /* Dest ID = 0 */
407     niu_put_byte(0) ;
408     niu_put_byte(packet) ;
409   }
```

CODE LISTING 1 APPENDIX  module ram.05h 266
COPYRIGHT 1993 SAVI TECHNOLOGY, INC.

```
1   /*         module ram.05h                              */
2   /*---------------------------------------------------*/
3   /*              RAM.05h
4   ---------------------------------------------------

5   $Source: p:/int/RCS/ram.05h $

6   This unit interfaces the external 64 K ram in the Interrogator V3.0
7   The control lines are ram_WR and ram_OE that are (WILL BE)
8   defined in config.h
9   ram_data_bus is also defined there.
10  This unit uses three variables:
11  ram_var : variable used for 2 things
12          ram_counter : counter used in the routines to read and
13                  write a block of data.
14          ram_data :   data to be written in write routine 15  n_bytes :   number of bytes to read of write in block operations.
16  buff: temporary tricky variable used to deal with pointer (try to
17          remove later).
18  ---------------------------------------------------*/
19  unsigned long ram_add   ;
20  unsigned int ram_addH   @ ram_add ;
21  unsigned int ram_addL   @ ram_add+1 ;

22  #define ram_WR        WR_line
23  #define ram_OE        E_line
24  #define ram_set_add(x)  ram_add = x
25  #define set_ram_high_address  porta = ram_addH ;\
26                          portc &= 0b10101111 ;\
27                          portc |= 0b01010000 ;

28  int *bu ;

29  unsigned int      ram_var ;
30  #define ram_data    ram_var
31  #define ram_counter ram_var 32  /*---------------------------------------------------
33              RAM_WRITE
34  Write a byte to location ram_add and postincrement the address
35  ---------------------------------------------------*/
36  void ram_write(ram_data)
37  {
38     /* clock high part of the address to the latch */
```

CODE LISTING 1 APPENDIX  
COPYRIGHT 1993 SAVI TECHNOLOGY, INC.

module ram.05h 267

```
39      set_ram_high_address ;
40      /* put low part of the address */
41      porta = ram_addL ;

42      ram_OE = 0 ;
43      select_ram_bank ;
44      data_bus = ram_data ;        /* put data byte */
45      ram_add++ ;
46      select_null_bank ;
47      ram_OE = 1 ;
48    }

49  /*----------------------------------------------------------
50                  RAM_READ
51   Read a byte from location ram_add and postincrement the address
52  ----------------------------------------------------------*/
53  int ram_read()
54  {
55      set_ram_high_address ;
56      porta = ram_addL ;
57      data_bus_dir = 0x00 ;    /* define bus as input */
58      ram_OE = 0 ;
59      ram_WR = 1 ;
60      select_ram_bank ;
61      ram_data = data_bus ;
62      select_null_bank ;
63      ram_WR = 0 ;
64      ram_OE = 1 ;
65      data_bus_dir = 0xFF ;
66      ram_add++ ;
67      return(ram_data) ;
68  }

69  /*----------------------------------------------------------
70                  RAM_WRITEBLOCK
71   Write a block of n_bytes starting at ram_add. ram_add is incremented
72   by n_bytes
73  ----------------------------------------------------------*/
74  void ram_writeblock(n_bytes,buff)
75  int buff,n_bytes ;
76  {
77      bu = buff ;
78      ram_OE = 0 ;
79      for ( ram_counter = 0 ; ram_counter < n_bytes ; ram_counter++)
80      {
81        set_ram_high_address ;
82        porta = ram_addL ;
```

CODE LISTING 1 APPENDIX
COPYRIGHT 1993 SAVI TECHNOLOGY, INC.

module ram.05h 268

```
83        select_ram_bank ;
84        data_bus = *bu++ ;        /* put data byte */
85        select_null_bank ;
86        ram_add++ ;
87      }
88      ram_OE = 1 ;
89    }

90    /*--------------------------------------------------------------
91                    RAM_READBLOCK
92      Read a block of n_bytes into buff. ram_add is incremented by n_bytes
93    --------------------------------------------------------------*/
94    void ram_readblock(n_bytes,buff)
95    int buff,n_bytes ;
96    {
97      bu = buff;
98      data_bus_dir = 0x00 ;    /* define bus as input */
99      ram_OE = 0 ;
100     for ( ram_counter = 0 ; ram_counter < n_bytes ; ram_counter++)
101     {
102       set_ram_high_address ;
103       porta = ram_addL ;
104       ram_WR = 1 ;
105       select_ram_bank ;
106       *bu++ = data_bus ;
107       select_null_bank ;
108       ram_WR = 0 ;
109       ram_add++ ;
110     }
111     ram_OE = 1 ;
112     data_bus_dir = 0xFF ;
113   }
```

CODE LISTING 1 APPENDIX
COPYRIGHT 1993 SAVI TECHNOLOGY, INC.

```
1   /*              module rs232.05h                      */
2   /*----------------------------------------------------*/
3   /*              RS232.05H
4   ----------------------------------------------------
5   $Source: p:/int/RCS/rs232.05h $
6   ----------------------------------------------------*/
7   void int_tenth_sec(int) ;
8   void delay() ;
9   int read_debug_latch() ;
10  void rs_init() ;
11  int rs_get_byte() ;
12  int rs_get_status() ;
13  void rs_put_byte(int a;) ;

14  int rs_inbyte_ready() ;
15  int rs_get_inbyte() ;
16  unsigned int data_tmp ;

17  /*----------------------------------------------------*/
18  /*              RS_INIT                                */
19  /*----------------------------------------------------*/
20  /* This routine initializes the RS232 driver.         */
21  /* 9600 baud, Tx and Rx enabled                       */
22  /* Modify :                                           */
23  /*----------------------------------------------------*/
24  void rs_init(void)
25  {
26          SCI_BAUD     = 0b00110000 ;   /* set 9600 baud */
27                                        /* = 4MHz / 13   */

28          SCI_CONTROL1 = 0x00 ;         /* select 8 bits mode */

29  #if (USE_HANDSHAKING == FALSE)
30          SCI_CONTROL2 = 0x2C ;         /* enable Tx and Rx */
31                                        /* Rx interrupt enabled */
32  #else
33          SCI_CONTROL2 = 0x0C ;         /* enable Tx and Rx */
34                                        /* Rx interrupt disabled */
35  #endif
36  }

37  /*----------------------------------------------------*/
38  /*              RS_GET_BYTE                            */
39  /*----------------------------------------------------*/
40  /* This routine readsthe variable data to the serial port */
41  /* Modify :    A                                      */
```

CODE LISTING 1 APPENDIX
COPYRIGHT 1993 SAVI TECHNOLOGY, INC.

module rs232.05h 270

```
42    /*--------------------------------------------------------------*/
43    int rs_get_byte(void)
44    {
45    #if USE_HANDSHAKING
46        db_I_am_ready() ;
47        while ( SCI_STATUS.5 == 0 )
48            ;
49        db_I_am_not_ready() ;
50        /* The next delay is to give the tracker time to read the debug latch
51           that receives the ready signal from the interrogator
52        */
53        REGX = 255 ;
54        delay() ;
55        return(SCI_DATA) ;
56    #else
57        disable_int ;
58        while ( sci_empty() )
59            {
60            enable_int ;
61            disable_int ;
62            }
63        REGA = sci_get() ;
64        enable_int() ;
65        return(REGA) ;
66    #endif
67    }

68    /*--------------------------------------------------------------*/
69    /*                    RS_PUT_BYTE                              */
70    /*--------------------------------------------------------------*/
71    /* This routine writes the variable data to the serial port    */
72    /*                                                              */
73    /* Modify :   A                                                 */
74    /*--------------------------------------------------------------*/
75    void rs_put_byte(mydata)
76    unsigned int mydata ;
77    {
78        while ( SCI_STATUS.7 == 0 )
79            ;
80    #if USE_HANDSHAKING
81        while ((read_debug_latch()&0b00000010) == 0)
82            ;
83    #endif
84        SCI_DATA = mydata ;
85    #if USE_HANDSHAKING
86        while ((read_debug_latch() &0b00000010) == 0b00000010)
87            ;
88    #endif
```

CODE LISTING 1 APPENDIX  module rs232.05h 271
COPYRIGHT 1993 SAVI TECHNOLOGY, INC.

```
89    }

90    void lcd_line(int) ;
91    void lcd_clear() ;
92    void accumula_msg(int) ;
93    void lcd_gotoxy(int,int) ;
94    /*------------------------------------------------------------*/
95    /*                  RS_INBYTE_READY                         */
96    /*------------------------------------------------------------*/
97    /* This routine returns true if there is a byte in the input buffer*/
98    /*                                                          */
99    /* Modify :   A                                             */
100   /*------------------------------------------------------------*/
101   int rs_inbyte_ready(void)
102   {
103   #if USE_HANDSHAKING
104   union both sci_status ;
105     sci_status.num = SCI_STATUS ;
106     if(sci_status.bool.1==1)      /* if framing error */
107       {
108         data_tmp = SCI_DATA ;     /* clear error bit */
109         return(FALSE) ;           /* no valid data available */
110       }
111     return (sci_status.bool.5==1) ;
112   #else
113     disable_int ;
114     REGA = ! sci_empty() ;
115     enable_int ;
116     return(REGA) ;
117   #endif
118   }

119   /*------------------------------------------------------------*/
120   /*                  RS_GET_INBYTE                           */
121   /*------------------------------------------------------------*/
122   /* This routine returns the byte present in the input buffer. */
123   /* Note that it does not check for the status byte. Before calling */
124   /* this routine the presence of a byte in the buffer can be  */
125   /* checked with rs_inbyte_ready.                             */
126   /*                                                          */
127   /* Modify :   A                                             */
128   /*------------------------------------------------------------*/
129   int rs_get_inbyte(void)
130   {
131   #if USE_HANDSHAKING
132     data_tmp = SCI_DATA ;
133     db_I_am_not_ready() ;
134     return(data_tmp) ;
```

CODE LISTING 1 APPENDIX  module rs232.05h  272
COPYRIGHT 1993 SAVI TECHNOLOGY, INC.

```
135    #else
136      disable_int ;
137      REGA = sci_get() ;
138      enable_int ;
139      return(REGA) ;
140    #endif
141    }
```

CODE LISTING 1 APPENDIX
COPYRIGHT 1993 SAVI TECHNOLOGY, INC.

module scanrssi.h 273

```
1   /*          module scanrssi.05h       */
2   /*------------------- SCAN RSSI----------
3    * $Source: p:/int/RCS/scanrssi.05h $
4    * Communications interface for tag and interrogator
5    *
6    */
7   #define SCAN_DEBUG FALSE 8   /*------------------------------------------------------
9                  SCAN_RX_4_RSSI
10  -------------------------------------------------------
11  Scan all receivers for the highest RSSI
12  -----------------------------------------------------*/
13  void scan_rx_4_rssi()
14  {
15      /* power up receiver here and wait for power up */
16      /* spike to pass ~ 250us */
17      select_rx_all(current_rx=0);
18      REGX = 82 ;
19      delay() ;

20      while (TRUE)
21      {
22          rssi0 = rssi1 = rssi2 = max_rssi = 1 ;
23          while (!expired)
24          {
25              REGA = read_adc_4_scan();
26              if (REGA > rssi_detect_thresh) break;
27          }

28          if (expired) return;

29          portc.0 = 1 ;
30          portc.0 = 0 ;

31          /* read RSSI 0 */
32          current_rx = 0;
33              rssi0 = read_adc_4_scan();
34          portc.0 = 1 ;
35          portc.0 = 0 ;

36          /* read RSSI 1 */
37          rssi1 = read_adc_4_scan();
38          portc.0 = 1 ;
39          portc.0 = 0 ;

40          /* read RSSI 2 */
```

CODE LISTING 1 APPENDIX      module scanrssi.h 274
COPYRIGHT 1993 SAVI TECHNOLOGY, INC.

```
41      max_rssi = rssi2 = read_adc_4_scan();
42      portc.0 = 1 ;
43      portc.0 = 0 ;

44        current_rx = 2;

45      /* find the largest value */

46         if (rssi0 > max_rssi)
47         {
48                 max_rssi = rssi0;
49                 current_rx = 0;
50         }
51         if (rssi1 > max_rssi)
52         {
53                 max_rssi = rssi1;
54                 current_rx = 1;
55         }

56         if (max_rssi > rssi_detect_thresh)
57         {
58                 select_one_rx(current_rx);
59                 adc_set_address();
60                 return;
61         }
62   } /* end while TRUE */
63   }

64   /*------------------------------------------------------------
65                       READ_ADC_4_SCAN
66   ------------------------------------------------------------
67   Read the ADC for the current_rx as quick as possible and
68   increment current_rx while you wait for conversion
69   ------------------------------------------------------------*/
70   unsigned int read_adc_4_scan()
71   {
72     select_rx_all(current_rx);
73     adc_set_address();
74     adc_start();

75     current_rx++ ;
76     if ( current_rx == 3) {
77   #ifdef USE_HHI
78        current_rx = 1 ;
79   #else
80        current_rx = 0 ;
81   #endif
```

CODE LISTING 1 APPENDIX
COPYRIGHT 1993 SAVI TECHNOLOGY, INC.

module scanrssi.h 275

```
82      }

83      /* wait so that the adc is read after the conversion takes place
84      */
85      REGX = 3 ;
86      delay() ;

87      /* If the RSSI if higher than 250, it is due to a bad board
88         or due to a unconnected board.
89         In this case set the RSSI to zero */
90      REGA = adc_read();
91      if (REGA > 250) return(0) ;
92      else return(REGA) ;
93      }

94      /*----------------------------------------------------------------
95                      MEASURE RSSI
96      ----------------------------------------------------------------
97      This routine samples the RSSI on each of the three antennas and
98      puts the result in rssi1,rssi2,rssi3 and max_rssi.
99      ----------------------------------------------------------------*/
100     void measure_rssi()
101     {
102       max_rssi = 0 ;
103       select_rx_all(0) ;
104       one_msec() ;
105       for (j = 0 ; j < 3 ; j++)
106         {
107         select_rx_all(j) ;
108         adc_set_address() ;
109         adc_start() ;
110         REGX = 6 ;
111         delay() ;           /* wait 3*3+3 usec = 12 for the A/D to convert */
112         rssi_array[j] = adc_read() ;
113         if ( max_rssi < rssi_array[j])
114            max_rssi = rssi_array[j] ;
115         }
116       select_one_rx(3) ;    /* deselect the receivers */
117     }

118     /*----------------------------------------------------------------
119                      SET_RSSI_PARAMETERS
120     ----------------------------------------------------------------
121     This routine samples the rssi background (by calling measure_rssi)
122     and sets the thresholds according to the deltas stored in EEPROM
123     ----------------------------------------------------------------*/
124     void set_rssi_parametes()
```

CODE LISTING 1 APPENDIX
COPYRIGHT 1993 SAVI TECHNOLOGY, INC.

module scanrssi.h 276

```
125   {
126     measure_rssi() ;
127     rssi_detect_thresh = max_rssi + ee_read(RSSI_DETECT_DELTA) ;
128     rssi_accept_thresh = max_rssi + ee_read(RSSI_ACCEPT_DELTA) ;
129   }
```

CODE LISTING 1 APPENDIX
COPYRIGHT 1993 SAVI TECHNOLOGY, INC.

```
1   /*            module scanrssi.h               */
2   /*---------------------- SCAN RSSI----------------------
3    * $Source: p:/int/RCS/scanrssi.h $
4    * Prototypes for the scanrssi.05h file
5    *
6    ---------------------------------------------------*/

7   void          scan_rx_4_rssi();
8   unsigned int  read_adc_4_scan();
9   void          measure_rssi();
10  void          set_rssi_parametes();
11  void          rssi_checkin();
```

CODE LISTING 1 APPENDIX
COPYRIGHT 1993 SAVI TECHNOLOGY, INC.

module sci.05h 278

```
1   /*         module sci.05h              */
2   /*----------------------------------------*/
3   /*              SCI.05H
4   ----------------------------------------

5   $Source: p:/int/RCS/sci.05h $

6   Module that received data via rs232 using interrupts. The data bytes
7   are stored in a circular buffer in internal micro memory.

8   ----------------------------------------*/

9   #define RX_FULL      0b00100000
10  #define OVERRUN_ERR  0b00001000
11  #define NOISE_ERR    0b00000100
12  #define FRAMING_ERR  0b00000010

13  /*
14     Important:
15     The next constant MUST BE a power of 2 because I am doing the modulo
16     operation with a bitwise AND
17  */
18  #define SCI_BUFFER_SIZE 64
19  uint sci_buffer[SCI_BUFFER_SIZE] ;
20  uint sci_tail ;
21  uint sci_head ;
22  uint sci_tmp ;
23  uint sci_next ;
24  uint sci_status ;

25  /*----------------------------------------*/
26  /*              SCI INIT              */
27  /*----------------------------------------*/
28  /* This routine initializes the sci received buffer and the   */
29  /* pointers to it                                             */
30  /*----------------------------------------*/
31  void sci_init()
32  {
33    for ( i = 0 ; i < SCI_BUFFER_SIZE ; i++)
34      sci_buffer[i] = 0 ;
35    sci_head = sci_tail = 0 ;
36  }

37  /*----------------------------------------*/
38  /*            SCI INTERRUPT             */
39  /*----------------------------------------*/
40  /* Interrupt service routine to received data via sci. The error   */
```

CODE LISTING 1 APPENDIX
COPYRIGHT 1993 SAVI TECHNOLOGY, INC.

module sci.05h 279

```
41    /* bits are checked for possible error and eventually the data byte*/
42    /* is put into the circular buffer                                 */
43    /*------------------------------------------------------------------*/
44    void sci_interrupt()
45    {
46      sci_status = SCI_STATUS ;       /* get the sci status */
47      if (sci_status & RX_FULL)       /* we received data */
48        {
49        sci_tmp = SCI_DATA ;          /* get the data to clear the status
50                                         bits */
51        /*
52           If byte overrun error, there is nothing that we can do
53           unfortunately. I am simply going to reset the unit
54        */
55        if (sci_status & OVERRUN_ERR)
56            {
57    #if USE_LCD
58            lcd_clear() ;
59            show("Orun") ;
60            int_tenth_sec(100) ;
61    #endif
62    #asm
63            RSP ;              reset the stack pointer
64            jmp start_loop ;
65    #endasm
66            }

67        /* If framing or noise error, discard the data byte */
68        if (sci_status & (NOISE_ERR|FRAMING_ERR))
69            {
70    #if USE_LCD
71            lcd_clear() ;
72            show("Fr err") ;
73    #endif
74            return ;
75            }
76        /* check of the buffer is full */
77        sci_next = (sci_head+1) & (SCI_BUFFER_SIZE-1) ;
78        if (sci_next == sci_tail )
79            {
80    #if USE_LCD
81            lcd_clear() ;
82            show("ovflow") ;
83            int_tenth_sec(100) ;
84    #endif
85    #asm
86            RSP ;              reset the stack pointer
87            jmp start_loop ;
```

CODE LISTING 1 APPENDIX  
COPYRIGHT 1993 SAVI TECHNOLOGY, INC.

module sci.05h 280

```
88    #endasm
89        }
90      else
91        {
92          sci_buffer[sci_head] = sci_tmp ;   /* put data byte into the buffer */
93          sci_head = sci_next ;              /* update pointers */
94        }
95      }
96   }

97   /*-----------------------------------------------------------*/
98   /*                    SCI_GET                           x */
99   /*-----------------------------------------------------------*/
100  /* This routine writes the variable data to the serial port   */
101  /*                                                            */
102  /* Modify :   A                                               */
103  /*-----------------------------------------------------------*/
104  unsigned int sci_get()
105  {
106    if (sci_head != sci_tail)          /* buffer NOT empty */
107      {
108        sci_tmp = sci_buffer[sci_tail] ;
109        sci_tail = (sci_tail+1) & (SCI_BUFFER_SIZE-1) ;
110        return(sci_tmp) ;
111      }
112  }

113  unsigned int sci_empty()
114  {
115    sci_tmp = (sci_head == sci_tail) ;
116    return(sci_tmp) ;
117  }
```

CODE LISTING 1 APPENDIX
COPYRIGHT 1993 SAVI TECHNOLOGY, INC.

module stddef.h 281

```
1   /*           module stddef.h              */
2   #pragma option P
3   /*
4    * $Source: p:/int/RCS/stddef.h $
5    * Standard C definitions for C6805
6    */

7   #define TRUE    1
8   #define FALSE   0
9   #define ON      1
10  #define OFF     0
11  #define YES     1
12  #define NO      0

13  union both {
14     int num ;
15     bits bool ;
16  };

17  union twobyte {
18     unsigned long lng ;
19     unsigned int bytepart[2] ;
20  };

21  registera   REGA;
22  registerx   REGX;

23  typedef unsigned int uint ;
```

<u>CODE LISTING 1 APPENDIX</u>  module timer.05h  282
COPYRIGHT 1993 SAVI TECHNOLOGY, INC.

```
1   /*            module timer.05h              */
2   /*----------------------------------------------------------------
3   File:$Source: p:/int/RCS/timer.05h $ 4   This file has all the timer related routines for the interrogator V3.0
5   ----------------------------------------------------------------*/

6   /*----------------------------------------------------------------
7                   INIT_TIMER
8   ----------------------------------------------------------------
9   Initialize the timer
10  ----------------------------------------------------------------*/
11  #define init_timer() TimerControl = 0b00000000

12  /*----------------------------------------------------------------
13                  LOAD_CMP_REGS
14  ----------------------------------------------------------------
15  Load the compare register with the current timer count plus $7000
16  ----------------------------------------------------------------*/
17  void load_cmp_regs()
18  {
19    REGA = TimerStatus ; /* clear any possible status bit that is set */
20    temph = TimerAltHigh ;
21    REGX  = TimerAltLow ;
22    TimerCmpHigh = temph + 0x70 ;  /* $7000 is 57.344 ms window */
23    TimerCmpLow = REGX ;
24  }

25  /*----------------------------------------------------------------
26                  TIME_EXPIRED
27  ----------------------------------------------------------------
28    Check that the time window has not expired. If it expired, it returns
29    true.
30  ----------------------------------------------------------------*/
31  int timer_int()
32  {
33    if ( TimerStatus.6 == 1 )
34    {
35      window_counter-- ;

36  #if DEBUG_SIGNALS
37       db_coll_start() ;
38       one_msec() ;
39       db_coll_end() ;
40  #endif
```

CODE LISTING 1 APPENDIX
COPYRIGHT 1993 SAVI TECHNOLOGY, INC.

module timer.05h 283

```
41      if ( window_counter == 0 )
42          {
43  #if DEBUG_SIGNALS
44          db_coll_start() ;
45          one_msec() ;
46          one_msec() ;
47          one_msec() ;
48          db_coll_end() ;
49  #endif
50          expired = TRUE ;
51          }
52      else
53          load_cmp_regs() ;   /* reload compare register */
54      }
55  }
```

CODE LISTING 1 APPENDIX
COPYRIGHT 1993 SAVI TECHNOLOGY, INC.

module util.05h 284

```
1   /*          module util.05h                      */
2   /*-----------------------------------------------
3               UTIL for the Interrogator 4   $Source: p:/int/RCS/util.05h $ 5   This file contains some useful general purpose functions
6   -----------------------------------------------*/

7   unsigned long temp_long ;
8   unsigned int high_part @ temp_long ;
9   unsigned int low_part @ temp_long+1 ;

10  /*-----------------------------------------------
11              SHOW_LONG_DEC
12  -----------------------------------------------
13  This routine writes the argument (unsigned long) in decimal to the
14  LCD
15  Do not change this and the routine below unless you are absolutely
16  sure of what you are doing. Notice that they share some memory
17  locations.
18  DMA
19  -----------------------------------------------*/
20  #if USE_LCD
21  void show_long_dec(temp_long)
22  {
23      REGA = temp_long/1000 ;
24      nibble_msg(REGA) ;
25      temp_long %= 1000 ;
26  trick:
27      REGA = temp_long/100 ;
28      nibble_msg(REGA) ;
29      temp_long %= 100 ;
30      REGA = temp_long/ 10 ;
31      nibble_msg(REGA) ;
32      REGA = temp_long % 10 ;
33      nibble_msg(REGA) ;
34  }
35  #endif 36  /*-----------------------------------------------
37              SHOW_INT_DECLONG
38  -----------------------------------------------
39  This routine writes the argument (unsigned int) in decimal to the
40  LCD
41  Do not change this and the above routine unless you are absolutely
```

CODE LISTING 1 APPENDIX
COPYRIGHT 1993 SAVI TECHNOLOGY, INC.

module util.05h 285

```
42      sure of what you are doing. Notice that they share some memory
43      locations.
44      DMA
45      ----------------------------------------------------------------*/
46  #if USE_LCD
47  void show_int_dec(low_part)
48  {
49      high_part = 0 ;
50      goto trick ;
51  }
52  #endif
```

CODE LISTING 1 APPENDIX
COPYRIGHT 1993 SAVI TECHNOLOGY, INC.

module watchdog.05h 286

```
1   /*          module watchdog.05h                    */
2   /*----------------------------------------------*/
3   /*          WATCH.05H
4   ----------------------------------------------

5   $Source: p:/int/RCS/watchdog.05h $

6   This unit supports the watchdog timer that is in the empty eprom socket
7   of the interrogator. The timers' output is tied to the reset line of the
8   interrogator and can be hard wired for different time intervals from
9   1/2 second to 30 seconds.

10         The watchdog timer is now set at approximately 8 second intervals.

11  The watchdog timer must be accessed (the !ROM line accessed) before the
12  reset time period, in order to keep the watchdog circuit from reseting the
13  interrogator.

14  This access will be called 'kicking the dog'.

15  Routines in the interrogator that take alot of time are:

16          Collection
17          Reports of tag ids
18          Updating internal database?

19  ----------------------------------------------*/

20  /*----------------------------------------------*/
21  /*          KICK_THE_DOG                        */
22  /*----------------------------------------------*/
23  /* Reset watchdog timer                         */
24  /*----------------------------------------------*/
25  void kick_the_dog()
26  {
27          enable_device(D_ROM);
28          disable_device();
29  }
```

CODE LISTING 1 APPENDIX  
COPYRIGHT 1993 SAVI TECHNOLOGY, INC.

module xtag.05h 287

```
1   /*           module xtag.05h                                    */
2   /*----------------------------------------------------------*/
3   /*              XTAG.05h 4     This file contains all the interrogator commands related to accessing
5     the XTAG, i.e. SealTag, SensorTag, etc., on board 8K byte RAM.
6     ----------------------------------------------------------

7     $Source: p:/int/RCS/xtag.05h $

8     ----------------------------------------------------------*/

9   #if XTAG
10  /*----------------------------------------------------------
11                  PLACE_RAM
12  ----------------------------------------------------------
13    This routine transmits a buffer (10 byte limit) to the Sensor Tag
14  ----------------------------------------------------------*/
15  void place_ram()
16  {
17    command_code = PLACE_RAM_CMD ;
18    get_target_id() ;
19    do_place_tag() ;
20  }

21  /*----------------------------------------------------------
22                  SQUAWK_RAM
23  ----------------------------------------------------------
24    This routine receives a buffer (10 byte limit) from the Sensor Tag
25  ----------------------------------------------------------*/
26  void squawk_ram()
27  {
28    command_code = SQUAWK_RAM_CMD ;
29    get_target_id() ;
30    do_squawk_tag() ;
31  }
32  #endif 33  #if XTAG
34  /*----------------------------------------------------------
35                  ARM_SEALTAG
36  ----------------------------------------------------------
37    Arm sealtag. Send a string containing - Month, Day, Year, Hour, Minutes and Seconds.
38    Bit 7 of Seconds = 1 -> Stop RTC
39                     = 0 -> Run  RTC
40  ----------------------------------------------------------*/
41  void arm_sealtag()
```

CODE LISTING 1 APPENDIX
COPYRIGHT 1993 SAVI TECHNOLOGY, INC.

module xtag.05h 288

```
42   {
43     command_code = ARM_SEALTAG_CMD ;
44     get_target_id() ;
45     do_place_tag() ;
46   }

47   void read_tag_rtc()
48   {
49     command_code = READ_RTC_CMD ;
50     get_target_id() ;
51     do_squawk_tag() ;
52   }
53   #endif 54   void read_tag_adc()
55   {
56     command_code = READ_ADC_CMD ;
57     get_target_id() ;
58     do_squawk_tag() ;
59   }

60   #define OPEN  0    /* open lock */
61   #define CLOSE 1    /* close lock */

62   unsigned int lock_condition ;

63   /*------------------------------------------------
64                    LOCK TAG
65   --------------------------------------------------
66     Send the LOCK command to the tag to unlock or lock the lock.
67   --------------------------------------------------*/
68   void lock_tag()
69   {
70     command_code = LOCK_TAG_CMD ;
71     get_target_id() ;

72     lock_condition = get_byte() ;

73     SEND_1BYTE_CMD(command_code) ;

74     send_target_id() ;

75     transmit_byte(lock_condition) ;  /* send desired state of lock */

76     get_tag_ack(2) ;

77     if (error_code != ALL_OK)    /* rotate antennas in case of failure */
78       current_tx = inc_tx(current_tx) ;
```

CODE LISTING 1 APPENDIX
COPYRIGHT 1993 SAVI TECHNOLOGY, INC.

module xtag.05h 289

```
79    put1byte(error_code) ;  /* send result of the command to the PC */
80    }pragma pragma pragma pragma pragma pragma pragma pragma pragma pragma pragma
81    pragma pragma pragma pragma pragma pragma pragma pragma pragma pragma pragma
82    pragma pragma pragma pragma pragma pragma pragma pragma pragma pragma pragma
83    pragma pragma pragma pragma pragma pragma pragma pragma pragma pragma pragma
84    pragma pragma pragma pragma pragma pragma pragma pragma pragma pragma pragma
85    pragma pragma
```

CODE LISTING 2 APPENDIX
COPYRIGHT 1993 SAVI TECHNOLOGY, INC.

module comcmds.05h 290

```
1   /*         module comcmds.05h         */
2   #pragma option P
3   /*--------------------------------------------------------
4   $Source: c:/version2/RCS/comcmds.h $ 5   --------------------------------------------------------*/
6   /* define interrogator-tag commands */
7   #define HELLO_CMD         0b00000000
8   #define INT_HELLO_CMD     0b00000011
9   #define TURBO_HELLO_CMD   0b00000101
10  #define SLEEP_CMD         0b11000011
11  #define BEEPON_CMD        0b11000101
12  #define BEEPOFF_CMD       0b11000110
13  #define PLACE_CMD         0b11001001
14  #define ALL_SLEEP_CMD     0b11011011
15  #define CHECK_IN_CMD      0b11001100
16  #define SET_WINDOW_CMD    0b10001110
17  #define TURBO_SET_WIN_CMD 0b10011111
18  #define GET_VERSION_CMD   0b11010001
19  #define SQUAWK_CMD        0b11010010
20  #define WRITE_PORTB_CMD   0b11010100
21  #define READ_PORTA_CMD    0b11011001
22  #define GET_ERROR_CMD     0b11011010
23  #define CLEAR_ERROR_CMD   0b11011101

24  #define TEST_EEPROM_CMD 0b11111111

25  /*--------------------------------------------------------*/
26  /*--------------------------------------------------------*/
27  /* define interrogator-pc commands */
28  #define REPORT2PC     0x41   /* send the ids to the PC */
29  #define COLLECT_TAGS  0x69   /* collect the tags */
30  #define COLLECT_ITAGS 0x6A   /* collect tags in interrupt mode */
31  #define SEND_WAKEUP   0x70   /* send the wakeup signal */
32  #define WAKEUP_ON     0x77   /* turn wakeup signal on */
33  #define WAKEUP_OFF    0x88   /* turn wakeup signal off */
34  #define TURBO_ON      0x10   /* turn turbo on */
35  #define TURBO_OFF     0x11   /* turn turbo off */
36  #define INT_HELLO     0x98   /* do hello only for tags in interrupt mode*/
37  #define READ_PARAM    0x99   /* read parameters from PC */
38  #define WRITE_PARAM   0xAA   /* write parameters from PC */
39  #define SNIFFON_TAG   0xBB   /* sniff on command */
40  #define SNIFFOFF_TAG  0xBC   /* sniff off command */
41  #define CHECK_IN      0xBD   /* check in and report status */
42  #define GET_VERSION   0xFF   /* send software version */
43  #define SLEEP_ALL     0xCC   /* send all tags to sleep */
44  #define SQUAWK        0x96   /* squawk a tag */
```

CODE LISTING 2 APPENDIX  module comcmds.05h 291
COPYRIGHT 1993 SAVI TECHNOLOGY, INC.

```
45   #define PLACE         0x80     /* write to tag eeprom */
46   #define SET_WINDOW    0x90     /* set the tag collection time */
47   #define GET_ERROR     0x91     /* get error code from the tag */
48   #define CLEAR_ERROR   0x92     /* clear tag error code */
49   #define WRITE_PORT    0x93     /* set the value of portb */
50   #define READ_PORT     0x95     /* read porta */
51   #define PASS_THRU     0xF2     /* send an arbitrary sequence of N
52                                     bytes to the tag and receive M
53                                     bytes of data from the tag.
54                                     M and N are read form the PC */
55   #define TEST_EEPROM   0x97     /* do tag eeprom test */

56   /*-----------------------------------------------------*/
57   /*-----------------------------------------------------*/
58   /* define error code returned by the interrogator to the PC to inform
59      about the most recent command */
60                            /* successful operation */
61   #define ALL_OK        0
62                            /* error when receiving header */
63   #define HEADER_ERROR  1
64                            /* parity error when receiving tag ID */
65   #define IDPARITY_ERROR   2
66                            /* error when receiving tag ID */
67   #define IDRX_ERROR    3
68                            /* tag needs service */
69   #define TAG_SERVICE   4
70                            /* error when receiving the extra byte
71                               in the commands check_in
72                                       get_version
73                                       get_error */
74   #define BYTE_RX_ERROR   5
75                            /* error when receiving number_of_bytes+1
76                               bytes via RF in squawk command */
77   #define MESSAGERX_ERROR  6
78                            /* error in the parity byte for the
79                               message in squawk command */
80   #define MESSAGEPARITY_ERROR 7
81                            /* buffer overflow error
82                               in pass_thru command */
83   #define BUFFER_FULL   8
84                            /* error when receiving response in
85                               pass_thru command */
86   #define RESPONSE_ERROR   9

87                            /* error trying to write to an input
88                               line in set_bit_cmd or reset_bit_cmd */
89   #define INPUTLINE_ERROR  10
```

CODE LISTING 2 APPENDIX    module comcmds.05h  292
COPYRIGHT 1993 SAVI TECHNOLOGY, INC.

```
90   /*-----------------------------------------------------------*/
91   /*-----------------------------------------------------------*/
92                        /* pulse width error in rf_receive */
93   #define T_RFPULSE_ERR      0x81
94                        /* parity error in rf_receive */
95   #define T_RFPARITY_ERR     0x82
96                        /* pulse width error in rf_receive
97                           when reading the tag ID */
98   #define T_RFIDPULSE_ERR    0x83
99                        /* parity error in rf_receive
100                          when reading the tag ID */
101  #define T_RFIDPARITY_ERR   0x84
102                       /* The tag has no beeper. This error
103                          is generated for beeper_on and
104                          beeper_off commands */
105  #define T_NOBEEPER_ERR     0x85
106                       /* parity error in the byte specifying
107                          the window size */
108  #define T_WINDOWPARITY_ERR 0x86
109                       /* pulse width error in rf_receive
110                          when reading the M,N in squawk */
111  #define T_RFMNPULSE_ERR    0x87
112                       /* parity error in rf_receive
113                          when reading M,N in squawk */
114  #define T_RFMNPARITY_ERR   0x88
115                       /* overflow in squawk. We are asking
116                          for more bytes than the size of
117                          the buffer */
118  #define T_SQUAWK_OVF_ERR   0x89
119                       /* pulse width error in rf_receive
120                          when reading window_size */
121  #define T_RFWPULSE_ERR     0x8A
122                       /* parity error in rf_receive
123                          when reading window_size */
124  #define T_RFWPARITY_ERR    0x8B
125                       /* pulse width error in rf_receive
126                          when reading the M,N in place */
127  #define T_RFMNPPULSE_ERR   0x8C
128                       /* parity error in rf_receive
129                          when reading M,N in place */
130  #define T_RFMNPPARITY_ERR  0x8D
131                       /* pulse width error in rf_receive
132                          when reading the string in place */
133  #define T_RFSTPPULSE_ERR   0x8E
134                       /* parity error in rf_receive
135                          when reading the string in place */
136  #define T_RFSTPPARITY_ERR  0x8F
```

CODE LISTING 2 APPENDIX
COPYRIGHT 1993 SAVI TECHNOLOGY, INC.

module comcmds.05h 293

```
137                         /* Incorrect CRC in place command */
138     #define T_PLACECRC_ERR    0x90
139                         /* Error when writing data to eeprom
140                             in place */
141     #define T_PLACEWRITE_ERR  0x91
142                         /* Error when comparing data written
143                             with the original message in place */
144     #define T_PLACECONFIRM_ERR 0x92
145                         /* Error when writing the new checksum
146                             error to eeprom in place */
147     #define T_PLACECHECK_ERR  0x93
148                         /* Error when confirming the writting
149                             of new checksum to the eeprom in place*/
150     #define T_CPLACECHECK_ERR 0x94
151                         /* overflow in place. We want to write
152                             more bytes than the size of
153                             the buffer */
154     #define T_PLACE_OVF_ERR   0x95
155                         /* overflow in place. The string overflows
156                             the maximum eeprom address */
157     #define T_PLACE_OVF2_ERR  0x96
158                         /* error when receiving the byte to be
159                             written to portb */
160     #define T_WRITEPORTB_ERR  0x97
```

CODE LISTING 2 APPENDIX  module communic.05h 294
COPYRIGHT 1993 SAVI TECHNOLOGY, INC.

```
1    /*            module communic.05h    */
2    #pragma option P
3    /*
4    * $Source: c:/version2/RCS/communic.05h $
5    * Communications interface for tag and interrogator
6    *
7    *
8    void init_thresholds();
9    void preamble() ;
10   int wait_header();
11   void send_wakeup() ;
12   void send_one() ;
13   void send_zero() ;
14   void transmit_byte(int a;) ;
15   int rf_receive(int how_many, int ptr);
16   */

17   void wait_pos();
18   void wait_neg();

19   #define select_neg TimerControl.1 = 0 ; /* select negative edge */
20   #define select_pos TimerControl.1 = 1 ; /* select positive edge */

21   unsigned int rf_error_code;

22   #ifdef TAG 23   unsigned int min_thresh[6];
24   unsigned int max_thresh[6];

25   #define ONE_MIN       min_thresh[0]
26   #define ZERO_MIN      min_thresh[1]
27   #define PRE_ID_MIN    min_thresh[2]
28   #define PRE_HIGH_MIN  min_thresh[3]
29   #define PRE_LOW_MIN   min_thresh[4]
30   #define LOW_MIN       min_thresh[5]

31   #define ONE_MAX       max_thresh[0]
32   #define ZERO_MAX      max_thresh[1]
33   #define PRE_ID_MAX    max_thresh[2]
34   #define PRE_HIGH_MAX  max_thresh[3]
35   #define PRE_LOW_MAX   max_thresh[4]
36   #define LOW_MAX       max_thresh[5]

37   #endif
```

CODE LISTING 2 APPENDIX  module communic.05h 295
COPYRIGHT 1993 SAVI TECHNOLOGY, INC.

```
38    #pragma option P
39    #ifdef INTERROGATOR
40    #define PRE_HIGH_MIN PRE_HIGH - MARGIN + DELTA_RF
41    #define PRE_HIGH_MAX PRE_HIGH + MARGIN + DELTA_RF 42    #define PRE_LOW_MIN  PRE_LOW  - MARGIN - DELTA_RF
43    #define PRE_LOW_MAX  PRE_LOW  + MARGIN - DELTA_RF 44    #define PRE_ID_MIN   PRE_ID - MARGIN + DELTA_RF
45    #define PRE_ID_MAX   PRE_ID + MARGIN + DELTA_RF 46    #define ZERO_MIN  IDEAL_ZERO - MARGIN + DELTA_RF
47    #define ZERO_MAX  IDEAL_ZERO + MARGIN + DELTA_RF 48    #define ONE_MIN   IDEAL_ONE - MARGIN + DELTA_RF
49    #define ONE_MAX   IDEAL_ONE + MARGIN + DELTA_RF 50    #define LOW_MIN   IDEAL_LOW - MARGIN - DELTA_RF
51    #define LOW_MAX   IDEAL_LOW + MARGIN - DELTA_RF 52    /*-----------------------------------------------------------
53                  SEND_WAKEUP
54    -------------------------------------------------------------
55    Send wakeup signal ( 58 KHz SIGNAL ) for 1.2 seconds
56    -----------------------------------------------------------*/
57    void send_wakeup()
58    {
59      for ( REGX = 0 ; REGX < 0xff ; REGX++ ) {
60        REGA = 0xff ;
61        do {
62          outhigh ;
63          NOP(); NOP(); NOP(); NOP(); NOP();     /* 10 cycles */
64          outlow ;
65          NOP() ;   /* one extra to balance signal, the while takes 9 cycles */
66        } while ( REGA -- != 0 ) ;
67      }

68      for ( REGX = 0 ; REGX < 0x52 ; REGX++ ) {    /* send 0.2 more seconds */
69        REGA = 0xff ;
70        do {
71          outhigh ;
72          NOP(); NOP(); NOP(); NOP(); NOP();     /* 10 cycles */
73          outlow ;
74          NOP() ;   /* one extra to balance signal, the while takes 9 cycles */
75        } while ( REGA -- != 0 ) ;
76      }
77    } /* end send_wakeup */
78    #endif
```

CODE LISTING 2 APPENDIX          module communic.05h 296
COPYRIGHT 1993 SAVI TECHNOLOGY, INC.

```
 79    #pragma option P
 80    /*-------------------------------------------------------------
 81                        PREAMBLE
 82    -------------------------------------------------------------
 83    Send the first part of the preamble signal formed by nine pulses
 84    -----------------------------------------------------------*/
 85    #define PRE_PULSE_COUNT 11
 86    void preamble()
 87    {
 88      for ( REGA = 0 ; REGA < PRE_PULSE_COUNT ; REGA++) {
 89        outhigh; pre_h_delay();
 90        outlow; REGX = PRE_L; delay();
 91      }
 92      outhigh ;

93    #ifdef TAG
 94        REGX = TAG_COUNT;
 95    #else
 96        REGX = INT_COUNT;
 97    #endif 98      delay();
 99      outlow ;
100      REGX = PRE_END_PAD;        /* pad to 100us delay */
101      delay();
102    }

103    #pragma option P
104    /*-------------------------------------------------------------
105                        SEND_ONE
106    -------------------------------------------------------------
107    Send a bit in one. This is a high pulse of one_delay duration amd
108    a low pulse of short_delay duration
109    -----------------------------------------------------------*/
110    void send_one()
111    {
112      outhigh; one_delay() ;
113      outlow; low_level_delay() ;
114    }

115    /*-------------------------------------------------------------
116                        SEND_ZERO
117    -------------------------------------------------------------
118    Send a bit in zero. This is a high pulse of zero_delay
119    duration and a low pulse of short_delay duration
120    -----------------------------------------------------------*/
121    void send_zero()
122    {
```

CODE LISTING 2 APPENDIX          module communic.05h  297
COPYRIGHT 1993 SAVI TECHNOLOGY, INC.

```
123        outhigh; zero_delay() ;
124        outlow; low_level_delay() ;
125     }

126     #pragma option P
127     /*----------------------------------------------------
128                     TRANSMIT_BYTE
129     -----------------------------------------------------
130        Transmit a whole byte of value tx_byte by succesive calls to send_one
131        and send_zero routines.
132     -----------------------------------------------------*/
133     void transmit_byte(tx_value)
134     registera tx_value ;
135     {
136     int tempx ;
137     unsigned int parity_counter ;

138                parity_counter = 0 ;
139                REGX = 8;
140     #asm
141     EACH_BIT
142     #endasm
143                tempx = REGX ;
144     #asm
145             LSRA
146             BCC     IS_ZERO
147     #endasm
148                send_one() ;
149                parity_counter++ ;
150                REGX = tempx;
151                REGX--;
152     #asm
153             BNE     EACH_BIT
154             BRA     FINAL_BITS
155     IS_ZERO
156     #endasm
157                send_zero();
158                REGX = tempx;
159                REGX--;
160     #asm
161             NOP
162             NOP
163             BNE     EACH_BIT
164             NOP               ; compensate bra final_bits
165     FINAL_BITS                ; add parity ans stop bits 166             NOP               ; add some delays to keep constant
```

CODE LISTING 2 APPENDIX      module communic.05h 298
COPYRIGHT 1993 SAVI TECHNOLOGY, INC.

```
167                  NOP                     ; the time for the low level */
168         #endasm 169                  if (parity_counter & 0x01 != 0)
170                       send_one() ;
171                  else
172                       send_zero() ;
173         #asm
174                  ldx #$01                 ;add delay before the stop bit
175         #endasm
176                  delay() ;
177                  send_zero() ; /* stop bit */
178         }

179         #pragma option P
180         #ifdef TAG
181         /*-----------------------------------------------------------
182                            INIT_THRESHOLDS
183         -----------------------------------------------------------
184         Determine if pulse mesurment thresholds are to have hard coded MARGIN
185         and DISTORTION or get them from EEPROM. Then initialize thresholds
186         -----------------------------------------------------------*/
187         #define EE_MARGIN 9
188         #define EE_DISTORT 10

189         void init_thresholds()
190         {
191         #define margin     i
192         #define pulse_dist j 193              if ( USE_EE_THRESH ) {
194                   margin = ee_read(EE_MARGIN);
195                   pulse_dist = ee_read(EE_DISTORT);
196              }
197              else {
198                   margin = MARGIN;
199                   pulse_dist = DELTA_RF;
200              }

201              /* the first 4 entrys in the ideal_times are for pulses */
202              /* here we must add the pulse distortion */
203              for( REGX = 0; REGX < 6; REGX++) {
204                   max_thresh[REGX] = ideal_times[REGX] + margin + pulse_dist;
205                   min_thresh[REGX] = ideal_times[REGX] - margin + pulse_dist;

206                   /* the last 2 entrys in the ideal_times are for low levels */
207                   /* here we must subtract the pulse distortion */
208                   if (REGX==3) pulse_dist = (-pulse_dist);
```

CODE LISTING 2 APPENDIX
COPYRIGHT 1993 SAVI TECHNOLOGY, INC.

```
209         }

210     } /* end init_thresholds */
211     #endif

212     #pragma option P
213     /*--------------------------------------------------------------
214                     RF_RECEIVE
215     ---------------------------------------------------------------
216     This routine receive how_many bytes from the interrogator and puts
217     them into a zero page buffer pointed to by ptr. If there is an error
218     during the reception of the data this routine returns FALSE. Otherwise
219     it returns TRUE.
220     ---------------------------------------------------------------*/
221     int rf_receive(how_many, ptr)
222     int how_many, ptr;
223     {
224     #define bit_counter     i
225     #define rf_data         temph
226     #define parity_received templ 227     unsigned int byte_counter ;
228     unsigned int parity_counter ;
229     int *bp;                /* pointer into the buffer */

230         bp = ptr;
231         REGA = TimerStatus ;
232         REGA = InputTimerLow ;
233         select_pos ;

234     /*
235      *  do the for loop in assembler because the compiler uses only short jumps
236      *    for ( byte_counter = 0 ; byte_counter < how_many ; byte_counter++)
237      */
238     #asm
239         clr  byte_counter        ; byte_counter = 0
240     start_byte_loop
241         lda  byte_counter
242         cmp  how_many
243         bcs  do_more             ; if (byte_counter < how_many) do_more
244         jmp  end_byte_loop       ; else jump ot end of the loop
245     do_more
246     #endasm
247     /* {                                              */
248         parity_counter = 0 ;
249         rf_error_code = T_RFPULSE_ERR ;     /* assume pulse error until done */
250         wait_pos() ;
251         for ( bit_counter = 8 ; bit_counter > 0 ; bit_counter--)
```

CODE LISTING 2 APPENDIX    module communic.05h  300
COPYRIGHT 1993 SAVI TECHNOLOGY, INC.

```
252            {
253            rf_data >>= 1 ;
254            wait_neg() ;
255            if ((length <= ZERO_MAX) && (length >= ZERO_MIN))
256                rf_data &= 0b01111111 ;
257            else
258                if ((length <= ONE_MAX) && (length >= ONE_MIN))
259                {
260                rf_data |= 0b10000000 ;
261                parity_counter++ ;
262                }
263                else return(FALSE) ; /* a wrong pulse was received. */

264            wait_pos() ;
265            if (length < LOW_MIN)
266                return(FALSE) ;        /* low level too short */
267            } /* end for bit_counter */

268            wait_neg() ;
269            if ((length <= ZERO_MAX) && (length >= ZERO_MIN))
270                parity_received = 0 ;
271            else
272                if ((length <= ONE_MAX) && (length >= ONE_MIN))
273                    parity_received = 1 ;
274                else
275                    return(FALSE) ; /* a wrong pulse was received. */
276            wait_pos() ;
277            if (length < LOW_MIN) return(FALSE) ;        /* low level too short */

278            wait_neg() ;

279            if ( (parity_counter & 0x01) == parity_received)
280                *bp++ = rf_data ;
281            else
282                {
283                rf_error_code = T_RFPARITY_ERR ;
284                return(FALSE) ;
285                }
286    #asm
287        inc byte_counter
288        jmp start_byte_loop
289    end_byte_loop
290    #endasm 291            rf_error_code = ALL_OK ;
292            return(TRUE) ;              /* return TRUE indicating that
293                                           the reception was correct */
294        }
```

CODE LISTING 2 APPENDIX    module communic.05h 301
COPYRIGHT 1993 SAVI TECHNOLOGY, INC.

```
295   #pragma option P
296   /*------------------------------------------------------------
297                   WAIT_NEG
298   ------------------------------------------------------------
299   This routine waits until a negative edge is found in the TCAP line.
300   It returns the time that the signal was high in timer counts.
301   1 timer count = 2 microseconds.
302   ------------------------------------------------------------*/
303   void wait_neg()
304   {
305     while ( TimerStatus.7 == 0 )
306       ;
307     length = InputTimerLow - start ;
308     start = InputTimerLow ;
309   #ifdef DEBUG
310     portb=length;
311   #endif
312     select_pos;
313   }

314   /*------------------------------------------------------------
315                   WAIT_POS
316   ------------------------------------------------------------
317   This routine waits until a negative edge is found in the TCAP line.
318   It returns the time that the signal was low in timer counts.
319   1 timer count = 2 microseconds.
320   ------------------------------------------------------------*/
321   void wait_pos()
322   {
323     while ( TimerStatus.7 == 0 );
324     length = InputTimerLow - start ;
325     start = InputTimerLow ;
326   #ifdef DEBUG
327     portb=length;
328   #endif
329     select_neg ;
330   }

331   #pragma option P
332   /*------------------------------------------------------------
333                   WAIT_HEADER
334   ------------------------------------------------------------
335   Receive the header (preamble) signal and then returns.
336   This routine can also go to sleep because of timeout.
337   ------------------------------------------------------------*/
338   int wait_header()
339   {
340   #define pulse_counter i
```

CODE LISTING 2 APPENDIX
COPYRIGHT 1993 SAVI TECHNOLOGY, INC.

module communic.05h 302

```
341         while (TRUE)
342         {

343         try_again:
344           pulse_counter = 0 ;
345           while ( pulse_counter != 6 )
346           {
347             REGA = TimerStatus ;
348             REGA = InputTimerLow ;
349             select_pos ;

350             /* wait for positive while checking time*/
351             while (TimerStatus.7 == 0) {
352         #ifdef INTERROGATOR
353                 if ( time_expired() ) {
354                   return(1);
355         #endif
356         #ifdef TAG
357                 if ( timeout == 0 ) {
358         #endif
359         #ifdef USE_LCD
360                   lcd_clear() ;
361                   timeout_msg() ;
362         #endif
363         #ifdef TAG
364                   Stop_Micro() ;
365         #endif
366                 }
367               } /* end while TimerStatus */

368             start = InputTimerLow ;
369             select_neg ;
370             for ( pulse_counter = 0 ; pulse_counter < 6 ; pulse_counter++ )
371             {
372               wait_neg() ;

373               if (( length <= PRE_HIGH_MIN ) || ( length >= PRE_HIGH_MAX ))
374                 goto try_again ;

375               wait_pos() ;

376               if (( length <= PRE_LOW_MIN ) || ( length >= PRE_LOW_MAX ))
377                 goto try_again ;
378             } /* for pulse_counter=1:6 */
379           } /* while pulse_counter <> 6*/

380           for ( pulse_counter = 0 ; pulse_counter < 6 ; pulse_counter++ )
381           {
```

CODE LISTING 2 APPENDIX  module communic.05h  303
COPYRIGHT 1993 SAVI TECHNOLOGY, INC.

```
382             wait_neg() ;
383             if ((length > PRE_ID_MIN) && (length < PRE_ID_MAX))
384                goto got_header ; /* sorry for the goto but in this case it
385                        does not look that bad, and this part is
386                        time critical to do something fancy */
387     /*
388             if (( length <= PRE_HIGH_MIN ) || ( length >= PRE_HIGH_MAX ) )
389                goto try_again ;
390     */

391             wait_pos() ;
392             if (( length <= PRE_LOW_MIN ) || ( length >= PRE_LOW_MAX ) )
393                goto try_again ;
394            } /* for pulse_counter = 1:6 */

395         } /* while TRUE */

396     got_header:
397     #ifdef INTERROGATOR
398         return(0);
399     #endif
400     } /* end wait_header() */
```

CODE LISTING 2 APPENDIX
COPYRIGHT 1993 SAVI TECHNOLOGY, INC.

module delaydef.h 304

```
1    /*          module delaydef.h                      */
2    #pragma option P
3    /*
4     * $Source: c:/version2/RCS/delaydef.h $
5     * Define the timing given by the specification
6     */

7    /****************************************************/
8    /* counter values used to to generate the delays    */
9    /* They are the same in TAG and INT, with the exception */
10   /* TAG COUNT is used only in TAG and                */
11   /* HELLO COUNT is used only in INT                  */
12   /****************************************************/
13         /* preamble high pulse 50us */
14   #define PRE_H       11
15         /* preamble low space 75us */
16   #define PRE_L       20
17         /* id pulse from tag to int 70us */
18   #define TAG_COUNT   20
19         /* id pulse from int to tag 110us */
20   #define INT_COUNT   33
21         /* padding to 100ms after id pulse of preamble */
22   #define PRE_END_PAD 22
23   #define SHORT_DELAY      14
24   #define ONE_DELAY   24
25   #define ZERO_DELAY  11
26   #define LOW_LEVEL_DELAY 1

27   /****************************************************/
28   /* define maximum allowable error. Currently we are */
29   /* using plus minus 4 timer counts.                 */
30   /****************************************************/
31   #define MARGIN 4

32   /****************************************************/
33   /* define current RF link distorsion in number of timer */
34   /* counts                                           */
35   /* Tag -> Int Pulses lengthened, spaces shortened   */
36   /* Int -> Tag Pulses shortened, length shortened    */
37   /****************************************************/
38   #define TAG2INT_DISTORSION 2
39   #define INT2TAG_DISTORSION -2

40   #ifdef TAG
41   #define DELTA_RF INT2TAG_DISTORSION
42   #else
```

CODE LISTING 2 APPENDIX
COPYRIGHT 1993 SAVI TECHNOLOGY, INC.

module delaydef.h 305

```
43    #define DELTA_RF TAG2INT_DISTORSION
44    #endif

45    /*************************************************/
46    /*     define constants for header detection     */
47    /*************************************************/
48    #define PRE_HIGH 25
49    #define PRE_LOW 38
50    #ifdef TAG
51    #define PRE_ID 55
52    #else
53    #define PRE_ID 35
54    #endif 55    /*************************************************/
56    /*     define constants for data (0,1) detection */
57    /*************************************************/
58    #define IDEAL_ZERO 25
59    #define IDEAL_ONE 45
60    #define IDEAL_LOW 18
```

CODE LISTING 2 APPENDIX        module delays.05h 306
COPYRIGHT 1993 SAVI TECHNOLOGY, INC.

```
1    /*         module delays.05h               */
2    #pragma option P
3    /***********************************************************/
4    /*         DELAYS UNIT                      */
5    /*
6    $Source: c:/version2/RCS/delays.05h $ 7        This unit contains routines used to produce delays of different
8        duration. All the routines in this unit modify only the X
9        register, and are called without parameters.

10   defined macros
11   --------------
12   pre_h_delay() ;     Delay for high part of preamble
13   pre_l_delay() ;     Delay for low part of preamble
14   short_delay() ;
15   zero_delay() ;      Delay for high part of zero
16   one_delay()  ;      Delay for high part of one
17   hello_delay();      left over from early times for interrogator 18   defined functions
19   -----------------
20   delay();        lowest level time delay loop
21   one_nop_delay();    calls delay
22   two_nop_delay();    calls delay
23   low_level_delay();  precise timing for filling space
24   one_msec() ;        one millisecond
25   five_msec() ;       five milliseconds
26   int_tenth_second(a);  # of tenth of second

27   */

28   #pragma option P
29   /*----------------------------------------------------------*/
30   /*                    DELAY                              */
31   /*----------------------------------------------------------*/
32   /* This routine produces a delay of 6 + X * 6 cycles        */
33   /*----------------------------------------------------------*/
34   void delay()
35   {
36   #asm
37   delay_loop    DECX              ; 3 cycles
38                 BNE    delay_loop ; 3 cycles
39   #endasm
40   }                            /* 6 cycles (RTS)   */
```

CODE LISTING 2 APPENDIX
COPYRIGHT 1993 SAVI TECHNOLOGY, INC.

module delays.05h 307

```
41      /*-------------------------------------------------*/
42      /* ONE_NOP_DELAY and TWO_NOP_DELAY                 */
43      /*-------------------------------------------------*/
44      /* These routines produce a exact timing loops     */
45      /*-------------------------------------------------*/
46      #asm
47      two_nop_delay   NOP
48      one_nop_delay   NOP
49              BSR delay   ;X*6+12 cycles
50              RTS
51      #endasm 52      /*-------------------------------------------------*/
53      /*      PRE_H_DELAY   (high part of the preamble signal)  */
54      /*-------------------------------------------------*/
55      #define pre_h_delay() REGX=PRE_H;one_nop_delay();

56      /*-------------------------------------------------*/
57      /*      PRE_L_DELAY   (low part of the preamble signal)   */
58      /*-------------------------------------------------*/
59      #define pre_l_delay() REGX=PRE_L;two_nop_delay();

60      /*-------------------------------------------------*/
61      /*      SHORT_DELAY                                */
62      /*-------------------------------------------------*/
63      #define short_delay() REGX=SHORT_DELAY;one_nop_delay();

64      /*-------------------------------------------------*/
65      /*      ONE_DELAY   delay for hi part of '1' bit   */
66      /*-------------------------------------------------*/
67      #define one_delay() REGX=ONE_DELAY;two_nop_delay();

68      /*-------------------------------------------------*/
69      /*      ZERO_DELAY  delay for hi part of '0' bit   */
70      /*-------------------------------------------------*/
71      #define zero_delay() REGX=ZERO_DELAY;two_nop_delay();

72      /*-------------------------------------------------*/
73      /*      LOW_LEVEL_DELAY  precise delay, no loop    */
74      /*-------------------------------------------------*/
75      void low_level_delay(void)
76      {
77      registerx shortcount ;
78        shortcount = LOW_LEVEL_DELAY ;  /* this value is not used in a loop! */
79        NOP() ;                 /* 2 cycles */
80      #asm
81          BSR MYRTS
82      MYRTS RTS
```

CODE LISTING 2 APPENDIX  module delays.05h 308
COPYRIGHT 1993 SAVI TECHNOLOGY, INC.

```
83   #endasm
84   }                         /* 6 cycles */

85   /*---------------------------------------------------*/
86   /*      ONE_MSEC     delay of 1 millisec           */
87   /*---------------------------------------------------*/
88   /* delay = 9 * one_counter+8 cycles+ 6 cycles for initial jsr  */
89   /* one_counter = 221*9=1989  1989+14=2003 cycles = 1.0015 msec */
90   /*---------------------------------------------------*/
91   void one_msec()
92   {
93     REGX = 221 ;
94     do { REGX--; }  while ( REGX != 0 ) ;
95   }

96   /*---------------------------------------------------*/
97   /*               FIVE_MSEC                          */
98   /*---------------------------------------------------*/
99   /* delay of 5.0135 msec  5*2003 cycles+12=10,027cycles = 5.0135ms*/
100  /*---------------------------------------------------*/
101  void five_msec()
102  { one_msec(); one_msec(); one_msec(); one_msec(); one_msec(); }

103  /*---------------------------------------------------*/
104  /*      INT_TENTH_SECOND    delay of number_ten tenths of second */
105  /*---------------------------------------------------*/
106  void int_tenth_second(number_ten)
107  unsigned int number_ten ;
108  {
109  unsigned int one_counter ;
110    for (one_counter = 0 ; one_counter < number_ten ; one_counter++ )
111       { five_msec(); five_msec(); }
112  }

113  #ifdef USE_LCD
114  /*---------------------------------------------------*/
115  /*     TENTH_SECOND     delay of number_ten tenths of second   */
116  /*---------------------------------------------------*/
117  void tenth_second(number_ten)
118  unsigned int number_ten ;
119  {
120  unsigned int one_counter ;
121    for (one_counter = 0 ; one_counter < number_ten ; one_counter++ )
122       { five_msec(); five_msec() ; }
123  }
124  #endif
```

CODE LISTING 2 APPENDIX
COPYRIGHT 1993 SAVI TECHNOLOGY, INC.

module delays.05h 309

```
125    #ifdef INTERROGATOR
126    /*------------------------------------------------------------*/
127    /*        HELLO_DELAY    left over from early times       */
128    /*------------------------------------------------------------*/
129    #define hello_delay() REGX=21;two_nop_delay();
130    #endif
```

CODE LISTING 2 APPENDIX
COPYRIGHT 1993 SAVI TECHNOLOGY, INC.

module eeprom.05h 310

```
1    /*          module eeprom.05h         */
2    /*----------------------------------------
3                    EEPROM UNIT
4    ----------------------------------------*
5    $Source: c:/version2/RCS/eeprom.05h $ 6               - if EEPROM_TYPE line is low we have a 1 Kbit eeprom.
7                 if it is high we have a 2 Kbit.
8                 EEPROM_TYPE is defined in tagconfg.h 9        This unit implements the primitives to access the 1Kbit serial
10       eeprom (XL93C46 ). In the case of write,erase and erase_all a
11       code is returned to indicate if the operation was sucessfull.
12       A code TRUE is returned if everything is OK.
13       A code FALSE is returned is timeout occured while waiting for
14       the ready signal
15   *----------------------------------------*/

16   /* interface for the eeprom driver */
17   /*
18   void ee_init() ;
19   void ee_enable() ;
20   void ee_disable() ;
21   int  ee_write(int a;int b;) ;
22   int  ee_read(int a;) ;
23   int  ee_erase(int a;) ;
24   int  ee_erase_all() ;
25   */

26   /*----------------------------------------*/

27   #define WRITE_CMD       0b10100000
28   #define READ_CMD        0b11000000
29   #define ERASE_CMD       0b11100000
30   #define ERA_ALL_CMD     0b10000000
31   #define ERA_ALL_CMD2    0b10000000
32   #define ENABLE_DISABLE  0b10000000
33   #define ENABLE_CMD      0b11000000
34   #define DISABLE_CMD     0b00000000

35   #define select_eeprom   ee_cs = 1
36   #define deselect_eeprom ee_cs = 0

37   /* eeprom power is low true logic */
38   #define ee_pwr_on  ee_vcc = 0
39   #define ee_pwr_off ee_vcc = 1
```

CODE LISTING 2 APPENDIX
COPYRIGHT 1993 SAVI TECHNOLOGY, INC.

module eeprom.05h 311

```
40      /* four global variables are used by this unit */

41      union both ee_dato ;
42      unsigned int ee_data ;
43      unsigned int ee_address ;
44      unsigned int ee_code ;     /* code used to return error if we fail waiting
45                                    for the ready signal */

46      /* it also uses temp_high and temp_low which are defined in tag.05c */

47      /*-------------------------------------------------------------
48                          EE_INIT
49      -------------------------------------------------------------
50      Initialize the eeprom driver by enabling the eeprom
51      -------------------------------------------------------------*/
52      void ee_init()
53      {
54        ee_pwr_on; ee_enable() ;   /* enable the eprom to be programmed */
55      }

56      /*-------------------------------------------------------------
57                          EE_CLOCK
58      -------------------------------------------------------------
59      Generate the clock signal to the eeprom
60
61      -------------------------------------------------------------*/
62      void ee_clock()
63      {
64        ee_sk = 0 ;
65        NOP(); NOP(); NOP(); NOP();
66        ee_sk = 1 ;
67      }

68      /*-------------------------------------------------------------
69                          WAIT_CHIP_READY
70      -------------------------------------------------------------
71      Wait for the eeprom chip to be ready. The chip is ready when the
72      line ee_get is high.
73      Is the line does not go high in 20 msec then the code FALSE is
74      returned indicating that the operation failed. The spec says that
75      the maximum waiting time is 10 msec. In practice it is about 7 msec.
76      -------------------------------------------------------------*/
77      int wait_chip_ready()
78      {
79        deselect_eeprom ;    /* deselect to enter in self clocking mode */
```

CODE LISTING 2 APPENDIX       module eeprom.05b  312
COPYRIGHT 1993 SAVI TECHNOLOGY, INC.

```
80      select_eeprom ;
81      temph = TimerAltHigh ;
82      templ = TimerAltLow ;
83      while ( ee_get == 0 )
84        {
85          if (TimerAltHigh-temph > 0x22)  /* timeout to 20 msec */
86            {
87              temph = TimerAltLow ;   /* read low byte to complete the sequence */
88              return(FALSE) ;         /* indicate that timeout error has occured */
89            }
90        }
91      return(TRUE) ;
92    }

93    /*-----------------------------------------------------
94                    SEND_BITS
95    -----------------------------------------------------
96      Send the ee_bits leftmost bits of ee_data through the serial line
97    -----------------------------------------------------*/
98    void send_bits(ee_bits,ee_dato)
99    registerx ee_bits ;
100   {
101     do {
102       if (ee_dato.bool.7 == 1) ee_put = 1 ;
103       else ee_put = 0 ;

104       ee_clock() ;
105       ee_dato.num <<= 1 ;
106       ee_bits-- ;
107     } while ( ee_bits > 0 ) ;
108   }

109   /*-----------------------------------------------------
110                   SEND_COMMAND
111   -----------------------------------------------------
112     Send a three bit command to the eeprom
113   -----------------------------------------------------*/
114   void send_command(command)
115   registera command ;
116   { send_bits(3,command); }

117   /*-----------------------------------------------------
118                   SEND_DATA
119   -----------------------------------------------------
120     Send the eight bits of data through the serial line
121   -----------------------------------------------------*/
122   void send_data(data)
```

CODE LISTING 2 APPENDIX          module eeprom.05h  313
COPYRIGHT 1993 SAVI TECHNOLOGY, INC.

```
123     registera data ;
124     { send_bits(8,data); }

125     /*-------------------------------------------------------
126                         SEND_ADDRESS
127     -------------------------------------------------------
128     This routine send the address to the eeprom. If the EEPROM_TYPE
129     line is low then we have to send the address for the 1Kbit
130     eeprom (7 bits), otherwise we send the full 8 bits of the address.
131     -------------------------------------------------------*/
132     void send_address(address)
133     registera address ;
134     {
135       if (EEPROM_TYPE == 0)         /* 1 Kbit memory */
136         send_bits(7,address<<1) ;   /* address in only 7 bits */
137       else
138         send_bits(8,address) ;      /* address in 8 bits long */
139     }

140     /*-------------------------------------------------------
141                         GET_DATA
142     -------------------------------------------------------
143     Read one byte of data and put it in ee_data
144     -------------------------------------------------------*/
145     void get_data()
146     {
147     registerx gbit ;
148       for ( gbit = 8 ; gbit > 0 ; gbit--)
149         {
150           ee_data <<= 1;
151           ee_clock() ;
152           if (ee_get == 0) ee_data &= 0b11111110 ;
153           else ee_data |= 0b00000001 ;
154         }
155     }

156     /*-------------------------------------------------------
157                         EE_ENABLE
158     -------------------------------------------------------
159     Enable the eeprom to be programmed.
160     -------------------------------------------------------*/
161     void ee_enable()
162     {
163       select_eeprom ;
164       send_command(ENABLE_DISABLE) ;
165       send_data(ENABLE_CMD) ;
166       deselect_eeprom ;
167     }
```

CODE LISTING 2 APPENDIX  module eeprom.05h 314
COPYRIGHT 1993 SAVI TECHNOLOGY, INC.

```
168   /*------------------------------------------------------------
169                   EE_WRITE
170   ------------------------------------------------------------
171     Write the data ee_data into the location ee_address. If the write
172     fails it returns FALSE, other wise it returns TRUE.
173   ------------------------------------------------------------*/
174   int ee_write(ee_data,ee_address)
175   {
176     select_eeprom ;
177     send_command(WRITE_CMD) ;
178     send_address(ee_address) ;
179     send_data(ee_data) ;
180     ee_code = wait_chip_ready() ;
181     deselect_eeprom ;
182     return(ee_code) ;
183   }

184   /*------------------------------------------------------------
185                   EE_READ
186   ------------------------------------------------------------
187     Read a byte from the location ee_address
188   ------------------------------------------------------------*/
189   int ee_read(ee_address)
190   {
191     select_eeprom ;
192     send_command(READ_CMD) ;
193     send_address(ee_address) ;
194     get_data() ;
195     deselect_eeprom ;
196     return(ee_data) ;
197   }

198   /****************** COMMENT ALL NON USED ROUTINES *****************/
199   /*

200   /*------------------------------------------------------------
201                   EE_DISABLE
202   ------------------------------------------------------------
203     Disable the eeprom to be programmed.
204   ------------------------------------------------------------*/
205   void ee_disable()
206   {
207     select_eeprom ;
208     send_command(ENABLE_DISABLE) ;
209     send_data(DISABLE_CMD) ;
210     deselect_eeprom ;
211   }
```

CODE LISTING 2 APPENDIX
COPYRIGHT 1993 SAVI TECHNOLOGY, INC.

module eeprom.05h 315

```
212    /*------------------------------------------------
213                    EE_ERASE
214    ------------------------------------------------
215    Erase the location ee_address. Return TRUE is sucessfull FALSE
216    otherwise.
217    ------------------------------------------------*/
218    int ee_erase(ee_address)
219    {
220      select_eeprom ;
221      send_command(ERASE_CMD) ;
222      send_address(ee_address) ;
223      ee_code = wait_chip_ready() ;
224      deselect_eeprom ;
225      return(ee_code) ;
226    }

227    /*------------------------------------------------
228                    EE_ERASE_ALL
229    ------------------------------------------------
230    Erase the whole eeprom. If fails it return FALSE. Otherwise it
231    returns TRUE.
232    ------------------------------------------------*/
233    int ee_erase_all()
234    {
235      select_eeprom ;
236      send_command(ERA_ALL_CMD) ;
237      send_data(ERA_ALL_CMD2) ;
238      ee_code = wait_chip_ready() ;
239      deselect_eeprom ;
240      return(ee_code) ;
241    }

242    /*------------------------------------------------
243      Routine to test the eeprom. Disabled temporarily
244    ------------------------------------------------*/
245    void test_eeprom()
246    {
247    registerx ee_count ;
248      enable() ;   /* enable eeprom for programming */
249      for ( ee_count = 0 ; ee_count < 10 ; ee_count++)
250        {
251          ee_address = ee_count ;
252          ee_write(ee_count) ;
253        }

254      for ( ee_count = 0 ; ee_count < 10 ; ee_count++)
255        {
```

CODE LISTING 2 APPENDIX
COPYRIGHT 1993 SAVI TECHNOLOGY, INC.

module eeprom.05h  316

```
256          ee_address = ee_count ;
257          ee_buffer[ee_count] = ee_read() ;
258        }
259      }
260   */
```

CODE LISTING 2 APPENDIX  
COPYRIGHT 1993 SAVI TECHNOLOGY, INC.

module lcd.05h 317

```
1    /*            module lcd.05h                    */
2    /*-----------------------------------------------
3                  LCD DRIVER
4    $Source: c:/version2/RCS/lcd.05h $
5    ---------------------------------------------*/

6    /* interface for lcd driver */
7    void lcd_init() ;
8    void lcd_shift() ;
9    void lcd_clear() ;
10   void lcd_move(int a;) ;
11   void lcd_write(int a;) ;
12   void lcd_line1() ;
13   void lcd_line2() ;
14   void timeout_msg() ;

15   /*-----------------------------------------------
16      These two variables are used for the LCD driver unit.
17   ---------------------------------------------*/
18   unsigned int dram              @ 0xD5 ;
19   unsigned int charmap [0x1C]    @ 0xD6 ;

20   #define send_lcd_cmd(lcdcmd) porta.1 = 1 ;\
21                        portb = lcdcmd ;\
22                        porta.1 = 1;\
23                        porta.1 = 0 ;\
24                        one_msec() ; \
25                        one_msec() ; \
26                        one_msec() ; \
27                        one_msec() ; \
28                        one_msec() ; \
29                        one_msec() ;
30   /*-----------------------------------------------
31                  LCD_INIT
32   -----------------------------------------------
33      Initialize the LCD display by following the directions in the manual
34      AND, led and lcd products.Display Products Catalog 1988. (red cover)
35   ---------------------------------------------*/
36   void lcd_init()
37   {
38     tenth_second(5) ;          /* wait 0.5 seconds */
39     porta.0 = 0 ;
40     send_lcd_cmd(0x38) ;       /* function set */
41     tenth_second(2) ;          /* wait 0.2 seconds */
42     send_lcd_cmd(0x38) ;       /* function set */
43     send_lcd_cmd(0x38) ;       /* function set */
```

CODE LISTING 2 APPENDIX
COPYRIGHT 1993 SAVI TECHNOLOGY, INC.

module lcd.05h 318

```
44      send_lcd_cmd(0x0C) ;        /* turn display on */
45      send_lcd_cmd(0x01) ;        /* clear display */
46      send_lcd_cmd(0x06) ;        /* set entry mode */
47    }
48    /*-----------------------------------------------------------
49                    LCD_SHIFT
50    -----------------------------------------------------------
51      Shift the lcd display N_SHIFTS location to the left, then
52      N_SHIFTS locations to the right, leaving unaltered the message
53    -----------------------------------------------------------*/
54    #define N_SHIFTS 40
55    void lcd_shift()
56    {
57    unsigned int shift_counter ;
58    for ( shift_counter = 0 ; shift_counter < N_SHIFTS ; shift_counter++)
59      {
60        porta.1 = 1 ;
61        portb = 0x18 ;
62        porta.1 = 0 ;
63        tenth_second(1) ;
64      }
65    /* one_second() ;*/
66    for ( shift_counter = 0 ; shift_counter < N_SHIFTS ; shift_counter++)
67      {
68        porta.1 = 1 ;
69        portb = 0x1C ;
70        porta.1 = 0 ;
71        tenth_second(1) ;
72      }
73    }

74    /*-----------------------------------------------------------
75                    LCD_CLEAR
76    -----------------------------------------------------------
77      Clear the LCD display
78    -----------------------------------------------------------*/
79    void lcd_clear()
80    {
81      send_lcd_cmd(0x01) ;   /* clear display */
82    }

83    /*-----------------------------------------------------------
84                    LCD_MOVE
85    -----------------------------------------------------------
86      Move the cursor to the location indicated in the argument
87    -----------------------------------------------------------*/
88    void lcd_move(dram)
89    registera dram ;
```

CODE LISTING 2 APPENDIX  
COPYRIGHT 1993 SAVI TECHNOLOGY, INC.

module lcd.05h 319

```
90      {
91        porta.1 = 1 ;
92        portb = dram ;
93        porta.1 = 0 ;
94        one_msec() ;
95      }

96      /*-------------------------------------------------
97                      LCD_WRITE
98      -------------------------------------------------
99        Write the first nchars characters of the string charmap into the LCD
100     -------------------------------------------------*/
101     void lcd_write(nchars)
102     int nchars ;
103     {
104       int char_counter ;
105       porta.0 = 1 ;    /* write active */

106       for ( char_counter = 0 ; char_counter < nchars ; char_counter++ )
107         {
108         porta.1 = 1 ;
109         portb = charmap[char_counter] ;
110         porta.1 = 0 ;
111         one_msec() ;
112         }
113       porta.0 = 0 ;
114     }

115     /*-------------------------------------------------
116                     LCD_LINE1
117     -------------------------------------------------
118       Move the cursor to the beginning of line1
119     -------------------------------------------------*/
120     void lcd_line1()
121     {
122       lcd_move(0x80) ;
123     }

124     /*-------------------------------------------------
125                     LCD_LINE2
126     -------------------------------------------------
127       Move the cursor to the beginning of line2
128     -------------------------------------------------*/
129     void lcd_line2()
130     {
131       lcd_move(0xC0) ;
132     }
```

CODE LISTING 2 APPENDIX  
COPYRIGHT 1993 SAVI TECHNOLOGY, INC.

module msgs.05h  320

```
1    /*              module msgs.05h                    */
2    /*              MESSAGES UNIT
3    *
4    * $Source: c:/version2/RCS/msgs.05h $
5    * Messages interface for tag and interrogator
6    *
7    *
8    ----------------------------------------------------------*/

9    #define show1(message) lcd_line1();\
10           for(REGX=0;(charmap[REGX]=message[REGX])!=0;REGX++) \
11                   ; \
12           lcd_write(REGX)

13   #define show2(message) lcd_line2();\
14           for(REGX=0;(charmap[REGX]=message[REGX])!=0;REGX++) \
15                   ; \
16           lcd_write(REGX)

17   #ifdef TAG
18   /*----------------------------------------------------------
19       Display the title Tytag V2.0 ..
20   ----------------------------------------------------------*/
21   const char title1msg[] = "Savi Technology TyTag" ;
22   void title_msg() { show1(title1msg) ;}

23   /*----------------------------------------------------------
24       Display "   ID = "
25   ----------------------------------------------------------*/
26   const char myIDmsg[] = "  ID = " ;
27   void myID_msg() { show2(myIDmsg) ;}

28   /*----------------------------------------------------------
29       ;        ' Sleeping'
30   ----------------------------------------------------------*/
31   const char sleepingmsg[] = "Sleeping ....." ;
32   void sleeping_msg() { show1(sleepingmsg) ; }

33   /*----------------------------------------------------------
34       ;        'Option 1'
35   ----------------------------------------------------------*/
36   const char option1msg[] = "Option 1" ;
37   void option1_msg() { show1(option1msg) ; }

38   /*----------------------------------------------------------
39       ;        'Option 2'
```

CODE LISTING 2 APPENDIX
COPYRIGHT 1993 SAVI TECHNOLOGY, INC.

module msgs.05h 321

```
40     -------------------------------------------------*/
41     const char option2msg[] = "Option 2" ;
42     void option2_msg() { show1(option2msg) ; }

43     /*-------------------------------------------------
44     ;       'Option 3'
45     -------------------------------------------------*/
46     const char option3msg[] = "Option 3" ;
47     void option3_msg() { show1(option3msg) ; }

48     /*-------------------------------------------------
49     ;       'Option 4'
50     -------------------------------------------------*/
51     const char option4msg[] = "Option 4" ;
52     void option4_msg() { show1(option4msg) ; }

53     /*-------------------------------------------------
54     ;       'EEPROM FAILURE '
55     -------------------------------------------------*/
56     const char eepromfailmsg[] = "EEPROM FAILED  " ;
57     void eepromfail_msg() { show1(eepromfailmsg) ; }

58     /*-------------------------------------------------
59     ;       'EEPROM CHECKED '
60     -------------------------------------------------*/
61     const char eepromokmsg[] = "EEPROM CORRECT" ;
62     void eepromok_msg() { show1(eepromokmsg) ; }

63     /*-------------------------------------------------
64     ;       'TESTING EEPROM... '
65     -------------------------------------------------*/
66     const char eepromtestmsg[] = " testing Eeprom..." ;
67     void eepromtest_msg() { show1(eepromtestmsg) ; }

68     /*-------------------------------------------------
69     ;       'because of timeout'
70     -------------------------------------------------*/
71     const char timeoutmsg[] = " because of timeout...." ;
72     void timeout_msg() { show2(timeoutmsg) ; }

73     /*-------------------------------------------------
74     ;       'sleep tag received OK!'
75     -------------------------------------------------*/
76     const char sleeptagmsg[] = " Sleep Tag received!!" ;
77     void sleeptag_msg() { show2(sleeptagmsg) ; }

78     /*-------------------------------------------------
79     ;       'sleep ALL received OK!'
```

CODE LISTING 2 APPENDIX
COPYRIGHT 1993 SAVI TECHNOLOGY, INC.

module msgs.05h 322

```
80      -----------------------------------------------------*/
81      const char sleepallmsg[] = "  Sleep ALL received!!" ;
82      void sleepall_msg() { show2(sleepallmsg) ; }

83      /*-----------------------------------------------------
84      ;           ' Reporting :'
85      -----------------------------------------------------*/
86      const char reportingmsg[] = " Reporting : " ;
87      void reporting_msg() { show2(reportingmsg) ; }

88      /*-----------------------------------------------------
89      ;           'Invalid Command!. Try again'
90      -----------------------------------------------------*/
91      const char invalidcmd1msg[] = "   Invalid Command !!! " ;
92      const char invalidcmd2msg[] = "    Try Again .." ;
93      void invalidcmd_msg() { show1(invalidcmd1msg) ;
94                              show2(invalidcmd2msg) ; }
95      #endif 96      #ifdef INTERROGATOR 97      /*-----------------------------------------------------
98          Display the title of the interrogator unit.
99      -----------------------------------------------------*/
100     const char inttitle1msg[] = " Interrogator Unit V2.0 " ;
101     const char inttitle2msg[] = "--- Savi  Technology ---" ;

102     void int_title_msg() { show1(inttitle1msg) ; show2(inttitle2msg) ;}
103     /*-----------------------------------------------------
104     ;           'Tag found!!'
105     -----------------------------------------------------*/
106     const char tagfoundmsg[] = "Tag Found !!" ;
107     void tagfound_msg() { show1(tagfoundmsg) ; }

108     /*-----------------------------------------------------
109     ;           'Tag NOT found!!'
110     -----------------------------------------------------*/
111     const char tagnotfoundmsg[] = "Tag NOT found !!" ;
112     void tagnotfound_msg() { show1(tagnotfoundmsg) ; }

113     /*-----------------------------------------------------
114     ;           'Tag needs service'
115     -----------------------------------------------------*/
116     const char tagservicemsg[] = "Tag Needs service !!" ;
117     void tagservice_msg() { show2(tagservicemsg) ; }

118     /*-----------------------------------------------------
```

CODE LISTING 2 APPENDIX
COPYRIGHT 1993 SAVI TECHNOLOGY, INC.

module msgs.05h 323

```
119     ;          ' CODE = '
120     -------------------------------------------------------*/
121     const char codemsg[] = "CODE = " ;
122     void code_msg() { show2(codemsg) ; }

123     #endif

124     /*
125     *-------------------------------------------------------
126     ;          'No Header!!'
127     -------------------------------------------------------*
128     const char noheadermsg[] = "No Header !!" ;
129     void noheader_msg() { show1(noheadermsg) ; }

130     */

131     #ifdef TAG

132     /*-------------------------------------------------------
133     ;          'Beeper ON received!!'
134     -------------------------------------------------------*/
135     const char beepingmsg[] = " Beeper ON received" ;
136     void beeping_msg() { show1(beepingmsg) ; }

137     /*-------------------------------------------------------
138     ;          'Beeper OFF received!!'
139     -------------------------------------------------------*/
140     const char nobeepingmsg[] = " Beeper OFF received " ;
141     void nobeeping_msg() { show1(nobeepingmsg) ; }

142     /*-------------------------------------------------------
143     ;          ' Sending tag ID '
144     -------------------------------------------------------*/
145     const char sendingIDmsg[] = " Sending Tag ID" ;
146     void sendingID_msg() { show1(sendingIDmsg) ; }

147     #endif

148     /*-------------------------------------------------------
149     ;          ' Incorrect CRC '
150     -------------------------------------------------------*/
151     const char wrongcrcmsg[] = "Incorrect CRC !!" ;
152     void wrongcrc_msg() { show1(wrongcrcmsg) ; }

153     /*-------------------------------------------------------
154     ;          ' Stack overflow!! '
```

CODE LISTING 2 APPENDIX   module msgs.05h 324
COPYRIGHT 1993 SAVI TECHNOLOGY, INC.

```
155     /*---------------------------------------------------------------*/
156     const char overflowmsg[] = "Stack Overflow!!! " ;
157     void overflow_msg() { show1(overflowmsg) ; }

158     /*---------------------------------------------------------------
159     ;            '   Stack underflow!!  '
160     ---------------------------------------------------------------*/
161     const char underflowmsg[] = "Stack Underflow!!! " ;
162     void underflow_msg() { show1(underflowmsg) ; }

163     /*---------------------------------------------------------------
164     ;            write the character c to the lcd
165     ---------------------------------------------------------------*/
166     void putc_msg(c)
167     int c ;
168     {
169       charmap[0] = c ;
170       lcd_write(1) ;
171     }

172     /*---------------------------------------------------------------
173     ;            write the byte accumulator to the lcd
174     ---------------------------------------------------------------*/
175     void accumula_msg(accumulator)
176     int accumulator ;
177     {
178       if ( (accumulator >> 4) <= 9)
179         charmap[0] = 0x30 + (accumulator >> 4) ;
180       else
181         charmap[0] = 0x37 + (accumulator >> 4) ;

182       if ( (accumulator & 0x0f) <= 9)
183         charmap[1] = 0x30 + (accumulator & 0x0F) ;
184       else
185         charmap[1] = 0x37 + (accumulator & 0x0F) ;
186       lcd_write(2) ;
187     }

188     #ifdef TAG
189     void tag_lcd_init()
190     {
191       lcd_init() ;         /* initialize the LCD driver */
192       lcd_clear();
193       title_msg() ;        /* display the title Tytag... */
```

CODE LISTING 2 APPENDIX
COPYRIGHT 1993 SAVI TECHNOLOGY, INC.

module msgs.05h 325

```
194       myID_msg() ;              /* display "  ID = " */
195       accumula_msg(tag_ID0) ;   /* write the tag ID */
196       accumula_msg(tag_ID1) ;
197       accumula_msg(tag_ID2) ;
198       /*
199       putc_msg(' ') ; putc_msg(' ') ;
200       if (EEPROM_MAX == 0x7F) putc_msg('1') ;
201       else putc_msg('2') ;
202       putc_msg(' '); putc_msg('K'); putc_msg('b'); putc_msg('i'); putc_msg('t');
203       */
204       }

205       const char placemsg[] = "Write EEPROM Data to:";
206       void showPlace()
207       {
208         lcd_clear();
209         show1(placemsg) ;
210       }

211       const char squawkmsg[] = "Read EEPROM Data from:";
212       void showSquawk()
213       {
214         lcd_clear();
215         show1(squawkmsg) ;
216       }

217       void showBuffer(n,a)
218       int n,a;
219       {
220         accumula_msg(a);
221         lcd_line2();
222         for(REGX=0; REGX < n;REGX++) charmap[REGX]=buffer[REGX];
223         lcd_write(REGX);
224       }
225       #endif
```

CODE LISTING 2 APPENDIX  module stddef.h 326
COPYRIGHT 1993 SAVI TECHNOLOGY, INC.

```
1    /*          module stddef.h              */
2    /*
3     * $Source: c:/version2/RCS/stddef.h $
4     * Standard C definitions for C6805
5     */

6    #define TRUE    1
7    #define FALSE   0
8    #define ON      1
9    #define OFF     0
10   #define YES     1
11   #define NO      0

12   union both {
13       int num ;
14       bits bool ;
15   };

16   registera    REGA;
17   registerx    REGX;
```

CODE LISTING 2 APPENDIX
COPYRIGHT 1993 SAVI TECHNOLOGY, INC.

```
18      /*           module tag.05c              */

19      #pragma option T $Source: c:/server/projects/tag/RCS/tag.05c $
20      /*------------------------------------------------------------
21                   Software for the TAG unit(s)
22      ------------------------------------------------------------*/
23      #define TAG
24      /*
25      #define C4_MICRO
26      #define USE_LCD
27      #define DEBUG
28      #define EEPROM_TEST
29      */

30      #include "stddef.h"
31      #include "tagconfg.h"
32      #include "delaydef.h"
33      #include "comcmds.h"
34
35      #pragma option P
36      /*------------------------------------------------------------
37         VERY IMPORTANT
38         Definitions depending on the target microprocessor (C4 or P1)
39         ROM MEMORY SIZE:
40            P1   0x20 -> 0x4F    0x0100 -> 0x08FF
41            C4   0x20 -> 0x4F    0x0100 -> 0x10FF
42      ------------------------------------------------------------*/
43      #ifdef C4_MICRO
44      #define ROM_SIZE     0x1000
45      #pragma mor @ 0x1FDF = 0x00 ;
46      #else
47      #define ROM_SIZE     0x07FF
48      #endif 49      /*------------------------------------------------------------
50                   Define eeprom addresses
51      ------------------------------------------------------------*/
52      #define EE_CHECKSUM    0x00
53      #define EE_ID0         0x01
54      #define EE_ID1         0x02
55      #define EE_ID2         0x03
56      #define EE_ID3         0x04
57      #define EE_FORMAT      0x05
58      #define EE_MANUF_YEAR  0x06
59      #define EE_MANUF_WEEK  0x07
60      #define EE_CONFIG      0x08
```

CODE LISTING 2 APPENDIX
COPYRIGHT 1993 SAVI TECHNOLOGY, INC.

module tag.05c 328

```
61      /*------------------------------------------------
62          buffer to hold recieved rf data
63          int_command is command from interrogator, same address as buffer[0].
64      ------------------------------------------------*/
65      #define BUFFER_SIZE 0x10
66      unsigned int int_command        @ 0x80 ;
67      unsigned int buffer [BUFFER_SIZE] @ 0x80 ;

68      /*------------------------------------------------
69          Timeout is used to control the general timeout of the tag. While the
70          tag is waiting for an incoming header the counter timeout decremented
71          by ons at each timer overflow. We have a 16 bits timer and 1 count of
72          the timer is 2 microseconds. Therefore timeout is decremented every
73          65536 * 2 usec = 0.131 seconds.
74          Note that timeout takes 2 bytes !!
75      ------------------------------------------------*/
76      long timeout            @ 0x90 ;
77      #ifdef DEBUG
78      #define T30SEC 916    /* temporarily 2 minutes -> timeout = 916 */
79      #else
80      #define T30SEC 229    /* 30 seconds timeout = 229 */
81      #endif
82      #define T3MIN  1374   /* 3 minutes timeout */

83      /*------------------------------------------------
84          IMPORTANT!!
85          Define RAM space allocated for variables.
86          Memory map
87              0x50 -> 0x91    fixed variables defined above.
88              0x92 -> 0xD5    variables located in memory by the compiler.
89              0xD5 -> 0xF2    fixed variables assigned for the lcd driver.
90      ------------------------------------------------*/
91      #pragma memory RAMPAGE0 [0x43]   @ 0x92 ;  /* 0x92 -> 0xD5 */

92      unsigned int EEPROM_MAX;         /* maximum eeprom valid address */

93      unsigned int tag_ID0 ;           /* Three bytes to store the TAG ID */
94      unsigned int tag_ID1 ;           /* that is in eeprom */
95      unsigned int tag_ID2 ;

96      /*------------------------------------------------
97          Variables to calculate random delay, entering into wait_my_delay
98          and time_slot_turbo_delay. For time_slot_turbo_delay
99          dlyby0 has a seed from the tag Id or a random number,
100         This number is multiplied by the number of slots (2 bytes) and
101         the result is put in dlyby1 and dlyby2, dlyby2 is high byte
102         (see wait_my_delay and time_slot_turbo_delay).
103     ------------------------------------------------*/
```

CODE LISTING 2 APPENDIX        module tag.05c 329
COPYRIGHT 1993 SAVI TECHNOLOGY, INC.

```
104    unsigned int dlyby0 ;
105    unsigned int dlyby1 ;
106    union both  dlyby2 ;
107    /*-------------------------------------------------------------
108       Note dlyby2 is also the flag TURBO_DELAY
109    -----------------------------------------------------------*/
110    #define TURBO_DELAY dlyby2.bool.1

111    unsigned int error_code ; /* storage for error code for all tag commands */

112    /*-------------------------------------------------------------
113                    Tag Status Byte
114    -----------------------------------------------------------*/
115    union both status ;
116    #define BATTERY_LOW          status.bool.1
117    #define MEMORY_CHECKSUM      status.bool.2
118    #define SNIFFER_ACTIVE       status.bool.3
119    #define INTERRUPT_A          status.bool.6
120    #define INTERRUPT_B          status.bool.7

121    /*-------------------------------------------------------------
122       WINDOW_FACTOR is the 50 msec multiplier for the window. It is used to
123       determine the window time during batch collection.

124       window_factor = 1 -> window = 50 msec
125       window_factor = 2 -> window =100 msec
126       window_factor = 4 -> window =200 msec (Default)

127       It is also used to determine how many 5ms slots there are in a
128       window (if turbo_delay is active), the relationship is:

129           window_factor*10 = # of 5ms slots in a given window 130       (by default 200ms window, window_factor=4 => 40 slots)

131       NOTE: window_factor must be in range 1-255
132    -----------------------------------------------------------*/
133    unsigned int window_factor ;

134    unsigned int start;    /* start time of incoming rf pulse */
135    unsigned int length;   /* time length of incoming rf pulse */

136    unsigned int i ;       /* i & j are general loop counters */
137    unsigned int j ;
138    unsigned int temph ;   /* temph & templ do not seem 2 be used, but are*/
139    unsigned int templ ;   /*  here to keep code same to MASK ROM #1 */
```

CODE LISTING 2 APPENDIX             module tag.05c  330
COPYRIGHT 1993 SAVI TECHNOLOGY, INC.

```
140     unsigned int number_of_bytes; /* byte count to recieve or get */
141     unsigned int starting_at;     /* eeprom address */

142     /* used by RW_port() */
143     #define READPORT 0
144     #define WRITEPORT 1

145     #pragma option P
146     /*----------------------------------------------------------
147                 FUNCTION PROTOTYPES FOR FORWARD REFERENCES
148     ----------------------------------------------------------*/
149     void mymain() ;
150     void init_ports() ;
151     void wait_my_delay() ;
152     void time_slot_turbo_delay() ;
153     void waitI_TX_tagID();
154     void TX_tagID() ;          /* transmit tag ID via RF */
155     void TX_tagservice() ;     /* transmit ID with the service request bit set */
156     void receive_cmd() ;
157     void std_hello_cmd() ;
158     void hello_cmd() ;
159     void sleep_cmd() ;
160     void beep_cmd(int a;) ;    /* beep on and beep off commands */
161     void report1byte_cmd() ;
162     void clear_error_cmd() ;
163     void set_window_cmd() ;
164     void squawk_cmd() ;
165     int write2eeprom() ;
166     void place_cmd() ;
167     void RW_port(int a;) ;
168     unsigned int compute_crc(int n) ; /* returns the crc for n bytes in buffer */
169     int compute_ee_parity() ;
170     void test_eeprom_cmd() ;
171     void get_and_check_ID() ;
172     int count_ones(int a; int b) ;
173     void check_battery() ;
174     void Stop_Micro() ;
175     void check_keys() ;

176     /* functions used from external modules */
177     void ee_enable();

178     #pragma option P
179     /*----------------------------------------------------------
180     ----------------------------------------------------------
181                 IMPORTANT
182         Code starts here from address 0x20 to 0x4F
```

CODE LISTING 2 APPENDIX
COPYRIGHT 1993 SAVI TECHNOLOGY, INC.

module tag.05c 331

```
183      EVERYTHING IN HERE FITS <<EXACTLY>>, AVOID MODIFICATION
184      ---------------------------------------------------------
185      ---------------------------------------------------------*/
186      #pragma memory ROMPROG [0x30]  @ 0x20 ;
187      main()
188      {
189        /* DO NOT MOVE THE NEXT LINE FROM HERE!!! */
190        /* mymain is also called from external interrupt service routine */
191        /*
192        STATUS_PARITY    status.bool.0
193        BATTERY_LOW      status.bool.1
194        MEMORY_CHECKSUM  status.bool.2
195        SNIFFER_ACTIVE   status.bool.3
196        INTERRUPT_A      status.bool.6
197        INTERRUPT_B      status.bool.7
198        */
199        status.num = 0b00000000;
200        mymain() ;
201      }

202      /*--------------------------------------------------------
203                        TIMER_INT
204      ---------------------------------------------------------
205      Routine to service interrupts produced by timer comparision
206      ---------------------------------------------------------*/
207      /* Timer Overflow Flag */
208      #define TOF TimerStatus.5

209      void timer_int()
210      {
211        if ( TOF == 1 ) /* I got an overflow timer interrupt */
212        {
213          REGA = TimerRegLow;  /* this clears TOF */
214          if (timeout != 0) timeout-- ;
215          if (SNIFFER_ACTIVE) BEEPER_LINE = !BEEPER_LINE ;
216        }
217      }

218      /*--------------------------------------------------------
219                        TIMER_INIT
220      ---------------------------------------------------------
221      Initialize the timer
222      ---------------------------------------------------------*/
223      void timer_init()
224      {
225        TimerCmpHigh = REGA;  /* inhibit the compare function */
226        REGA = TimerStatus;   /* reset the OCF bit in case it was set */
227      }
```

CODE LISTING 2 APPENDIX
COPYRIGHT 1993 SAVI TECHNOLOGY, INC.

module tag.05c 332

```
228     /*-------------------------------------------------
229        DO NOT MOVE THESE CONSTANTS, THIS SIX TOPS OUT THE PART OF THIS ROM SPACE
230        FROM $20 to $4F
231     -------------------------------------------------*/
232     const int ideal_times[] = {
233        IDEAL_ONE, IDEAL_ZERO, PRE_ID, PRE_HIGH, PRE_LOW, IDEAL_LOW
234     };

235     #pragma option P
236     /*-------------------------------------------------
237     -------------------------------------------------
238                    IMPORTANT
239        Code continues here from address 0x100 to the maximum limit
240        depending on the micro in use.
241     -------------------------------------------------
242     -------------------------------------------------*/
243     #pragma memory ROMPROG [ROM_SIZE]  @ 0x100 ;

244     #include "delays.05h"

245     #ifdef USE_LCD
246     #include "lcd.05h"
247     #include "msgs.05h"
248     #endif 249     #include "eeprom.05h"
250     #include "communic.05h"
251     /*-------------------------------------------------
252                    DISABLE_CMP_TIMER_INT
253     -------------------------------------------------*/
254     #define disable_cmp_timer_int TimerControl.6 = 0

255     /*-------------------------------------------------
256                    ENABLE_CMP_TIMER_INT
257     -------------------------------------------------*/
258     #define enable_cmp_timer_int TimerControl.6 = 1

259     /*-------------------------------------------------
260                    DISABLE_OVF_TIMER_INT
261     -------------------------------------------------*/
262     #define disable_ovf_timer_int TimerControl.5 = 0

263     /*-------------------------------------------------
264                    ENABLE_OVF_TIMER_INT
265     -------------------------------------------------*/
266     #define enable_ovf_timer_int TimerControl.5 = 1

267     /*-------------------------------------------------
```

CODE LISTING 2 APPENDIX
COPYRIGHT 1993 SAVI TECHNOLOGY, INC.

module tag.05c 333

```
268                     ENABLE_WAKEUP_RESET
269    ----------------------------------------------------
270    Allow reset caused by the wakeup signal
271    ----------------------------------------------------*/
272    #define enable_wakeup_reset ENABLE_WAKEUP_LINE = 0

273    /*---------------------------------------------------
274                    DISABLE_WAKEUP_RESET
275    ----------------------------------------------------
276    Avoid reset caused by the wakeup signal
277    ----------------------------------------------------*/
278    #define disable_wakeup_reset ENABLE_WAKEUP_LINE = 1

279    /*---------------------------------------------------
280                        ENABLE_RF_TX
281    ----------------------------------------------------
282    Enable the RF Transmitter
283    ----------------------------------------------------*/
284    void Enable_RF_Oscillator()
285    {
286       TR_SWITCH_LINE = 1 ;
287       REGX = 125;             /* while loop is 16 cycles, wait 1ms */
288       while (TR_READY_LINE == 0 && REGX > 0) {
289          REGX--;
290       }
291    }

292    /*---------------------------------------------------
293                        DISABLE_RF_TX
294    ----------------------------------------------------
295    Disable the RF Transmitter
296    ----------------------------------------------------*/
297    #define Disable_RF_Oscillator TR_SWITCH_LINE = 0

298    #pragma option P
299    /*---------------------------------------------------
300                           MAIN
301    ----------------------------------------------------
302    Main loop of the program. It initializes the drivers and then it
303    loops forever by calling receive. If after receive the ID code
304    received in the acknowledge is equal to the local ID, the tag
305    goes to sleep.
306    ----------------------------------------------------*/
307    void mymain()
308    {
309       init_ports() ;          /* define IO ports */
310       disable_wakeup_reset ;  /* inhibit external reset circuit */
```

CODE LISTING 2 APPENDIX
COPYRIGHT 1993 SAVI TECHNOLOGY, INC.

module tag.05c 334

```
311     disable_cmp_timer_int ;    /* disable timer interrupts */
312     timer_init() ;             /* initialize the internal timer */
313     ee_init() ;                /* initialize the eeprom driver */

314     /* check the current eeprom configuration and set the maximum address */
315     EEPROM_MAX = (EEPROM_TYPE == 0) ? 0x7F : 0xFF ;  /* 1 or 2 kbit eeprom */

316     get_and_check_ID() ;       /* load and check tag ID */
317     init_thresholds();         /* initialze pulse width thresholds */

318     BATTERY_LOW = BATTERY_LINE ;   /* read battery low line */

319     #ifdef USE_LCD
320         tag_lcd_init() ;       /* initialize the LCD driver */
321     #endif 322     error_code = 0 ;           /* clear tag error code */
323     timeout = T30SEC ;         /* set to sleep after 30 sec if nothing received */
324     CLI() ;                    /* enable interrupts */
325     while ( TRUE ) receive_cmd() ;  /* keep receiving and processing commands */
326     }

327     #pragma option P
328     /*-----------------------------------------------------------
329                         STOP_MICRO
330     -------------------------------------------------------------
331     Put the microprocessor in a lower power mode
332     -----------------------------------------------------------*/
333     void Stop_Micro()
334     {
335         status.num = 0 ;       /* clear the status. When there is an external
336                                   interrupt the interrupt bits can be set */

337         disable_cmp_timer_int ;
338         ee_pwr_off;
339         BEEPER_LINE = 0 ;      /* turn off beeper */
340         enable_wakeup_reset ;  /* allow wakeup signal to reset the micro */

341         /* sleep in low power mode
342         VERY TRICKY:
343             IT HAS TO BE in a loop because after the interrupt routine is attended the
344             RTI will jump to the location of the PC at the moment of the interrupt,
345             this is the instruction following the STOP
346         */
347         while (TRUE) STOP();
348     }
```

CODE LISTING 2 APPENDIX
COPYRIGHT 1993 SAVI TECHNOLOGY, INC.

module tag.05c 335

```
349    /*---------------------------------------------------
350                    INIT_PORTS
351    ---------------------------------------------------
352       Initialize the I/O ports
353    ---------------------------------------------------*/
354    void init_ports()
355    {
356      porta = portb = portc = 0 ;
357      ddra = DDRA ;        /* see definition in tagconfg.h file */
358      ddrb = DDRB ;        /*          "                        */
359      ddrc = DDRC ;        /*          "                        */
360    #ifndef C4_MICRO
361      ddrd = DDRD ;        /*          "                        */
362    #endif
363    }

364    #pragma option P
365    /*---------------------------------------------------
366                    get_and_check_ID
367    ---------------------------------------------------
368      Read the tag ID. Then check
369      1 - ID parity in eeprom is correct.
370      2 - the bits 1-3 of tag_ID2 are 0.
371      3 - ID <> 000000
372      If there is an error the tag ID is set to FFFF0.
373    ---------------------------------------------------*/
374    void get_and_check_ID()
375    {
376      tag_ID0 = ee_read(EE_ID0) ;
377      tag_ID1 = ee_read(EE_ID1) ;
378      tag_ID2 = ee_read(EE_ID2) ;
379      if (((count_ones(8,tag_ID0^tag_ID1^tag_ID2) & 0x01) != 0x00)
380         || ((tag_ID2 & 0b00001110)!=0x00) /* wrong parity */
381         || ((tag_ID0 | tag_ID1 | tag_ID2) == 0x00))
382         {                          /* set the tag ID to FFFF0 */
383           tag_ID0    = 0xFF ;
384           tag_ID1    = 0xFF ;
385           tag_ID2    = 0xF0 ;
386         }
387    /*
388     * set dlyby0 equal to lower 8 bits of tag id number (no status)
389     * but swap nybbles. (ie. if id is $12345, dlyby0 = $54)
390     */
391           dlyby0 = tag_ID1 & 0x0f;
392           dlyby0 = (tag_ID2 & 0xf0) | dlyby0;
393           dlyby1 = tag_ID1; /* this is used by wait_my_delay */
394    }
```

CODE LISTING 2 APPENDIX
COPYRIGHT 1993 SAVI TECHNOLOGY, INC.

module tag.05c  336

```
395   #pragma option P
396   /*------------------------------------------------------------
397                    Receive_my_ID
398   ------------------------------------------------------------
399   This routine receives the tag ID. It returns TRUE if the ID received
400   in buffer[0,1,2] is equal to my ID.
401   ERROR_CODE = 1 -> error when receiving tag ID.
402   ------------------------------------------------------------*/
403   int Receive_my_ID()
404   {
405     if (rf_receive(3,buffer))        /* get the ID via RF */
406       {
407         error_code = ALL_OK ;
408         return( (buffer[0]==tag_ID0 &&
409                  buffer[1]==tag_ID1 &&
410                  buffer[2]==tag_ID2 ) ? TRUE : FALSE ) ;
411       }
412     else
413       {
414         /* here I add 2 to the code returned by rf_receive */
415         error_code = 2 + rf_error_code ; /* 0x83 = T_IDPULSE_ERR */
416                                          /* 0x84 = T_IDPARITY_ERR */
417         return(FALSE) ;
418       }
419   }

420   #pragma option P
421   /*------------------------------------------------------------
422                    INTERPRET
423   ------------------------------------------------------------
424         Case statement for all commands
425   ------------------------------------------------------------*/
426   void interpret()
427   {
428   switch ( int_command ) {

429   /* complex argument commands */
430   case PLACE_CMD       : place_cmd() ;
431                break ;

432   case SQUAWK_CMD      : squawk_cmd() ;
433                break ;

434   case TURBO_SET_WIN_CMD: TURBO_DELAY = TRUE;
435   case SET_WINDOW_CMD  : set_window_cmd() ;
436                break ;

437   case WRITE_PORTB_CMD : RW_port(WRITEPORT) ;
```

Attorney Docket No. SAVI1001CIP2DEL
del/savi/1001cip2.pa.a2

CODE LISTING 2 APPENDIX
COPYRIGHT 1993 SAVI TECHNOLOGY, INC.

module tag.05c 337

```
438                       break ;

439         case READ_PORTA_CMD  : RW_port(READPORT) ;
440                       break ;

441                   /* 3 byte ID as arguments */
442         case SLEEP_CMD       : if (Receive_my_ID()) {
443         #ifdef USE_LCD
444                       lcd_clear(); sleeping_msg(); sleeptag_msg();
445         #endif
446                       Stop_Micro() ;
447                   }
448                       break ;

449         case ALL_SLEEP_CMD   : if (!(Receive_my_ID() | error_code)) {
450                       /* correct reception of the ID, but not my ID */
451         #ifdef USE_LCD
452                       lcd_clear(); sleeping_msg(); sleepall_msg() ;
453         #endif
454                       Stop_Micro() ;
455                   }
456                       break ;

457         case BEEPON_CMD      :
458         case BEEPOFF_CMD     : beep_cmd(int_command) ;
459                       break ;

460         case CLEAR_ERROR_CMD : if (Receive_my_ID()) {
461                       /* the code is cleared in Receive_my_ID if OK */
462         #ifdef USE_LCD
463                       lcd_clear(); lcd_line1(); accumula_msg(buffer[0]) ;
464                       accumula_msg(buffer[1]); accumula_msg(buffer[2]) ;
465         #endif
466                       wait1_TX_tagID() ;
467                   }
468                       break ;

469         /* these 3 commands have the same structure, they return tag ID + 1 byte */
470         case CHECK_IN_CMD    :
471         case GET_VERSION_CMD :
472         case GET_ERROR_CMD   : report1byte_cmd() ;
473                       break;

474         /* no argument commands */
475                       /* no interrupt status */
476         case INT_HELLO_CMD   : if ( (status & 0b11000000) != 0) {
477                       std_hello_cmd() ;
478                   }
```

CODE LISTING 2 APPENDIX
COPYRIGHT 1993 SAVI TECHNOLOGY, INC.

module tag.05c 338

```
479                    break ;

480         case TURBO_HELLO_CMD : TURBO_DELAY = TRUE;
481         case HELLO_CMD       : std_hello_cmd() ;
482                    break ;
483     #ifdef EEPROM_TEST
484         case TEST_EEPROM_CMD : test_eeprom_cmd() ;
485                    break ;
486     #endif
487     #ifdef USE_LCD
488                default : lcd_clear() ;
489                         invalidcmd_msg() ;
490     #endif
491         } /* end switch */
492     }

493     #pragma option P
494     /*-----------------------------------------------------------
495                         RECEIVE_CMD
496     -----------------------------------------------------------
497     Receive commands from the interrogator and process them.
498     It calls wait_header to read the header.
499     The headrdc routine returns when it detects the appropiate
500     header.
501     -----------------------------------------------------------*/
502     void receive_cmd()
503     {
504       if (! SNIFFER_ACTIVE) {
505                         /* crunching bytes */
506         REGA = T30SEC / 0x100 ;     /* reset timeout to 30 seconds */
507         REGX = T30SEC % 0x100 ;
508       }
509       else {
510         REGA = T3MIN / 0x100 ;   /* or to three minutes if the beeper is ON*/
511         REGX = T3MIN % 0x100 ;
512       }

513     #asm
514         sta timeout;            /* load low part of timeout */
515         stx timeout+1;          /* load high part of timeout */
516     #endasm 517         TURBO_DELAY = FALSE;        /* do normal random 'hello delays'*/
518         enable_ovf_timer_int ;      /* enable overflow timer interrupt */
519         wait_header() ;             /* wait for the header */
520         disable_ovf_timer_int ;     /* enable overflow timer interrupt */
521         if (rf_receive(1,buffer))   /* receive the command byte */
522            interpret() ;
```

Attorney Docket No. SAVI1001CIP2DEL
del/savi/1001cip2.pa.a2

11/8/93-11:33

CODE LISTING 2 APPENDIX
COPYRIGHT 1993 SAVI TECHNOLOGY, INC.

module tag.05c 339

```
523         Disable_RF_Oscillator ;      /* undo enable done when tag ID was sent */
524     }

525     #pragma option P
526     /*------------------------------------------------------------
527                          STD_HELLO_CMD
528     ------------------------------------------------------------
529     This function sets window factor to 4 and falls through to hello_cmd
530     Do not move this code, it is used to save space of subroutine calls.
531     ------------------------------------------------------------*/
532     #asm
533     std_hello_cmd    lda #4
534                      sta window_factor
535     #endasm 536     /*------------------------------------------------------------
537                          HELLO_CMD
538     ------------------------------------------------------------
539     This function is called after the hello signal was received.
540     It waits some delay as a function of the tag ID and cycle number
541     and then it sends the tag ID
542     ------------------------------------------------------------*/
543     void hello_cmd()
544     {
545         /* if the interrupt or battery or checksum bits in the status are set
546             we have to inform the interrogator */
547         if ((status.num & 0b11000110) != 0)
548         {
549            tag_ID2 |= 0b00000010 ;     /* set service request bit and fix parity */
550            tag_ID2 ^= 0b00000001 ;
551         }

552         if (TURBO_DELAY)
553             time_slot_turbo_delay();
554         else
555             wait_my_delay();           /* wait proportional to the pseudo tag ID */

556         TX_tagID() ;                   /* send the ID to the interrogator */
557         Disable_RF_Oscillator ;

558     #ifdef DEBUG
559         outhigh; one_msec(); outlow;
560     #endif
561     }

562     #pragma option P
563     /*------------------------------------------------------------
564                          BEEP_CMD
```

Attorney Docket No. SAVI1001CIP2DEL
del/savi/1001cip2.pa.a2

11/8/93-11:33

CODE LISTING 2 APPENDIX
COPYRIGHT 1993 SAVI TECHNOLOGY, INC.

module tag.05c 340

```
This command implements BEEP_ON and BEEP_OFF commands.
The command is followed by a tag ID.
If the ID is my ID then I send the ID back to the interrogator.
ERROR_CODE = rf_error_code -> error when receiving tag ID.
ERROR_CODE = T_NOBEEPER_ERR -> this particular tag does not have beeper.
-----------------------------------------------------------*/
void beep_cmd(action_type)
unsigned int action_type ;
{
    if (Receive_my_ID()) {   /* receive 3 bytes ID and check that it is mine */
        /* check tag has a beeper available by reading eeprom config byte */
        if ( (ee_read(EE_CONFIG) & 0b00000100) == 0) {
            error_code = T_NOBEEPER_ERR;
            wait1_TX_tagservice() ; /* send back the tag ID asking service */
        } /* end if ee_read */
        else {
            if (action_type == BEEPON_CMD) {
                SNIFFER_ACTIVE = TRUE ;   /* turn on the beeper */
                timeout = T3MIN ;         /* set timeout to 3 minutes */
            }
            else {
                SNIFFER_ACTIVE = FALSE;   /* turn off flag for beeper on */
                BEEPER_LINE = 0 ;         /* turn off the beeper */
                timeout = T30SEC ;        /* reset timeout to 30 seconds */
            } /* end else if action type */ ifdef USE_LCD
            lcd_clear() ;
            if (action_type == BEEPON_CMD) beeping_msg();
            else nobeeping_msg();
#endif
            error_code = ALL_OK ;
            wait1_TX_tagID() ;            /* send back the tag ID */
        } /* end else if ee_read */
    } /* if Receive_my_ID */
} /* end beep_cmd */ pragma option P
/*-----------------------------------------------------------
                    REPORT1BYTE_CMD
    ---------------------------------------------------------
This routine implements three different routines that have the same
structure. They return the tag ID plus 1 byte of data.
ERROR_CODE = rf_error_code -> error when reading tag ID.
-----------------------------------------------------------*/
/* define software version */
const int SW_VERSION = {1} ;
```

CODE LISTING 2 APPENDIX
COPYRIGHT 1993 SAVI TECHNOLOGY, INC.

module tag.05c 341

```
611   void report1byte_cmd()
612   {
613       unsigned int request ;
614       /* reuse request to save bytes */
615       #define expected_parity request 616       request = buffer[0] ;
617       /* if the command if get_error I want to keep the previous error_code */
618       /* so I put it in buffer[3] */
619       buffer[3] = error_code ;
620       if (Receive_my_ID())   /* receive 3 bytes ID and check that it is mine */
621       {
622           /* load in request byte the byte to be sent to the int */
623           switch (request) {
624                           /* UPDATE_STATUS - Form the status byte. */
625           case CHECK_IN_CMD   : BATTERY_LOW = BATTERY_LINE ;
626                           expected_parity = compute_ee_parity() ;
627                           if (expected_parity != ee_read(EE_CHECKSUM))
628                               MEMORY_CHECKSUM = TRUE ;
629                           REGA = status.num ;
630                           break ;

631           case GET_VERSION_CMD : REGA = SW_VERSION ;
632                           break ;

633           case GET_ERROR_CMD   : REGA = error_code = buffer[3] ;
634                           break ;
635           } /* end switch */
636           request = REGA;

637   #ifdef USE_LCD
638           lcd_clear(); reporting_msg(); accumula_msg(request);
639   #endif
640           wait1_TX_tagID() ;          /* send back the tag ID */
641           transmit_byte(request) ; /* send the requested information */
642       } /* if Receive_my_ID() */
643   } /* end report1byte_cmd */

644   #pragma option P
645   /*_____
646                       SET_WINDOW_CMD
647   _____
648   The command is SET_WINDOW followed by a byte ( window_factor ) ,
649   which indicates how many ->50<- msec the collection time is going to be.
650   After the window is set the tag acts as in a normal collection
651   cycles (like in hello)
652   ERROR_CODE = rf_error_code -> error when reading window counter.
653   _____*/
```

CODE LISTING 2 APPENDIX
COPYRIGHT 1993 SAVI TECHNOLOGY, INC.

module tag.05c 342

```
654    void set_window_cmd()
655    {
656      if (rf_receive(1,buffer)) {       /* reading window counter */
657        window_factor = buffer[0] ;
658        if (window_factor<1)
659          window_factor = 4;            /* default to 200ms and hope */
660        hello_cmd();                    /* continue as in normal hello */
661    #ifdef USE_LCD
662        lcd_clear(); accumula_msg(buffer[0]);
663    #endif
664      } /* if rf_receive() */
665      else error_code = 9 + rf_error_code ;
666    } /* end set_window_cmd */

667    #pragma option P
668    /*------------------------------------------------------------
669                              RW_PORT
670       ------------------------------------------------------------
671       This routine implemets read and write of the unasigned lines in
672       the tag. The write operation is done to portb and the read operation
673       is done from porta.
674       READ : the whole PORTA is read and the value is sent to the interro
675       gator preceeded by the tag id.
676       WRITE: the byte to be written to portb is read received from the
677       interrogator, then it is written and the tag id is sent back to the
678       interrogator as acknowledge.
679       ------------------------------------------------------------*/
680    void RW_port(action_type)
681    {
682    unsigned int portvalue ;
683    if (Receive_my_ID())     /* receive ID and check that it is mine */
684      {
685        switch (action_type)
686        {
687        case READPORT:
688          portvalue = porta ;
689          wait1_TX_tagID() ;
690          transmit_byte(portvalue) ;
691    #ifdef USE_LCD
692          lcd_clear(); accumula_msg(portvalue) ;
693    #endif
694          break ;
695        case WRITEPORT:
696          if (rf_receive(1,buffer)) {
697            portb = buffer[0] ;
698            wait1_TX_tagID() ;
699          }
700          else error_code = T_WRITEPORTB_ERR ;
```

CODE LISTING 2 APPENDIX
COPYRIGHT 1993 SAVI TECHNOLOGY, INC.

module tag.05c 343

```
701              break ;
702           }
703        }
704     }

705   #pragma option P
706   /*----------------------------------------------------------
707                       SQUAWK_CMD
708   ----------------------------------------------------------
709     The command is SQUAWK_CMD followed by a
710        - tag ID
711        - N ( number of bytes to read )
712        - M ( starting address )

713     the tag sends back the requested data:
714        - tag ID
715        - N bytes of data
716        - parity byte.
717     ERROR_CODE = 1 -> error when reading tag ID.
718              = 2 -> error when reading N and/or M.
719   ----------------------------------------------------------*/
720   void squawk_cmd()
721   {
722   unsigned int squawk_c ;
723     if (Receive_my_ID())  /* receive 3 bytes ID and check that it is mine */
724       {
725        if (rf_receive(2,buffer))    /* receive N and M */
726          {
727           number_of_bytes = buffer[0] ;  /* how many data bytes must be sent
728                                              to the interrogator */
729           starting_at    = buffer[1] ;  /* initial eeprom location */
730           if (number_of_bytes >= BUFFER_SIZE)
731              {
732               error_code = T_SQUAWK_OVF_ERR ;
733               goto abort_squawk ;
734              }

735   #ifdef USE_LCD
736          lcd_clear(); accumula_msg(number_of_bytes); accumula_msg(starting_at);
737   #endif
738          /* Load data from eeprom and put it into buffer */
739          /* the data goes from buffer[0] to buffer[number_of_bytes-1] */

740          for ( squawk_c = 0 ; squawk_c < number_of_bytes ; squawk_c++ )
741             buffer[squawk_c] = ee_read(starting_at+squawk_c) ;

742          /* compute the parity byte and put it at location "number_of_bytes" */
743          buffer[number_of_bytes] = compute_crc(number_of_bytes) ;
```

CODE LISTING 2 APPENDIX  module tag.05c
COPYRIGHT 1993 SAVI TECHNOLOGY, INC.

```
744             number_of_bytes += 1 ;    /* increment because of the parity byte */
745             TX_tagID() ;              /* send out the tag ID */

746             /* send number_of_bytes bytes plus 1 for the parity byte */
747             for ( squawk_c = 0 ; squawk_c < number_of_bytes ; squawk_c++) {
748                 transmit_byte(buffer[squawk_c]) ;
749                 short_delay() ;  /* produce 100 usec between bytes */
750             }
751         } /* if N and M were received OK */
752         else error_code = 6 + rf_error_code ;     /* wrong N and/or M */
753     } /* Receive_my_ID() */
754 abort_squawk:
755 }

756 #pragma option P
757 /*---------------------------------------------------------------
758                         PLACE_CMD
759 ---------------------------------------------------------------
760  The command is PLACE_CMD followed by a
761         - tag ID
762         - N ( number of bytes to read )
763         - M ( starting address )
764         - parity byte 765  the tag sends back the requested data:
766         - tag ID
767  ERROR_CODE = 1 -> error when reading tag ID.
768             = 2 -> error when reading N and/or M.
769             = 3 -> error when receiving the string of data.
770             = 4 -> wrong parity byte.
771             = 5 -> error when writing to eeprom.
772             = 6 -> error when writing to eeprom the new checksum.
773 ---------------------------------------------------------------*/

774 void place_cmd()
775 {
776     unsigned int place_c ;

777     if (Receive_my_ID())  /* receive 3 bytes ID and check that it is mine */
778     {
779         if (rf_receive(2,buffer))    /* receive N and M */
780         {
781             number_of_bytes = buffer[0] ;  /* how many bytes must be sent to int */
782             starting_at     = buffer[1] ;  /* initial eeprom location */

783             if ( number_of_bytes >= BUFFER_SIZE) {
784                 error_code = T_PLACE_OVF_ERR ;
785                 goto place_abort ;
```

CODE LISTING 2 APPENDIX
COPYRIGHT 1993 SAVI TECHNOLOGY, INC.

module tag.05c 345

```
786        }
787        if ( number_of_bytes + starting_at - 1 > EEPROM_MAX) {
788            error_code = T_PLACE_OVF2_ERR ;
789            goto place_abort ;
790        }

791        if (rf_receive(number_of_bytes+1,buffer)) {  /* receive the message */
792            if ( buffer[number_of_bytes] == compute_crc(number_of_bytes)) {
793                if (write2eeprom())  /* write to eeprom the received message*/
794                    TX_tagID();      /* if ok, send out the tag ID */
795                else
796                    TX_tagservice();  /* set ID with service request bit ON */
797            } /* end if buffer */
798            else { /* the crc was incorrect */
799                error_code = T_PLACECRC_ERR ;
800 #ifdef USE_LCD
801                lcd_clear(); wrongcrc_msg() ;
802 #endif
803            } /* end else if buffer */
804        } /* end if rf_receive */
805        else  /* error when receiving the string of data */
806            error_code = 0x0D + rf_error_code ;
807        } /* N amd M were received OK */
808        else
809            error_code = 0x0B + rf_error_code ;  /* wrong N and/or M */
810    } /* Receive_my_ID() */
811 #ifdef USE_LCD
812    lcd_clear(); accumula_msg(error_code) ;
813 #endif
814    place_abort:
815    } /* end place command */

816    /* write to eeprom and return TRUE is everything is OK */
817    int write2eeprom()
818    {
819      unsigned int data2write ;

820      for ( place_c = 0 ; place_c < number_of_bytes ; place_c++) {
821         data2write = buffer[place_c] ;
822         if (!ee_write(data2write,starting_at+place_c)) {
823            error_code = T_PLACEWRITE_ERR ;
824            return(FALSE) ;
825         }
826         /* read back to confirm */
827         if (buffer[place_c] != ee_read(starting_at+place_c)) {
828            error_code = T_PLACECONFIRM_ERR ;
829            return(FALSE) ;
830         }
```

CODE LISTING 2 APPENDIX  
COPYRIGHT 1993 SAVI TECHNOLOGY, INC.

module tag.05c 346

```
831      } /* end for */
832      place_c = compute_ee_parity() ;

833      /* compute parity byte for the whole eeprom and put it in location 0 */
834      if (!ee_write(place_c,EE_CHECKSUM)) {
835          error_code = T_PLACECHECK_ERR ;
836          return(FALSE) ;
837      }
838      /* confirm */
839      if ( place_c != ee_read(EE_CHECKSUM)) {
840          error_code = T_CPLACECHECK_ERR ;
841          return(FALSE) ;
842      }
843      return(TRUE) ;
844  } /* end write2eeprom() */

845  #pragma option P
846  #ifdef EEPROM_TEST
847  /*-----------------------------------------------------------
848                     TEST_EEPROM_CMD
849  -----------------------------------------------------------
850     This command reads and writes the whole eeprom to detect possible
851     failures.
852  -----------------------------------------------------------*/
853  void test_eeprom_cmd()
854  {
855      unsigned int test_c ;

856      /* NOTE LCD STUFF HERE */
857      lcd_clear(); lcd_line2(); eepromtest_msg() ;

858      for ( test_c = 0 ; test_c < EEPROM_MAX ; test_c++) {
859          if ( !ee_write(test_c,test_c) )  /* if it returns false->timeout error */
860          {
861              /* NOTE LCD STUFF HERE */
862              eepromfail_msg(); accumula_msg(0) ;
863              goto conti ;
864          }
865      } /* end for */
866      for ( test_c = 0 ; test_c < EEPROM_MAX ; test_c++) {
867          if (test_c != ee_read(test_c))
868          {
869              /* NOTE LCD STUFF HERE */
870              eepromfail_msg(); accumula_msg(1) ;
871              accumula_msg(test_c); accumula_msg(ee_read(test_c)) ;
872              goto conti ;
873          }
874      } /* end for */
```

CODE LISTING 2 APPENDIX
COPYRIGHT 1993 SAVI TECHNOLOGY, INC.

module tag.05c 347

```
875       NOP() ;
876       /* NOTE LCD STUFF HERE */
877       eepromok_msg() ;
878       conti:
879       }
880     #endif 881     #pragma option P
882     /*--------------------------------------------------------
883                     COMPUTE_CRC
884     --------------------------------------------------------
885     This function returns the CRC ( parity byte ) for all the bytes in
886     buffer from 0 to "number_of_bytes".
887     --------------------------------------------------------*/
888     unsigned int compute_crc(number_of_bytes)
889     {
890     registerx crc_counter ;
891     unsigned int crc ;
892       crc = 0 ;
893       for ( crc_counter = 0 ; crc_counter < number_of_bytes ; crc_counter++)
894         crc ^= buffer[crc_counter] ;
895       return(crc) ;
896     }

897     /*--------------------------------------------------------
898                     COUNT_ONES
899     --------------------------------------------------------
900     Return the numbers of bits in one in the nbits leftmost bits of the
901     byte data. This is auxiliary routine used to generate the parity bit
902     --------------------------------------------------------*/
903     int count_ones(nbits,data)
904     int data ;
905     registerx nbits ;
906     {
907     int counter ;
908       counter = 0 ;
909       do
910       {
911       if ((data & 0x80) == 0x80 )
912           counter++ ;
913       data <<= 1 ;
914       nbits-- ;
915       } while (nbits != 0) ;
916       return(counter) ;
917     }

918     #pragma option P
919     /*--------------------------------------------------------
```

CODE LISTING 2 APPENDIX
COPYRIGHT 1993 SAVI TECHNOLOGY, INC.

module tag.05c 348

```
920                     COMPUTE_EE_PARITY
921     /*------------------------------------------------------------
922     This routine returns the parity byte for the bytes in eeprom from
923     address 0x01 through EEPROM_MAX.
924     ------------------------------------------------------------*/
925     int compute_ee_parity()
926     {
927       crc = 0x00 ;              /* initialize the parity byte to zero */
928       for ( j = EEPROM_MAX ; j > 0 ; j--)
929         crc ^= ee_read(j) ;
930       return(crc) ;             /* return the parity byte */
931     }

932     #pragma option P
933     /*------------------------------------------------------------
934                     WAIT_MY_DELAY
935     ------------------------------------------------------------
936     Wait for a time proportional to the current virtual tag ID
937     ------------------------------------------------------------*/
938     void wait_my_delay()
939     {
940       /*
941       the default delay is computed for a 200 msec window, therefore
942       for a general window we need to repeat that delay for a factor
943       equal to window_factor
944       */
945       for ( j = 0 ; j < window_factor ; j++) {

946         for ( i = dlyby0 ; i != 0  ; i--) {
947           /* This section generates 64 * 6 cycles delay    */
948           /* = 384 cycles = 192 usec  (255*192)+192=49.152ms*/
949     #asm
950             ldx #64
951     xx1     decx            ; 3 cycles
952             bne   xx1       ; 3 cycles
953     #endasm
954         } /* end for i=dlyb10 */

955         /* the loop takes 6 cycles = 3 usec. Gen 3us dly 4 each cnt in dlyby1
956            Max delay = 256*3us = 768us => 49.155ms + .765ms = 49.920ms */
957     #asm
958             ldx dlyby1
959     xx2     decx            ; 3 cycles
960             bne   xx2       ; 3 cycles
961     #endasm 962       } /* end for j<window_factor */
```

CODE LISTING 2 APPENDIX
COPYRIGHT 1993 SAVI TECHNOLOGY, INC.

module tag.05c 349

```
963      /*-------------------------------------------------------------
964      Generate a new random virtual tag ID.
965      Set the most significant byte from the least significant byte of
966      the timer, and the middle ID byte from the most significant byte.
967      -------------------------------------------------------------*/
968      dlyby1 = TimerAltHigh ;
969      dlyby0 = TimerAltLow ;
970
971      } /* end for wait_my_delay */

972      #pragma option P
973      /*-------------------------------------------------------------
974                      TIME_SLOT_TURBO_DELAY
975      -------------------------------------------------------------
976      Wait for a time proportional to the current virtual tag ID 977      Here we determine what 'time slot' to send the id into. The slot
978      we choose is the result of dlyby0*number_of_slots/256. Where dlyby0 is
979      a random byte. This will result in a random slot number in the range
980      0 to number_of_slots-1. This result is used to count 5ms delays
981      and place the tagID into the correct time slot
982      -------------------------------------------------------------*/
983      void time_slot_turbo_delay()
984      {
985              /* Calculate the number of 5.1 ms slots for the window */
986              /* window_factor must be in range 1-255 */
987              /* number of slots = window_factor * 10 */
988      #asm
989              lda window_factor      ;number of slots = window_factor * 10
990              ldx #$0A
991              mul                    ;X:A now has the number of slots
992              stx dlyby2             ;store high part of number for later calc 993              ldx dlyby0             ;dlyby0 * number of slots(lo byte) / 256
994              mul                    ;reg-X has hi byte, effective division by 256
995              stx dlyby1             ;lo part of loop counter 996              lda dlyby2             ;get hi part of number of slots
997              ldx dlyby0             ;dlyby0 * number of slots(hi byte) / 256
998              mul                    ;reg-X has hi byte, effective division by 256
999                                     ;X:A has hi result
1000             add dlyby1             ;add to lo part of loop counter
1001             sta dlyby1
1002             bcc MYDLY1
1003             inx
1004     MYDLY1  stx dlyby2             ;save hi part of loop count
1005     #endasm
```

CODE LISTING 2 APPENDIX
COPYRIGHT 1993 SAVI TECHNOLOGY, INC.

module tag.05c 350

```
1006        for ( i = dlyby2 ; i != 0  ; i-- ) {
1007               int_tenth_second(130);  /* delay 256*5.1ms approx. 1300ms */
1008        }
1009        for ( i = dlyby1 ; i != 0  ; i-- ) {
1010               five_msec(); REGX = 30; delay(); /* delay about .1 ms */
1011        }
1012        dlyby0 = TimerRegLow ;  /* get random number from the timer */
1013    } /* end wait_my_delay() */

1014    #pragma option P
1015    /*--------------------------------------------------------------
1016                       wait1_TX_tagID
1017    ----------------------------------------------------------------
1018       Wait 1 ms and Transmit the tag ID plus status bits.
1019       NOTE THIS ROUTINE FALLS THROUTH TO TX_tagID - DO NOT MOVE THIS CODE
1020    ---------------------------------------------------------------*/
1021    #asm
1022    wait1_TX_tagID jsr one_msec
1023    #endasm
1024    /*--------------------------------------------------------------
1025                       TX_tagID
1026    ----------------------------------------------------------------
1027       Transmit the tag ID plus status bits.
1028    ---------------------------------------------------------------*/
1029    void TX_tagID()
1030    {
1031      Enable_RF_Oscillator() ;
1032      preamble() ;              /* send the tag preamble signal */
1033      transmit_byte(tag_ID0) ;  /* send the three address bytes */
1034      short_delay() ;
1035      transmit_byte(tag_ID1) ;
1036      short_delay() ;
1037      transmit_byte(tag_ID2) ;
1038      short_delay() ;
1039    }

1040    /*--------------------------------------------------------------
1041                       TX_tagservice
1042    ----------------------------------------------------------------
1043       Transmit the tag ID by calling TX_tagID, but before it sets the
1044       service request bit. After this routine the tag ID is set to
1045       its original value.
1046    ---------------------------------------------------------------*/
1047    void TX_tagservice()
1048    {
1049      tag_ID2 ^= 0b00000011 ;    /* turn ON service request bit
1050                                    and invert the parity bit */
```

Attorney Docket No. SAVI1001CIP2DEL
del/savi/1001cip2.pa.a2

CODE LISTING 2 APPENDIX
COPYRIGHT 1993 SAVI TECHNOLOGY, INC.

module tag.05c 351

```
1051      TX_tagID() ;

1052      tag_ID2 ^= 0b00000011 ;     /* turn OFF service request bit
1053                                     and invert the parity bit */
1054      }

1055      #pragma option P
1056      /*----------------------------------------------------------
1057                          SOFT_INT
1058      ----------------------------------------------------------
1059         Interrupt Service routine for the software interrupt.
1060      ----------------------------------------------------------*/
1061      void soft_int() {}

1062      /*----------------------------------------------------------
1063                          EXTERNAL_INT
1064      ----------------------------------------------------------
1065         Check if a key was pressed and it send the control to
1066         the appropiate routine.
1067      ----------------------------------------------------------*/
1068      void external_int()
1069      {
1070      union both keycode ;
1071      #asm
1072        bih no_interrupt ;    /* make sure that the interrupt line is LOW */
1073      #endasm
1074        ee_pwr_on;
1075        if ( (ee_read(EE_CONFIG) & 0b00010000) = = 0) /* interrupt disabled */
1076          ee_pwr_off;
1077        else
1078          {
1079            status.num = 0 ;              /* clear status */
1080            keycode.num = interrupt_port ;
1081      #asm
1082      wait_int_high
1083            bil wait_int_high
1084      #endasm
1085            if (!keycode.bool.BIT_INTA) INTERRUPT_A = 1 ;
1086            if (!keycode.bool.BIT_INTB) INTERRUPT_B = 1 ;
1087            RSP() ;                /* reset the stack pointer */
1088            SEI() ;
1089      #asm
1090            jmp mymain;
1091      #endasm
1092          }
1093      #asm
1094      no_interrupt
1095      #endasm
```

CODE LISTING 2 APPENDIX
COPYRIGHT 1993 SAVI TECHNOLOGY, INC.

module tag.05c 352

```
1096        }

1097        /*----------------------------------------------------------------
1098                        COPYRIGHT
1099        ----------------------------------------------------------------*/
1100        const char copyright[]="(c)1989, 1993 SAVI  "
```

CODE LISTING 2 APPENDIX  
COPYRIGHT 1993 SAVI TECHNOLOGY, INC.

module tagconfg.h 353

```
1   /*           module tagconfg.h                               */
2   /*----------------------------------------------------------
3     $Source: c:/version2/RCS/tagconfg.h $
4     ----------------------------------------------------------
5          Configuration for TAG, either 6805-C4 or 6805-P1
6     ----------------------------------------------------------
7                    Define I/O ports
8     port? = data registers
9     ddr?  = data direction registers, 0 = input, 1 = output
10    ----------------------------------------------------------*/
11  #pragma  portrw  porta       @ 0x00 ;
12  #pragma  portrw  portb       @ 0x01 ;
13  #pragma  portrw  portc       @ 0x02 ;
14  #pragma  portrw  portd       @ 0x03 ;
15  #pragma  portrw  ddra        @ 0x04 ;
16  #pragma  portrw  ddrb        @ 0x05 ;
17  #pragma  portrw  ddrc        @ 0x06 ;
18  #pragma  portrw  ddrd        @ 0x07 ;

19  /*----------------------------------------------------------
20                   Define Timer Registers
21    ----------------------------------------------------------*/
22  #pragma portrw TimerControl    @ 0x12 ;   /* Timer Control Register */
23  #pragma portrw TimerStatus     @ 0x13 ;   /* Timer Status Register */
24  #pragma portrw InputTimerHigh  @ 0x14 ;   /* Input Timer High */
25  #pragma portrw InputTimerLow   @ 0x15 ;   /* Input Timer Low */
26  #pragma portrw TimerCmpHigh    @ 0x16 ;   /* Compare High Register */
27  #pragma portrw TimerCmpLow     @ 0x17 ;   /* Compare Low Register */
28  #pragma portrw TimerRegHigh    @ 0x18 ;   /* Counter High Register */
29  #pragma portrw TimerRegLow     @ 0x19 ;   /* Counter Low Register */
30  #pragma portrw TimerAltHigh    @ 0x1A ;   /* Alternate High Register */
31  #pragma portrw TimerAltLow     @ 0x1B ;   /* Alternate Low Register */

32  /*----------------------------------------------------------
33                   Define User Vectors
34    ----------------------------------------------------------*/
35  #pragma vector timer_int       @ 0x1FF8 ; /* Timer interrupt vector */
36  #pragma vector external_int    @ 0x1FFA ; /* External interupt vector */
37  #pragma vector soft_int        @ 0x1FFC ; /* Software interrupt vector */
38  #pragma vector __RESET         @ 0x1FFE ; /* Reset vector */

39  /*----------------------------------------------------------
40        Tell the compiler about this two special instructions
41    ----------------------------------------------------------*/
42  #pragma has STOP ;
43  #pragma has MUL ;
```

CODE LISTING 2 APPENDIX  module tagconfg.h 354
COPYRIGHT 1993 SAVI TECHNOLOGY, INC.

```
44      /*---------------------------------------------------------
45              Define all the hardware I/O lines
46      ---------------------------------------------------------*/
47      #ifdef C4_MICRO
48      #define DDRA 0b01010111
49                  /*--------------- C6805C4 ------------------*/
50                  /* PA0 OUT  RS LCD                          */
51                  /* PA1 OUT  E  LCD                          */
52                  /* PA2 OUT  TR switch                       */
53                  /* PA3 IN   TR switch ready (active high)   */
54                  /* PA4 OUT  TX line                         */
55                  /* PA5 IN   Pulse Threshold Select (HI=hardcode) */
56                  /* PA6 OUT  Enable wakeup circuit (active low)   */
57                  /* PA7 IN   Sense Low battery line (active high) */
58                  /*------------------------------------------*/
59      #else
60      #define DDRA 0b01010100
61                  /*--------------- C6805P1 ------------------*/
62                  /* PA0 IN   INPUT LINE0                     */
63                  /* PA1 IN   INPUT LINE1                     */
64                  /* PA2 OUT  TR switch                       */
65                  /* PA3 IN   TR switch ready (active high)   */
66                  /* PA4 OUT  TX line                         */
67                  /* PA5 IN   Pulse Threshold Select (HI=hardcode) */
68                  /* PA6 OUT  Enable wakeup circuit (active low)   */
69                  /* PA7 IN   Sense Low battery line (active high) */
70                  /*------------------------------------------*/
71      #endif 72      #ifdef C4_MICRO
73      #define DDRB 0b11111111
74                  /*--------------- C6805C4 ------------------*/
75                  /* PB0 OUT  LCD data bus line 0             */
76                  /* PB1 OUT  LCD data bus line 1             */
77                  /* PB2 OUT  LCD data bus line 2             */
78                  /* PB3 OUT  LCD data bus line 3             */
79                  /* PB4 OUT  LCD data bus line 4             */
80                  /* PB5 OUT  LCD data bus line 5             */
81                  /* PB6 OUT  LCD data bus line 6             */
82                  /* PB7 OUT  LCD data bus line 7             */
83                  /*------------------------------------------*/
84      #else
85      #define DDRB 0b11111111
86                  /*--------------- C6805P1 ------------------*/
87                  /* PB0 ---  Line does not exist in P1       */
88                  /* PB1 ---  Line does not exist in P1       */
89                  /* PB2 ---  Line does not exist in P1       */
```

CODE LISTING 2 APPENDIX
COPYRIGHT 1993 SAVI TECHNOLOGY, INC.

module tagconfg.h 355

```
90              /* PB3 --- Line does not exist in P1        */
91              /* PB4 --- Line does not exist in P1        */
92              /* PB5 OUT  OUTPUT LINE0                    */
93              /* PB6 OUT  OUTPUT LINE1                    */
94              /* PB7 OUT  OUTPUT LINE2                    */
95              /*------------------------------------------*/
96   #endif 97   #ifdef C4_MICRO
98   #define DDRC 0b11011100
99              /*--------------- C6805C4 ------------------*/
100             /* PC0 IN   NC                              */
101             /* PC1 INT  NC                              */
102             /* PC2 OUT  BEEPER                          */
103             /* PC3 OUT  eeprom Vcc (active high)        */
104             /* PC4 OUT  eeprom DI (data in)             */
105             /* PC5 IN   eeprom DO (data out)            */
106             /* PC6 OUT  eeprom CS (chip select)         */
107             /* PC7 OUT  eeprom SK (clock input)         */
108             /*------------------------------------------*/
109  #else
110  #define DDRC 0b01111100
111  /* #define DDRC  0b01111110 define PC1 as a debug output line */

112             /*--------------- C6805P1 ------------------*/
113             /* PC0 IN   INTERRUPT A                     */
114             /* PC1 IN   INTERRPUT B                     */
115             /* PC2 OUT  BEEPER                          */
116             /* PC3 OUT  eeprom Vcc (active high)        */
117             /* PC4 OUT  eeprom CS (chip select)         */
118             /* PC5 OUT  eeprom SK (clock input)         */
119             /* PC6 OUT  eeprom DI (data in)             */
120             /* PC7 IN   eeprom DO (data out)            */
121             /*------------------------------------------*/
122  #endif 123  #define DDRD 0b01000000
124             /*------------- C6805P1 ONLY ---------------*/
125             /* PD0 --- Line does not exist in P1        */
126             /* PD1 --- Line does not exist in P1        */
127             /* PD2 --- Line does not exist in P1        */
128             /* PD3 --- Line does not exist in P1        */
129             /* PD4 --- Line does not exist in P1        */
130             /* PD5 IN   Detect eeprom type (1=1Kbit,0=2Kbit)*/
131             /* PD6 OUT  Used by the micro as TCMP       */
132             /* PC6 IN   Input line shared with TCAP     */
133             /*------------------------------------------*/
```

CODE LISTING 2 APPENDIX
COPYRIGHT 1993 SAVI TECHNOLOGY, INC.

module tagconfg.h 356

```
134     /*-----------------------------------------------------------
135             Define macros to access control lines
136     ------------------------------------------------------------*/
137     #define TX_LINE porta.4
138     #define outhigh TX_LINE = 1 ;
139     #define outlow  TX_LINE = 0 ;

140     /* line to control the beeper */
141     #define BEEPER_LINE portc.2

142     /* line to sense battery low bit */
143     #define BATTERY_LINE porta.7

144     /* line to the TR switch */
145     #define TR_SWITCH_LINE porta.2

146     /* line to sense the sense RF ready line */
147     #define TR_READY_LINE porta.3

148     /* line to enable the wakeup circuit */
149     #define ENABLE_WAKEUP_LINE porta.6

150     /* line to select hard or soft pulse mesurment thresholds */
151     #define USE_EE_THRESH porta.5

152     /*-----------------------------------------------------------
153             Eeprom control lines
154     ------------------------------------------------------------
155     C4 -------->>>
156             PC3 OUT  eeprom Vcc (active high)
157             PC4 OUT  eeprom DI (data in)
158             PC5 IN   eeprom DO (data out)
159             PC6 OUT  eeprom CS (chip select)
160             PC7 OUT  eeprom SK (clock input)

161             PD5 IN   eeprom type (1=1Kbit,0=2Kbit)
162     P1 -------->>>
163             PC3 OUT  eeprom Vcc (active high)
164             PC4 OUT  eeprom CS (chip select)
165             PC5 OUT  eeprom SK (clock input)
166             PC6 OUT  eeprom DI (data in)
167             PC7 IN   eeprom DO (data out)

168             PD5 IN   eeprom type (1=1Kbit,0=2Kbit)
169     ------------------------------------------------------------*/
```

CODE LISTING 2 APPENDIX  
COPYRIGHT 1993 SAVI TECHNOLOGY, INC.  
module tagconfg.h 357

```
170     #define EEPROM_TYPE portd.5

171     #ifdef C4_MICRO

172     #define ee_vcc  portc.3
173     #define ee_put  portc.4
174     #define ee_get  portc.5
175     #define ee_cs   portc.6
176     #define ee_sk   portc.7

177     #else

178     #define ee_vcc  portc.3
179     #define ee_cs   portc.4
180     #define ee_sk   portc.5
181     #define ee_put  portc.6
182     #define ee_get  portc.7

183     #endif

184     /*------------------------------------------------------------
185                 External interrupts.
186     ------------------------------------------------------------
187         C4 -> use portD
188         P1 -> use portC
189         Interrupt Line A goes to pin 0 (C4 and P1)
190         Interrupt Line B goes to pin 1 (C4 and P1)
191     ------------------------------------------------------------*/
192     #ifdef C4_MICRO
193     #define interrupt_port portd
194     #else
195     #define interrupt_port portc
196     #endif
197     #define BIT_INTA 0
198     #define BIT_INTB 1
199     (  NuAc       /* e;

200     #^F@ NuAc     /* e;

201     #^F@ NuAc     /* e;

202     #^F@ NuAc     /* e
```

We claim:

1. A communication system for efficiently identifying large numbers of items through transmission and reception of signals in a communication region, where the number of items is large and may exceed one hundred in the region, and where the location of the items in the region may not be known, said communication system comprising:

a plurality of tags, one for each of said items, an interrogator for communicating with said tags, said tags and said interrogator communicating over a common communication channel with a communication protocol, said communication protocol including a sequence common to all tags, said sequence including a plurality P of collection periods CP(1), CP(2), ..., CP(p), ..., CP(P), each collection period for identifying different ones of the tags whereby all tags can be identified during said sequence, where one number of said tags are identified during one of said collection periods and where different numbers, less than said one number, of said tags are identified during different ones of said collection periods, each collection period having, a synchronization period during which said interrogator can communicate with said plurality of tags whereby respective synchronization periods SP(1), SP(2), ..., SP(p), ..., SP(P) are provided, a listen period during which each of said plurality of tags can communicate a tag identifying signal to said interrogator over said communication channel whereby respective listen periods LP(1), LP(2), ..., LP(p), ..., LP(P) are provided, and wherein each of said listen periods has a plurality of time slots such that, said listen period LP(1) has D1 time slots TS(1,1), TS(1,2), ..., TS(1,d1), ..., TS(1,D1), said listen period LP(2) has D2 time slots TS(2,1), TS(2,2), ..., TS(2,d2), ..., TS(2,D2), and so on, and said listen period LP(p) has Dp time slots TS(p,1), TS(p,2), ..., TS(p,dp), ..., TS(p,Dp), and so on, and said listen period LP(P) has DP time slots TS(P,1), TS(P,2), ..., TS(P,dP), ..., TS(P,DP), an acknowledge period during which said interrogator can communicate acknowledge signals to said tags over said communication channel whereby respective acknowledge periods AP(1), AP(2), ..., AP(p), ..., AP(P) are provided, said interrogator including, interrogator memory for storing interrogator code including one or more broadcast commands, one or more directed commands and duration control code for controlling the duration of said collection periods such that one or more of the listen periods LP(2), ..., LP(p), ..., LP(P) has fewer time slots than the listen period LP(1) whereby said one or more listen periods LP(2), ..., LP(p), ..., LP(P) are shorter than said listen period LP(1), interrogator processor means connected for accessing said interrogator memory and for processing said interrogator code and for sequencing said broadcast commands and said directed commands, signal sending means, operable for each of said collection periods, for sending during said synchronization period one of said broadcast commands over the common communication channel to the tags to signal the commencement of the listen period, receiver means, operable for each of said collection periods, for receiving tag identifying signals over the common communication channel from said tags during said listen period, acknowledge sending means, operable for each of said collection periods, for sending acknowledge signals as directed commands over the common communication channel to said tags during said acknowledge period, each of said tags including, signal receiving means, operable for one or more of said collection periods, for receiving said one of said broadcast commands from the signal sending means during said synchronization period so as to identify the start of the listen period, identification sending means, operable for one or more of said collection periods, for sending a tag identifying signal during only one of said time slots during the listen period, acknowledge receiving means, operable for one of said collection periods, for receiving an acknowledge signal from said interrogator during the acknowledge period, control means, operable for said one or more of said collection periods, for controlling said identification sending means, said control means operative, before said acknowledge receiving means receives said acknowledge signal and during each of said one or more of said collection periods, for selecting one of said time slots for sending a tag identifying signal whereby two or more of said plurality of tags may each send a respective tag identifying signal over said common communication channel during the same time slot such that during some time slots of listen periods collisions of tag identifying signals may occur and such that during other time slots of listen periods no collision of tag identifying signals occurs, said control means operative, after said acknowledge means receives said acknowledge signal, for inhibiting said identification sending means from sending said tag identifying signal.

2. The communication system of claim 1 wherein the number of time slots D2 is approximately one half the number of time slots D1 whereby listen period LP(2) is shorter than listen period LP(1), wherein a number of time slots D3 is approximately one half the number of time slots D2 whereby a listen period LP(3) is shorter than listen period LP(2), and wherein a number of time slots D4 is approximately one half the number of time slots D3 whereby a listen period LP(4) is shorter than listen period LP(3).

* * * * *